(12) United States Patent
Strauch et al.

(10) Patent No.: US 6,522,939 B1
(45) Date of Patent: Feb. 18, 2003

(54) COMPUTER SYSTEM FOR QUALITY CONTROL CORRELATION

(76) Inventors: Robert D. Strauch, 10558 Clydesdale Dr. West, Jacksonville, FL (US) 32257; John Mark Lepper, 8991 Hunt Valley Dr., West Jacksonville, FL (US) 32257; Wallace Anthony Martin, 2603 Sandlewood Ct., Orange Park, FL (US) 32065; Ravi Sankar Sanka, 10322 Heather Glen Dr., North Jacksonville, FL (US) 32256; Craig William Walker, 3746 Hunt Club Rd., Jacksonville, FL (US) 32224; Daniel Tsu-Fang Wang, 13753 Night Hawk Ct., Jacksonville, FL (US) 32225; Lars William Johnson, 1271 Stephanie Ct., Indialantic, FL (US) 32903; Leonard Ross Reinhart, 515 Andrews Dr., Melbourne Beach, FL (US) 32951; Larry G. Hearin, 4709 Sam Bass Rd., Round Rock, TX (US) 78681; Carolyn R. Solberg, 5007 Strass Dr., Austin, TX (US) 78731; Jeffrey L. Wilson, Rte. 3, Box 8263, Elgin, TX (US) 78621

( * ) Notice: Subject to any disclaimer, the term of this patent is extended or adjusted under 35 U.S.C. 154(b) by 0 days.

(21) Appl. No.: 08/550,613

(22) Filed: Jul. 1, 1996

(Under 37 CFR 1.47)

(51) Int. Cl.$^7$ .............................................. G06F 19/00
(52) U.S. Cl. ........................... 700/116; 700/28; 700/32; 700/108; 700/109; 700/110; 700/216; 702/81; 702/82; 702/84; 702/115; 165/22
(58) Field of Search ................................. 700/116, 216, 700/108, 109, 28, 32, 110; 702/81, 115, 82, 84; 165/22

(56) References Cited

U.S. PATENT DOCUMENTS

| | | | | |
|---|---|---|---|---|
| 4,465,348 A | * | 8/1984 | Lang et al. | 351/211 |
| 5,396,432 A | * | 3/1995 | Saka et al. | 364/468.18 |
| 5,434,790 A | * | 7/1995 | Saka et al. | 364/468.17 |
| 5,434,792 A | * | 7/1995 | Saka et al. | 364/468.17 |
| 5,555,504 A | * | 9/1996 | Lepper et al. | 364/468.23 |
| 5,891,371 A | * | 4/1999 | Lepper et al. | 264/2.1 |

* cited by examiner

Primary Examiner—William A. Cuchlinski, Jr.
Assistant Examiner—McDieunel Marc
(74) Attorney, Agent, or Firm—Scully, Scott, Murphy & Presser

(57) ABSTRACT

A production control system provides real-time monitoring of process parameters in an automated production line that manufactures contact lenses, the line and having a plurality of process stations with each process station having one or more process control devices that control production operations at each respective process station and generates production parameter data therefrom. The system includes a line monitor device for receiving an externally generated production order including a lot number, product type, and quantity, and further coordinates manufacturing processes at each of the plurality of process stations, and tracks order production. A plurality of cell monitor devices retrieves the production data from one or more process control devices and processes the data to ensure that production parameters are within predefined limits. Real-time viewing of respective line status and device status information is provided by an interface device that accesses respective line status information from the line monitor device and production data from said cell monitor. Activation and completion of orders at each process station is also provided via the interface device.

27 Claims, 96 Drawing Sheets

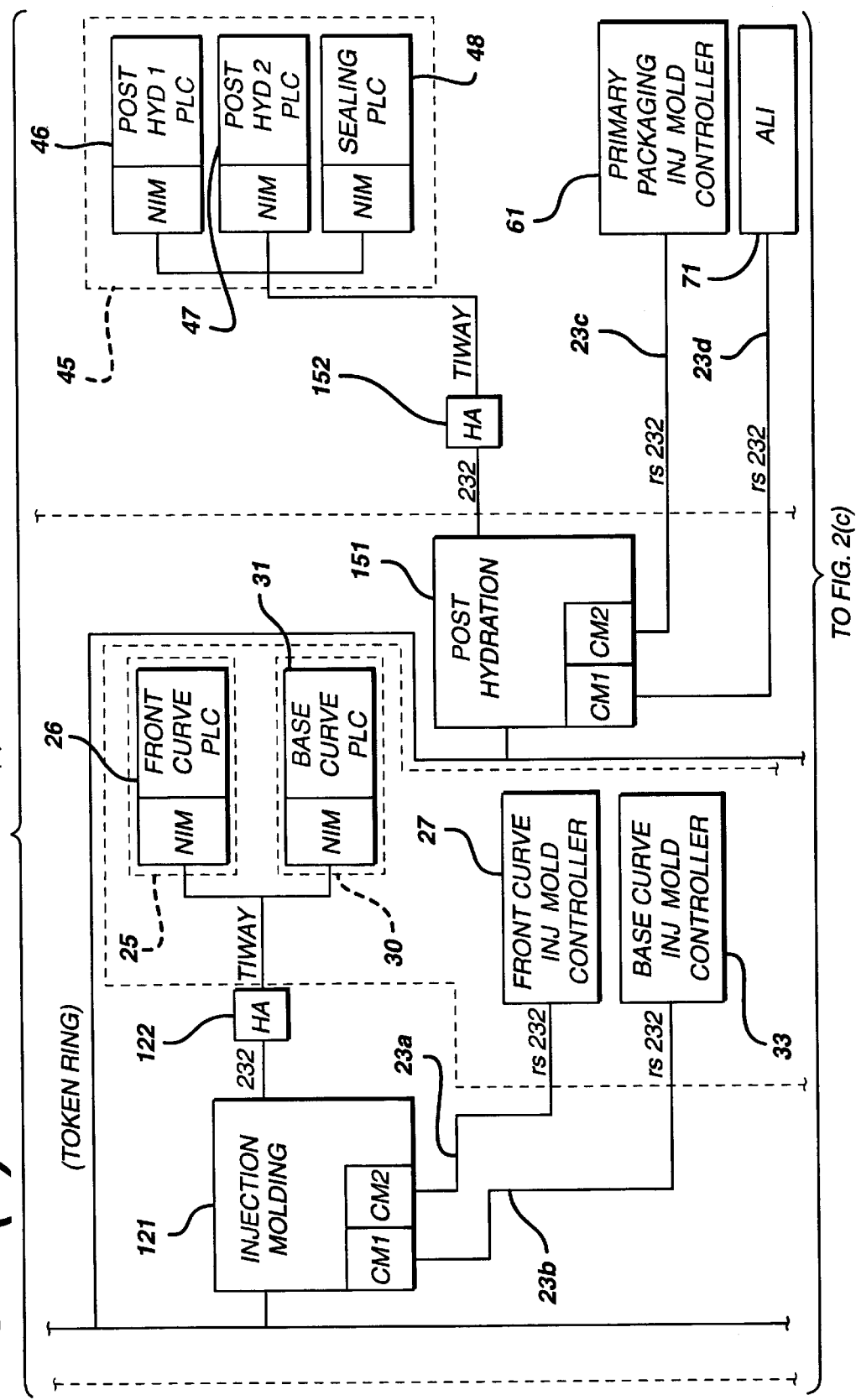

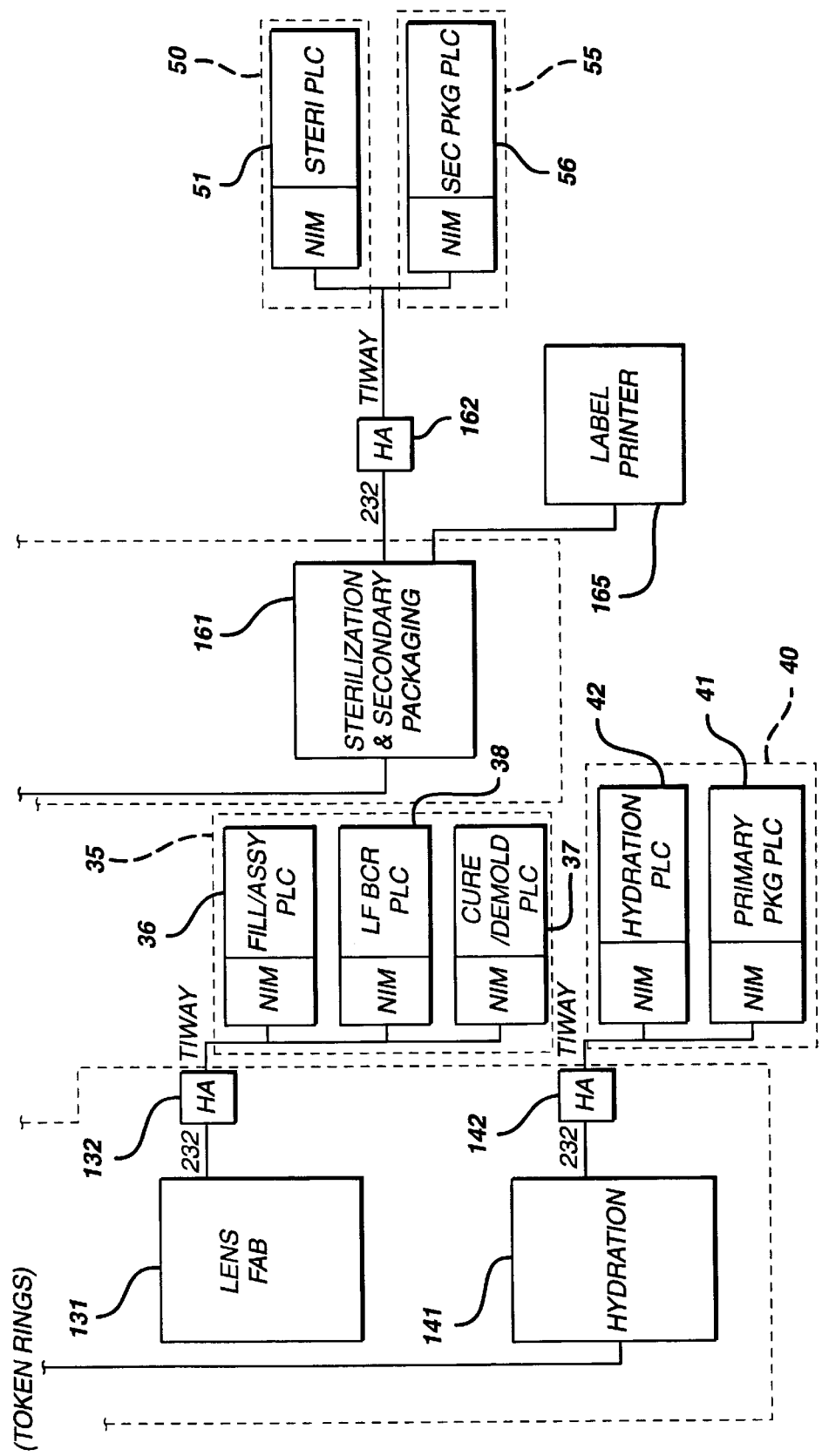

FIG. 5(a)

| TABLE Ⓐ | TABLE Ⓑ | TABLE Ⓒ |
|---|---|---|
| PS1, PS2, PS3, | PS1, PS2 | LF1, LF2, LF3, |
| PS4, PS5, PS6, | PS3, PS4 | LF4, LF5, LF6, |
| PS7, PS8, PS9, | PS10, PS11 | LF7, LF8, LF9, |
| PS1, PS22, PS23, | PS12, PS13 | LF10, LF11, LF12, |
| PS25, PS26, PS27, | PS14, PS15 | LF13, LF14, LF15, |
| PS29, PS30, PS31, | PS16, PS17 | LF16, LF17, LF18, |
| PS33, PS44, PS90, | PS18, PS19 | LF19, LF21, LF22, |
| PS91, PS92, PS93, | PS20, PS24 | LF23, LF24, LF25, |
| PS94, PS95, PS96, | PS34, PS35 | LF26, LF27, LF28, |
| PS97, PS98, PS99, | PS36, PS37 | LF29, LF30, LF31, |
| PS100, PS101, PS102, | PS38, PS39 | LF32, LF33, LF34, |
| PS103, PS104, PS105, | PS40, PS41 | LF35, LF36, LF37, |
| PS106, PS107, PS108, | PS42, PS43 | LF38, LF39, LF40 |
| PS109, PS110, PS111, | PS45, PS46 | |
| PS112, PS113, PS114, | PS47, PS51 | |
| PS115, PS116, PS117, | PS52, PS53 | |
| PS118, PS119, PS120, | PS54, PS56 | |
| PS121, PS122, PS123, | PS57, PS58 | |
| PS124, PS125, PS126, | PS59, PS60 | |
| PS127, PS128, PS129, | PS61, PS62 | |
| PS130, PS131, PS132, | PS63, PS64 | |
| PS133, PS134, PS135, | PS65, PS66 | |
| PS136, PS137, PS138, | PS67, PS68 | |
| PS139, PS140, PS141, | PS69, PS70 | |
| PS142, PS143, PS144, | PS71, PS72 | |
| PS145, PS146, PS147, | PS73, PS74 | |
| PS148, PS149, PS150 | PS75, PS76 | |
| | PS77, PS78 | |
| | PS79, PS80 | |
| | PS81, PS82 | |
| | PS88, PS89 | |

FIG. 5(b)

| TABLE D | TABLE E | TABLE F | TABLE G |
|---|---|---|---|
| CF1, CF2, CF3 | I3 | I3 | CF1, CF3, CF4 |
| CF4, CF5, CF6 | I4 | I8 | CF10, CF11, CF19 |
| CF7, CF8, CF9 | I7 | I20 | |
| CF12, CF13, CF15 | I8 | I23 | |
| CF16, CF17, CF18 | I20 | I24 | |
| | I23 | I42 | |
| | I24 | | |
| | I42 | | |

| TABLE H | TABLE J | TABLE K |
|---|---|---|
| PS55 | AS1, AS2, AS3, AS4, AS5, | I26 |
| PS83 | AS6, AS7, AS8, AS9, AS10, | I27 |
| PS84 | AS11, AS12, AS13, AS14, | I28 |
| PS85 | AS15, AS16, AS17, AS90, | I29 |
| PS86 | AS94, AS98, AS102, AS106, | I30 |
| PS87 | AS110, AS114, AS118, AS122, | I31 |
| | AS126, AS130, AS134, AS138, | I32 |
| | AS142, AS146, AS150 | I33 |
| | | I34 |
| | | I35 |
| | | I36 |
| | | I37 |
| | | I38 |
| | | I39 |
| | | I40 |
| | | I41 |

TABLE L

I1, I2, I5, I6, I7, I9, I11, I12, I15, I16, I17, I18, I19, I20, I21, I22, I25

TABLE M

I1, I2, I5, I7, I9, I11, I12, I13, I15, I16, I17, I18, I21, I25

TABLE N

A7, A8, A9, A10, A11

TABLE P

PS46, PS47, PS48, PS50

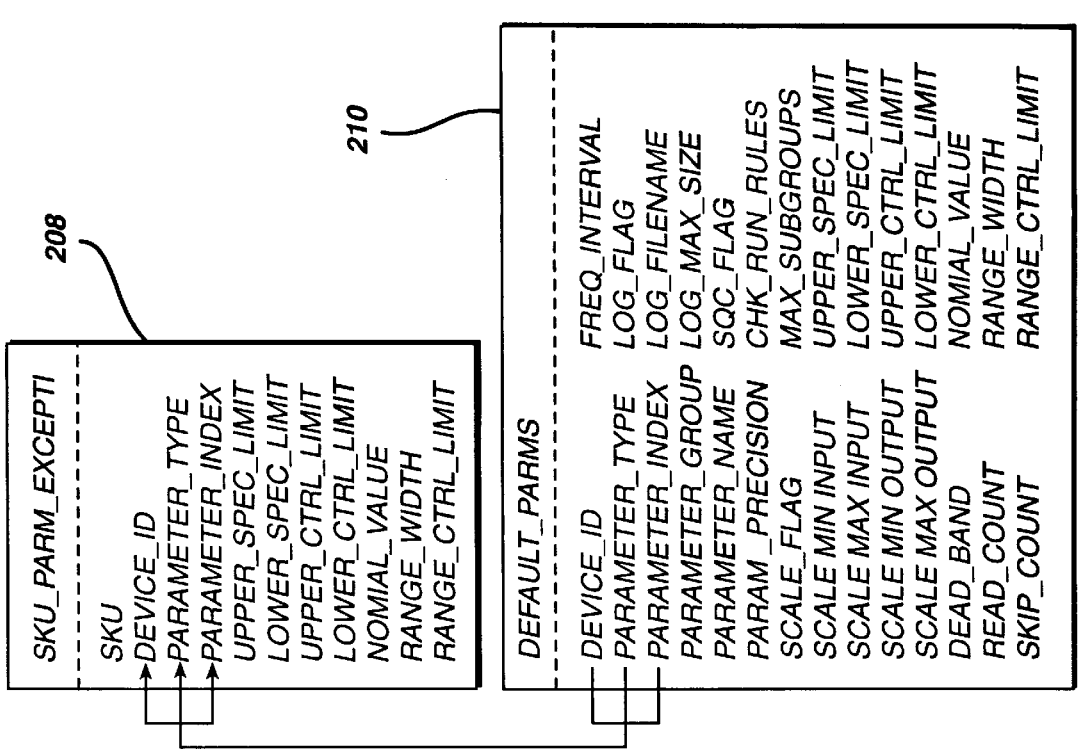
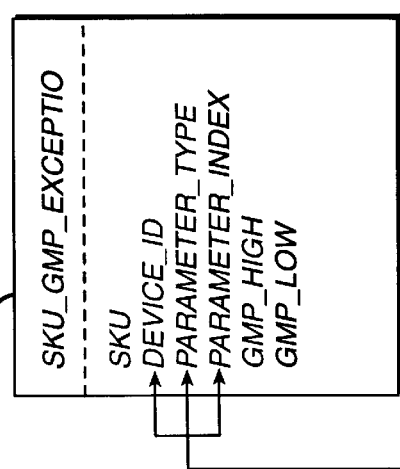
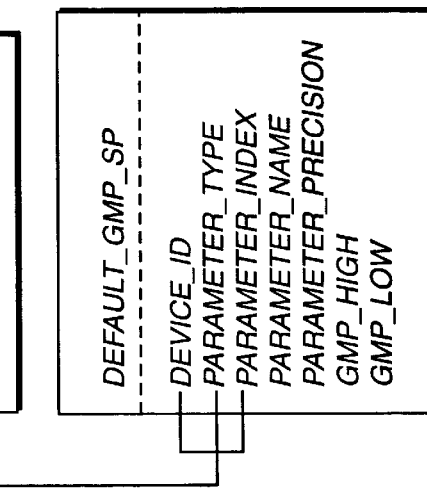
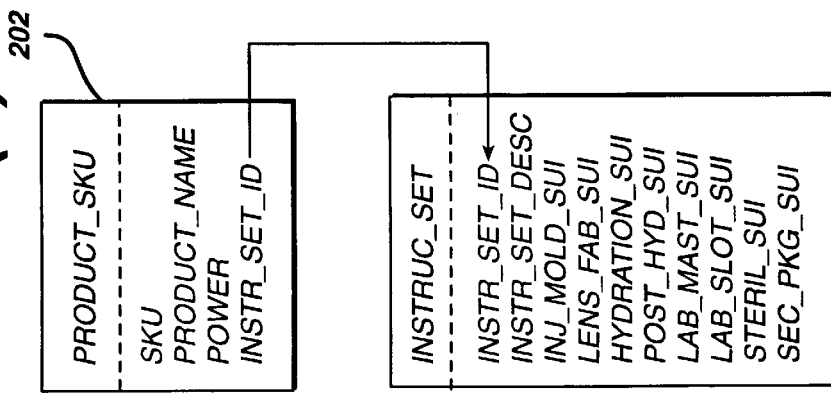

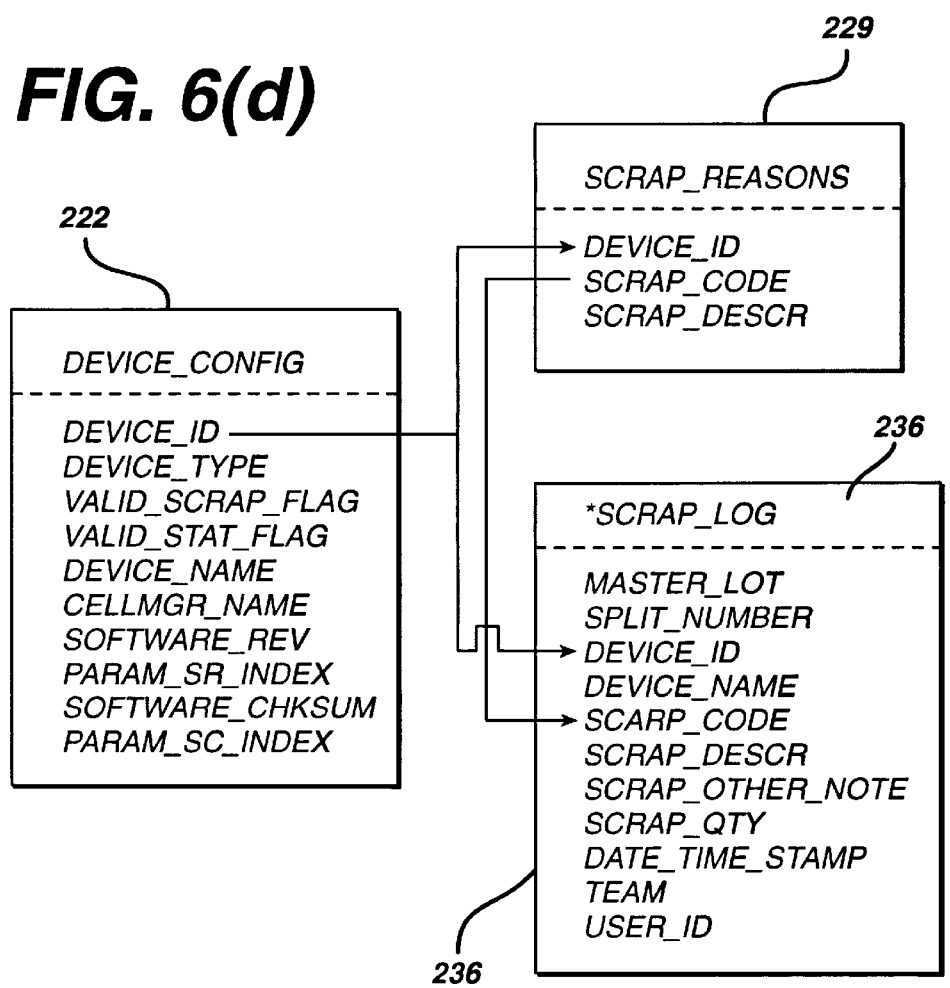
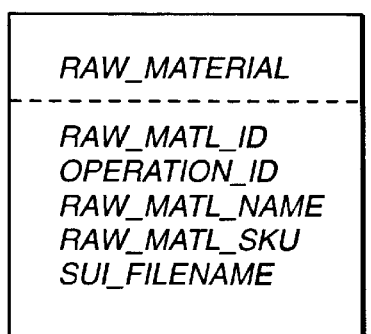
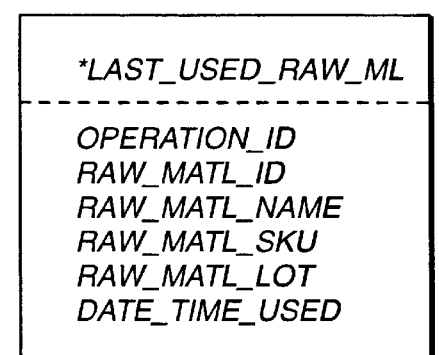

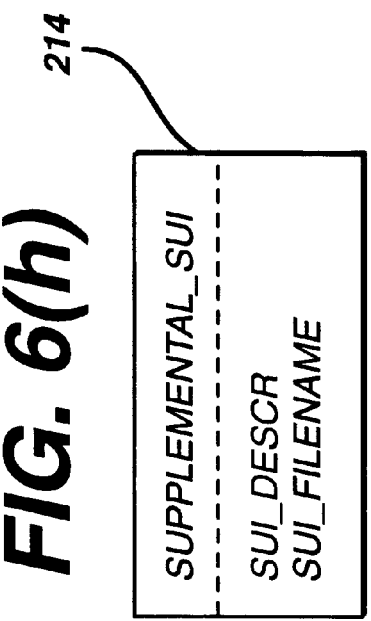
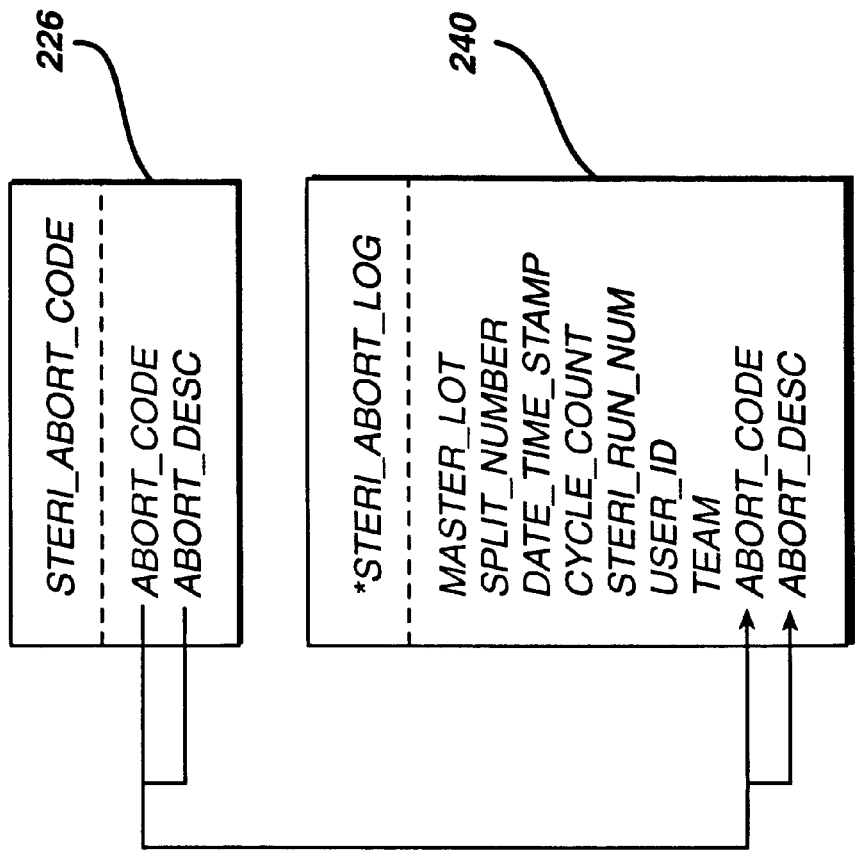

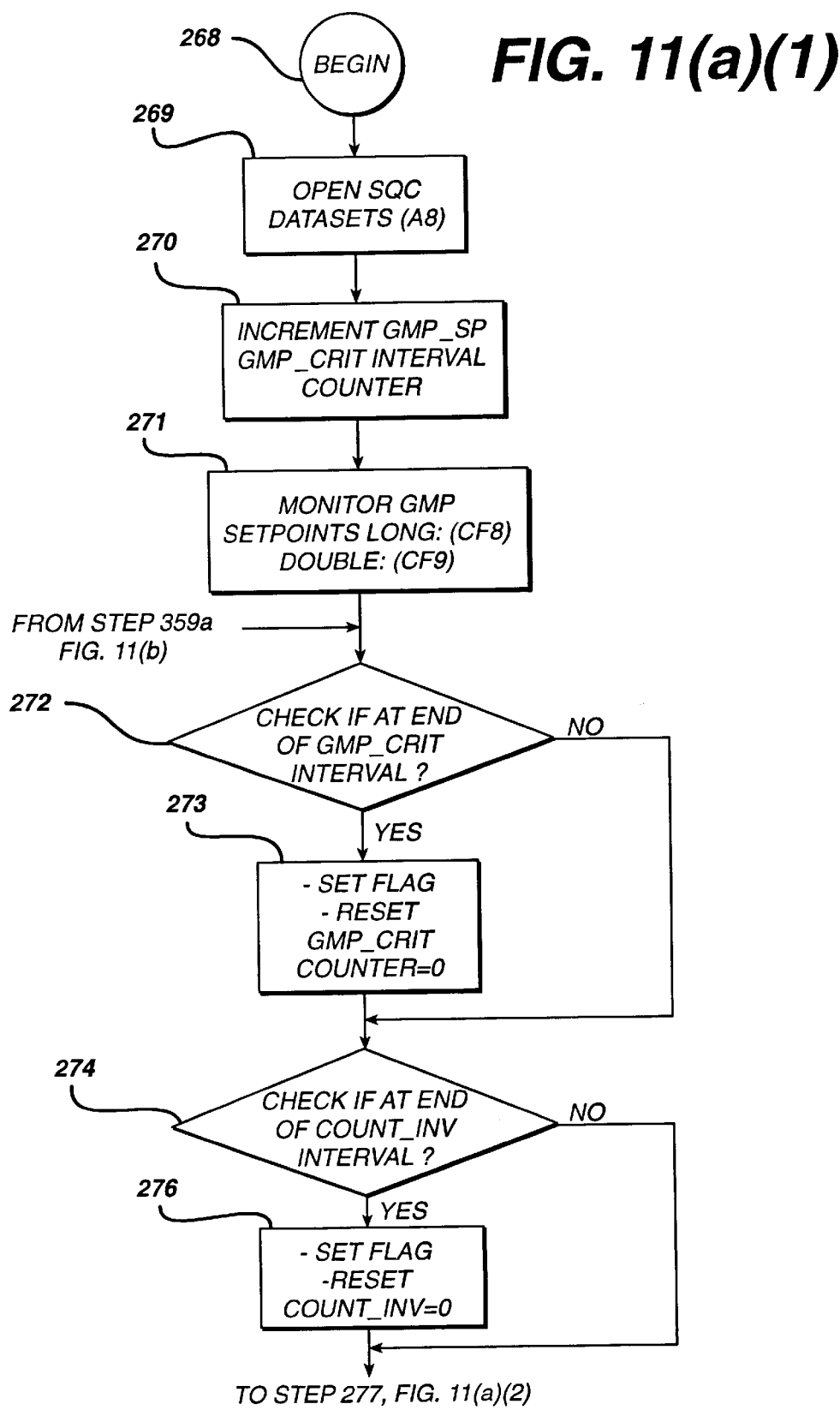
FIG. 11(a)(1)

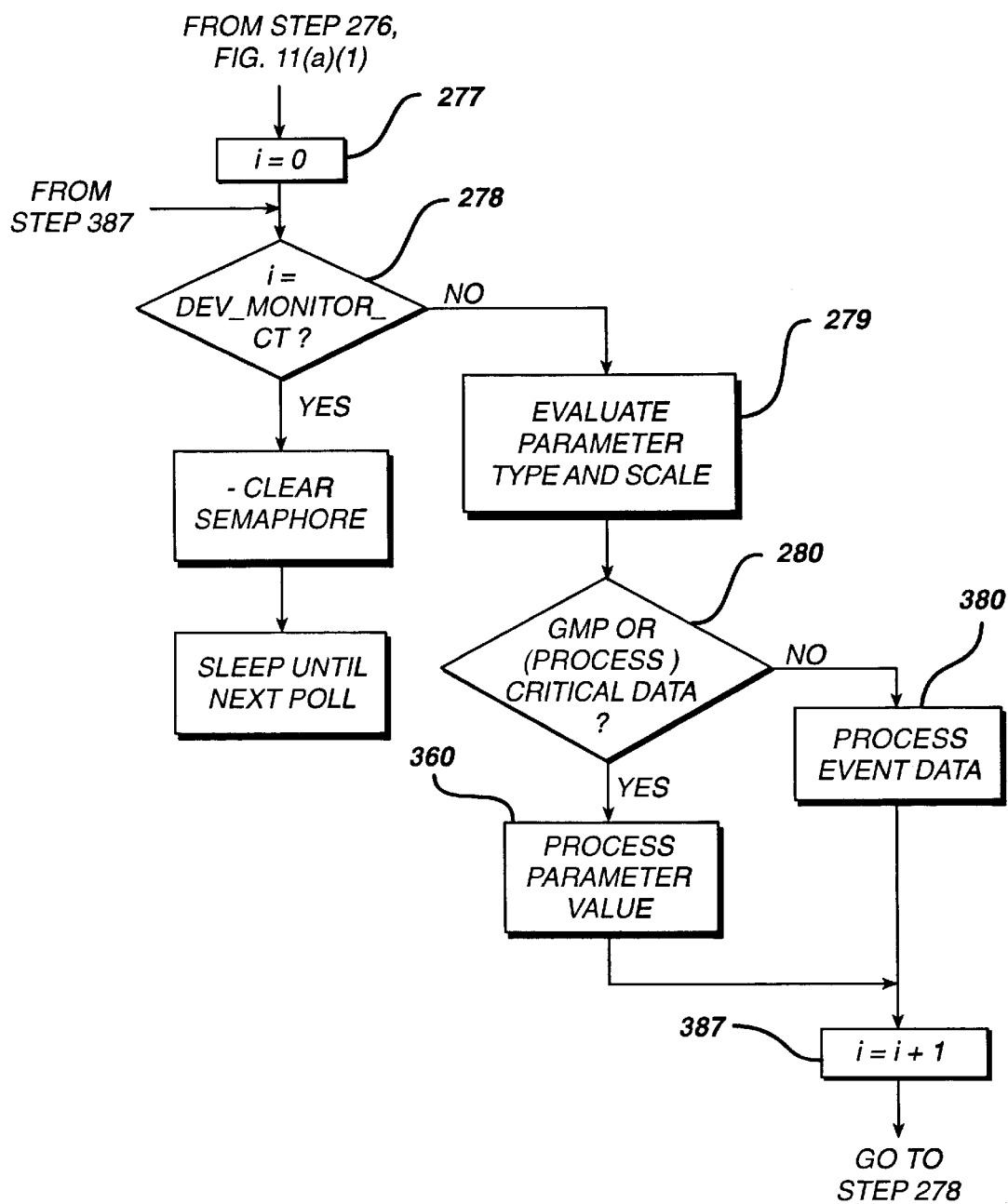
FIG. 11(a)(2)

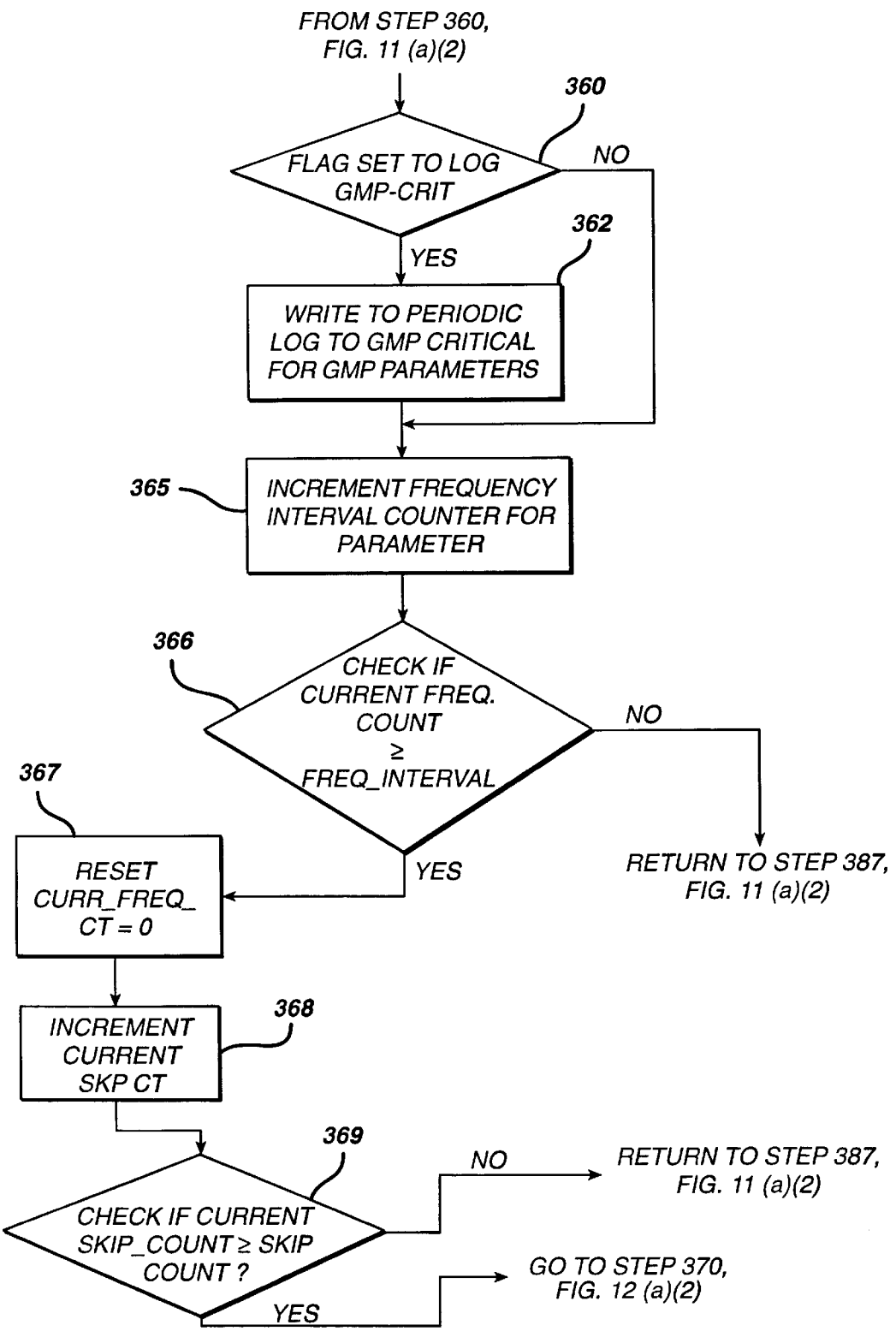
FIG. 12 (a) (1)

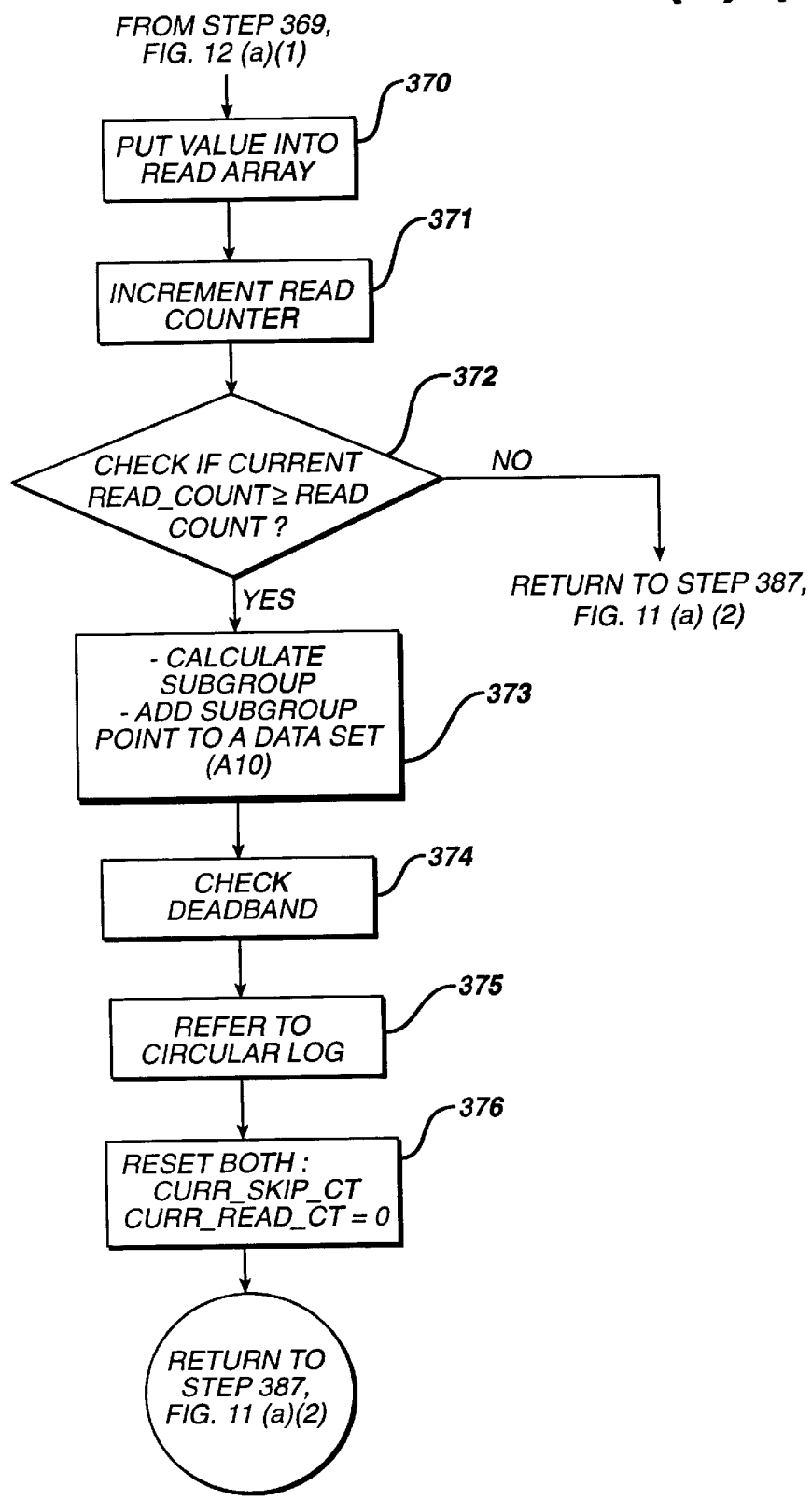
FIG. 12(a) (2)

FIG. 13

SYSTEM LOG ON PC'S

PLEASE IDENTIFY TEAM

1. TEAM A
2. TEAM B
3. TEAM C
4. TEAM D

PLEASE ENTER YOUR USER ID AND PASSWORD TO SIGN ON SHIFT

| SECURITY VALIDATION SCREEN |
|---|
| USER ID : _____ |
| PASSWORD : _____ |
| [ENTER] [UPDATE PASWORD] [ESC=CANCEL] [F1=HELP] |

F1=HELP    F3=SYSTEM EMERGENCY SHUT DOWN

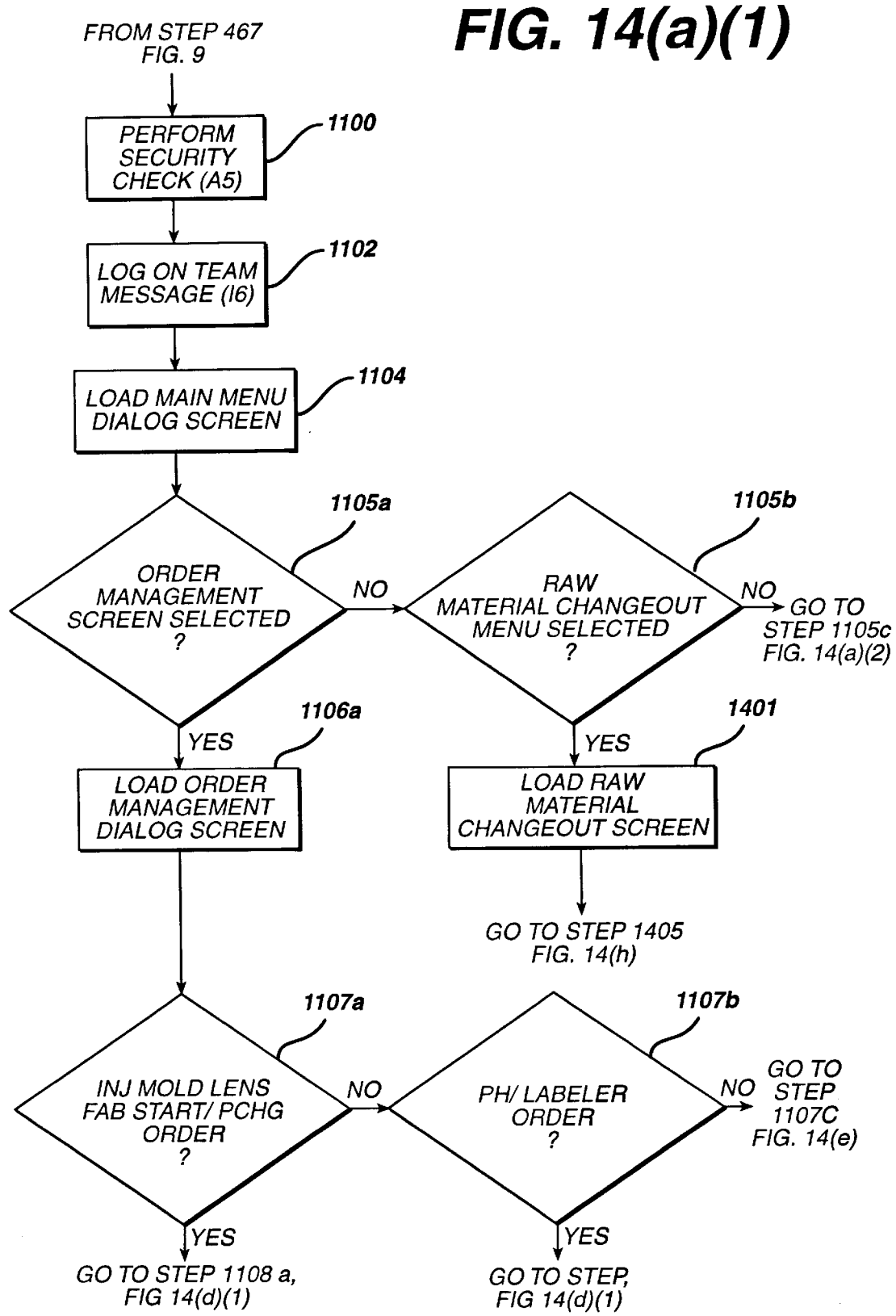
FIG. 14(a)(1)

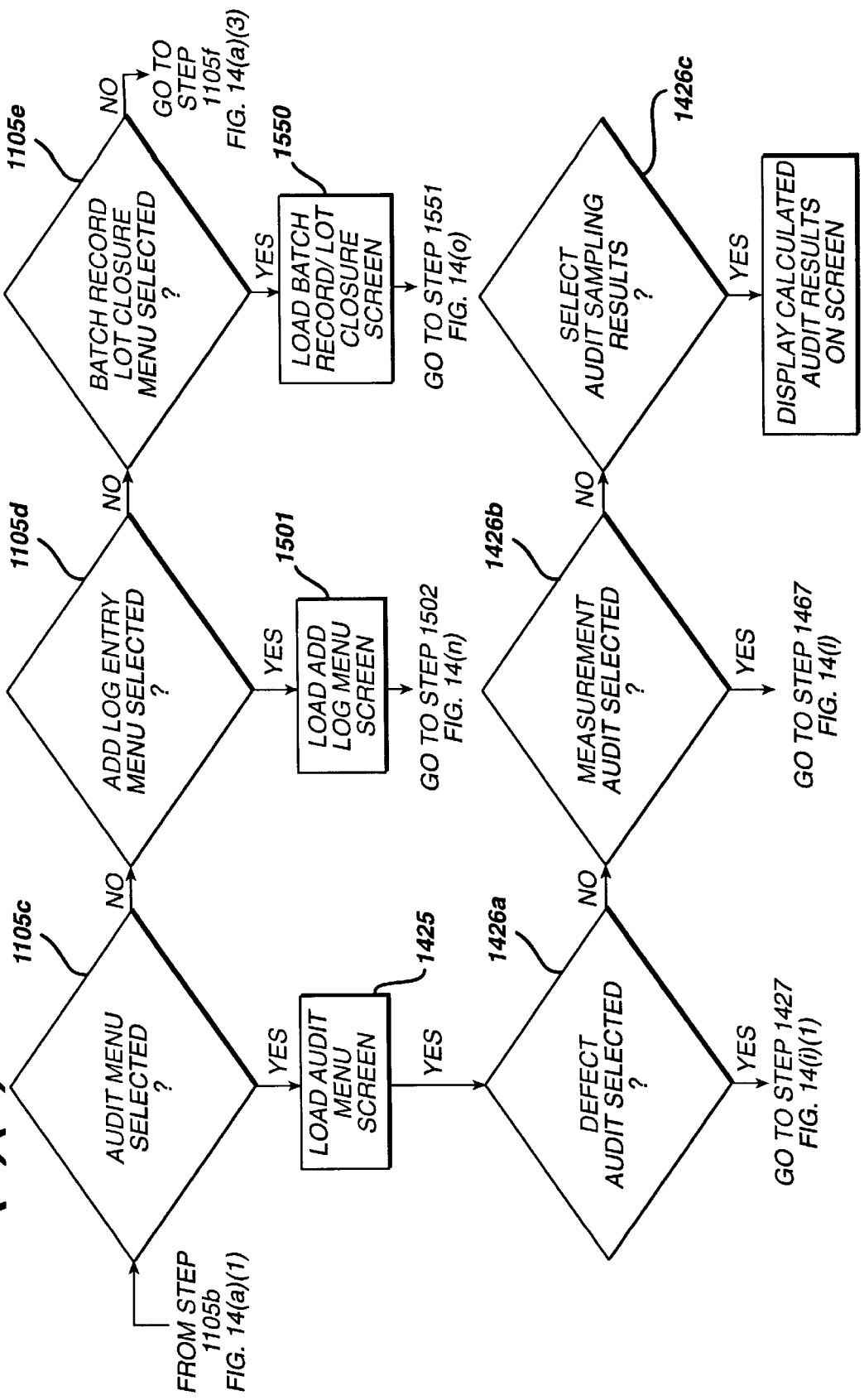

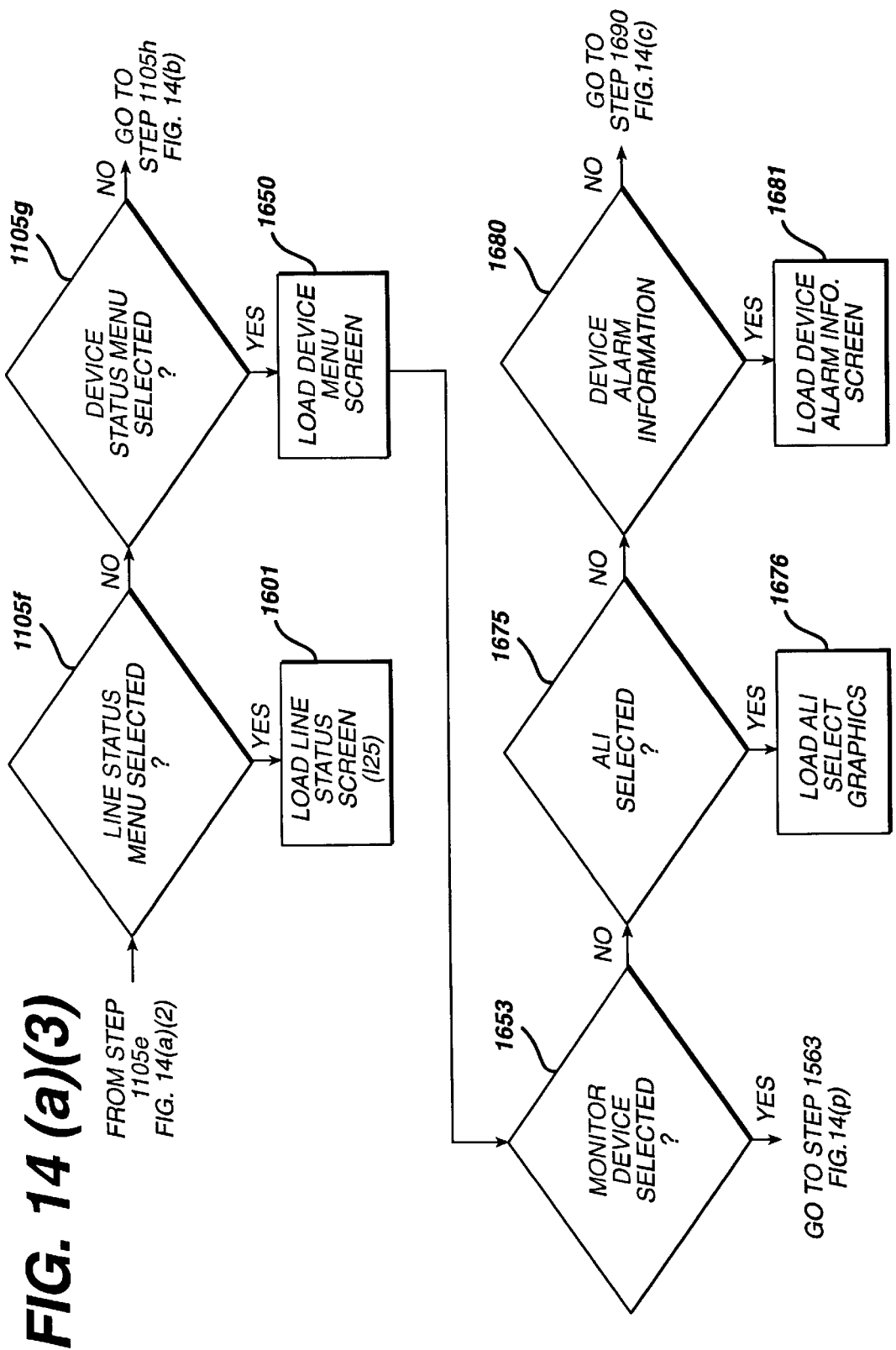
FIG. 14 (a)(3)

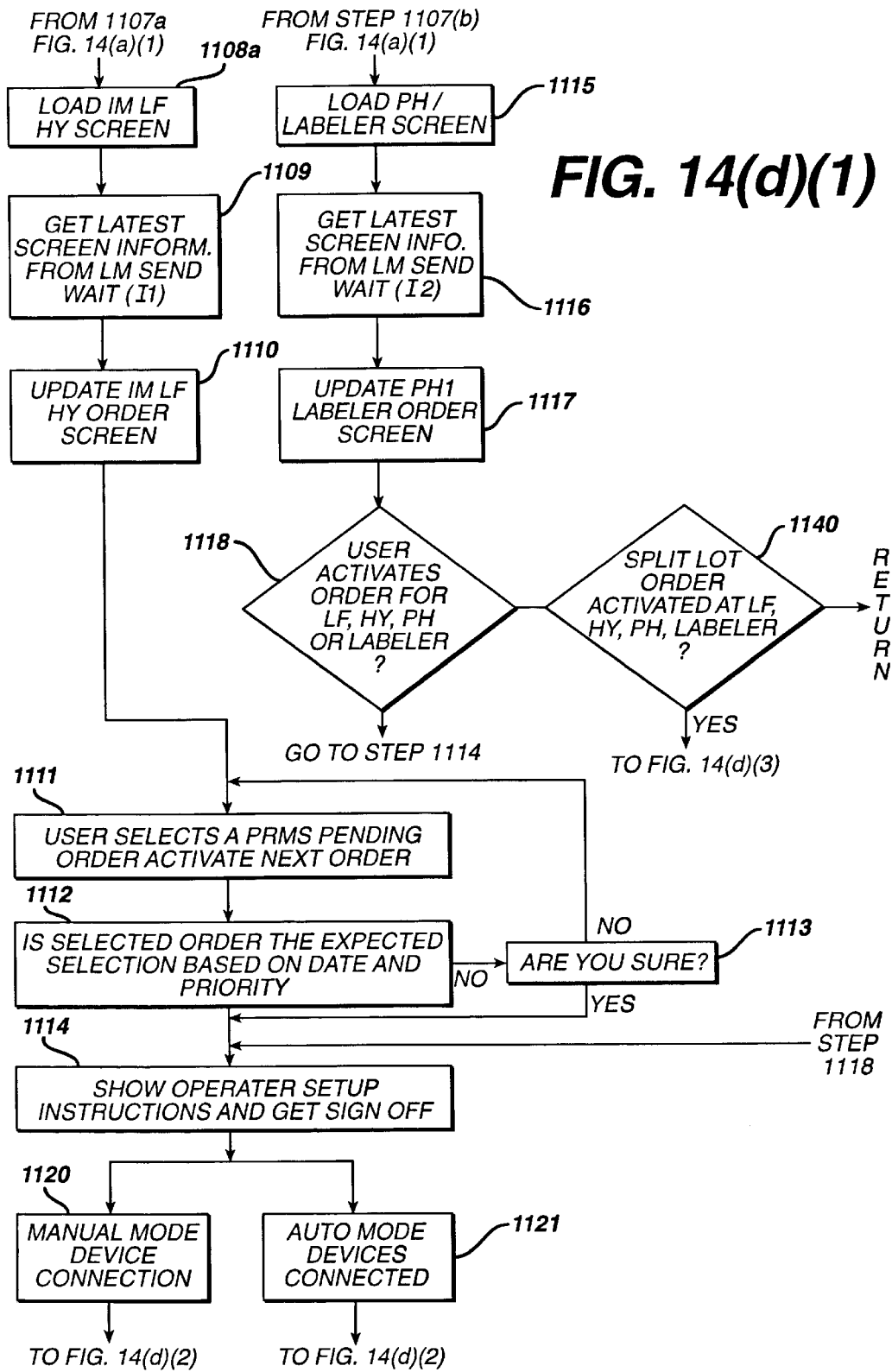

FIG. 14(d)(2)
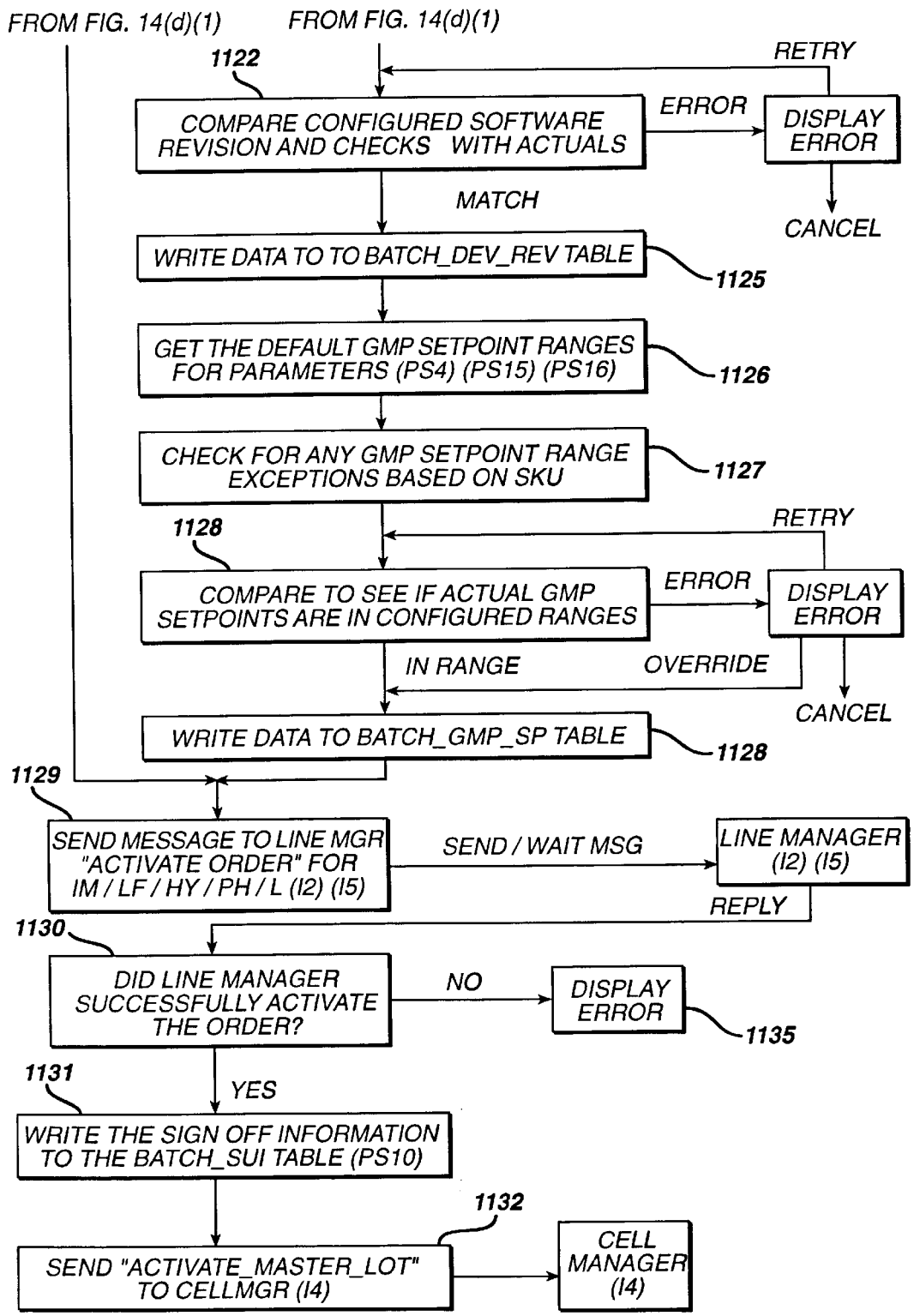

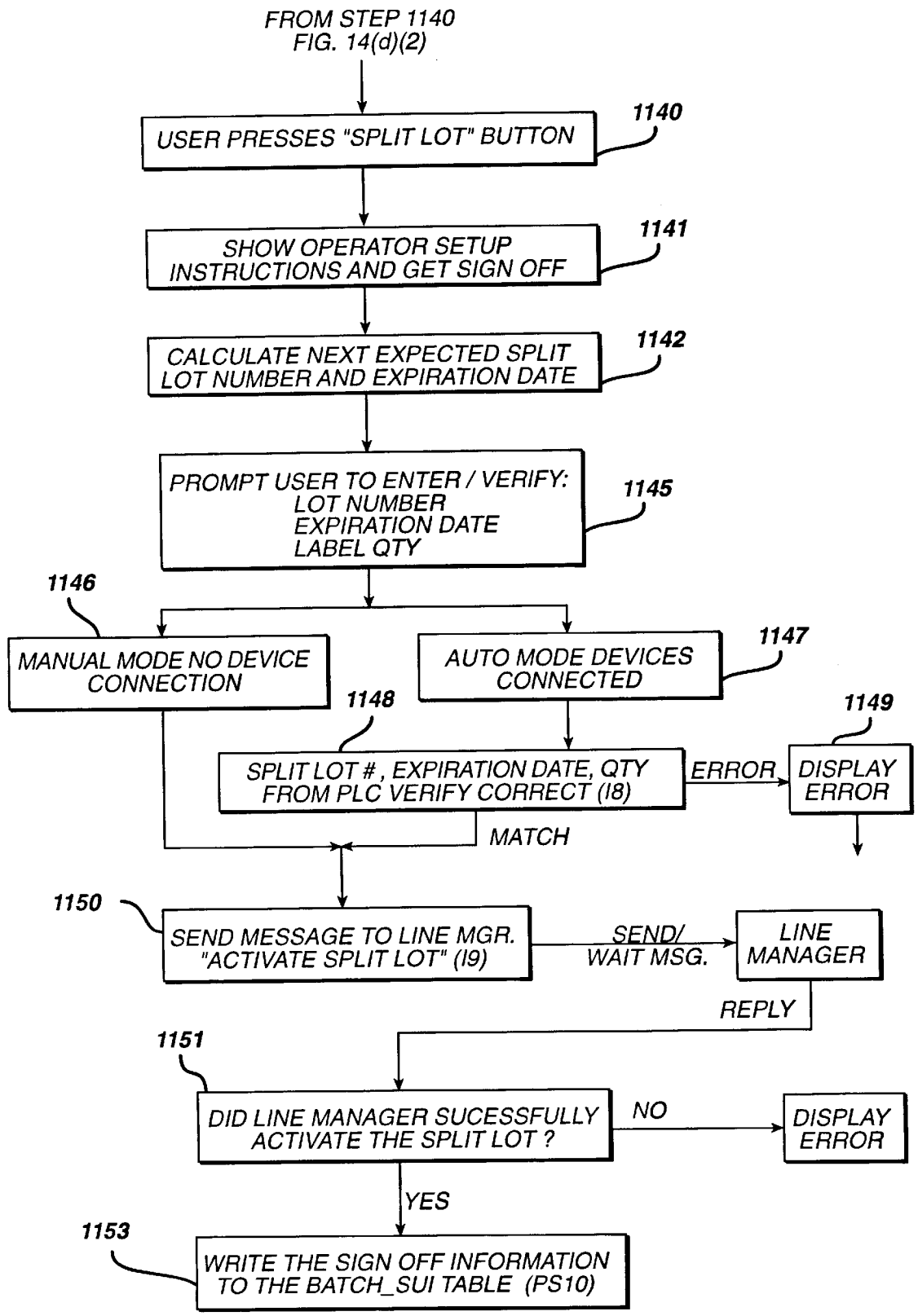
FIG. 14(d)(3)

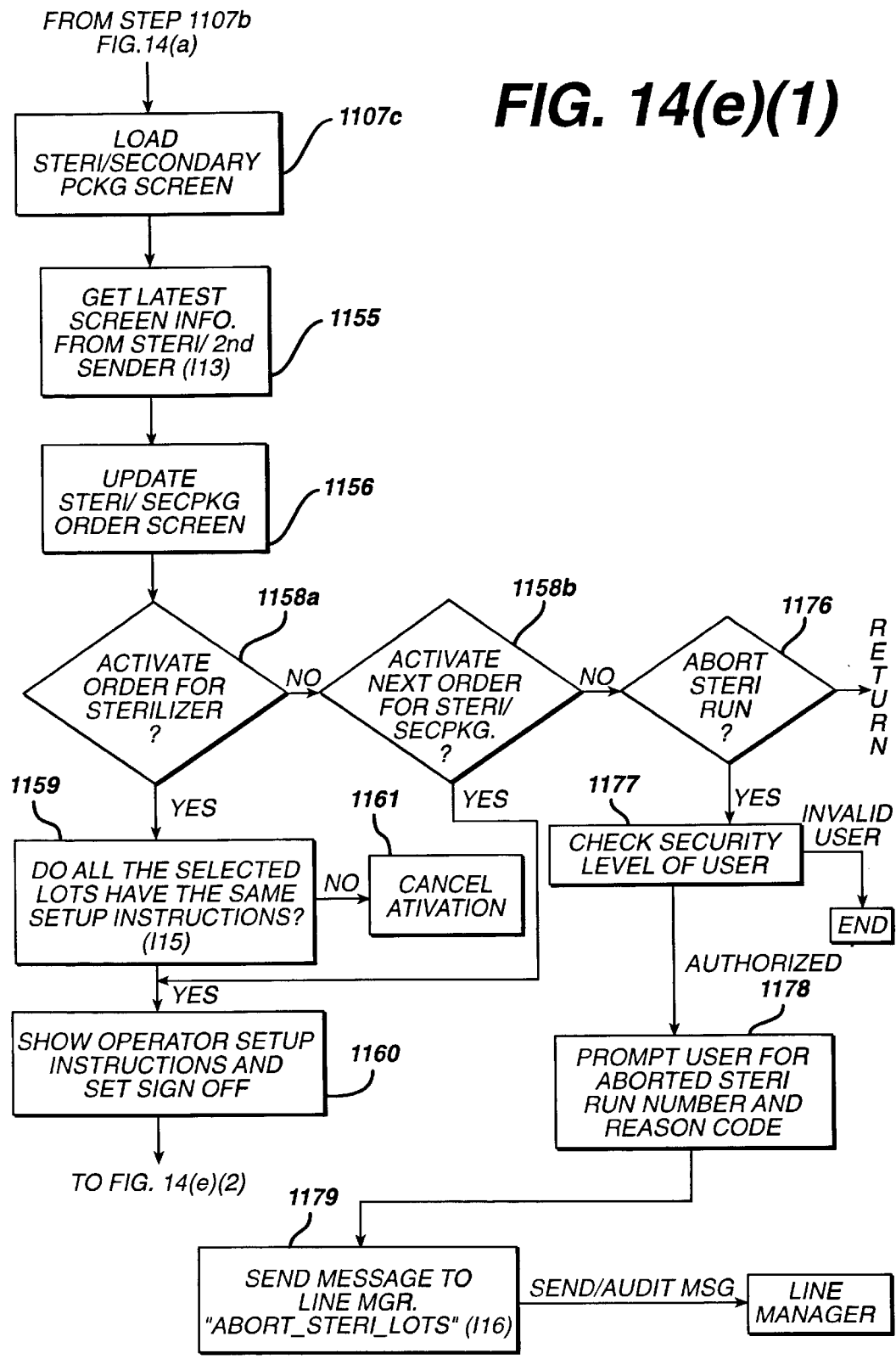
FIG. 14(e)(1)

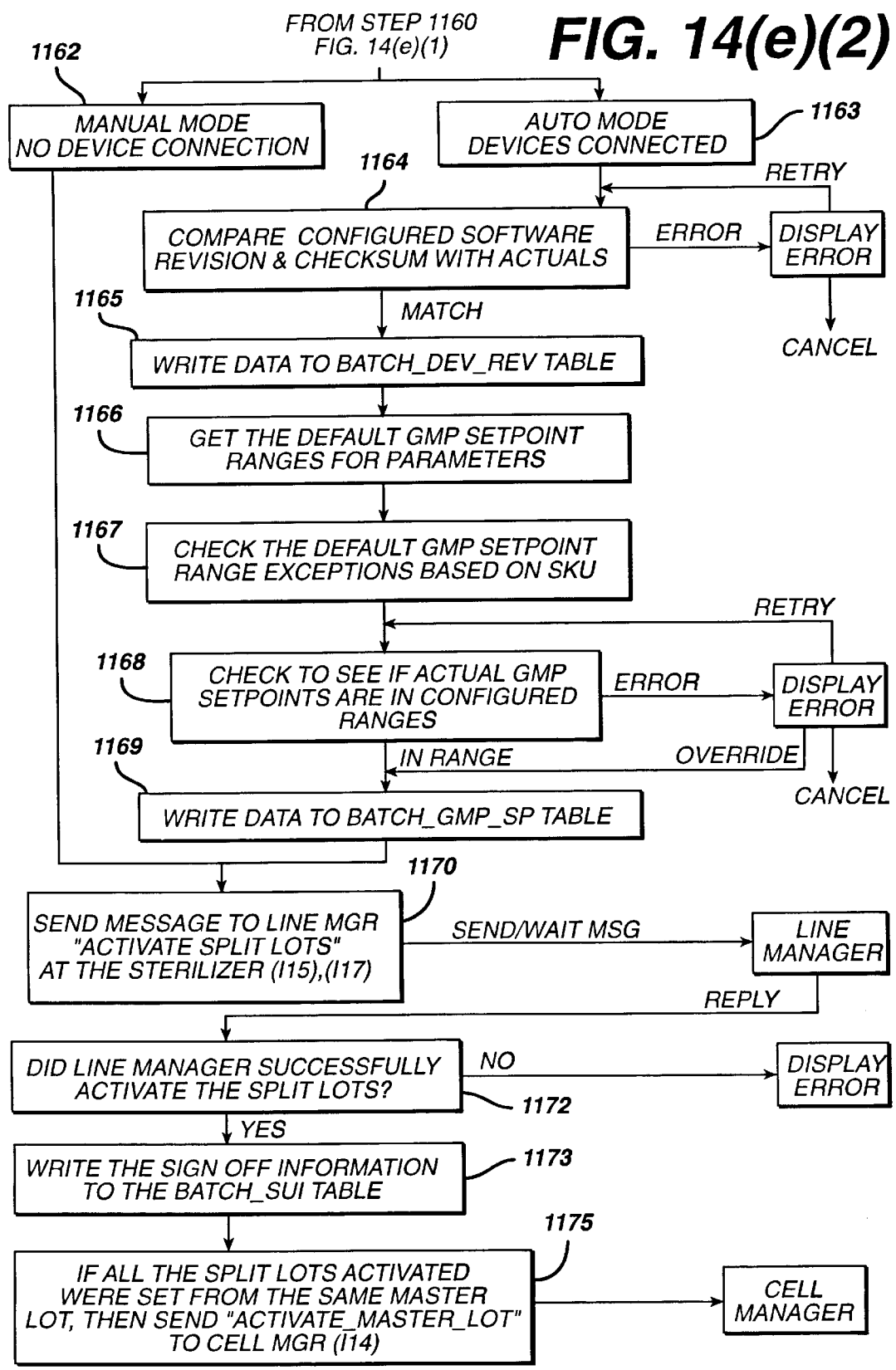
FIG. 14(e)(2)

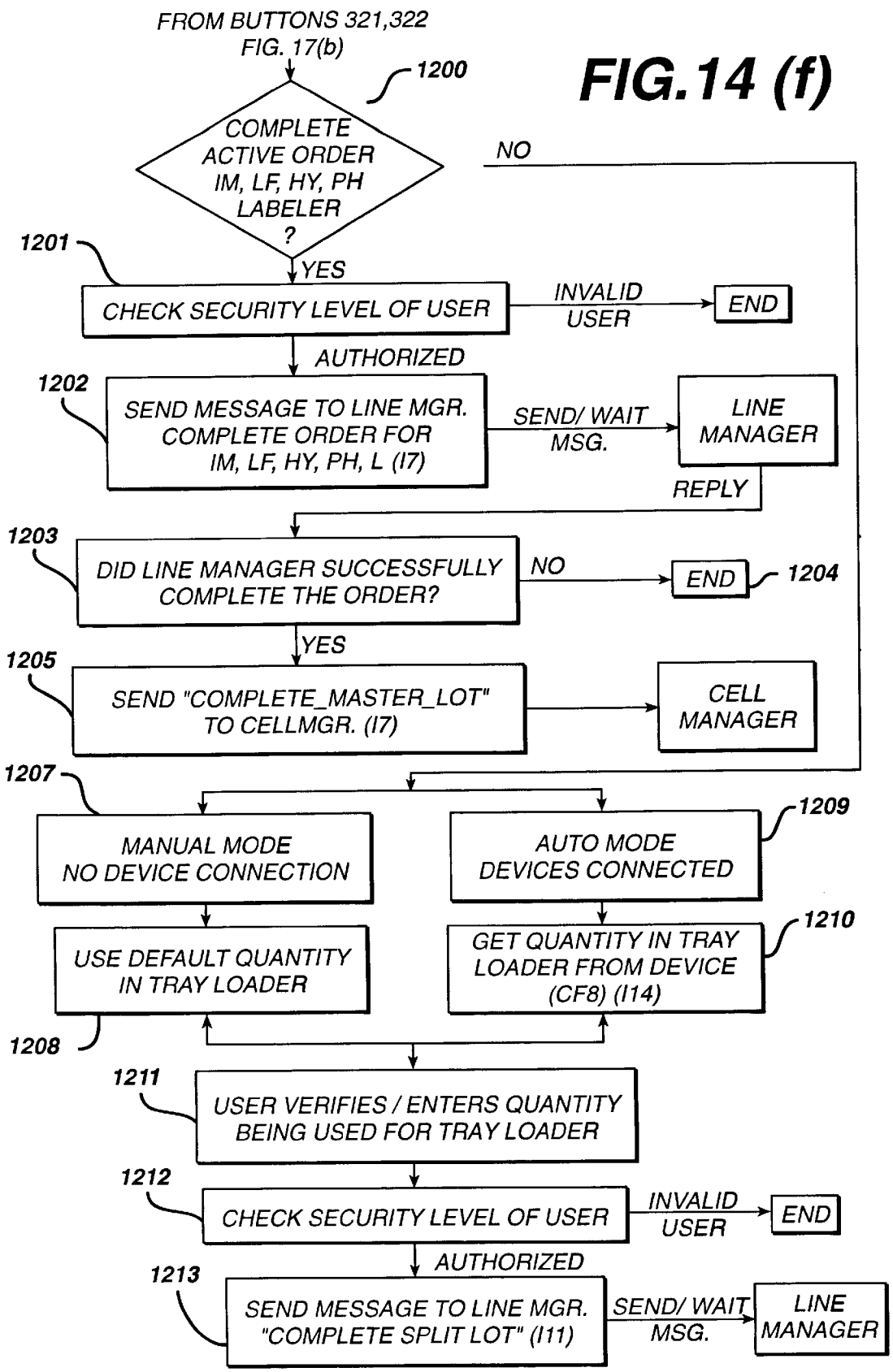

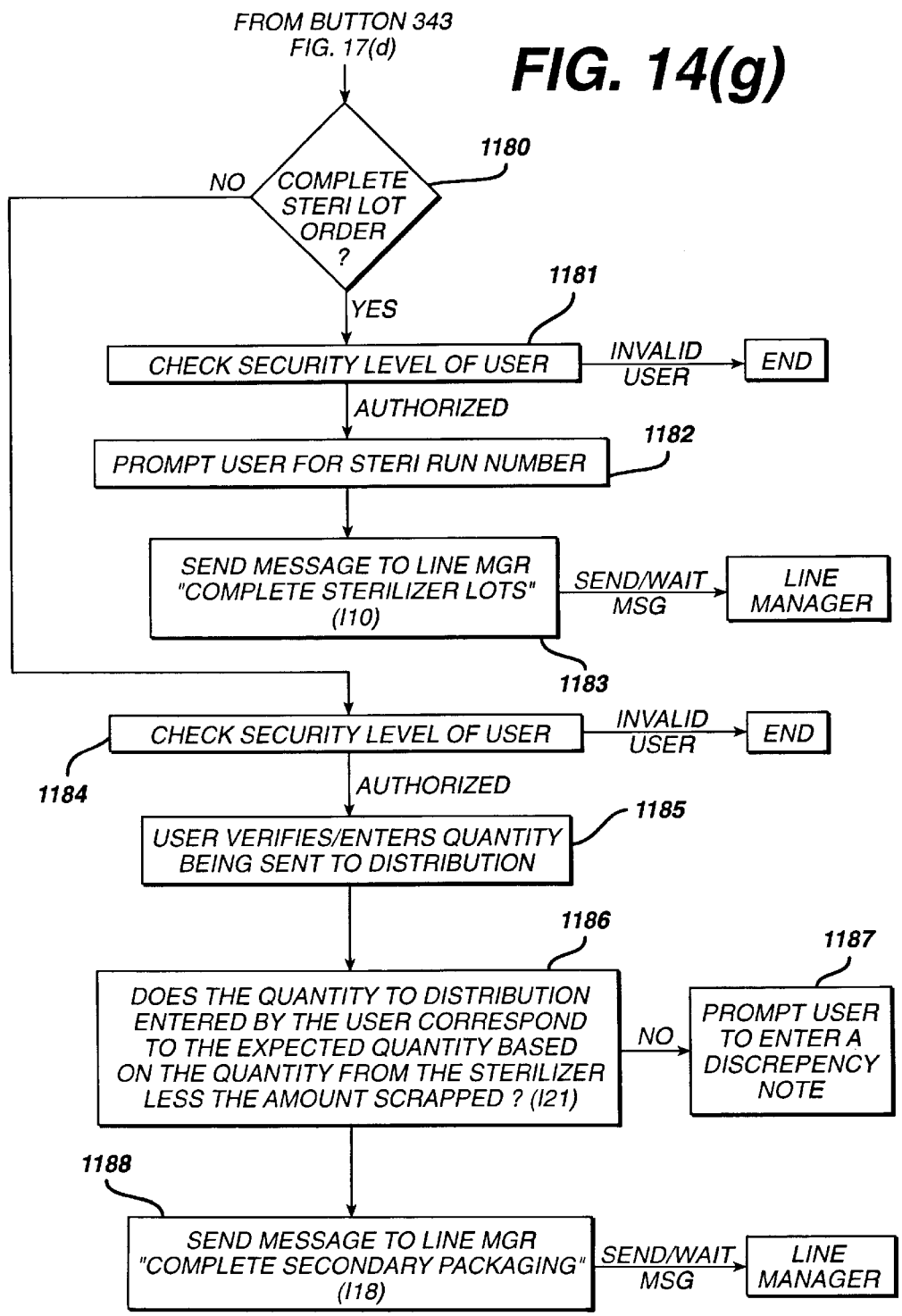

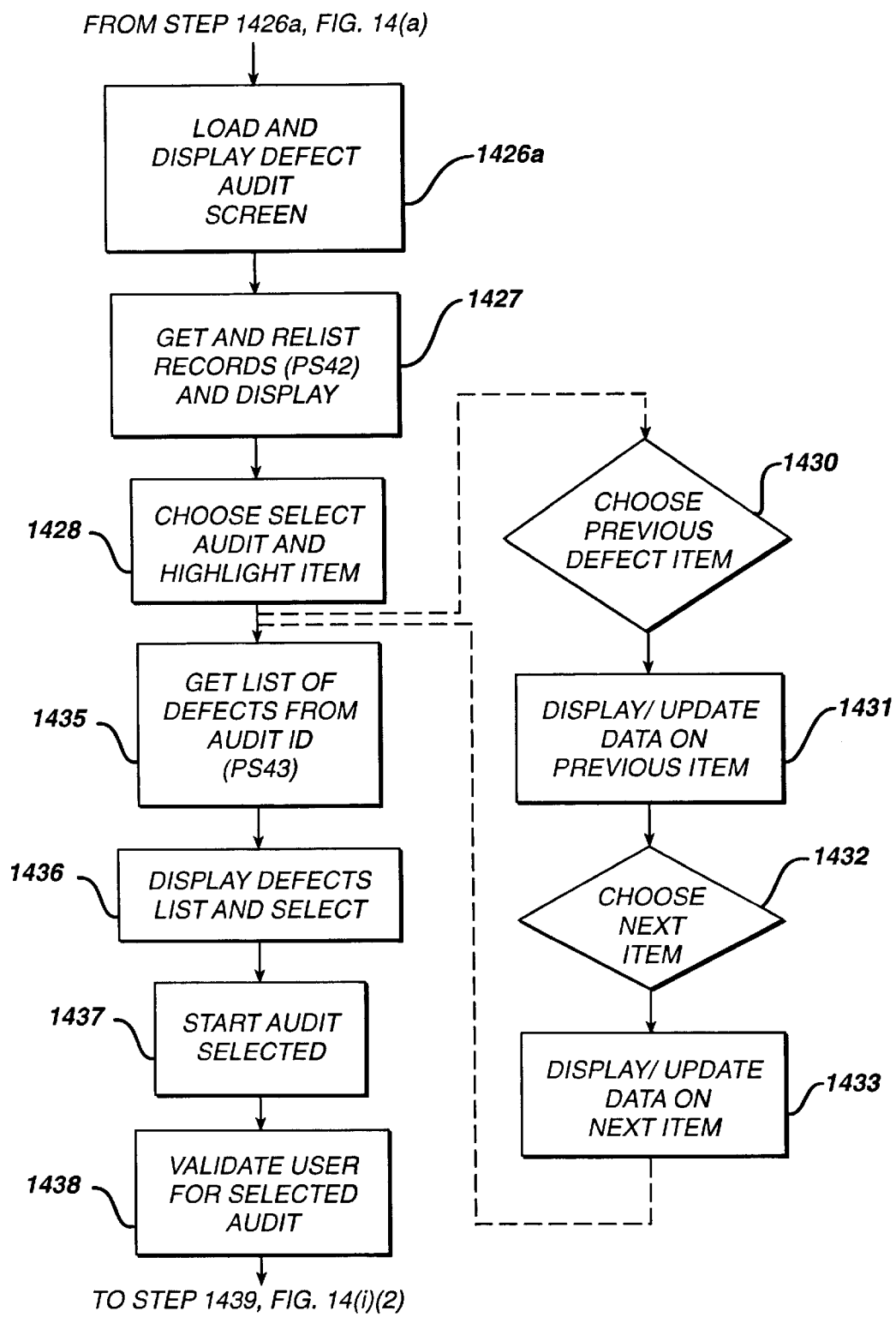
FIG.14 (i)(1)

FIG.14 (i)2
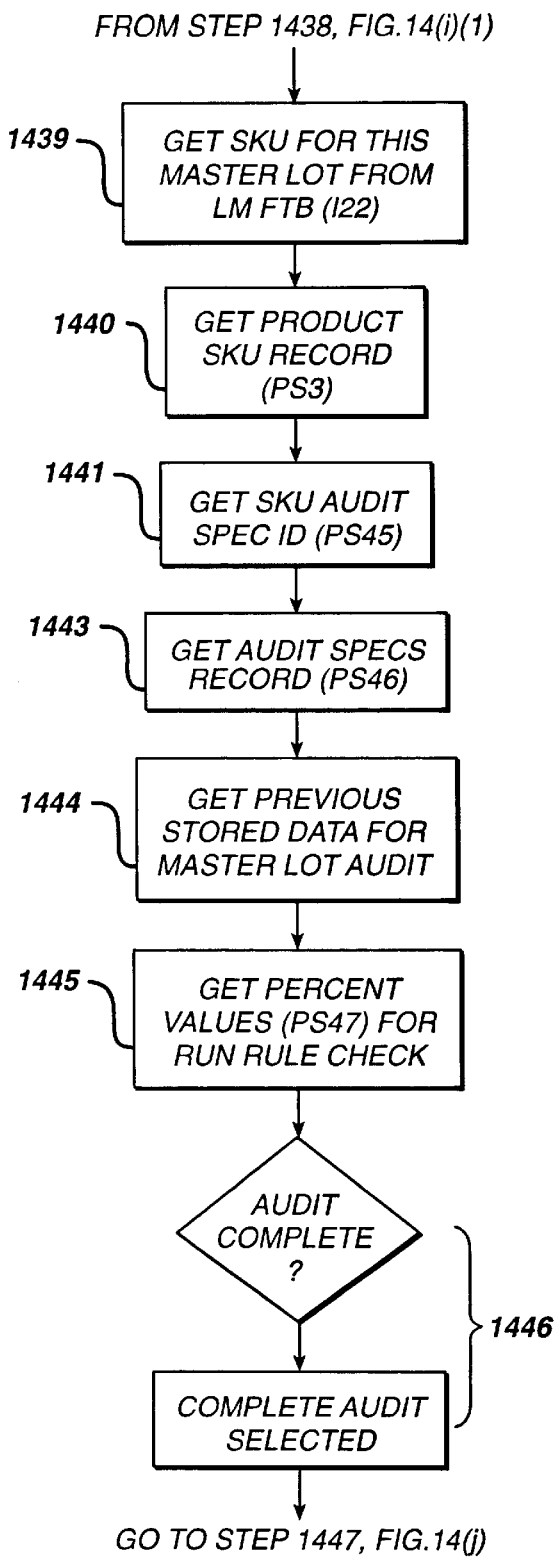

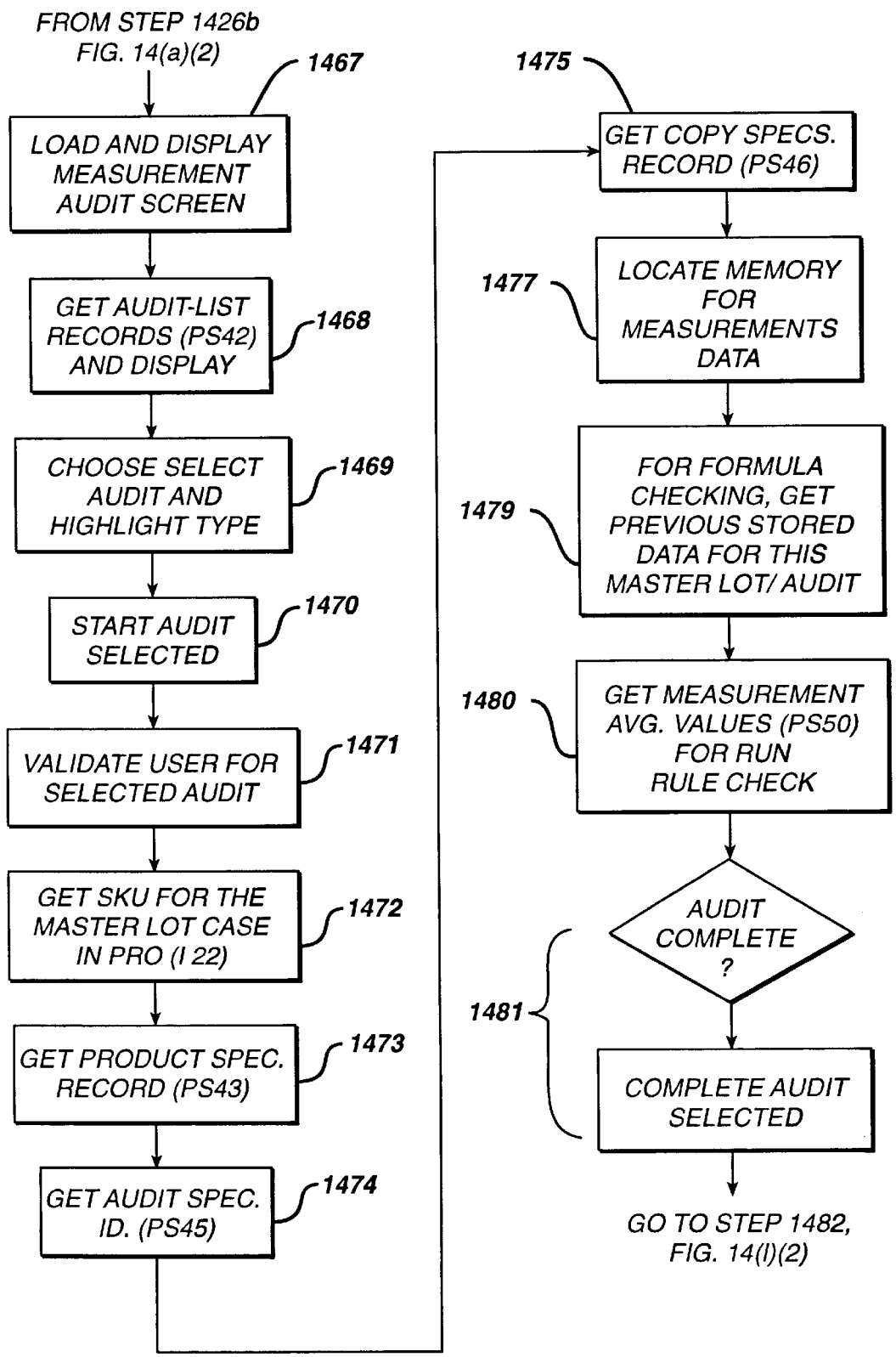
FIG.14 (I)(1)

FIG.14 (I)(2)
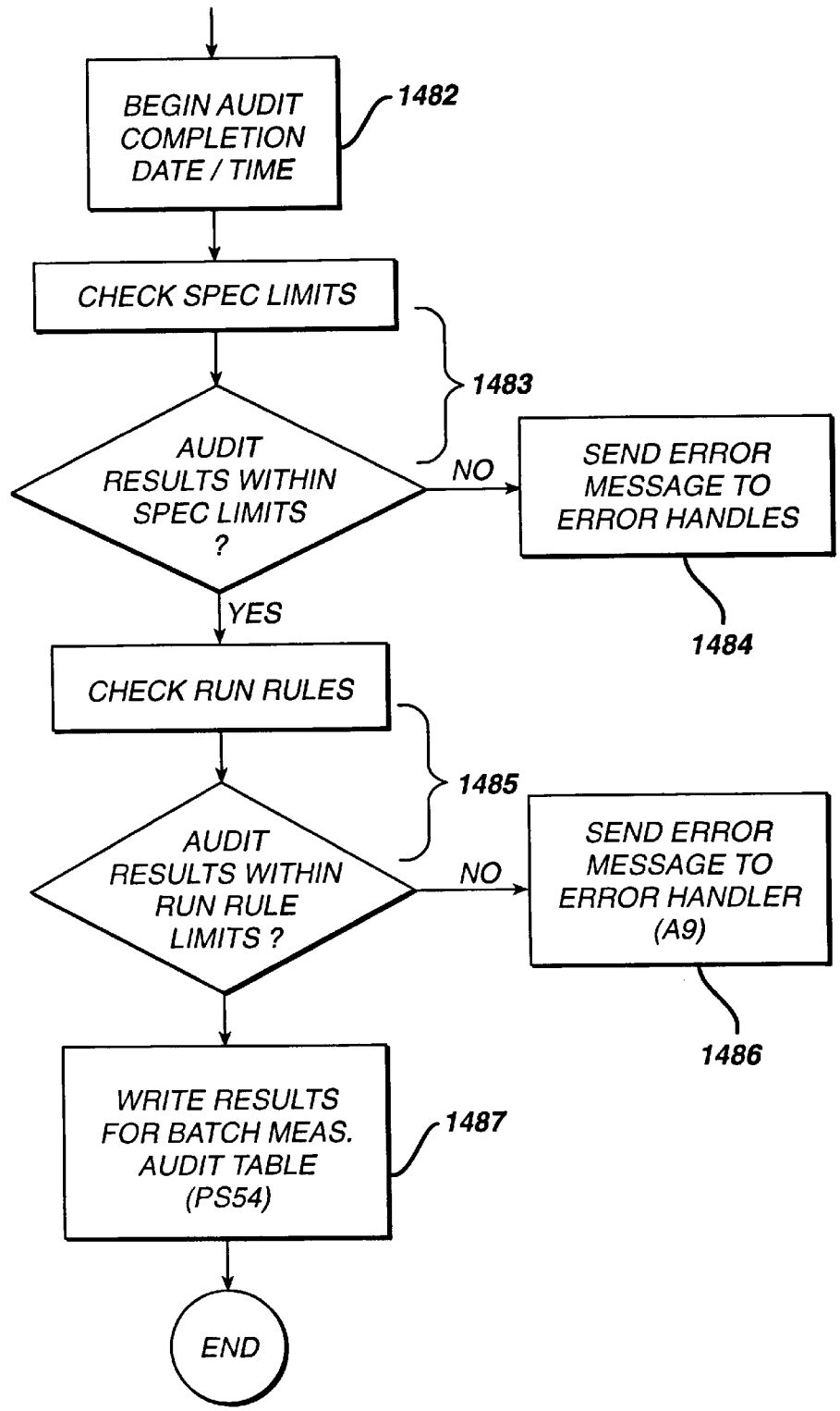

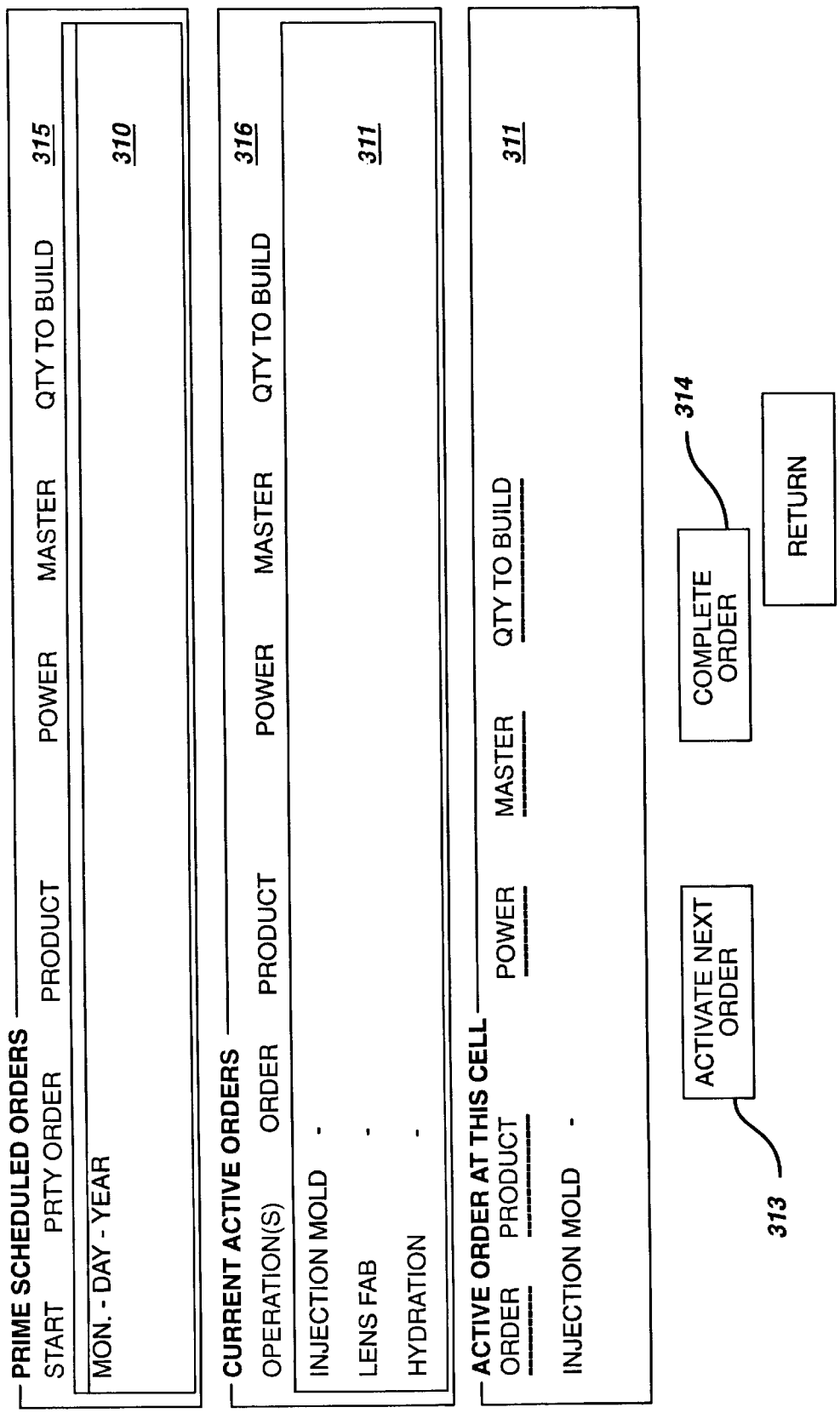

FIG. 17 (c)

VERIFY THE FOLLOWING INFORMATION :

MASTER LOT : [210804]
SPLIT NUMBER : [61]
CHECK DIGIT : [3]
POWER : [- 1.06]
EXPIRATION DATE : [06/34]
LABELER QUANTITY : [32767]

[+] 331
[-] 332

SELECT (OK) TO CONTINUE OR (CANCEL) TO ABORT SPLIT LOT ACTIVATION

[SELECT]   [CANCEL]

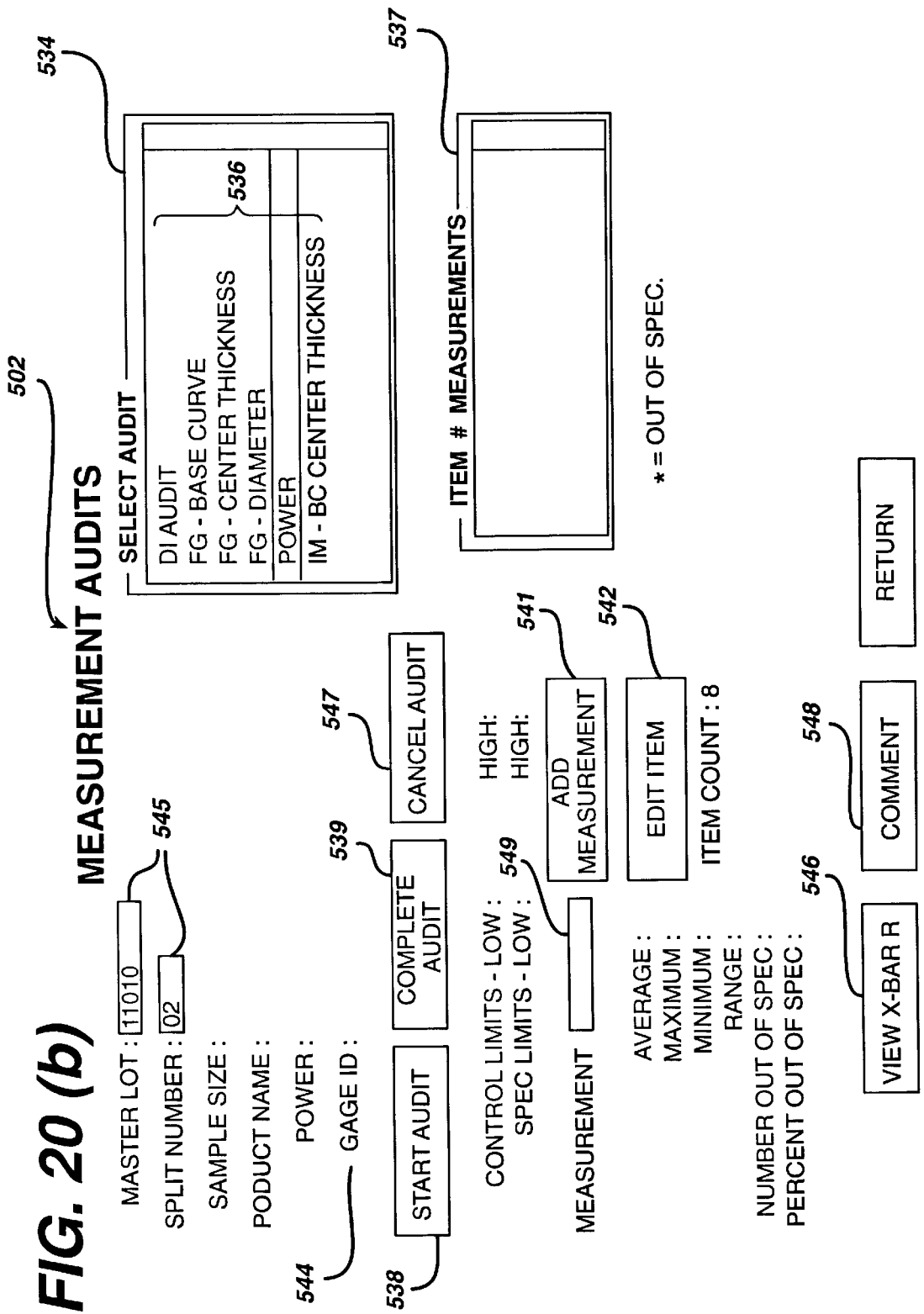

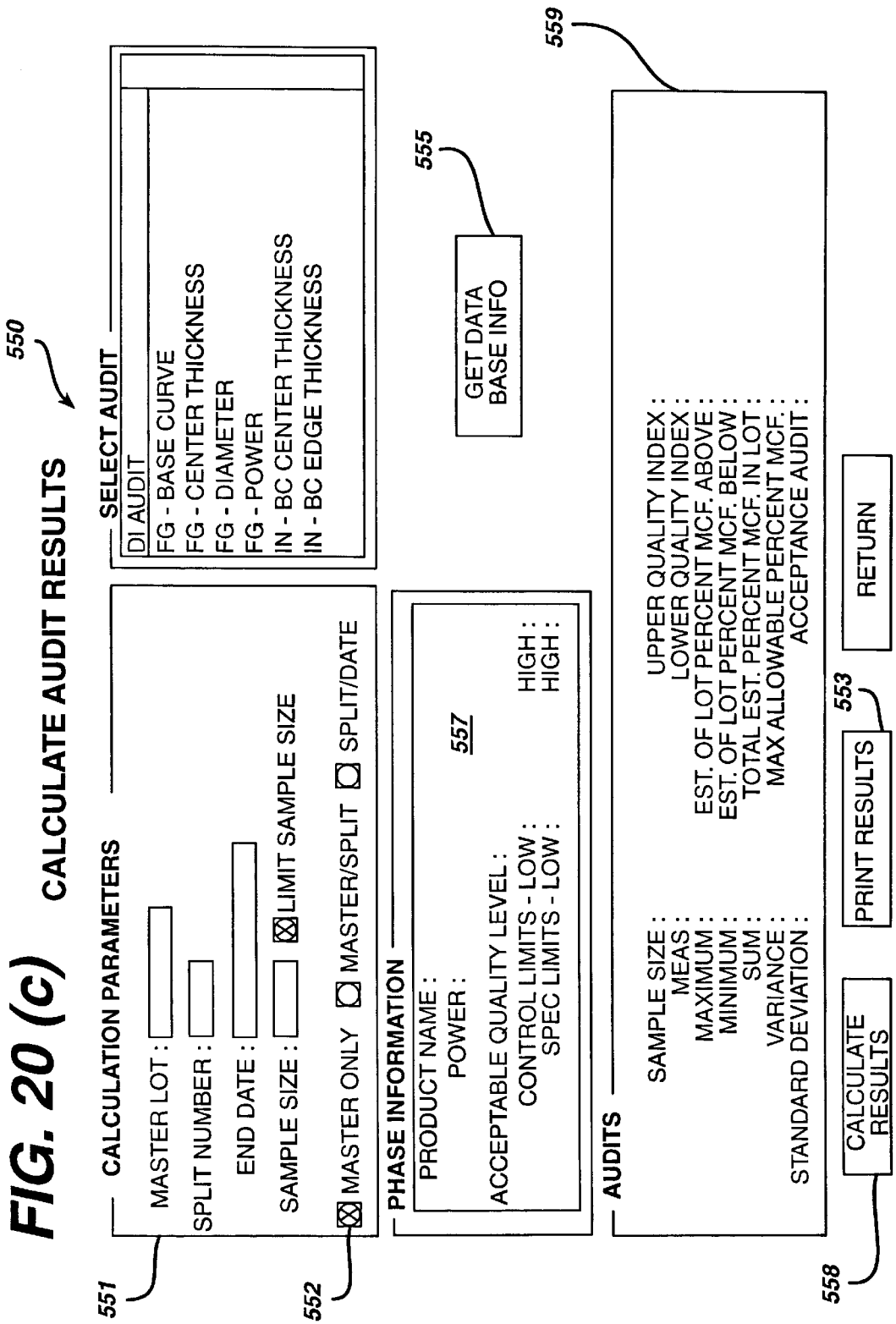

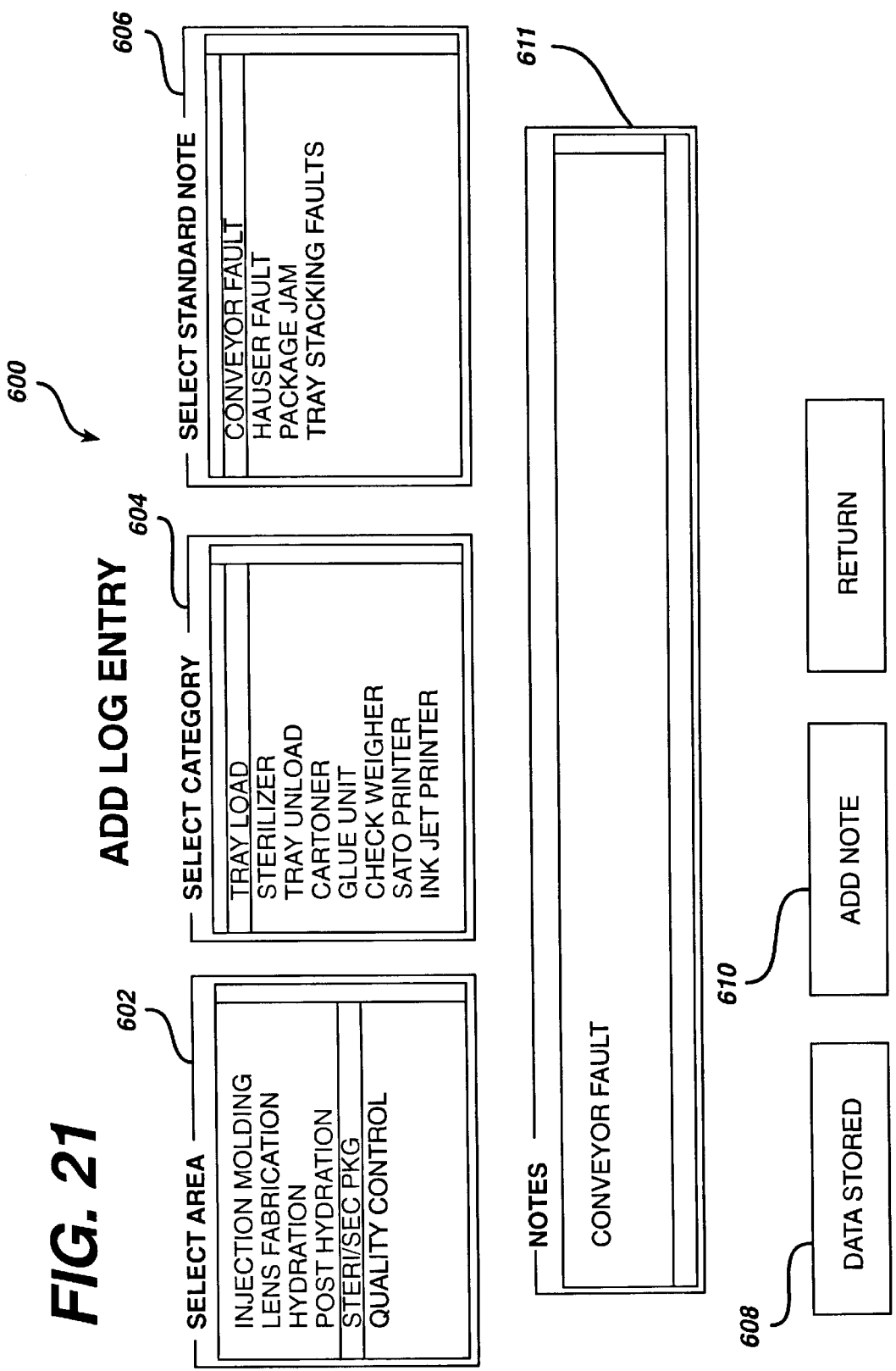

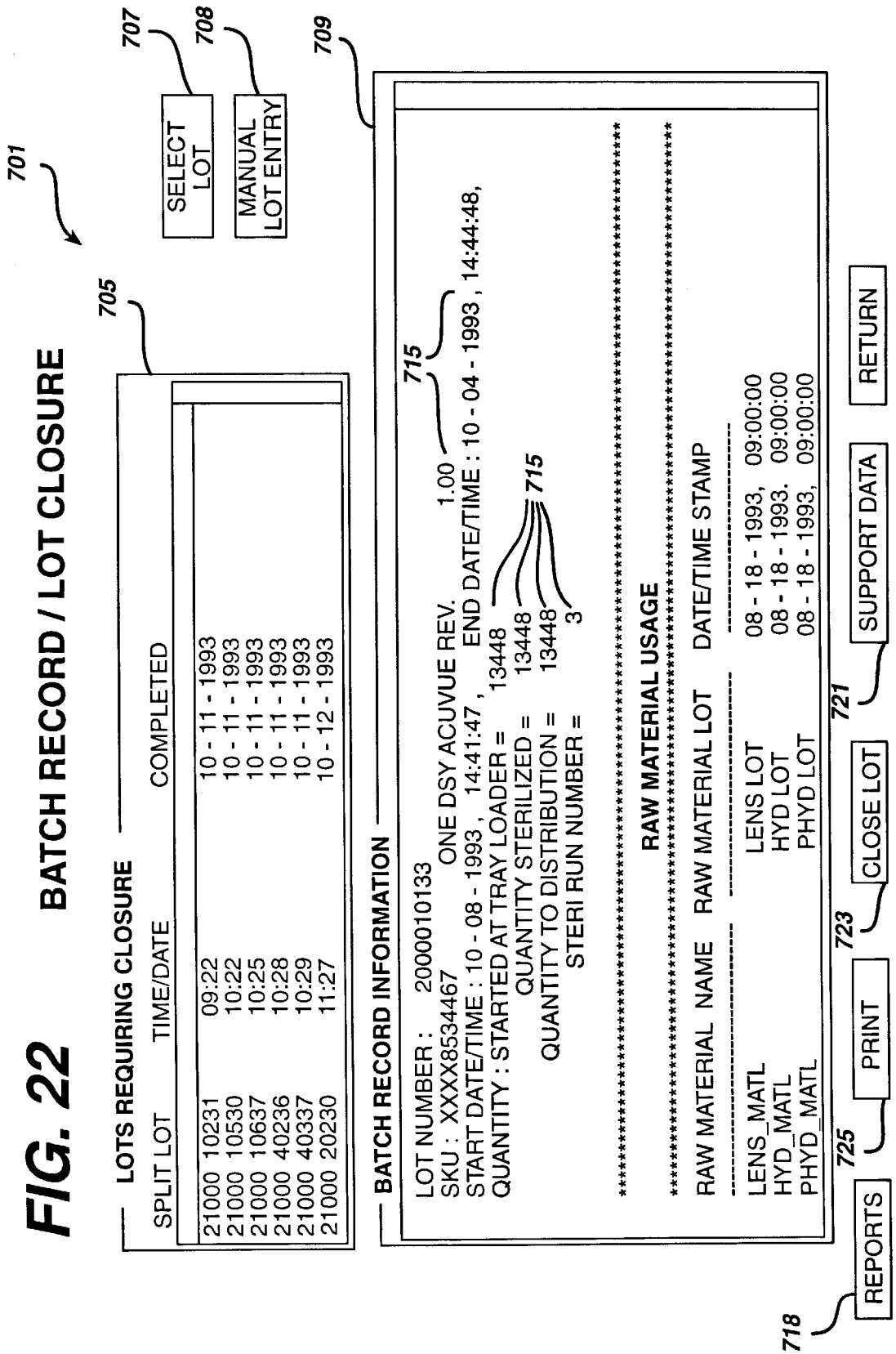
FIG. 22   BATCH RECORD / LOT CLOSURE

FIG. 23

LINE STATUS 801

| DEVICE NAME | LOT NUMBER | PRODUCT | POWER | QTY XXXX | QTY XXXX | YIELD |
|---|---|---|---|---|---|---|
| FRONT CURVE | 210004 | ONE DAY ACUVUE REV. | -1.00 | 0 | 0 | 0% |
| BASE CURVE | 210004 | ONE DAY ACUVUE REV. | -1.00 | 0 | 0 | 0% |
| FILL / ASSY A | 210004 | ONE DAY ACUVUE REV. | -1.00 | 0 | 0 | 0% |
| FILL / ASSY B | 210004 | ONE DAY ACUVUE REV. | -1.00 | 0 | 0 | 0% |
| CURE / DEMOLD A | 210004 | ONE DAY ACUVUE REV. | -1.00 | 0 | 0 | 0% |
| CURE / DEMOLD B | 210004 | ONE DAY ACUVUE REV. | -1.00 | 0 | 0 | 0% |
| HYDRATION | 210004 | ONE DAY ACUVUE REV. | -1.00 | 0 | 0 | 0% |
| PRIMARY PKG | 210004 | ONE DAY ACUVUE REV. | -1.00 | 0 | 0 | 0% |
| POST HYDRATE 1 | 210004 | ONE DAY ACUVUE REV. | -1.00 | 0 | 0 | 0% |
| POST HYDRATE 2 | 210004 | ONE DAY ACUVUE REV. | -1.00 | 0 | 0 | 0% |
| HEAT SEAL | 210004 | ONE DAY ACUVUE REV. | -1.00 | 0 | 0 | 0% |
| STERILIZER | 210004 | ONE DAY ACUVUE REV. | -1.00 | 0 | 0 | 0% |
| SECONDARY PKCG | 000000 | ONE DAY ACUVUE REV. | 0.00 | 0 | 0 | 0% |

802 → {QTY XXXX, QTY XXXX, YIELD}

804:
- FORNT CURVE HOST QUANTITY TO BULLET    9999
- FRONT CURVE ADJUSTED QUANTITY TO BULLET    9999
- FRONT CURVE REMAINING QUANTITY TO BULLET    9999
- SECONDARY PACKAGING HOST QUANTITY TO BULLET    0
- SECONDARY PACKAGING HYDRATION QUANTITY TO BULLET    0

RETURN

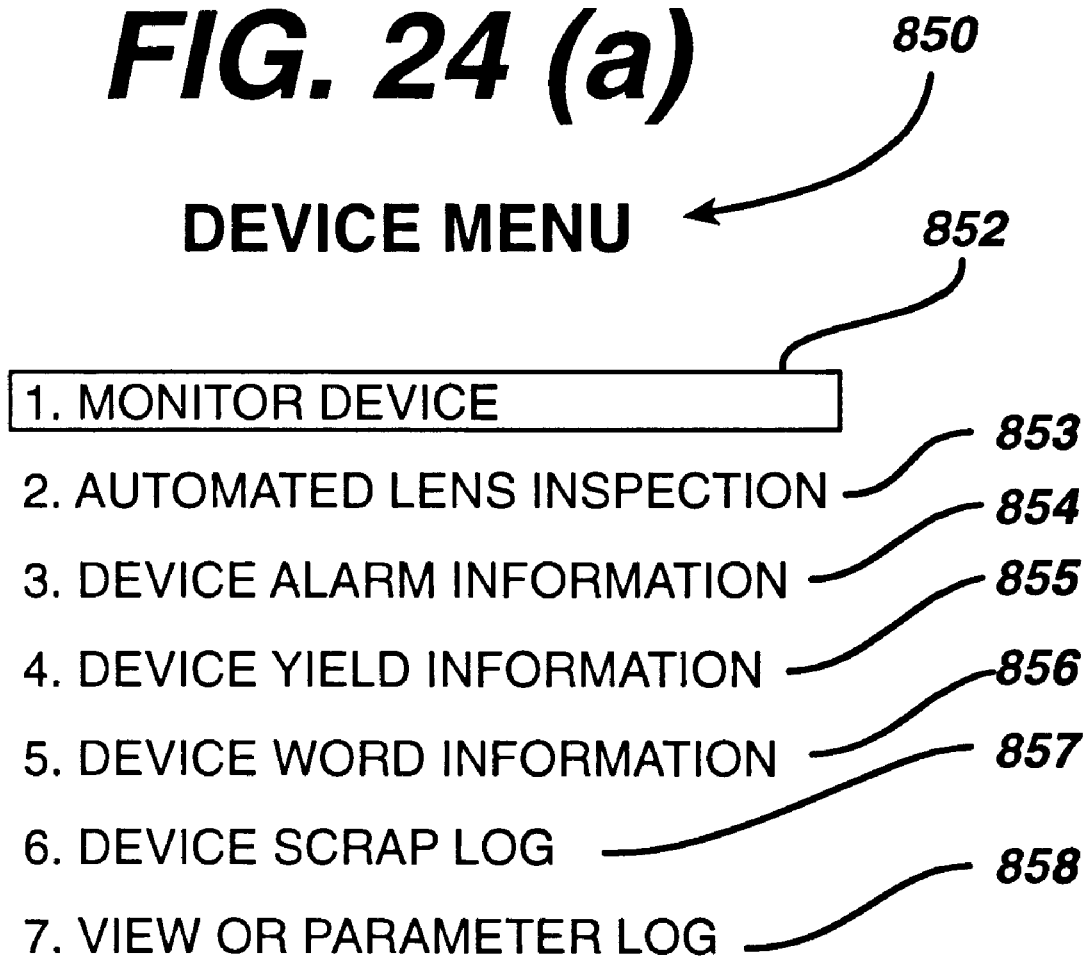

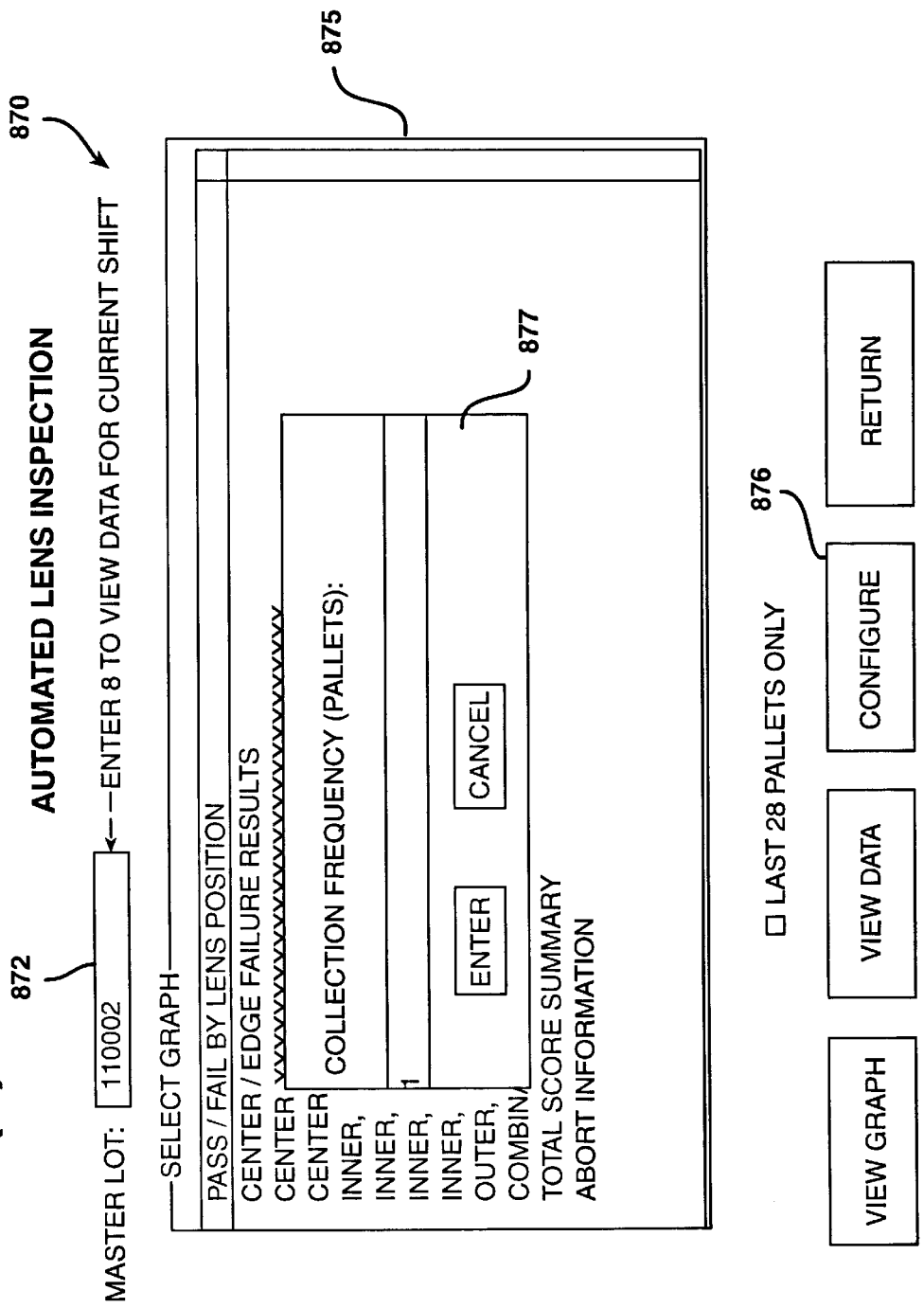

FIG. 25 (b)

| NEGATIVE SCORE (CODE) | ABORT CODE | CODE DESCRIPTION |
|---|---|---|
| -2 | DL | MISSING LENS, NO LENS FOUND IN THE IMAGE. |
| -3 | DL | DISTORTED LENS. LENS WAS MISSHAPEN TO THE POINT THAT A MODEL COULD NOT BE GENERATED. |
| -4 | LOF | LENS OFF IMAGE. A PORTION OF THE LENS FALLS OUTSIDE OF THE CAMERA'S FIELD OF VIEW. |
| -5 | CAB | CROSSED ANNULUS BOUNDARY. THE LENS' EDGE HAS INTERSECTED THE PROCESSING ANNULUS BOUNDARY |
| -6 | GF | GRAB FAILED. IMAGE CAPTURE WAS NOT COMPLETED CORRECTLY. |
| -7 | FL | FRAGMENTED LENS. A PORTION OF THE LENS' EDGE WAS BADLEY FRAGMENTED IN THE PROCESS IMAGE. |
| -8 | NP | NOT PROCESSED. THE IMAGE WAS NOT PROCESSED. |
| -9 | APAL | ABNORMAL PALLET. A PALLET WAS PROCESSED THAT CONTAINED TOO MANY OR TOO FEW LENS. ALL LENSES ARE ASSIGNED THIS CODE IF EITHER CONDITION OCCURS. |
| -10 | NC | NEVER COMPLETED. IMAGE PROCESSING WAS STARTED, BUT NEVER COMPLETED BEFORE THE START OF THE NEXT PALLET. |

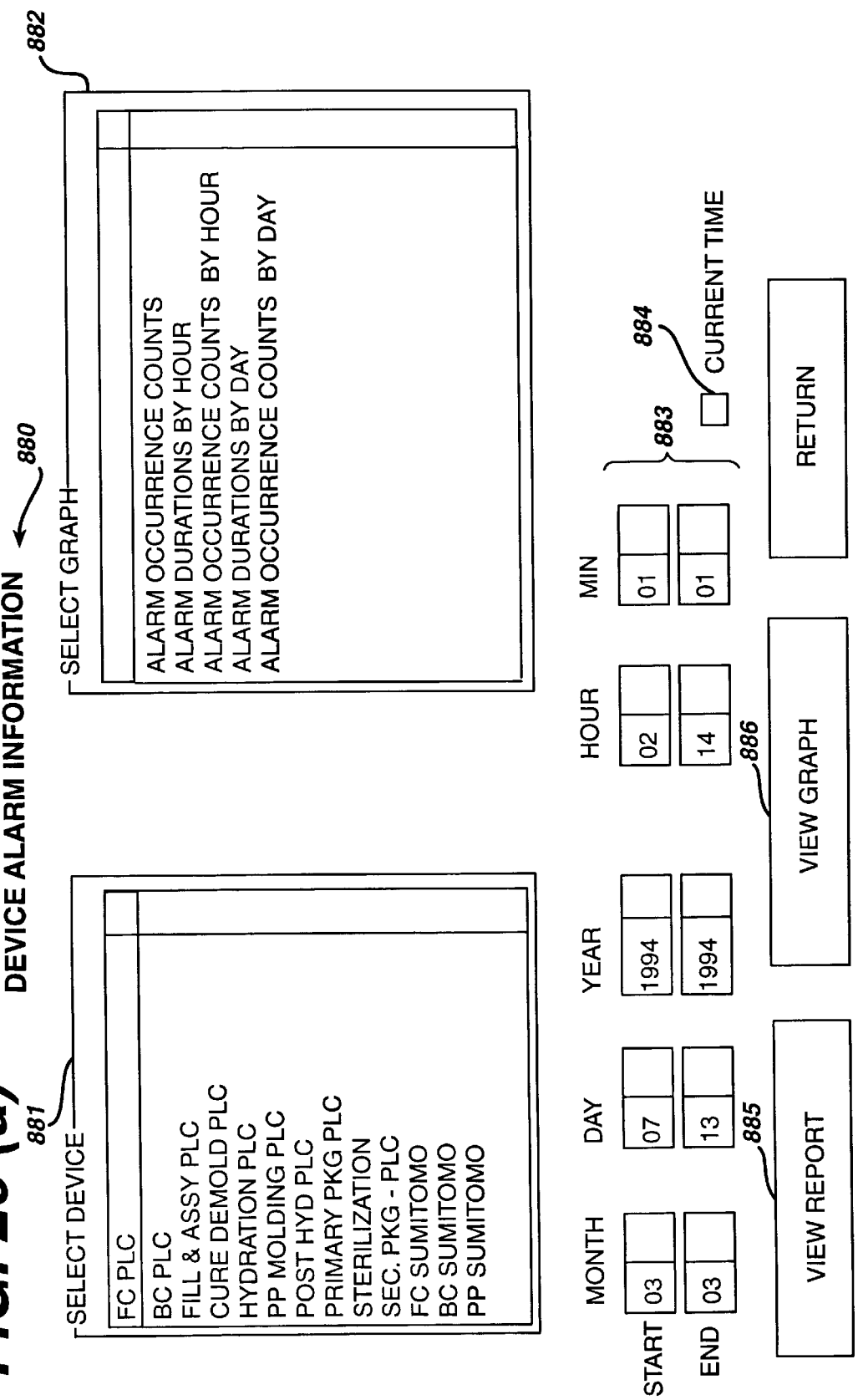

FIG. 27 (b)
TOTAL YIELD FOR DEVICE (S)
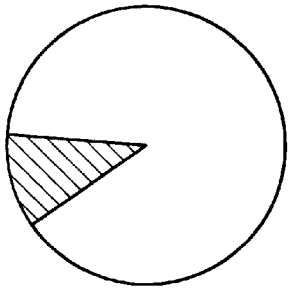
94.3%, FC PLC
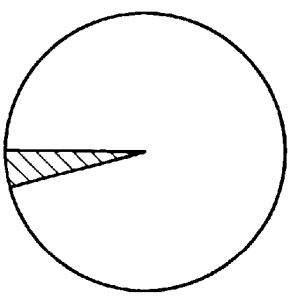
92.5%, HYDRATION PLC
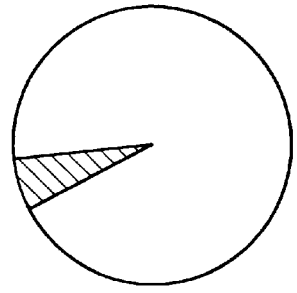
97.3%, PRIMARY PKG PLC
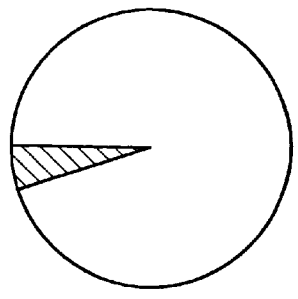
97.2%, SEC PKG PLC
☐ GOOD COUNT ▨ BAD COUNT

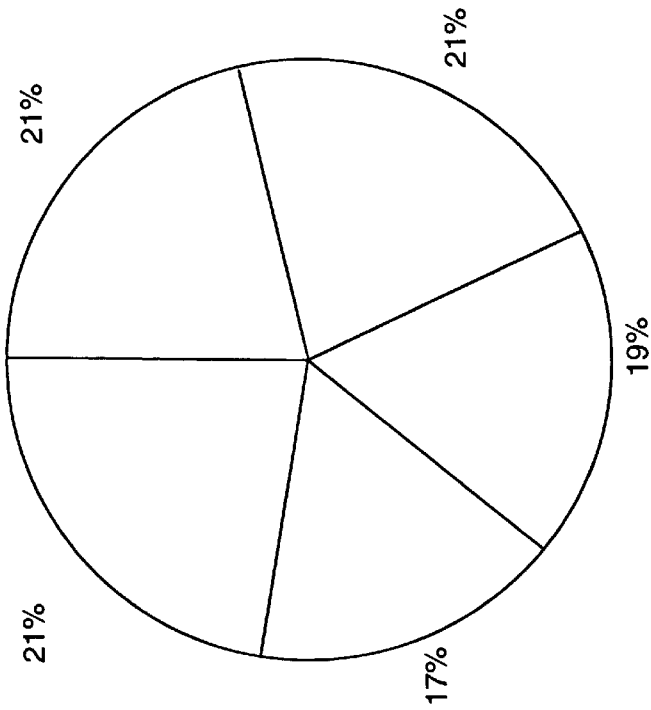

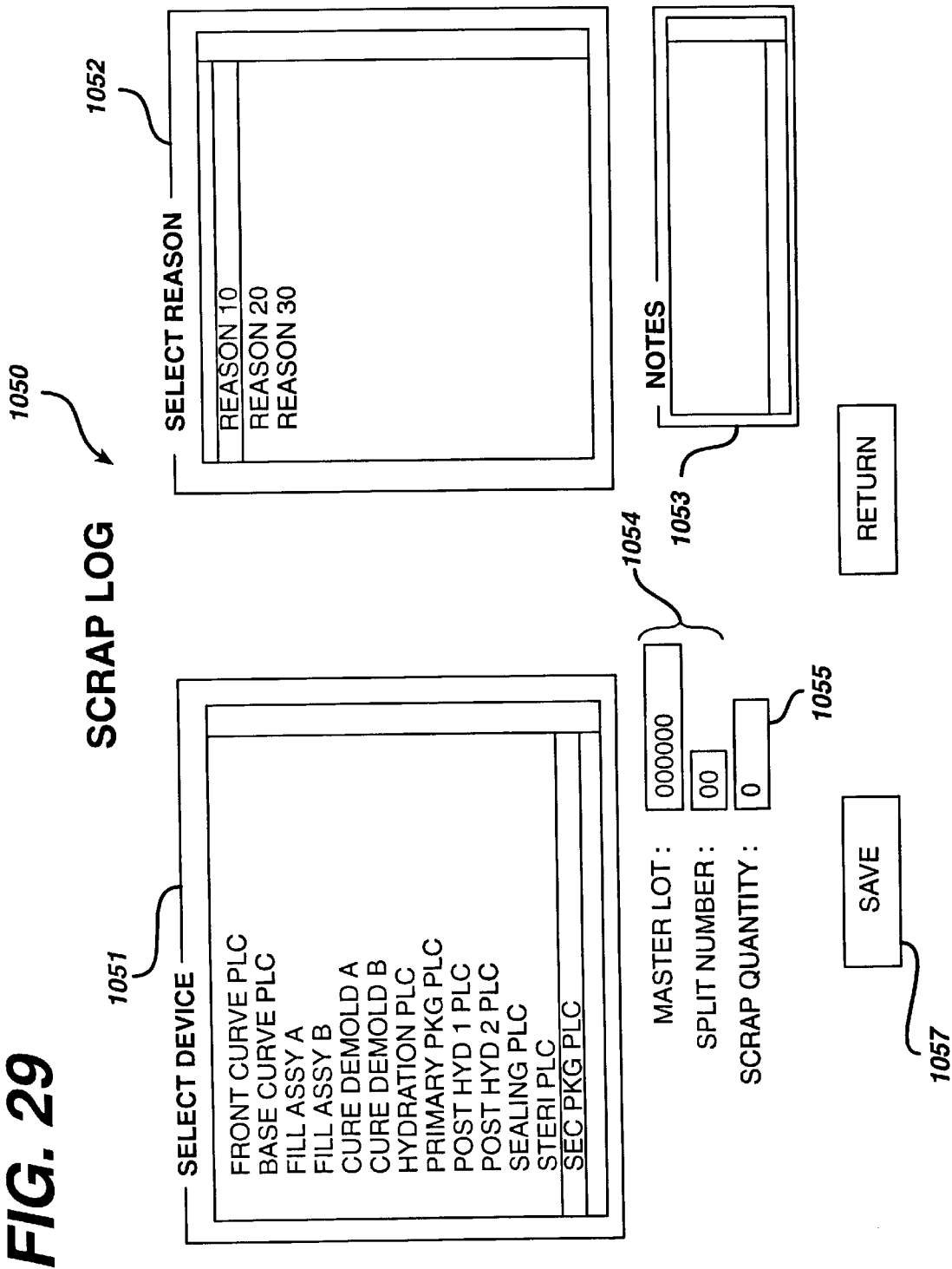

FIG. 30

UTILITY MENU 900

1. REPORT MENU — 901
2. VIEW / EDIT DATABASE — 902
3. VIEW LOGS — 903
4. SUPPLEMENTAL SETUP INSTRUCTIONS — 904
5. QUERY MANAGER — 905

9. SECURITY ADMINISTRATION — 906

RETURN

FIG. 31

INJECTION MOLD TAG ENTRY 950

- ☐ FRONT CURVE - SIDE A
- ☐ FRONT CURVE - SIDE B

- ☐ BASE CURVE - SIDE A
- ☐ BASE CURVE - SIDE B

- ☐ PRIMARY PACKAGE - SIDE A
- ☐ PRIMARY PACKAGE - SIDE B

MODEL TAG NUMBER: [ _ _ _ _ _ _ _ _ _ ] } 953

SAVE            RETURN

FIG. 33 (a) (1)
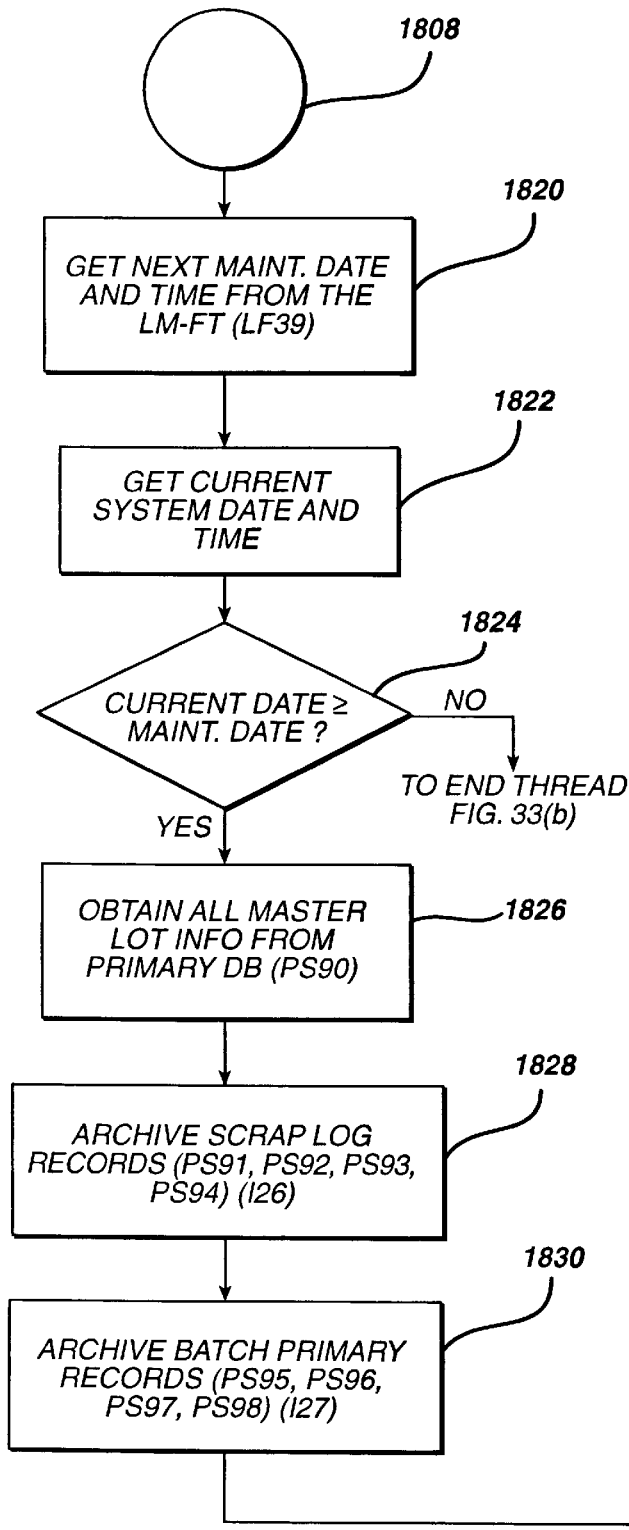
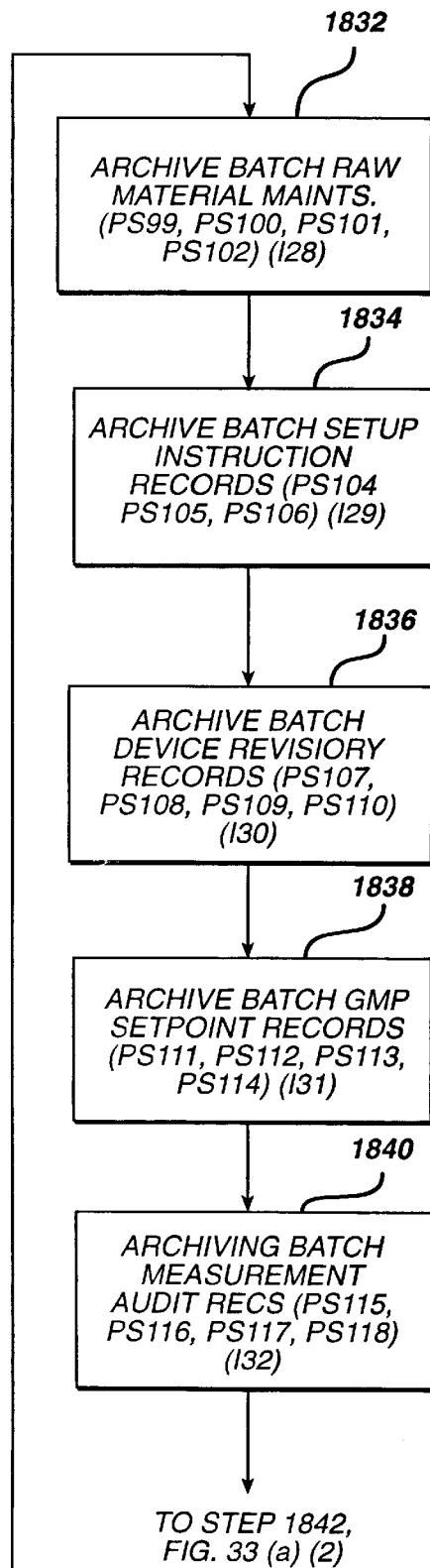

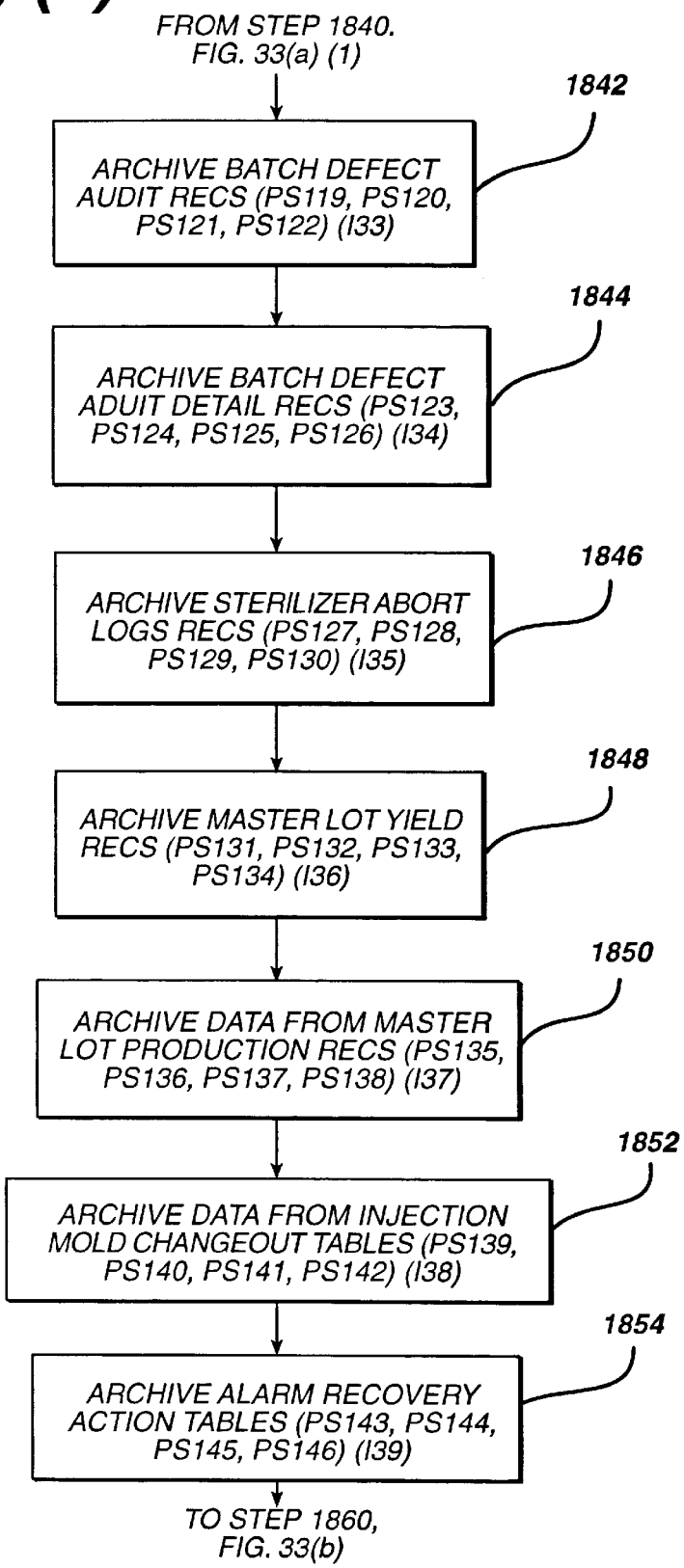
FIG. 33 (a) (2)

FROM FIG. 44(a)

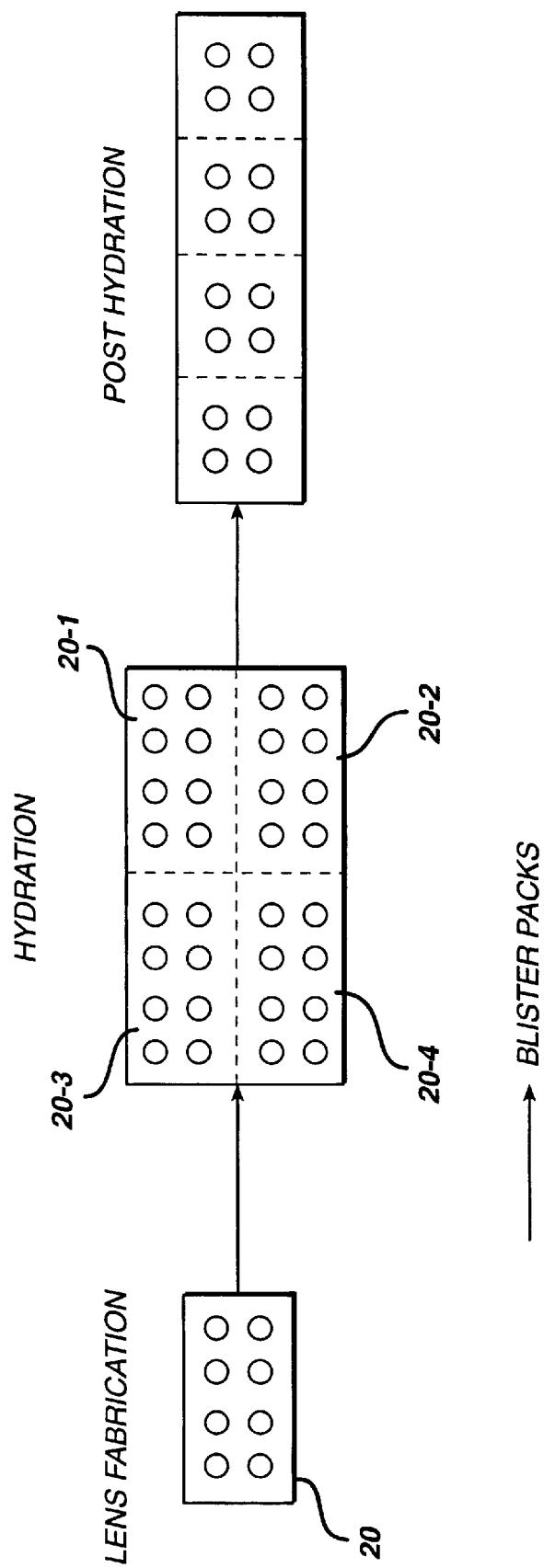

COMPUTER SYSTEM FOR QUALITY CONTROL CORRELATION

1. FIELD OF THE INVENTION

This invention relates generally to a manufacturing facility for the production of ophthalmic contact lenses, and, in particular to a production computer system for monitoring the production line processes used in the manufacture of contact lenses in a contact lens fabrication facility, with the goal of collecting data to enable investigation into and optimization of the manufacturing process.

2. DESCRIPTION OF THE PRIOR ART

The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application. Essentially, these references disclose an automated contact lens production process wherein each lens is formed by sandwiching a monomer between back curve (upper) and front curve (lower) mold sections. The monomer is polymerized, thus forming a lens, which is then removed from the mold sections and further treated and packaged for consumer use.

The manufacturing of contact lenses requires tightly controlled conditions and processes, many of which are monitored by computers and other control devices. Much information, in the form of process conditions and control data, for e.g., that occur during contact lens manufacturing, may be gathered for quality control purposes. However, this entails the acquisition of a tremendous amount of data for each contact lens that is produced, and, additionally, requires a means for processing the data acquired in a way that is suitable for use by operators, engineers, and supervisors, etc., so that they may properly perform their functions. Additionally, some of the information generated may be by human observation, for instance, lens inspection, which is not as reliable as automatic sensors.

There is therefore the need to provide a quality control system that can automatically acquire process control data from a plurality of manufacturing process controllers that control various aspects of contact lens production at process stations in a contact lens manufacturing facility, and, that can automatically process the data for real-time display and archiving purposes.

It would additionally be highly desirable to provide a quality control system that can automatically gather process control data for each specific contact lens at each of the plurality of process stations.

Additionally, it would be highly desirable to provide a quality control system that gathers process control data for each specific contact lens, and, includes means for automatically correlating the data acquired with each individual contact lens produced for storage and optimization purposes.

It would furthermore be highly desirable to provide a quality control system in a contact lens manufacturing facility that enables an operator to determine the specific reason as to why a contact lens has been rejected during an automatic inspection process occurring subsequent to the manufacture of the lens.

SUMMARY OF THE INVENTION

An object of the instant invention is to provide a production control system for monitoring process parameters in an automated production line for manufacturing contact lenses wherein the station has a plurality of process stations with each process station having one or more process control devices that control production operations at the respective process station and generates production parameter data therefrom. The system comprises a line monitor device for receiving an externally generated production order including a lot number, product type, and quantity and further coordinates manufacturing processes at each of the plurality of process stations, and tracks order production from the beginning to the end of the production line; a plurality of cell monitor devices for retrieving the production data from one or more process control devices and processing the data to ensure that production data are within predefined setpoints; and, further includes an interface device for enabling operator activation and completion of orders at each process station and for accessing line status information from the line monitor device and production data from said cell monitor device for real-time viewing of respective line status and device status information.

Another object of the invention is to provide a quality control system that gathers process control data in machine cycle time increments for each specific contact lens that is being produced.

Still another object is to provide a quality control system that includes a data acquisition system having a means for obtaining selected data samples from different device processes and manual audits for statistical purposes.

Yet still another object is to provide a quality control system that includes a data acquisition system wherein the means for obtaining data samples from different device processes is user configurable.

Additionally, another object of the invention is to provide a quality control system that gathers process control data for each lens at each manufacturing process station of a contact lens production line, and includes automatic means for automatically storing the data in a relational database for prospective and retrospective analysis.

The above objects are achieved in a quality control system for optimizing process parameters in an automated production line for producing contact lenses. The system comprises a plurality of process control means for controlling one or more process stations of the production line, each of the control means regulating a plurality of process control devices that each control specific production parameters used in the automated manufacture of contact lenses at the process station(s).

Further benefits and advantages of the invention will become apparent from a consideration of the following detailed description given with reference to the accompanying drawings, which specify and show preferred embodiments of the invention.

BRIEF DESCRIPTION OF THE DRAWINGS

The foregoing objects and advantages of the present invention for a supervisor system for quality control may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 5 is a table presented on two sheets, FIG. 5(*a*) and FIG. 5(*b*), which together illustrate the interprocess communication messages calls that comprise the contents of Tables A–P shown in FIG. 4.

FIGS. 6(*d*)', 6(*e*)' and FIG. 6(*i*)–FIG. 6(*k*) illustrate the data contents of dynamic memory tables stored in the primary database.

FIG. 13 illustrates the PCS sign-on log for operators.

Figure 14B:
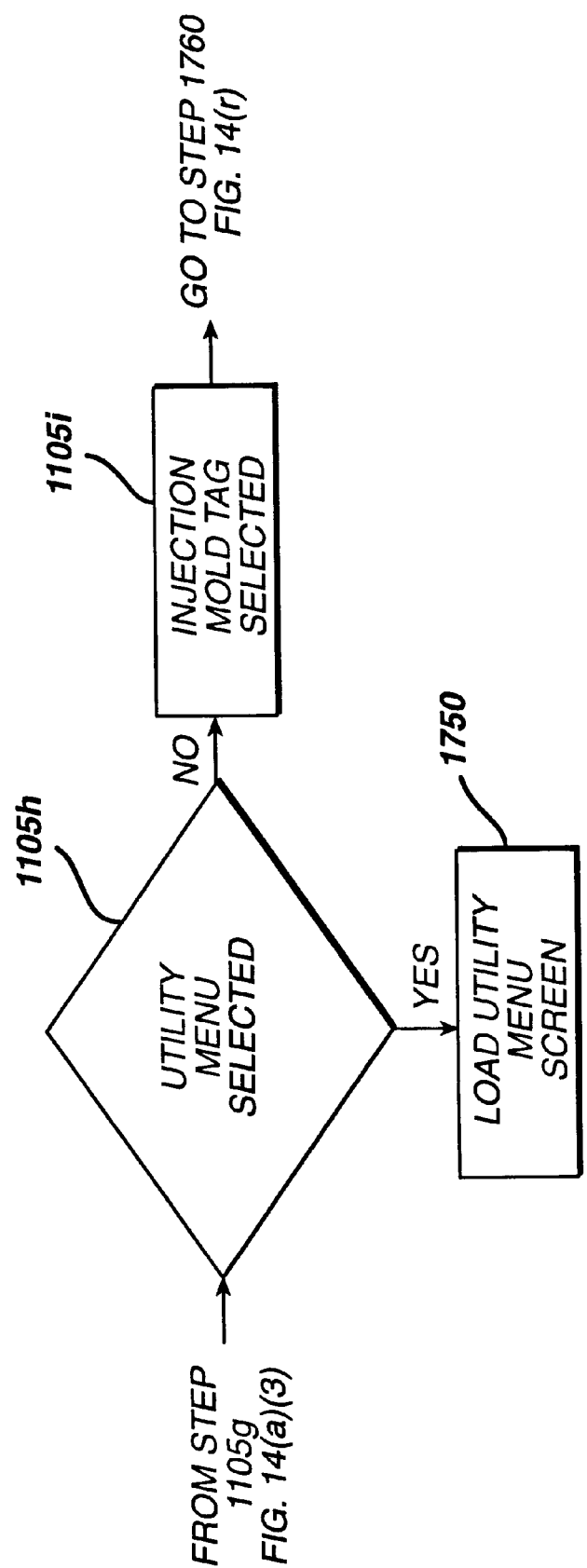
FIGS. 14(*a*)(1) through 14(*t*) illustrate the Operator Interface communication threads that include.
Figure 14C:
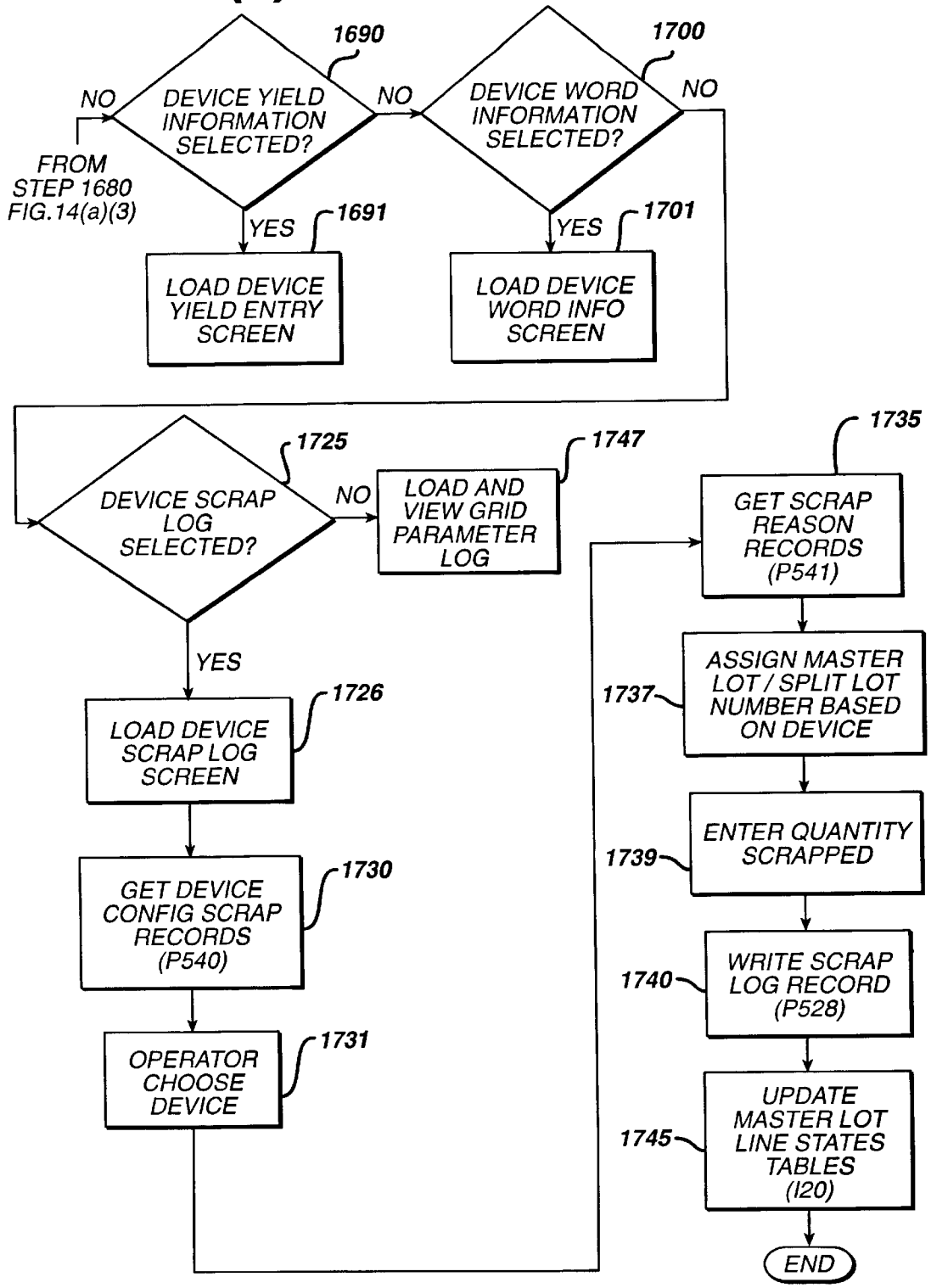
Figure 14H:
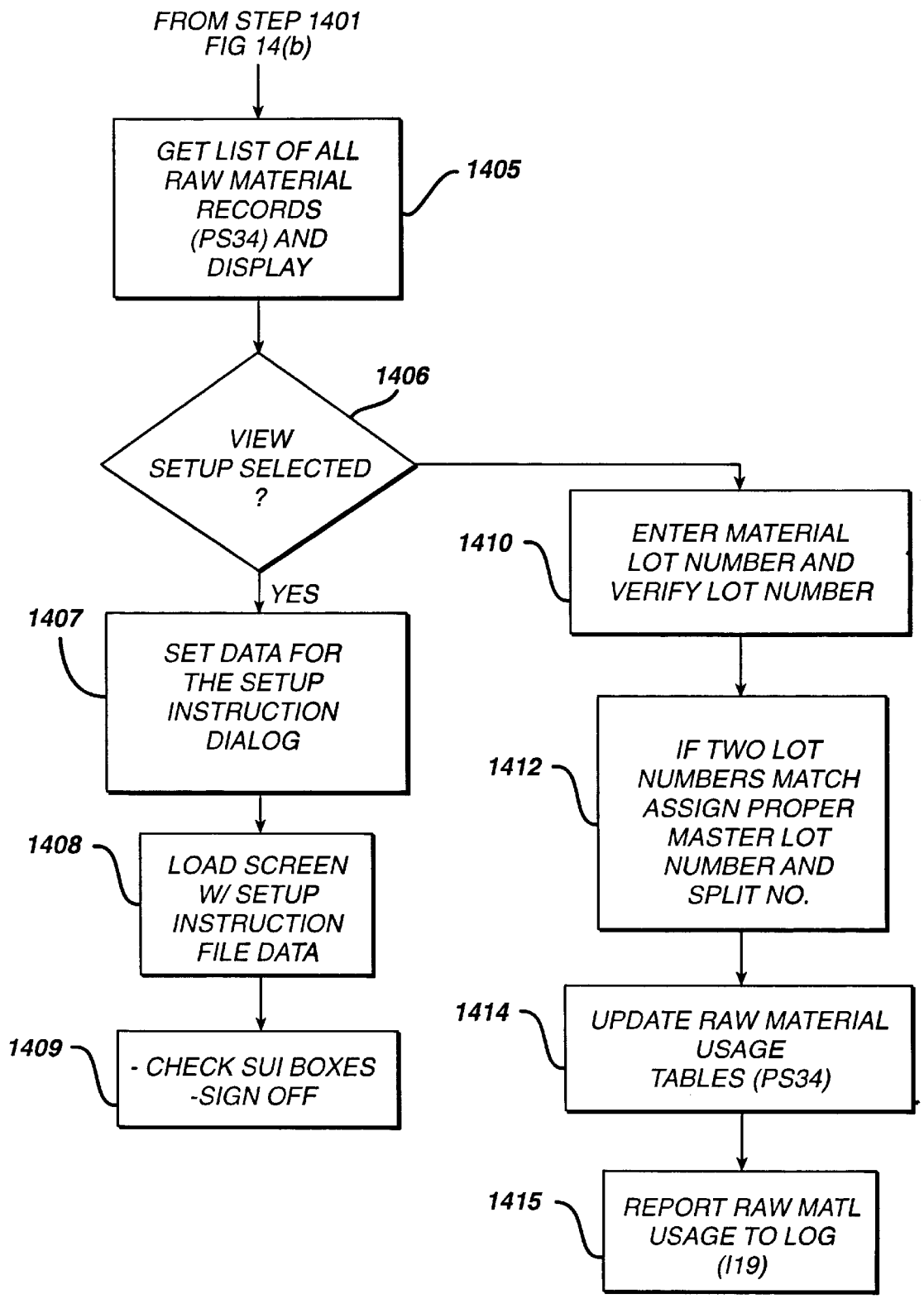
Figure 14:
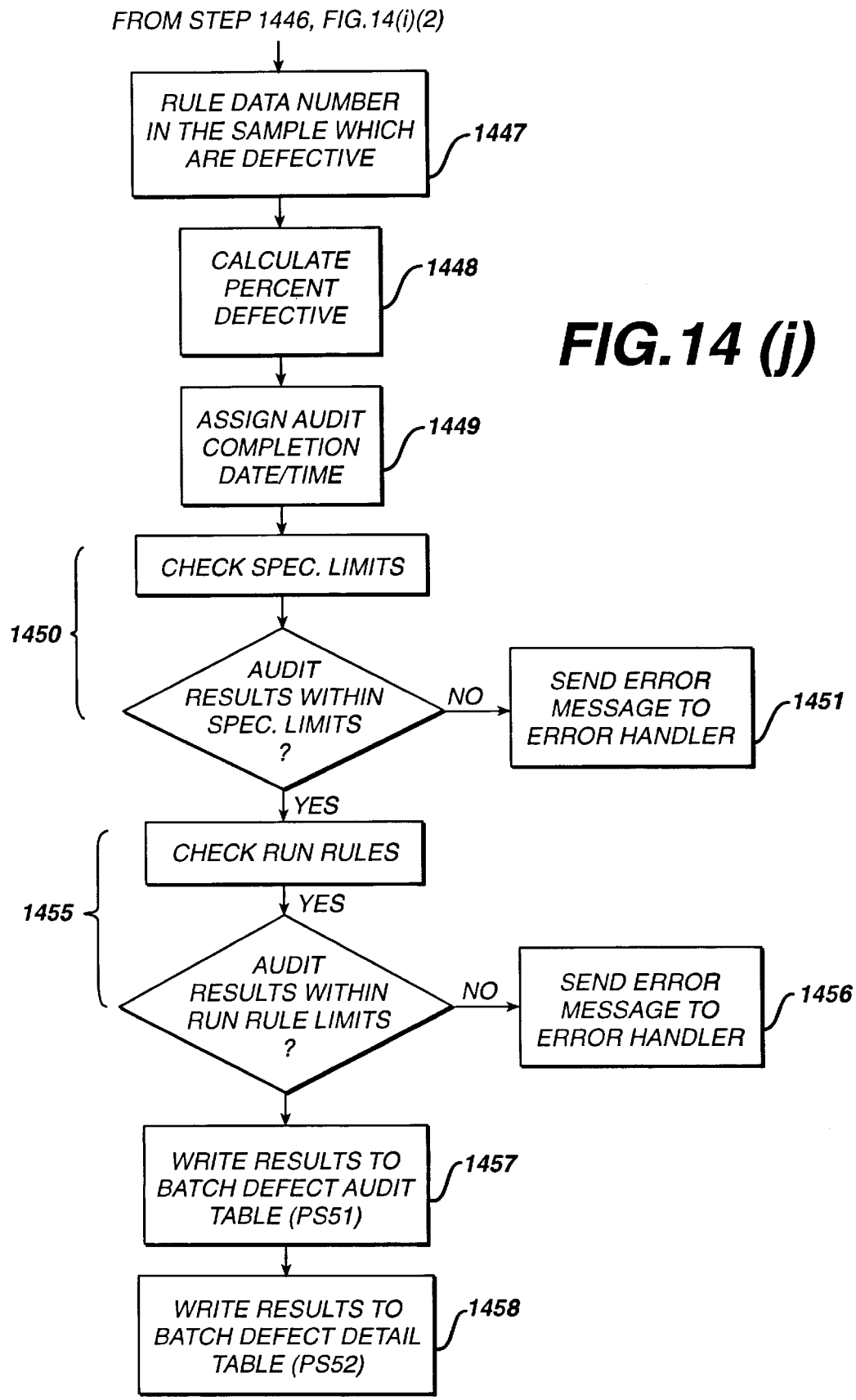
Figure 14:
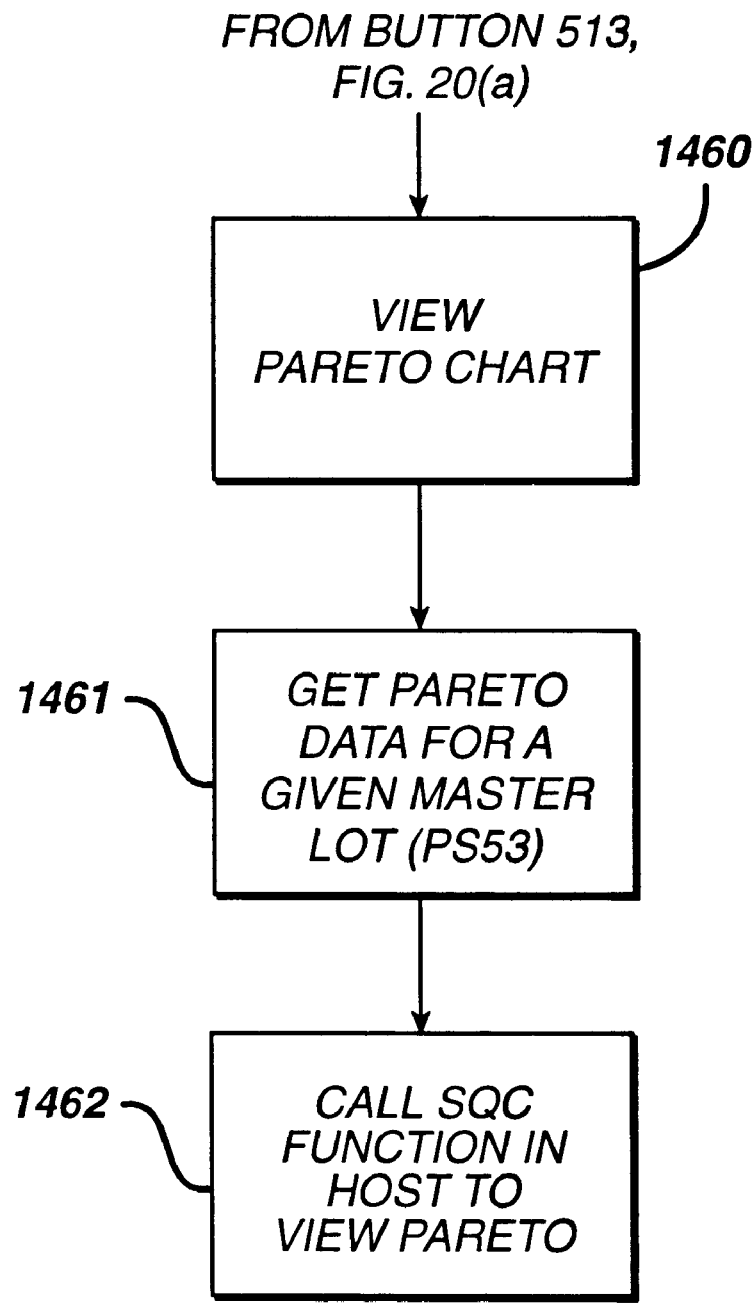
Figure 14:
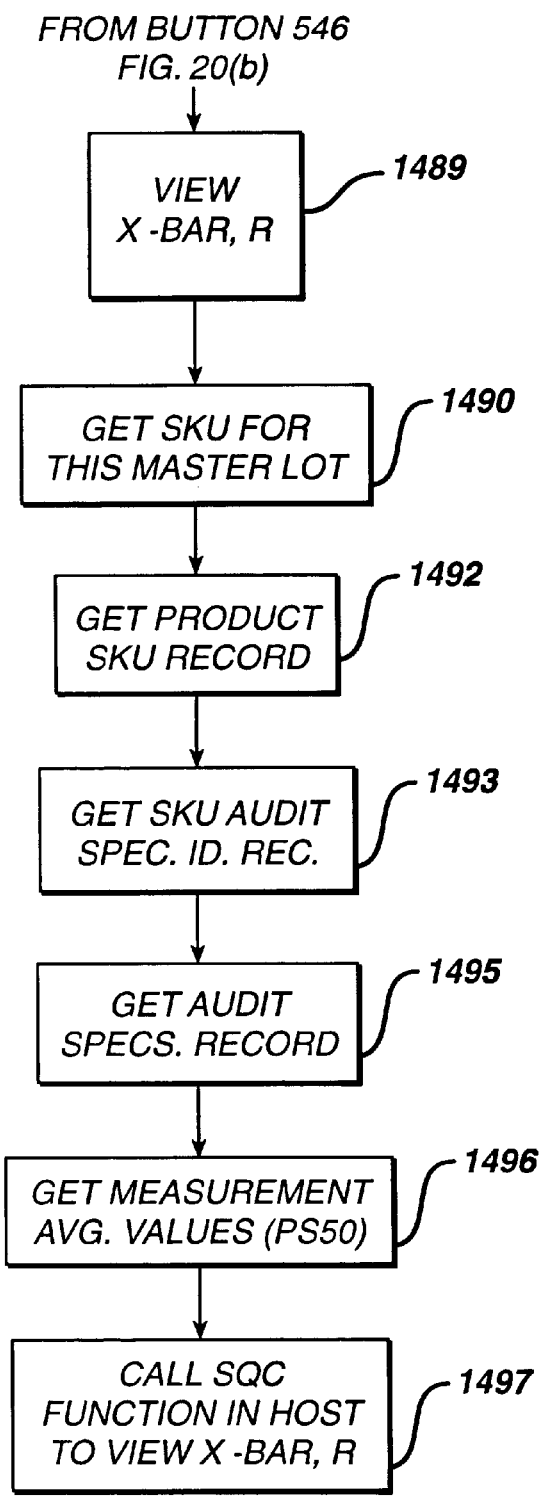
Figure 14:
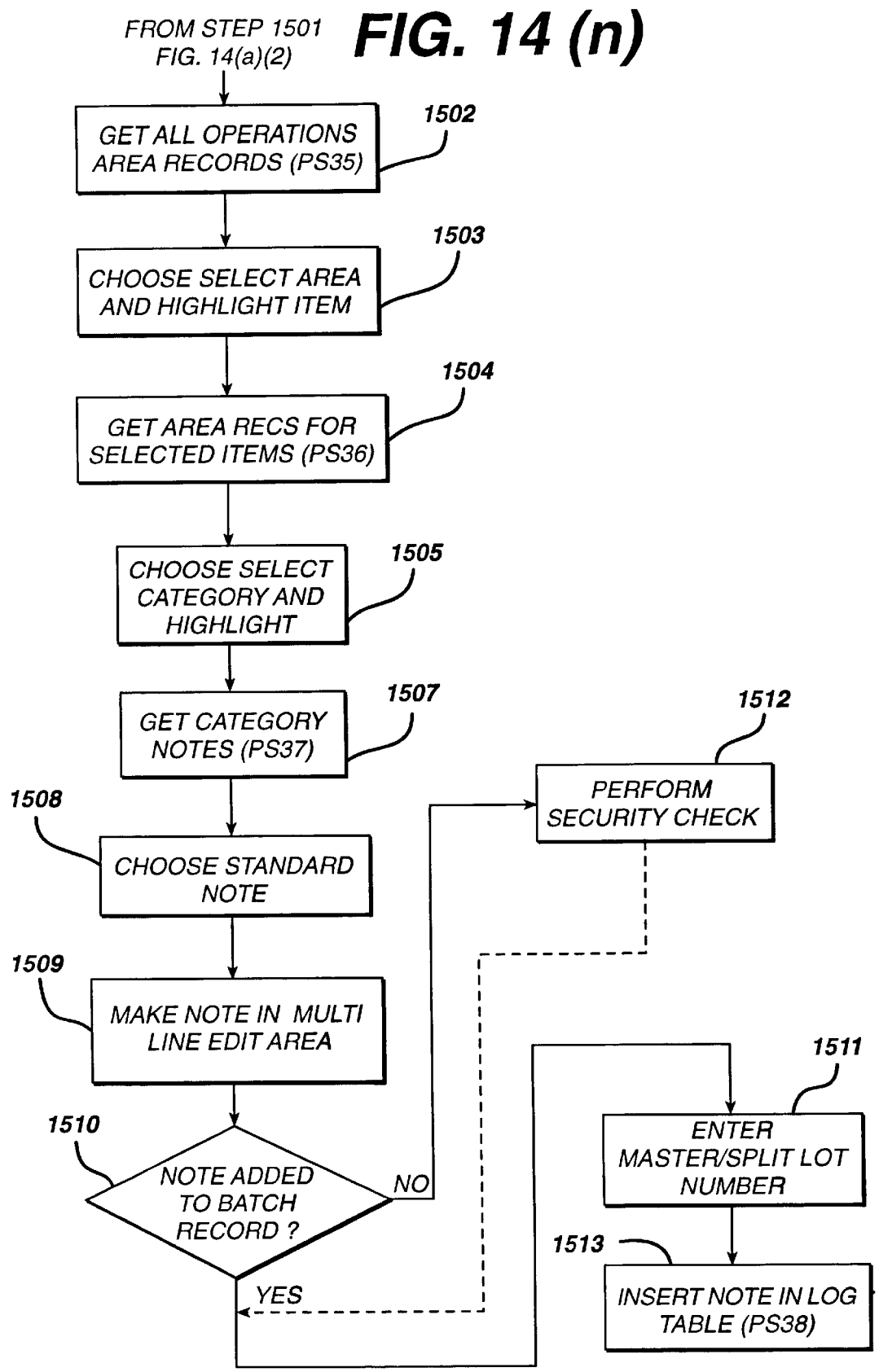
Figure 14:
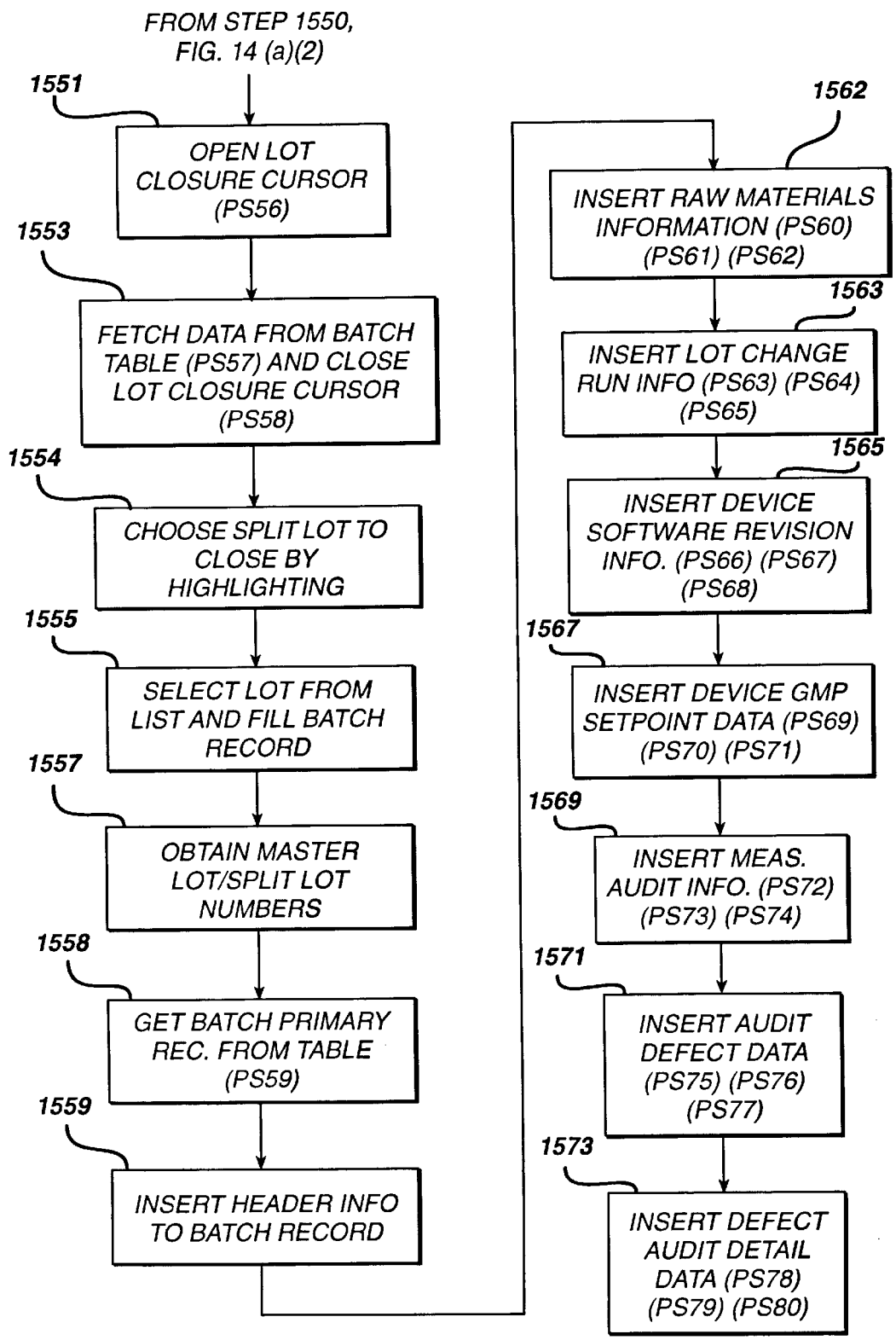
Figure 14:
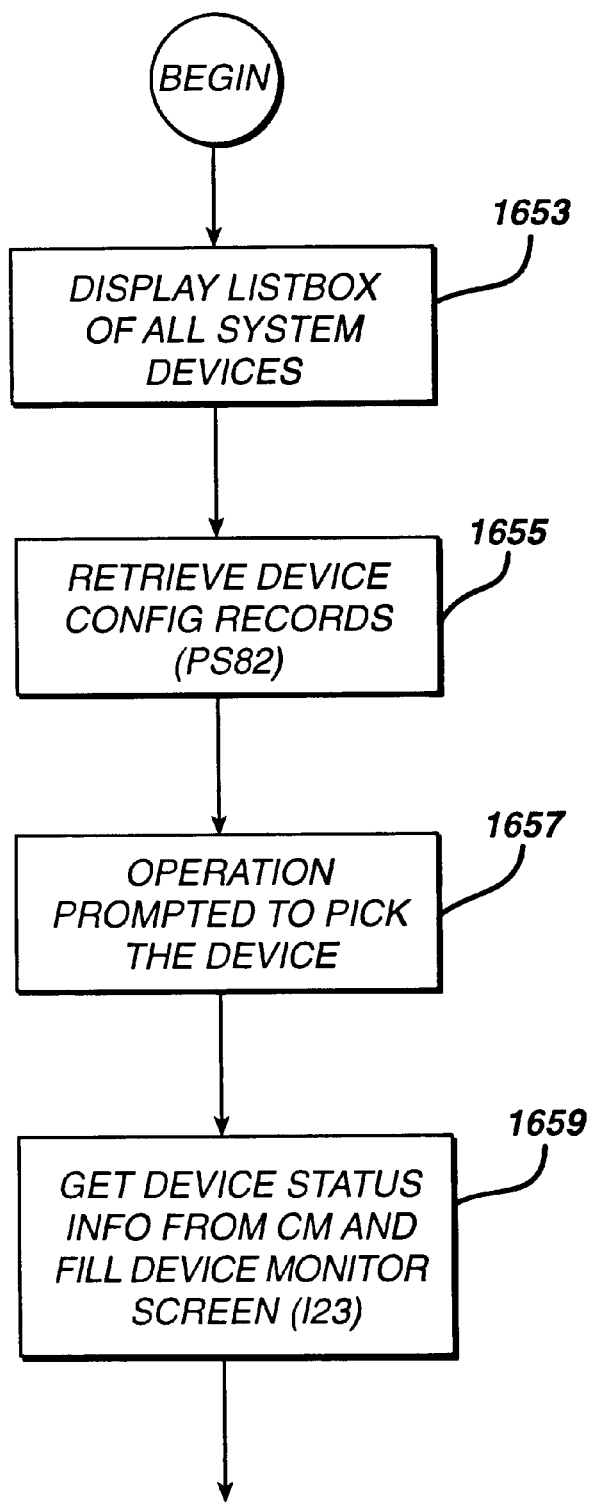
Figure 14:
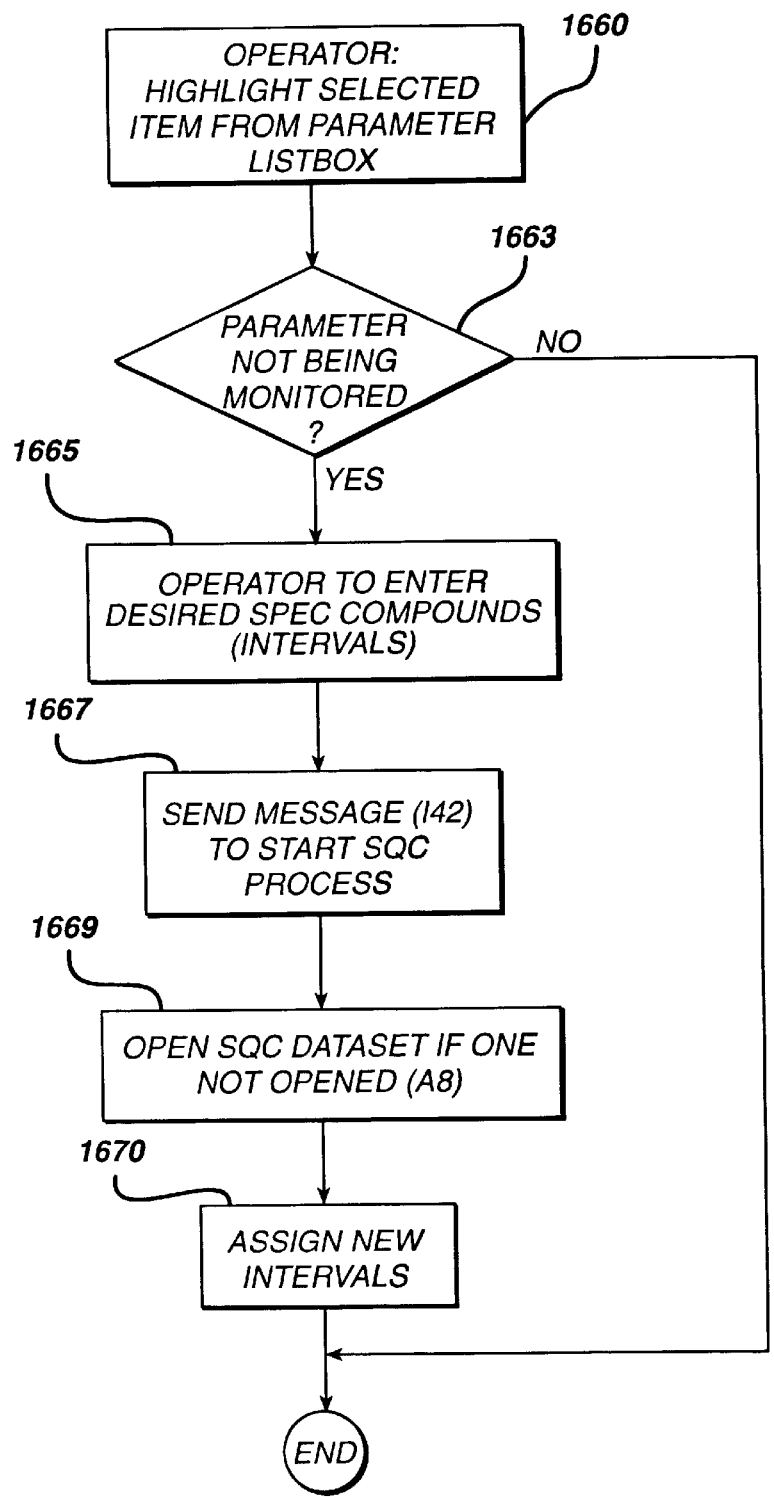
Figure 14:
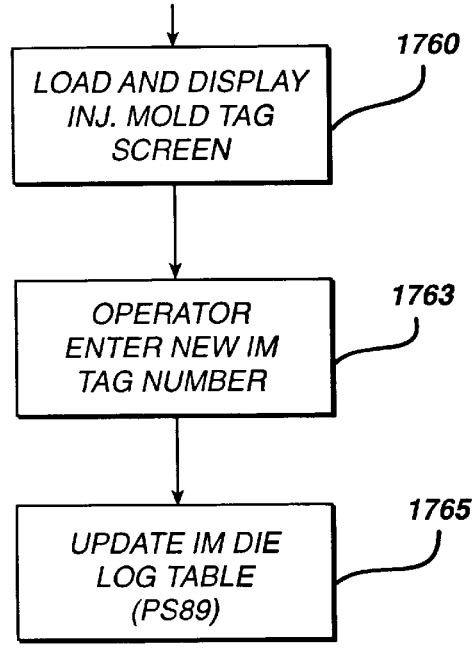
Figure 14:
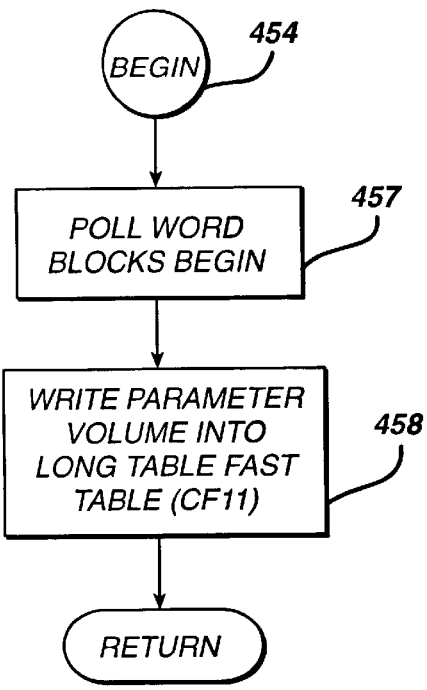
Figure 14:
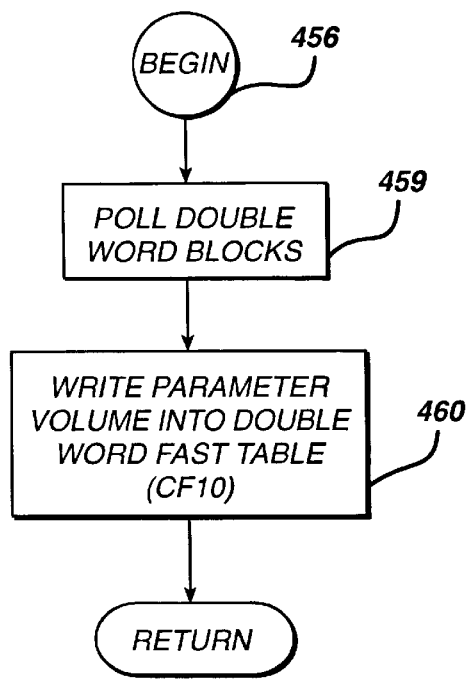

the Main Menu interface thread in FIGS. 14(*a*)(1) through 14(*c*);

the Order Management thread for activating orders in FIGS. 14(*d*)(1) through 14(*e*);

the Order Management thread for completing orders in FIGS. 14(*f*)–14(*g*);

the Raw Material changout thread in FIG. 14(*h*);

the Defect audit thread in FIGS. 14(*i*)(1) through 14(*j*);

the View Pareto chart thread in FIG. 14(*k*);

the Measurement audit thread in FIGS. 14(l)(1) and 14(l)(2);

the View X-Bar, R graphic thread in FIG. 14(*m*);

the Add Log Entry thread in FIG. 14(*n*);

the Batch Record/Lot changeover thread in FIG. 14(*o*);

the Device Monitor thread in FIG. 14(*p*);

the process for starting a configured SQC process in FIG. 14(*q*);

the Injection Molding Tag entry thread in FIG. 14(*r*);

the polling thread for long type PLC data in FIG. 14(*s*); and, the polling thread for double type PLC data in FIG. 14(*t*).

Figure 15:
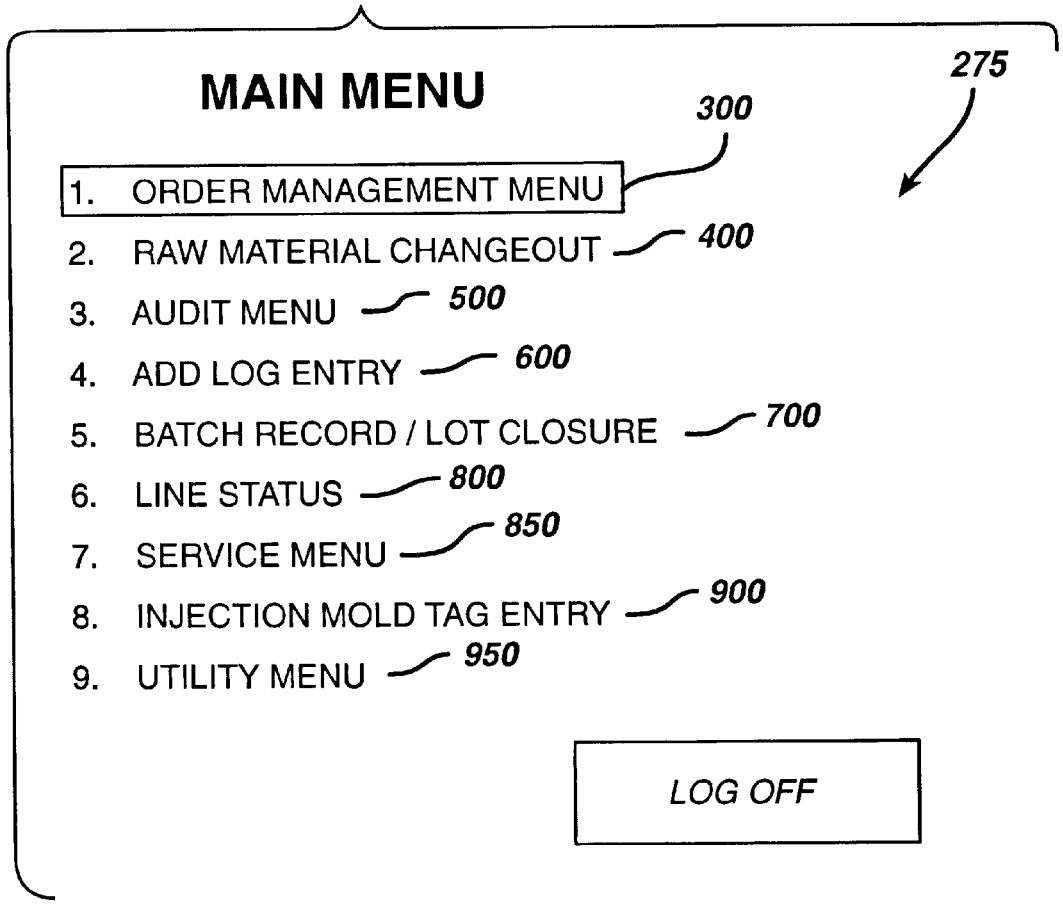

FIG. 15 illustrates the Main menu display screen for the operator interface to the PCS system.

Figure 16:
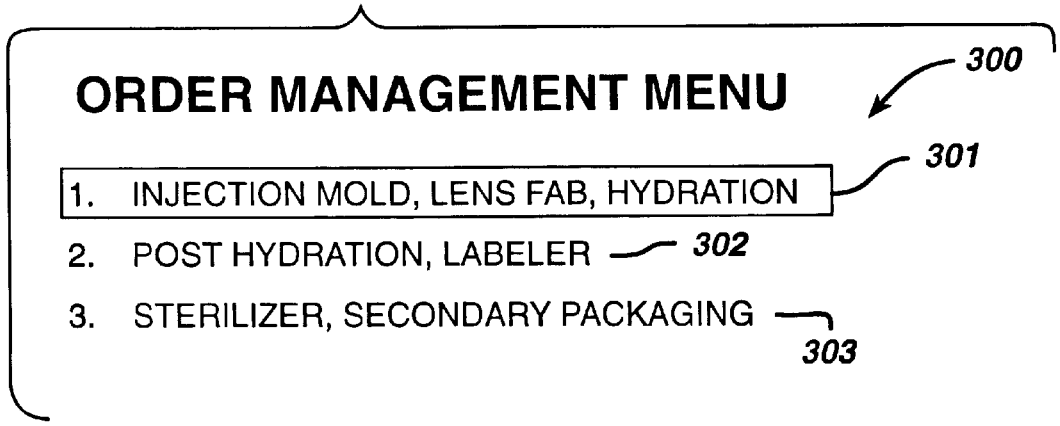

FIG. 16 illustrates the Order Management menu operator interface display.

Figure 17:
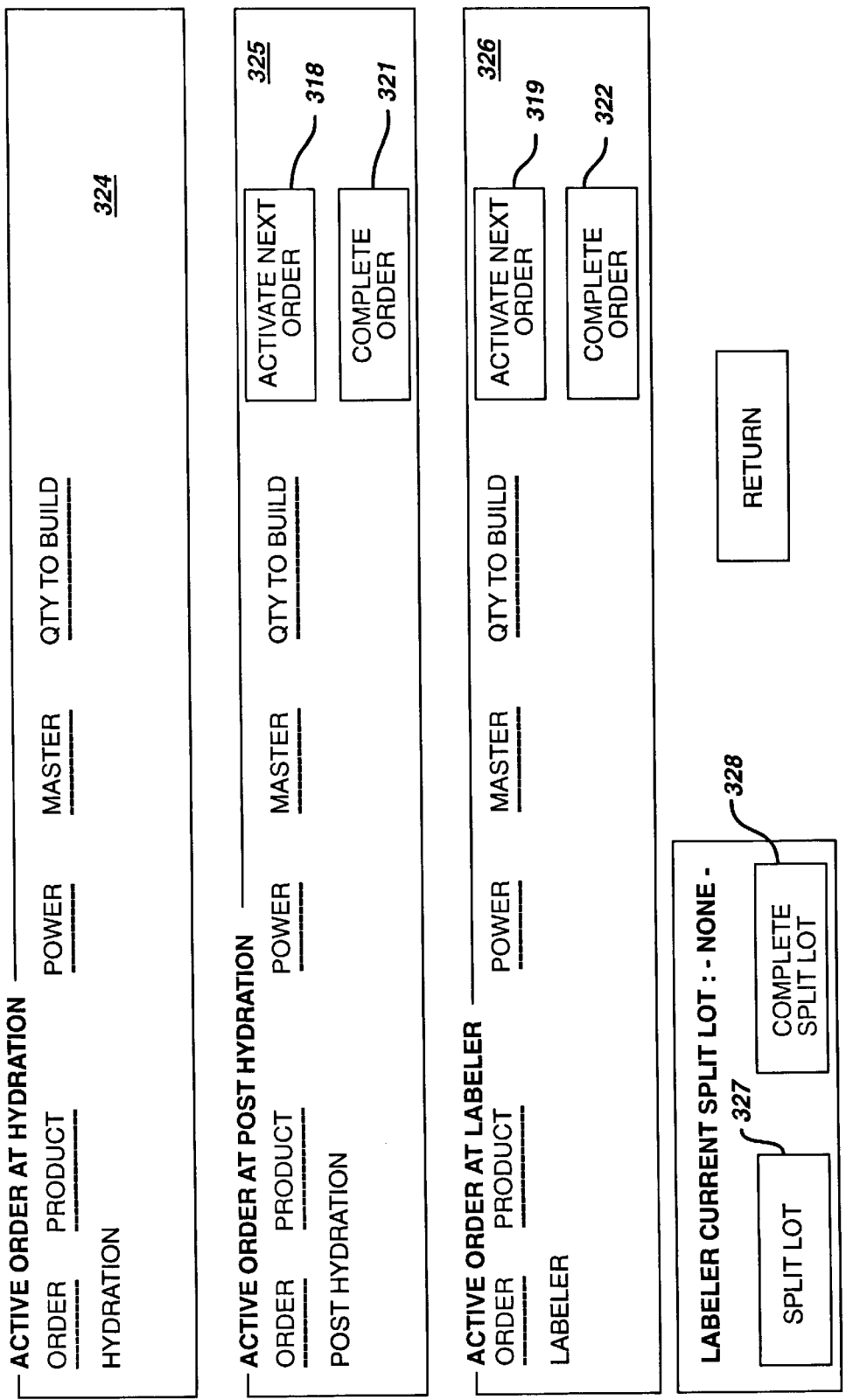
Figure 17:
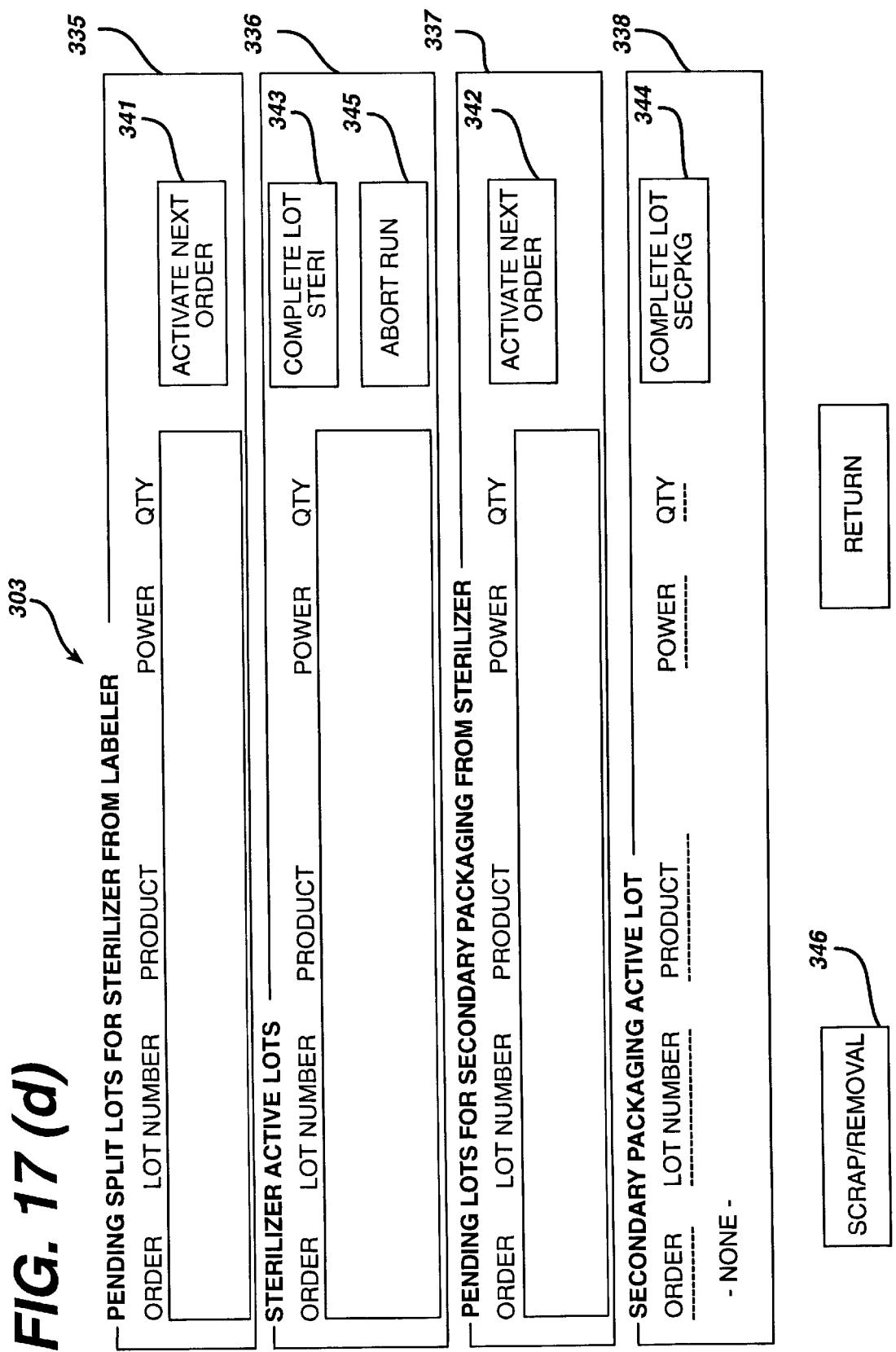

FIG. 17(*a*) illustrates the Order Management operator interface display for activating/completing orders at IM, LF, and HY.

FIG. 17(*b*) illustrates the Order Management operator interface display for activating/completeing orders at HY, PH, and Labeler.

FIG. 17(*c*) illustrates the operator screen for split lot verification.

FIG. 17(*d*) illustrates the Order Management operator interface display for activating/completeing orders Labeler, Sterilizer, and secondary packaging.

Figure 18:
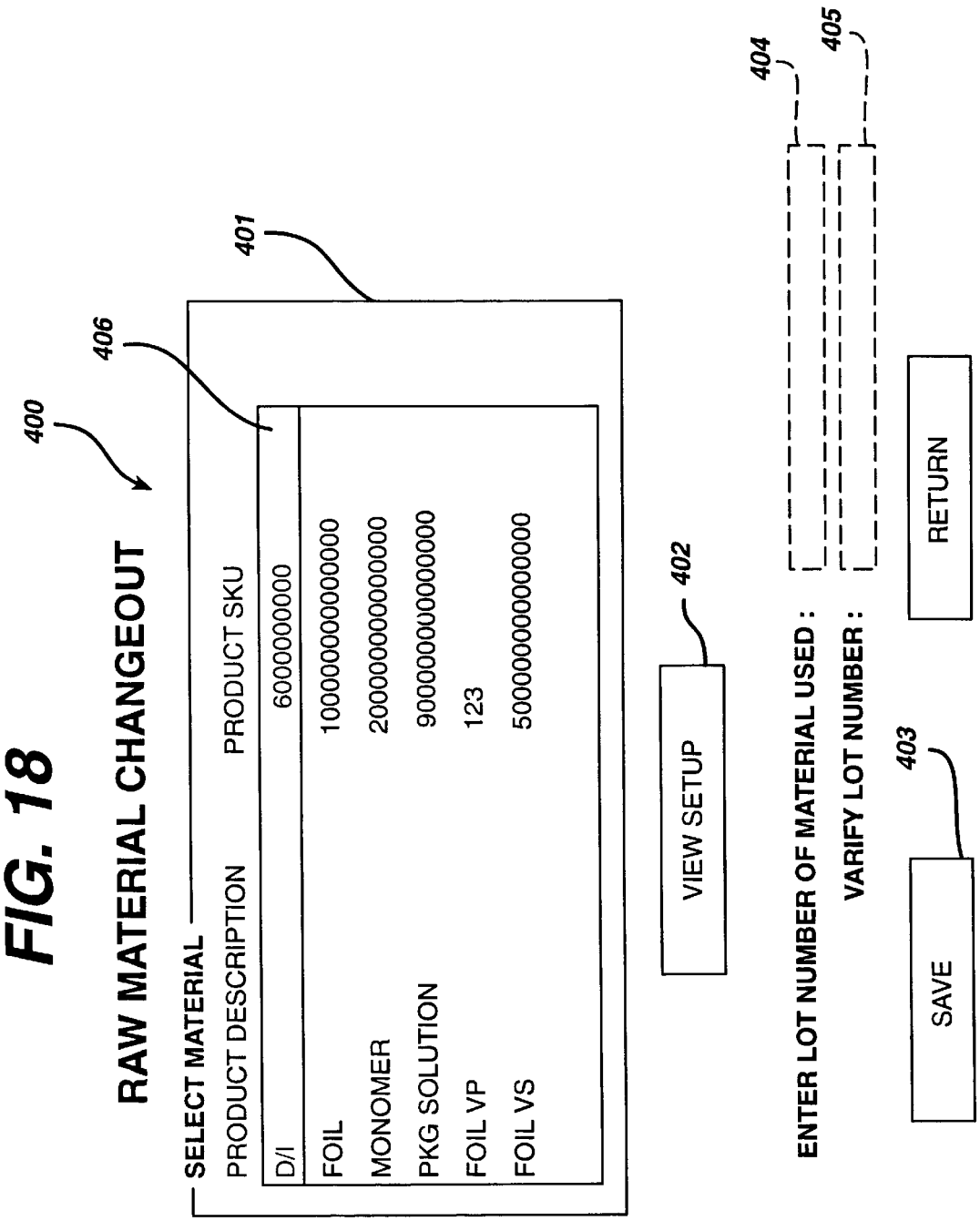

FIG. 18 illustrates the Raw Material Changeout operator interface display.

Figure 19:
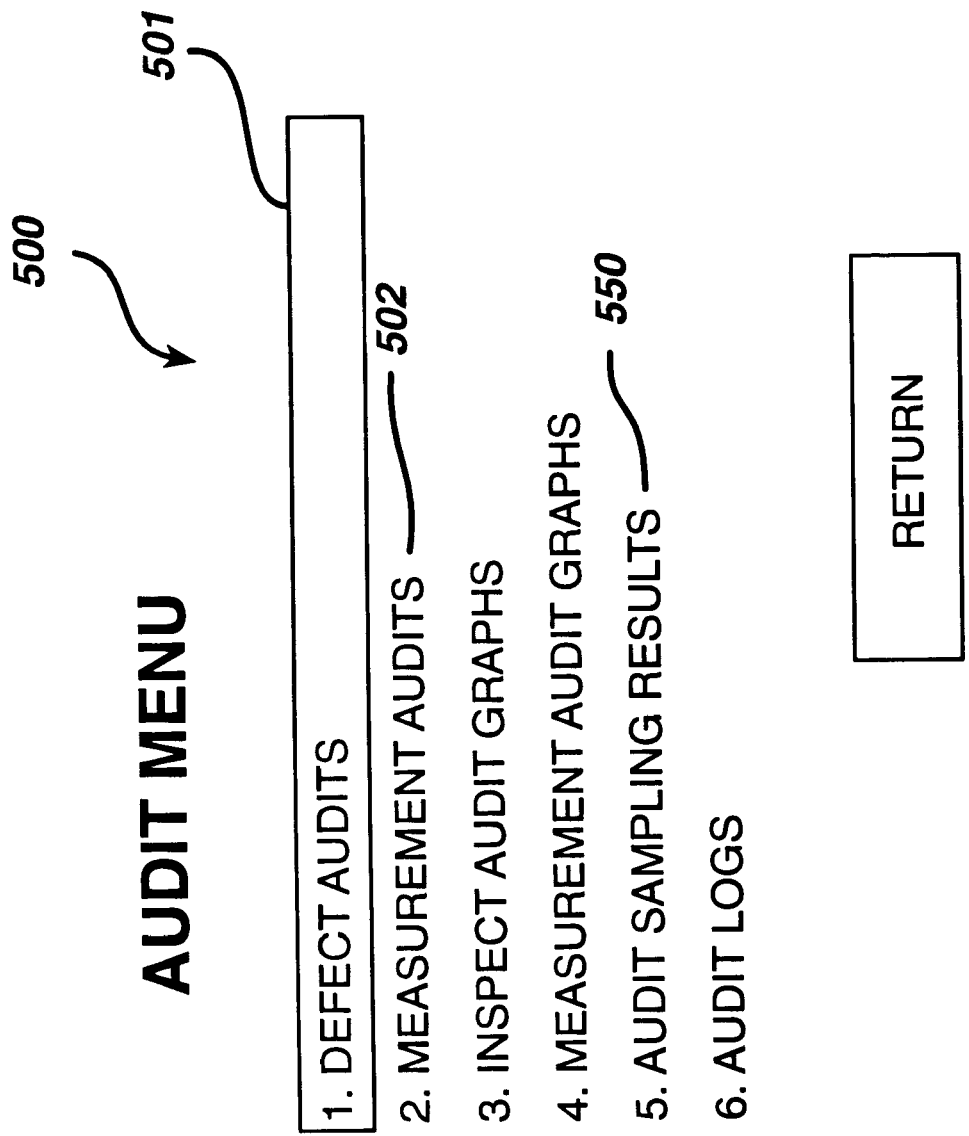

FIG. 19 illustrates the Audit menu operator interface display.

Figure 20:
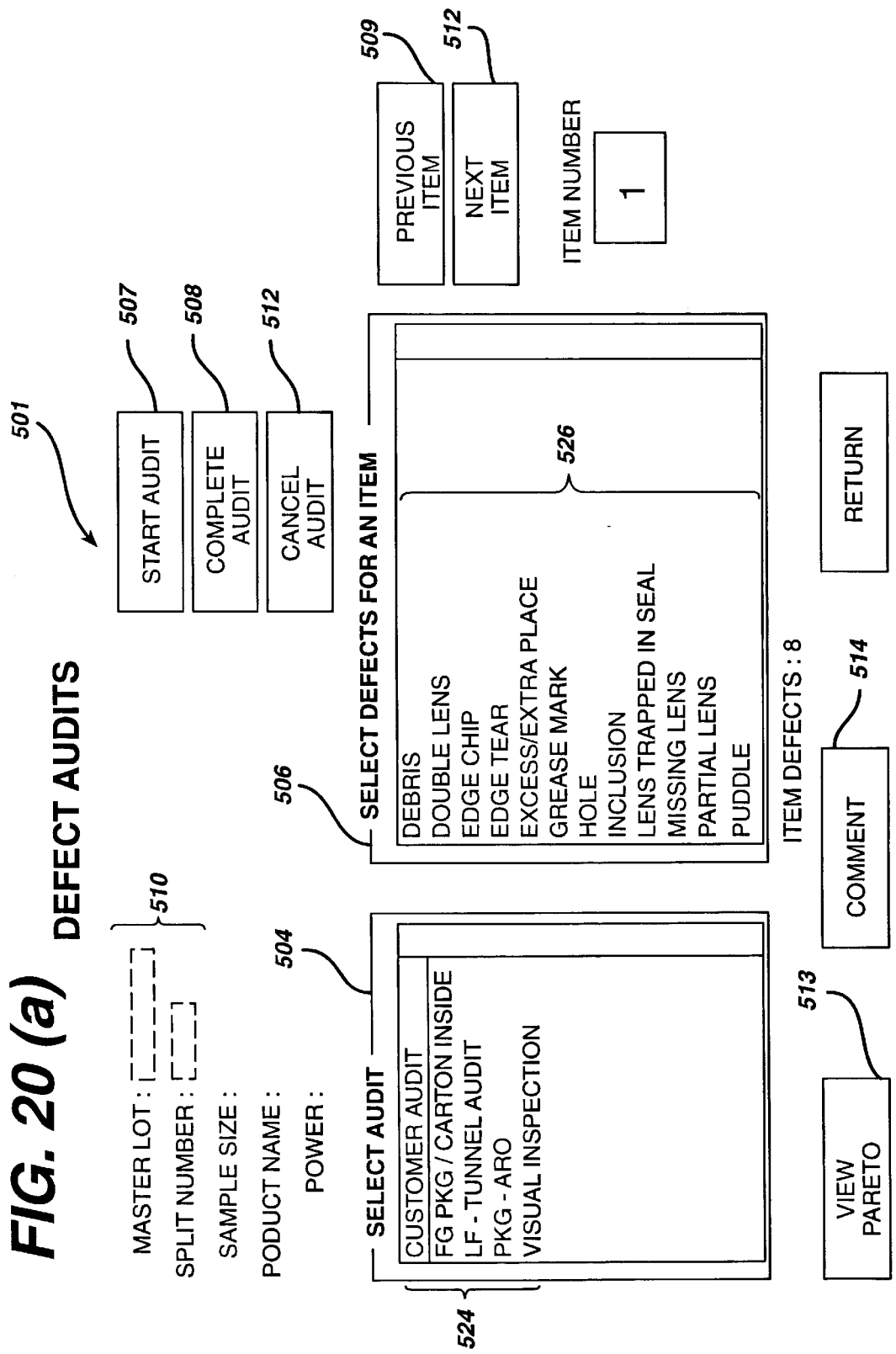

FIG. 20(*a*) illustrates the Defect Audits operator interface display.

FIG. 20(*b*) illustrates the Measurements Audit operator interface display.

FIG. 20(*c*) illustrates the Calculate Audit results operator interface display.

FIG. 21 illustrates the Add Log Entry operator interface display.

FIG. 22 illustrates the Batch Record/Lot changeover operator interface display.

FIG. 23 illustrates the Line Status operator interface display.

Figure 24:
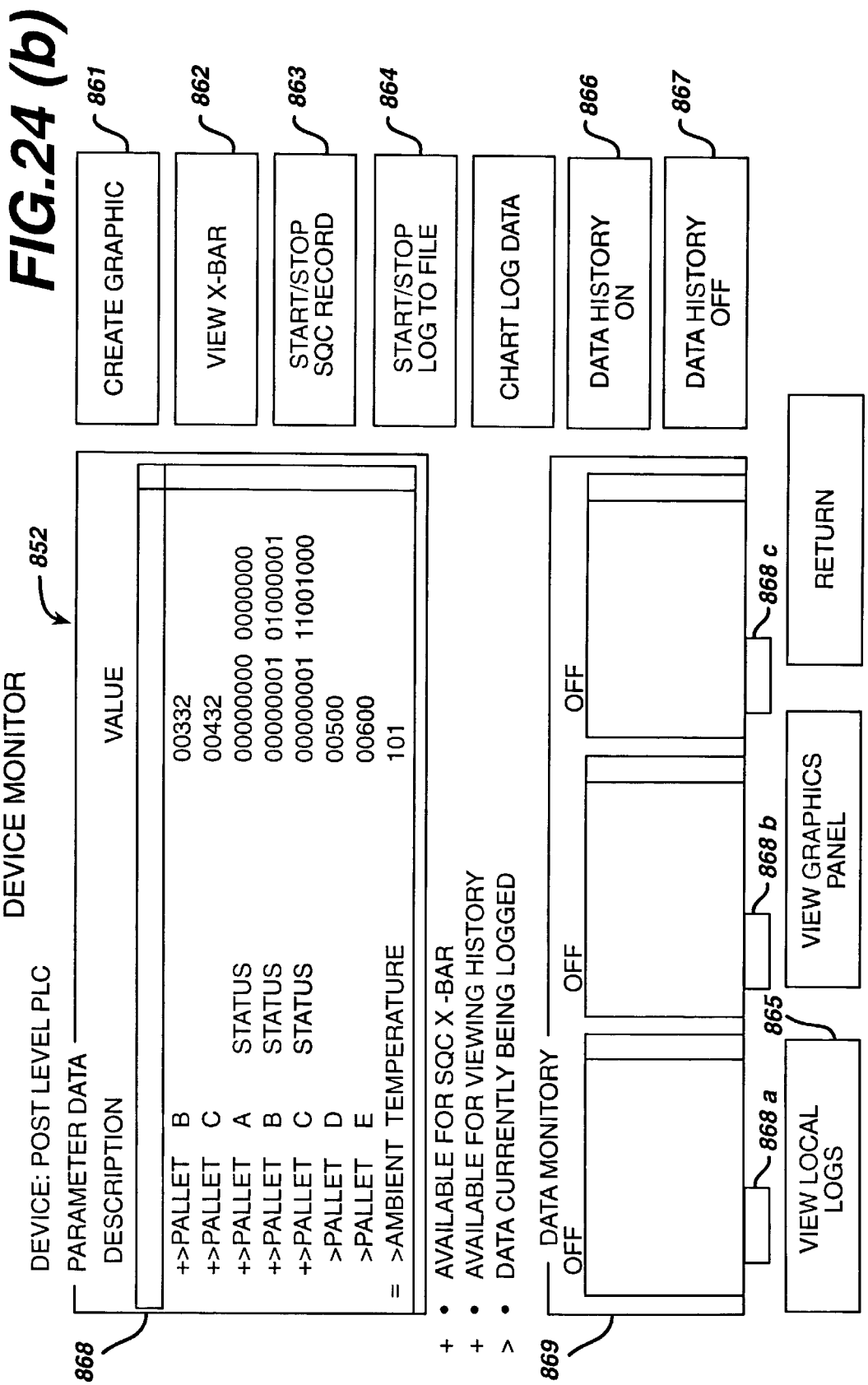

FIG. 24(*a*) illustrates the Device menu operator interface display.

FIG. 24(*b*) illustrates the Device Monitor operator interface display.

FIG. 24(*c*) illustrates the ALI operator interface display.

Figure 25:
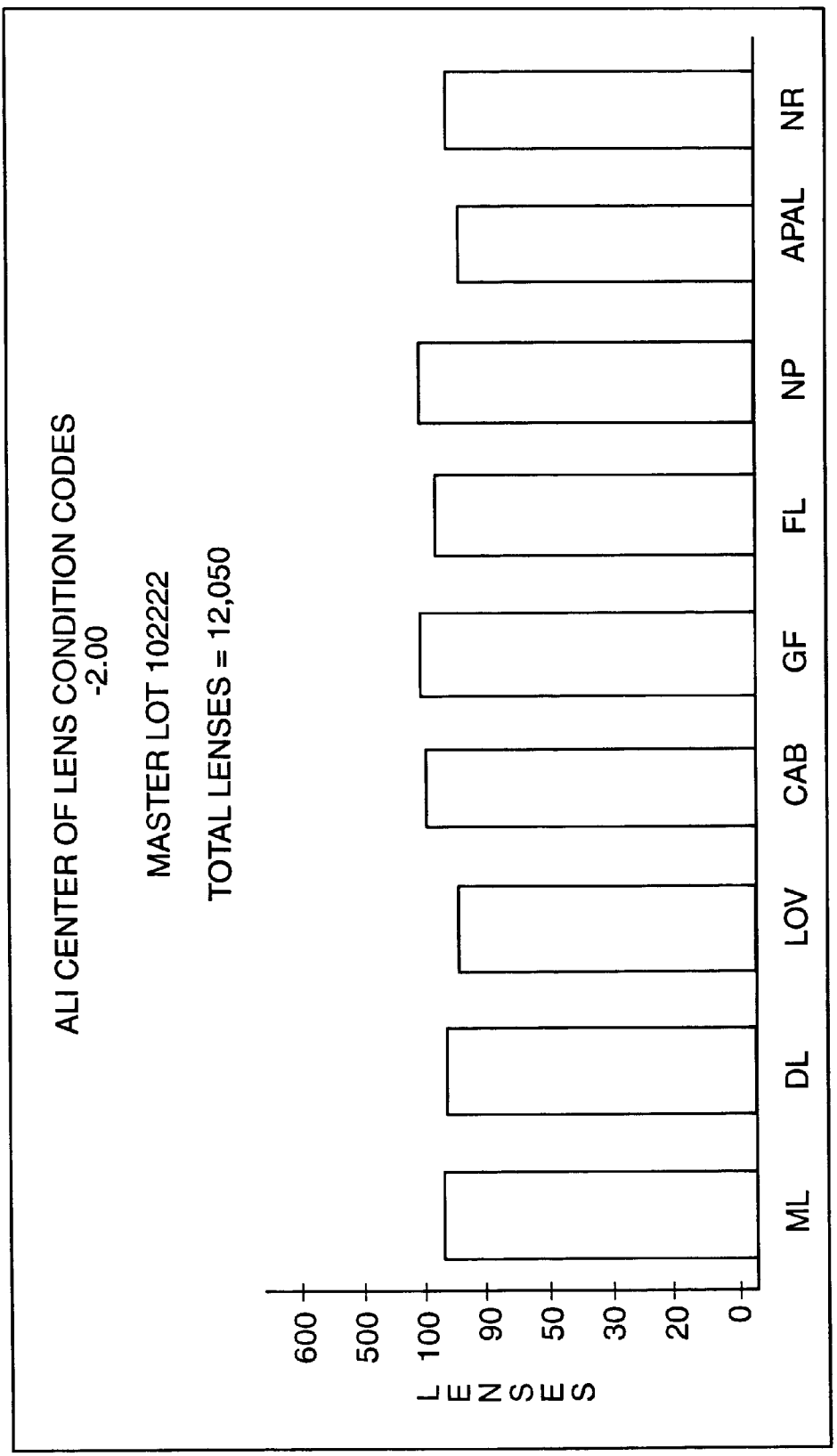

FIG. 25(*a*) illustrates a graphic display of an ALI results chart and FIG. 25(*b*) illustrates the data for the chart of FIG. 25(*a*).

Figure 26:
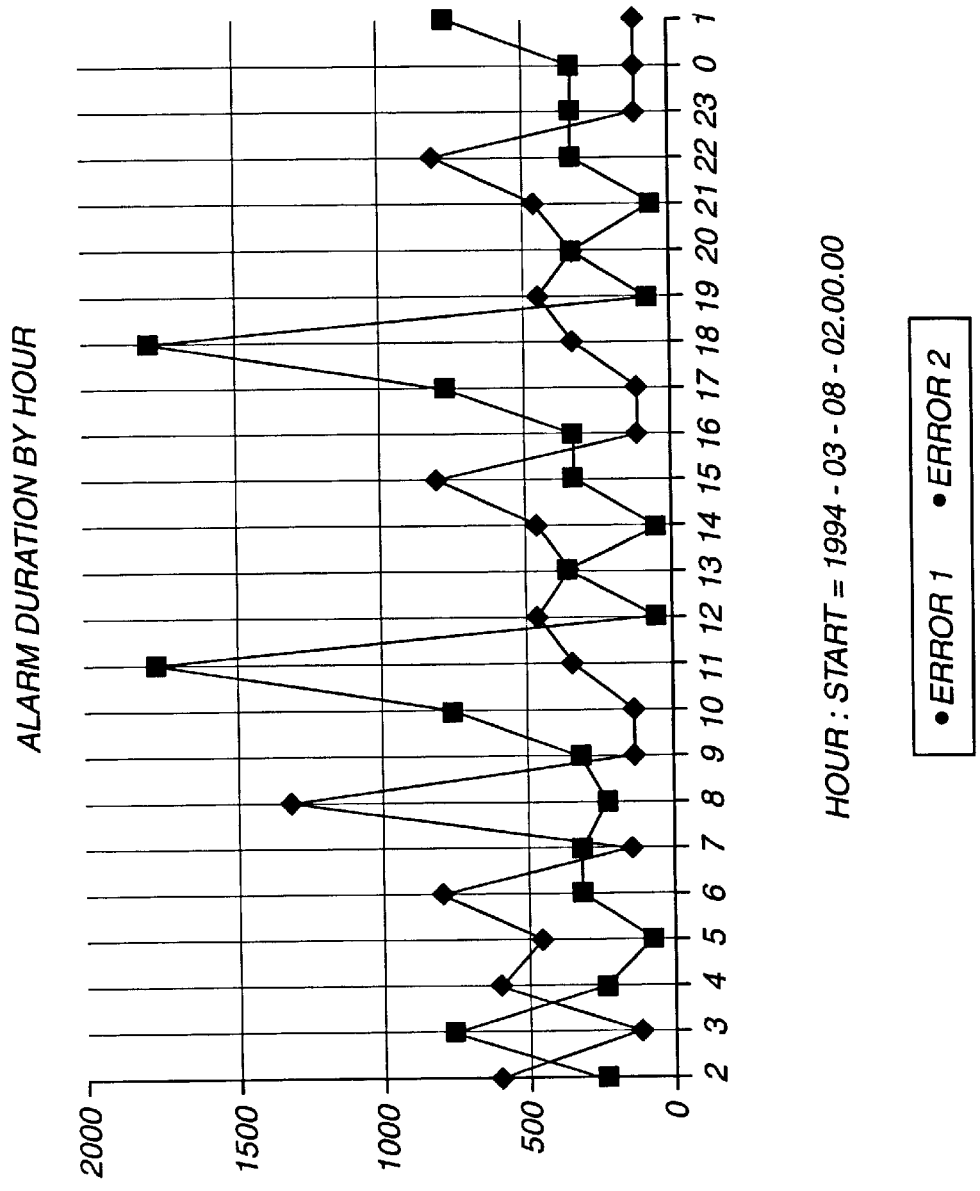

FIG. 26(*a*) illustrates the Device Alarm Information operator interface display.

FIG. 26(*b*) illustrates a graphic display for a particular Device Alarm Information.

Figure 27:
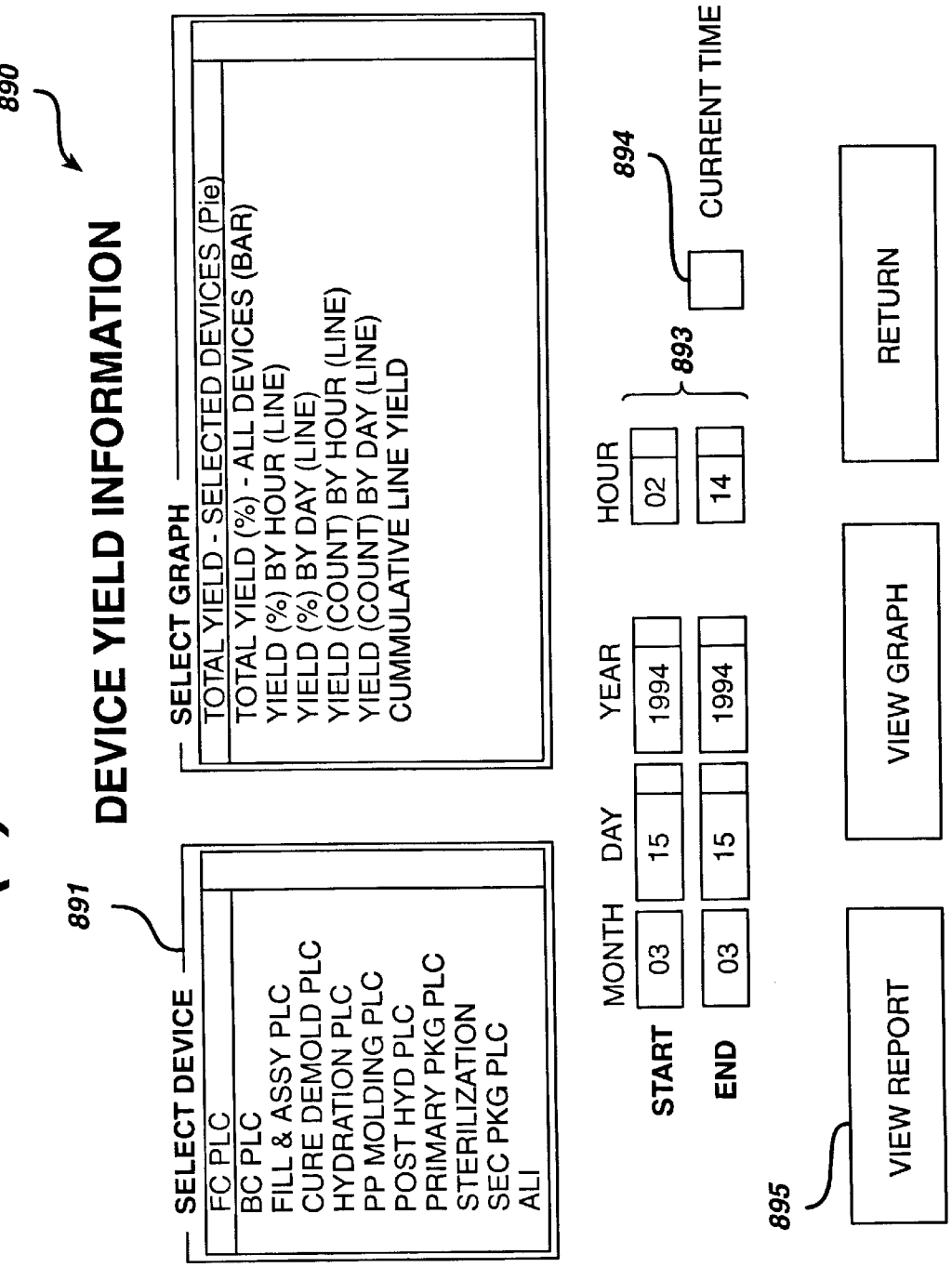

FIG. 27(*a*) illustrates the Device Yield Information operator interface display.

FIG. 27(*b*) illustrates a graphic display for particular Device Yield Information.

Figure 28:
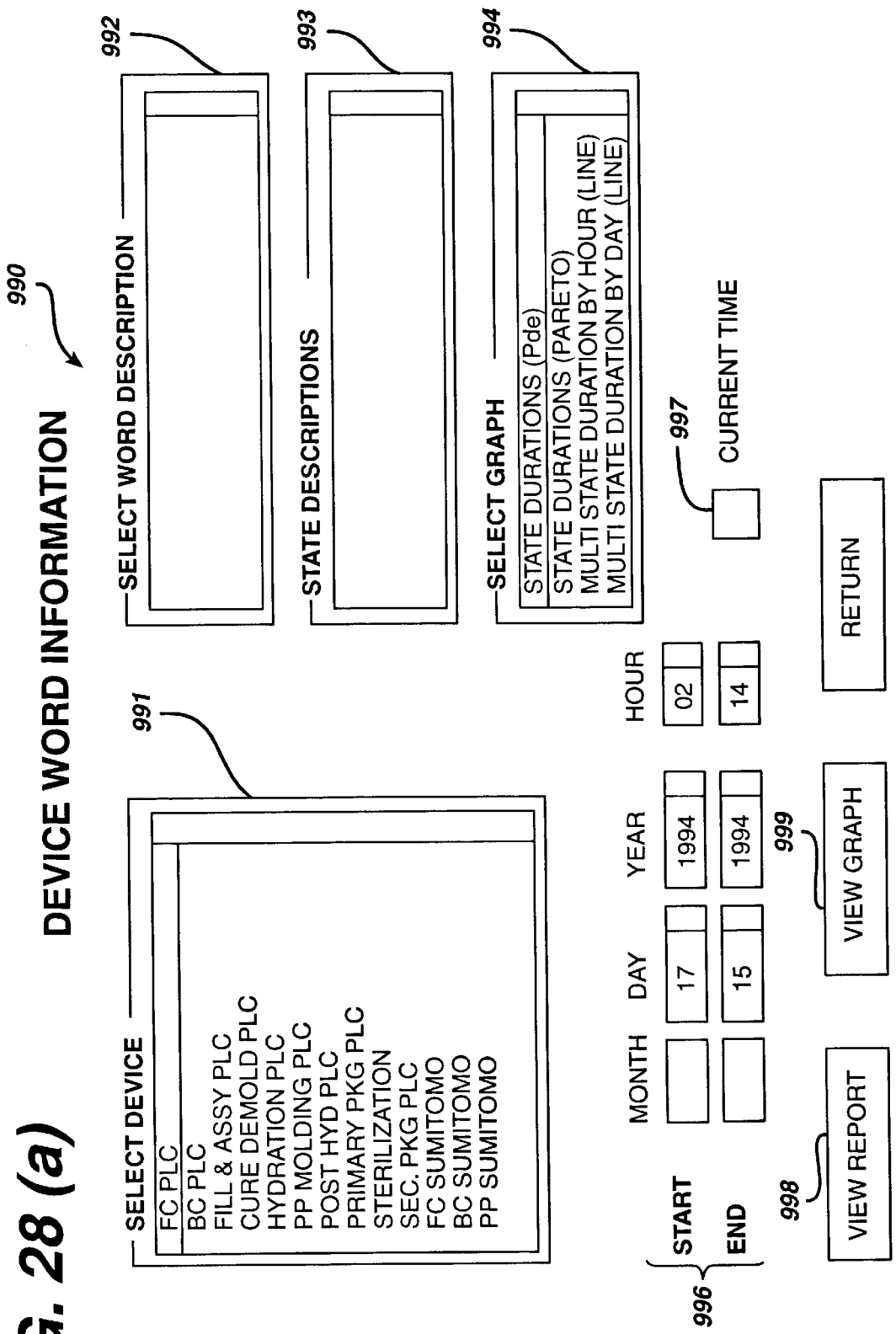

FIG. 28(*a*) illustrates the Device Word Information operator interface display.

FIG. 28(*b*) illustrates a graphic display for particular Device Word Information.

FIG. 29 illustrates a scraplog information screen including a select device listbox and a select reason window.

FIG. 30 illustrates the Utility menu operator interface display.

FIG. 31 illustrates the Injection Mold Tag Entry operator interface display.

Figure 32:
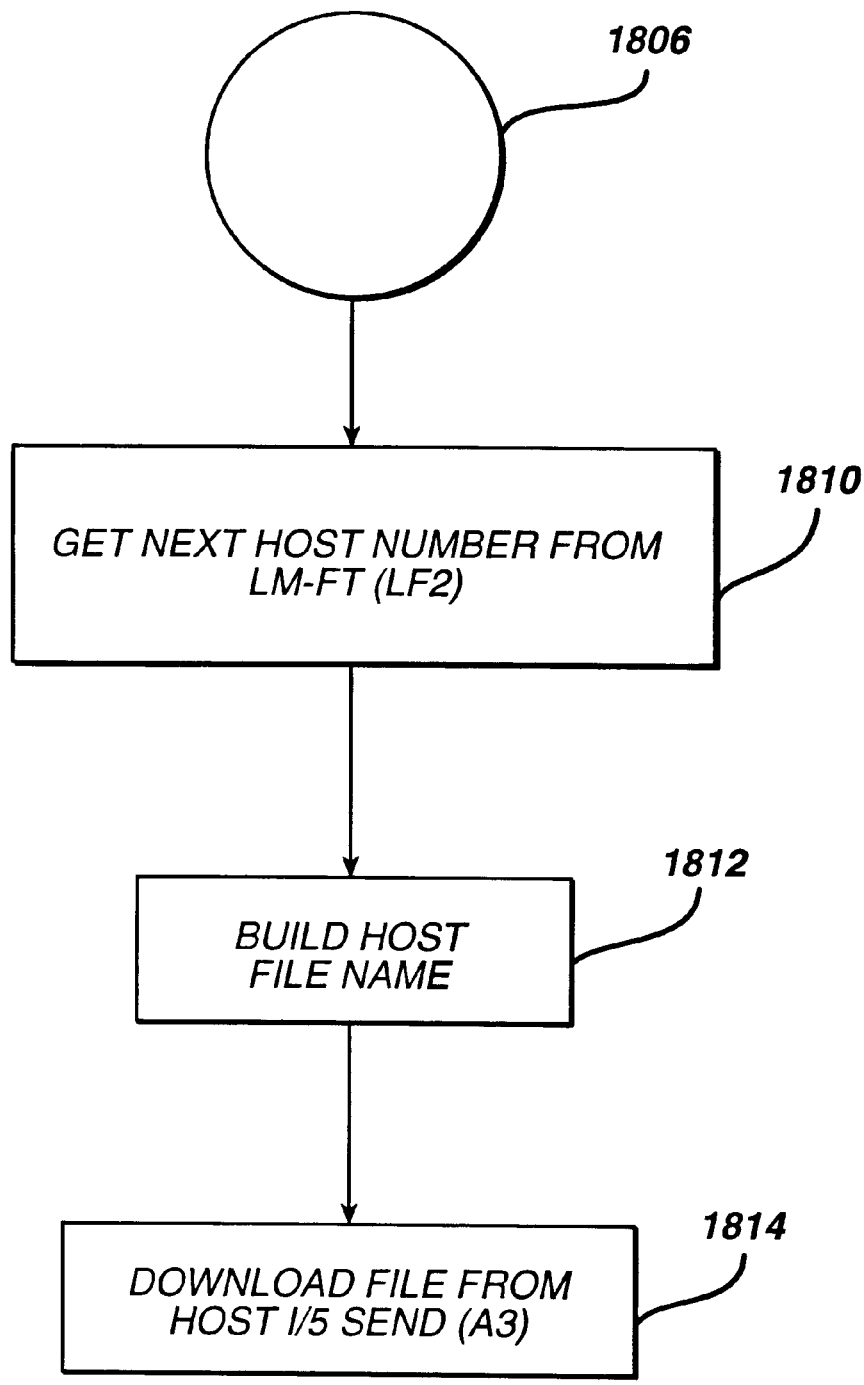

FIG. 32 illustrates the Line manager Host File Request thread process.

Figure 33:
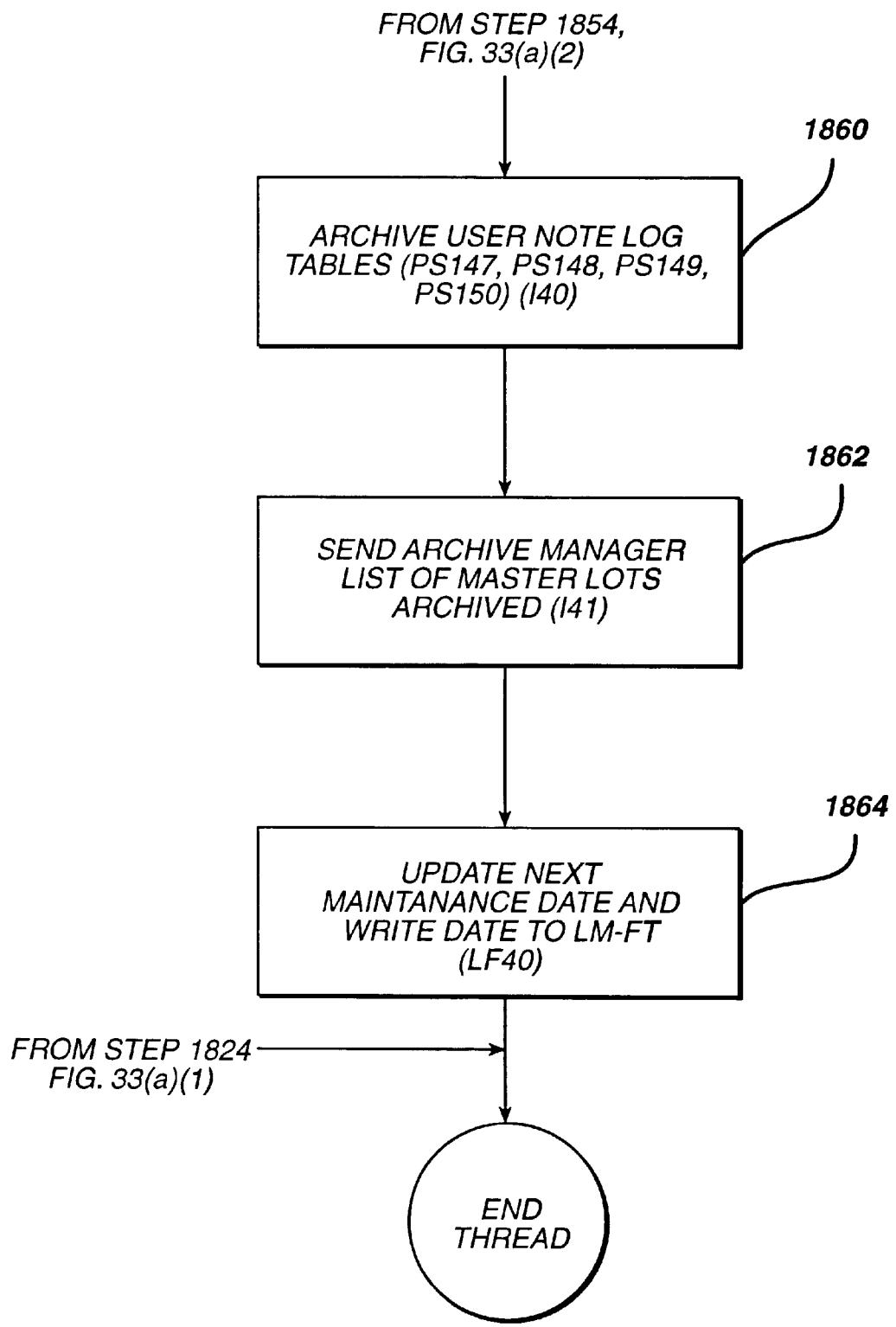

FIGS. 33(*a*)(1), 33(*a*)(2) and 33(*b*) together illustrate the Line manager Maintenance thread.

Figure 34:
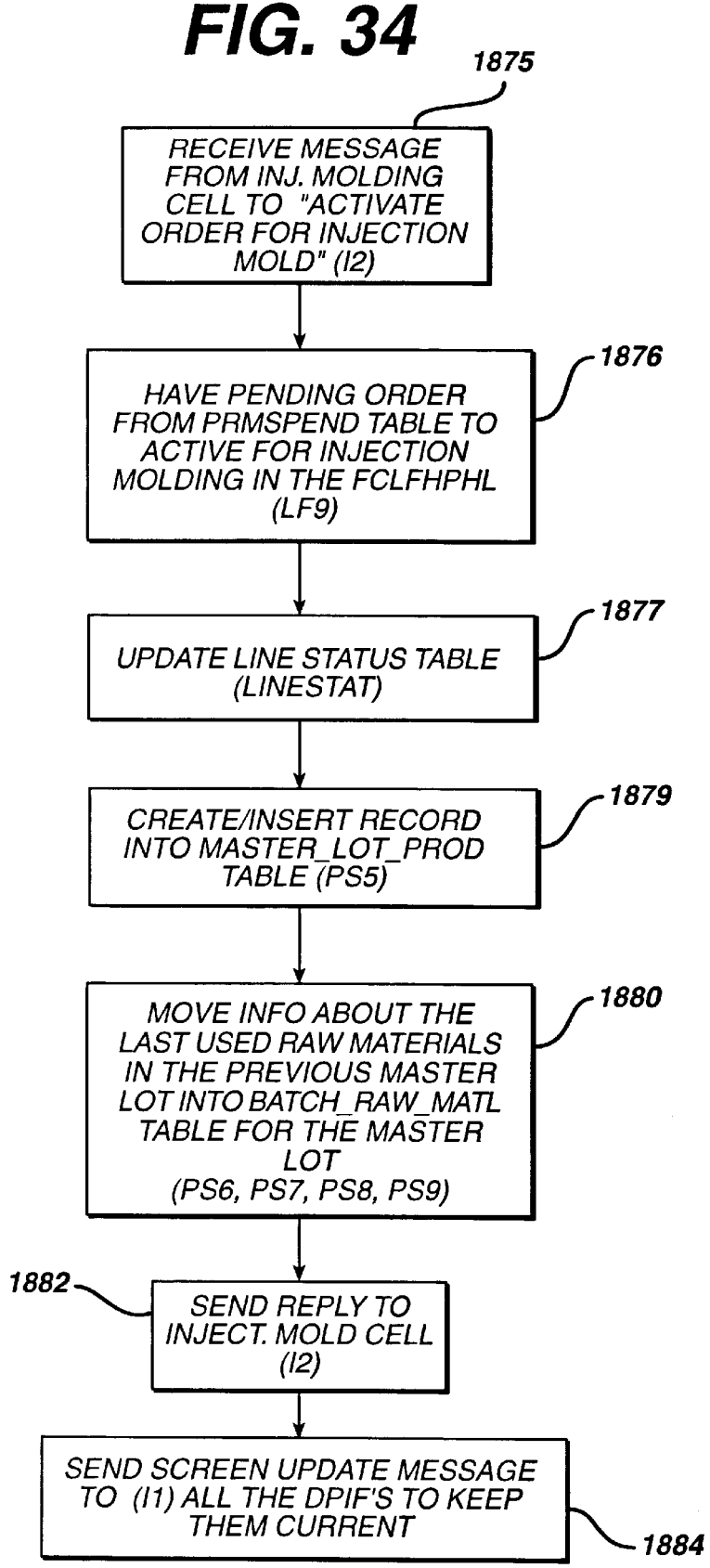

FIG. 34 illustrates the line manager activate order process for the IM cell.

Figure 35:
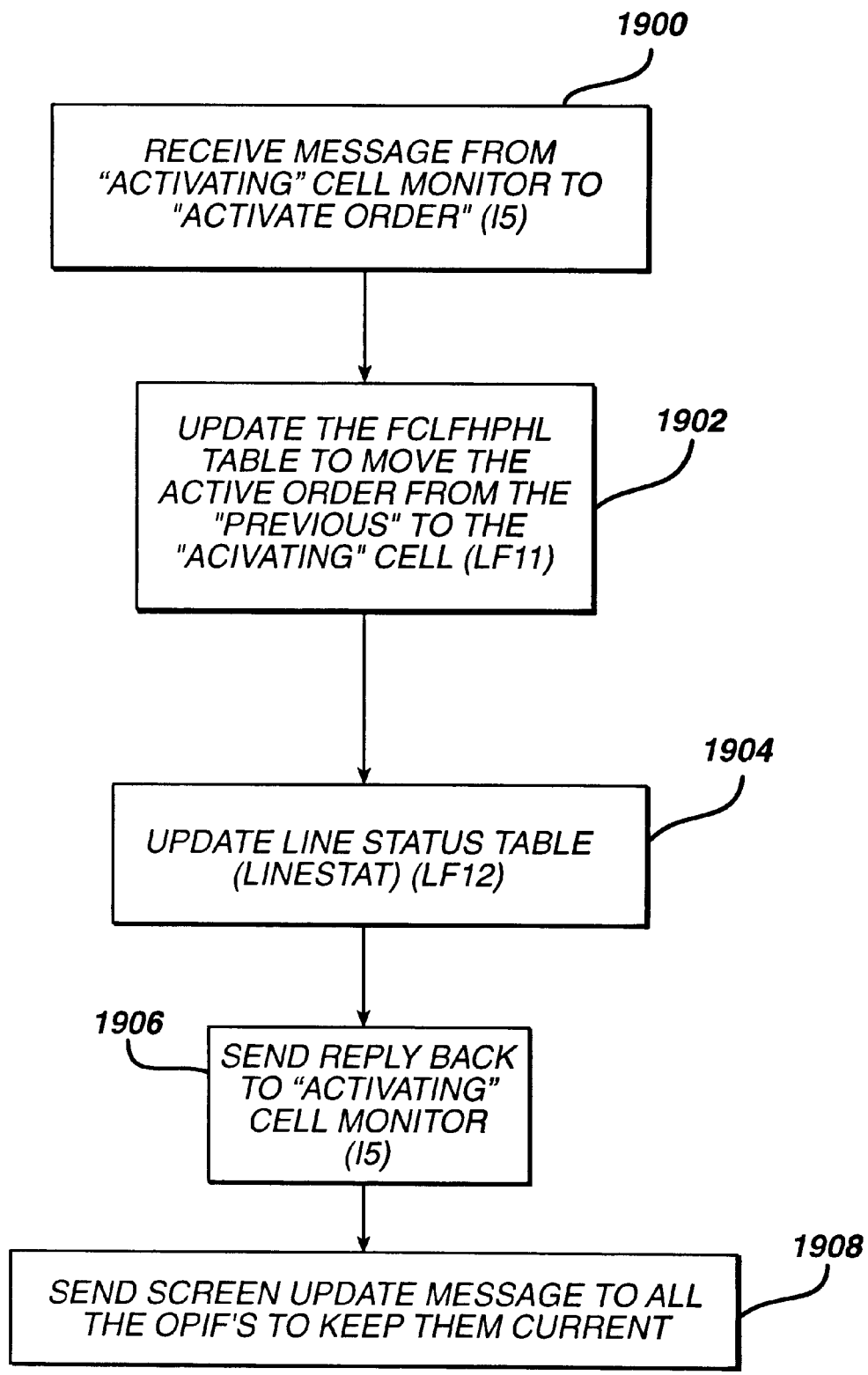

FIG. 35 illustrates the line manager activate order process for the LF, HY, PH, and Labeler cells.

Figure 36:
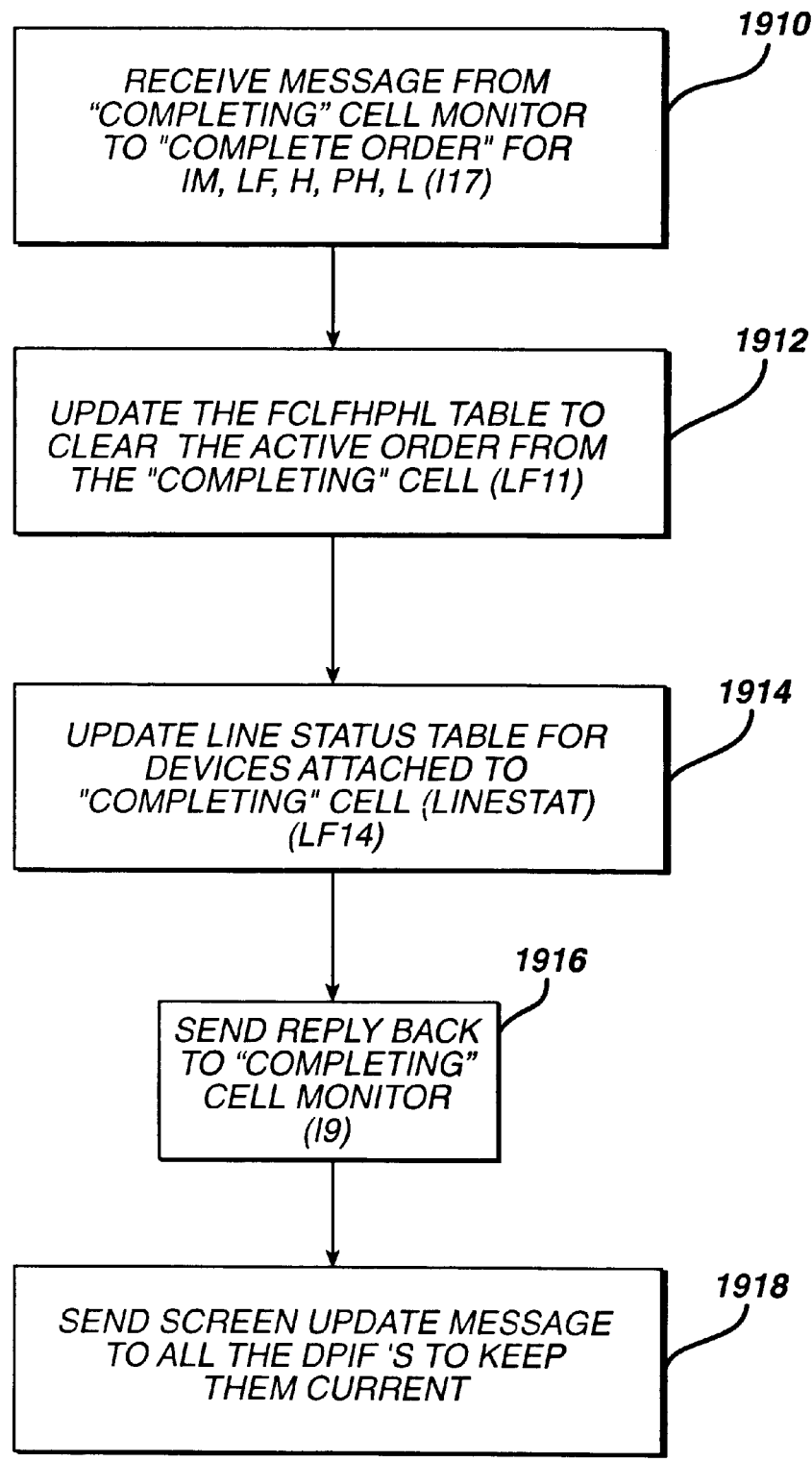

FIG. 36 illustrates the line manager complete order process for the IM, LF, HY, PH, and Labeler cells.

Figure 37:
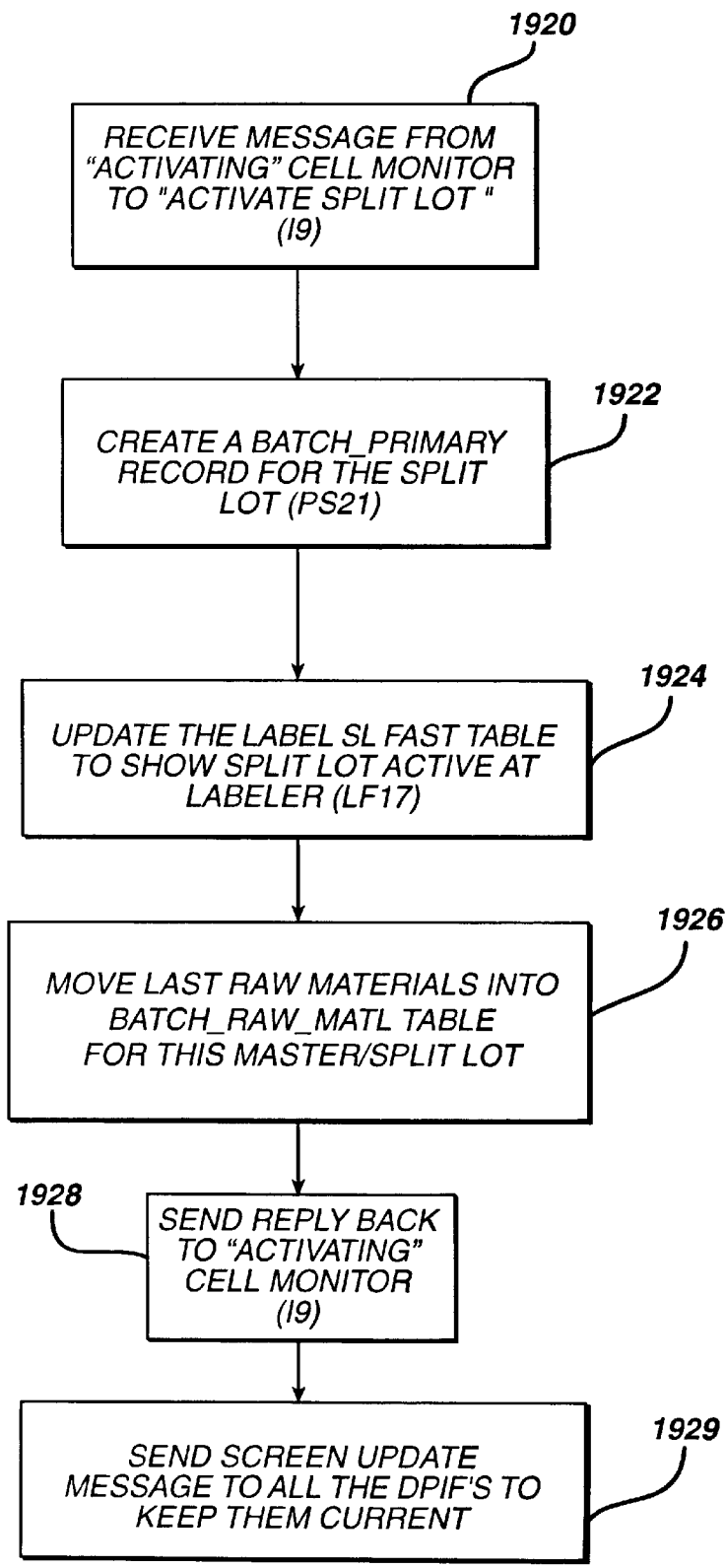

FIG. 37 illustrates the line manager activate split lot order for the Labeler cell.

Figure 38:
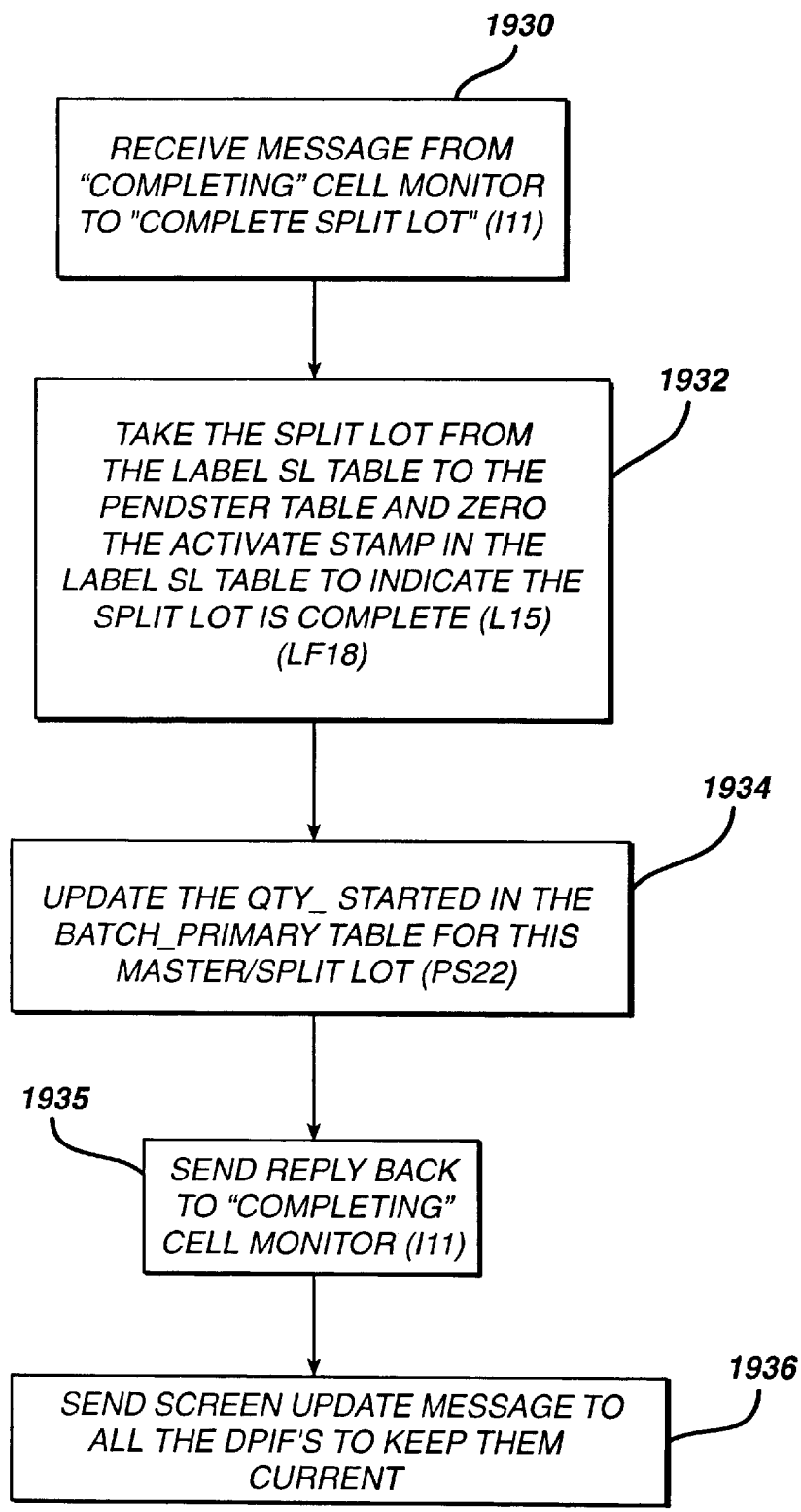

FIG. 38 illustrates the line manager complete split lot order for the Labeler cell.

Figure 39:
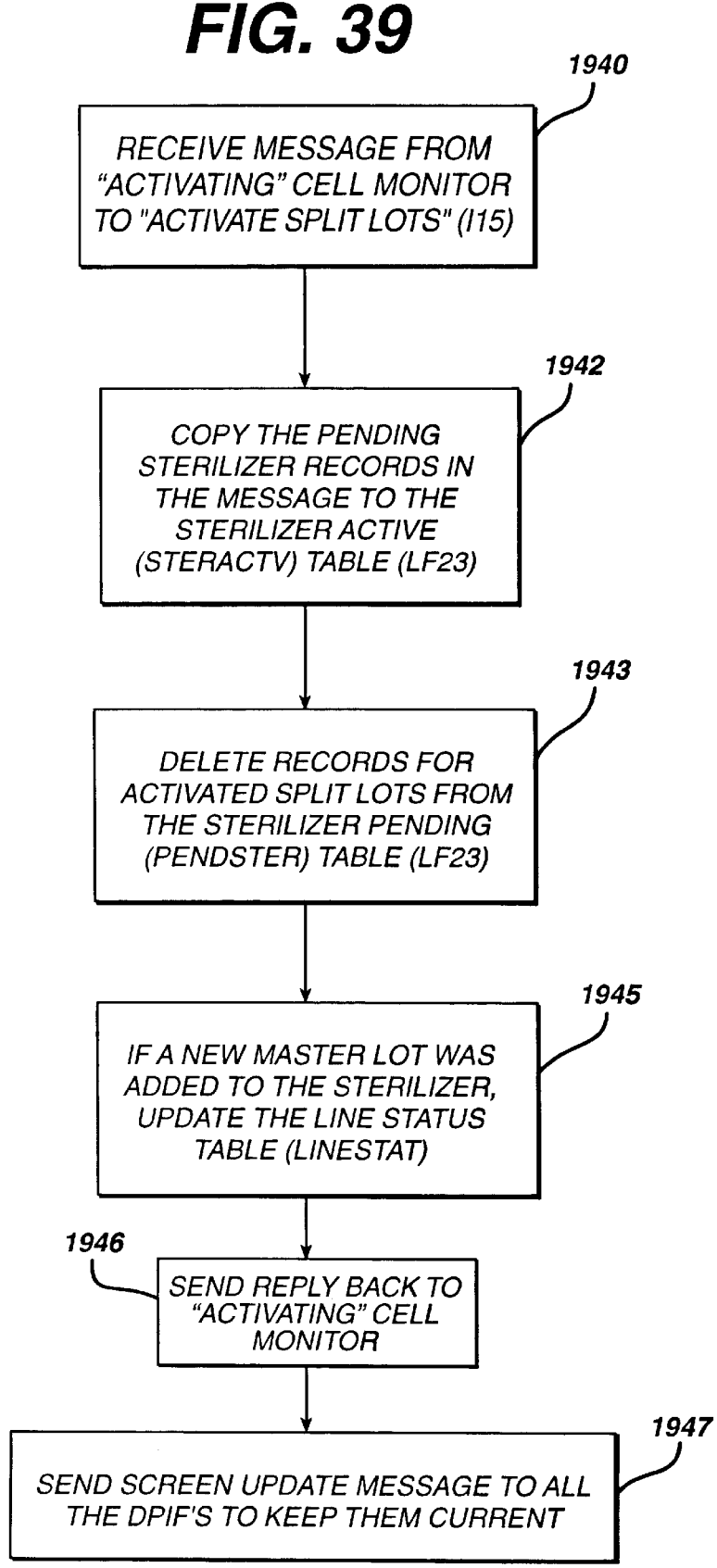

FIG. 39 illustrates the line manager activate split lot order for the Sterilizer cell.

Figure 40:
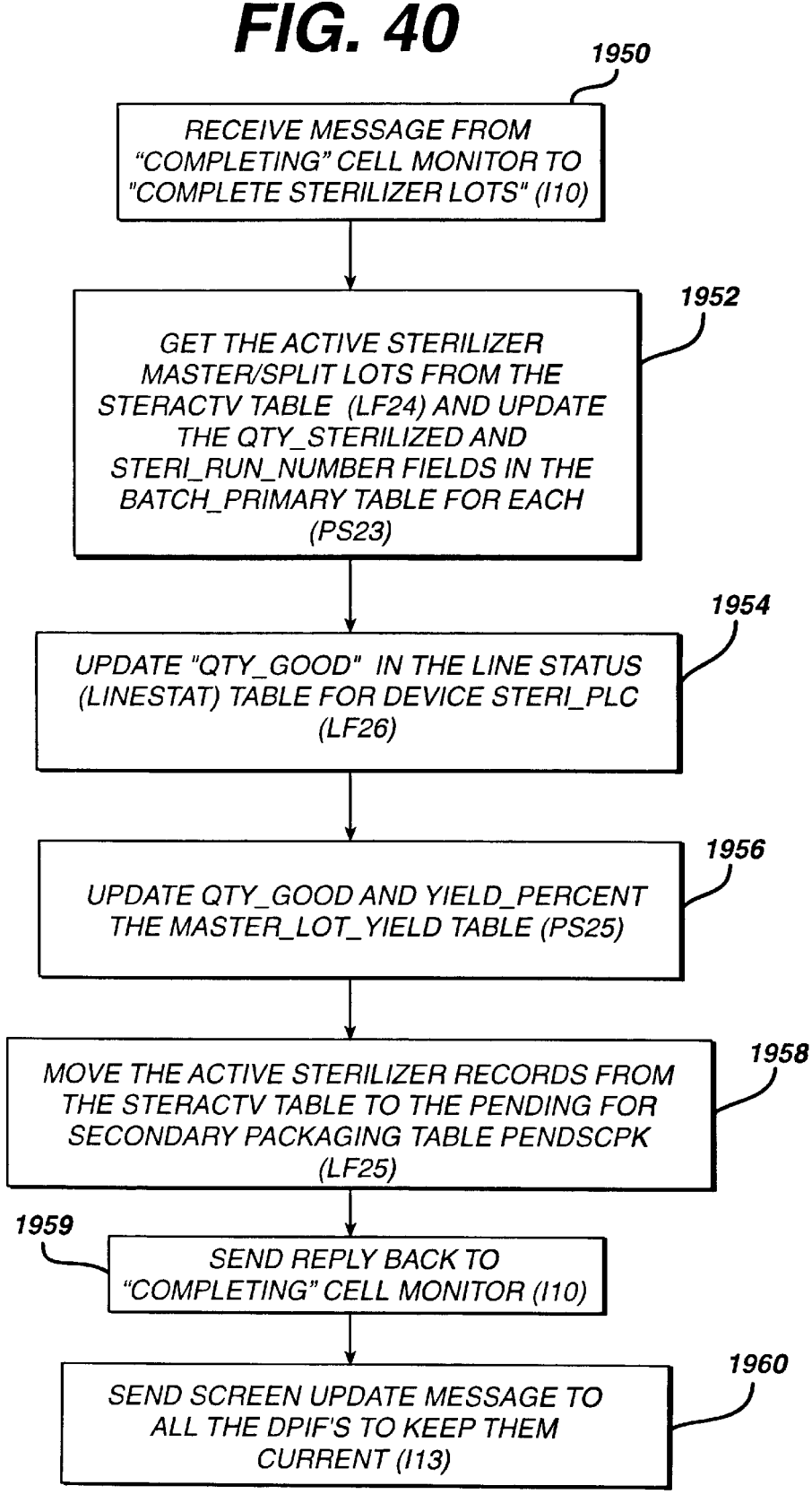

FIG. 40 illustrates the line manager complete split lot order for the Sterilizer cell.

Figure 41:
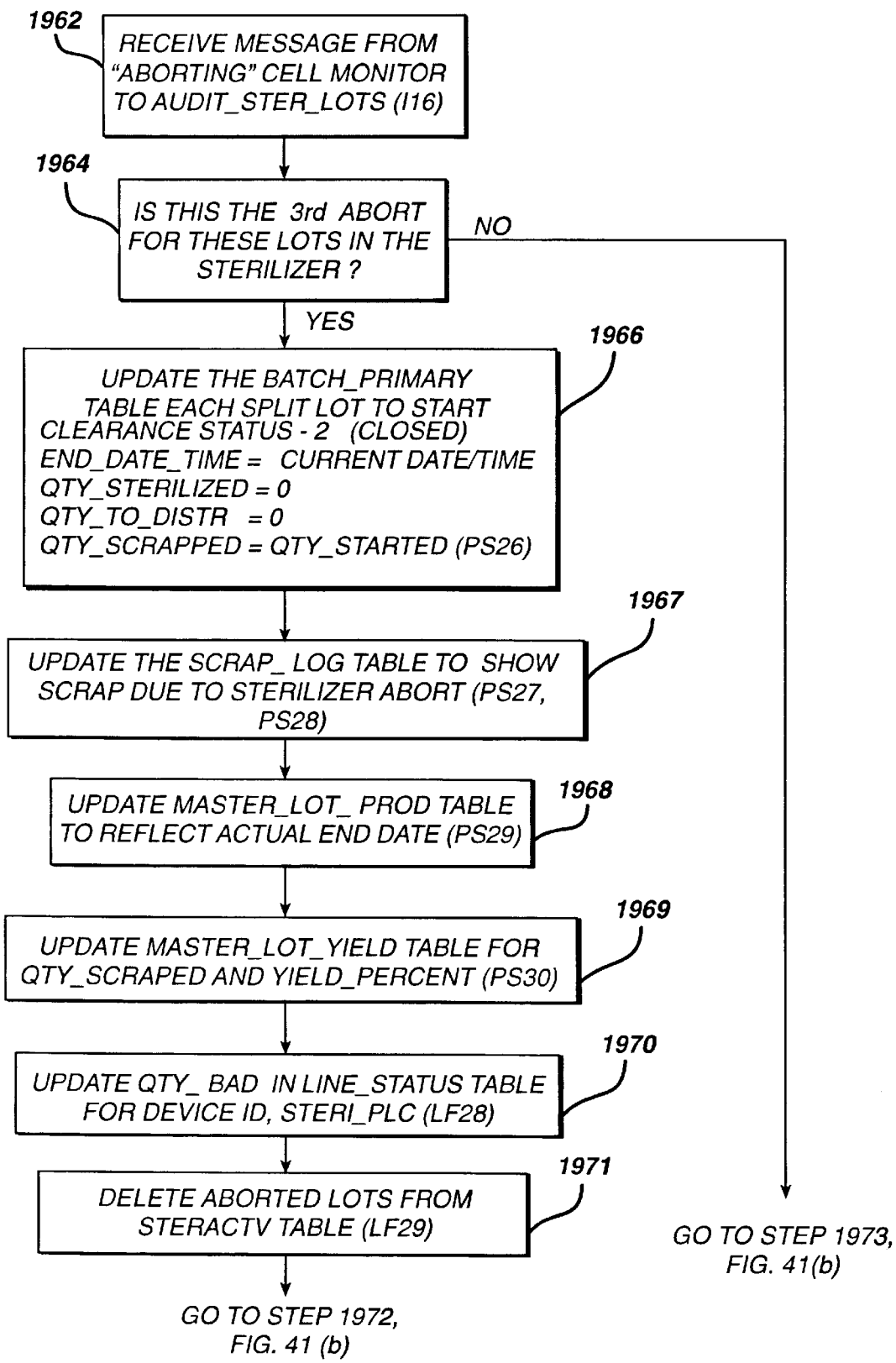
Figure 41:
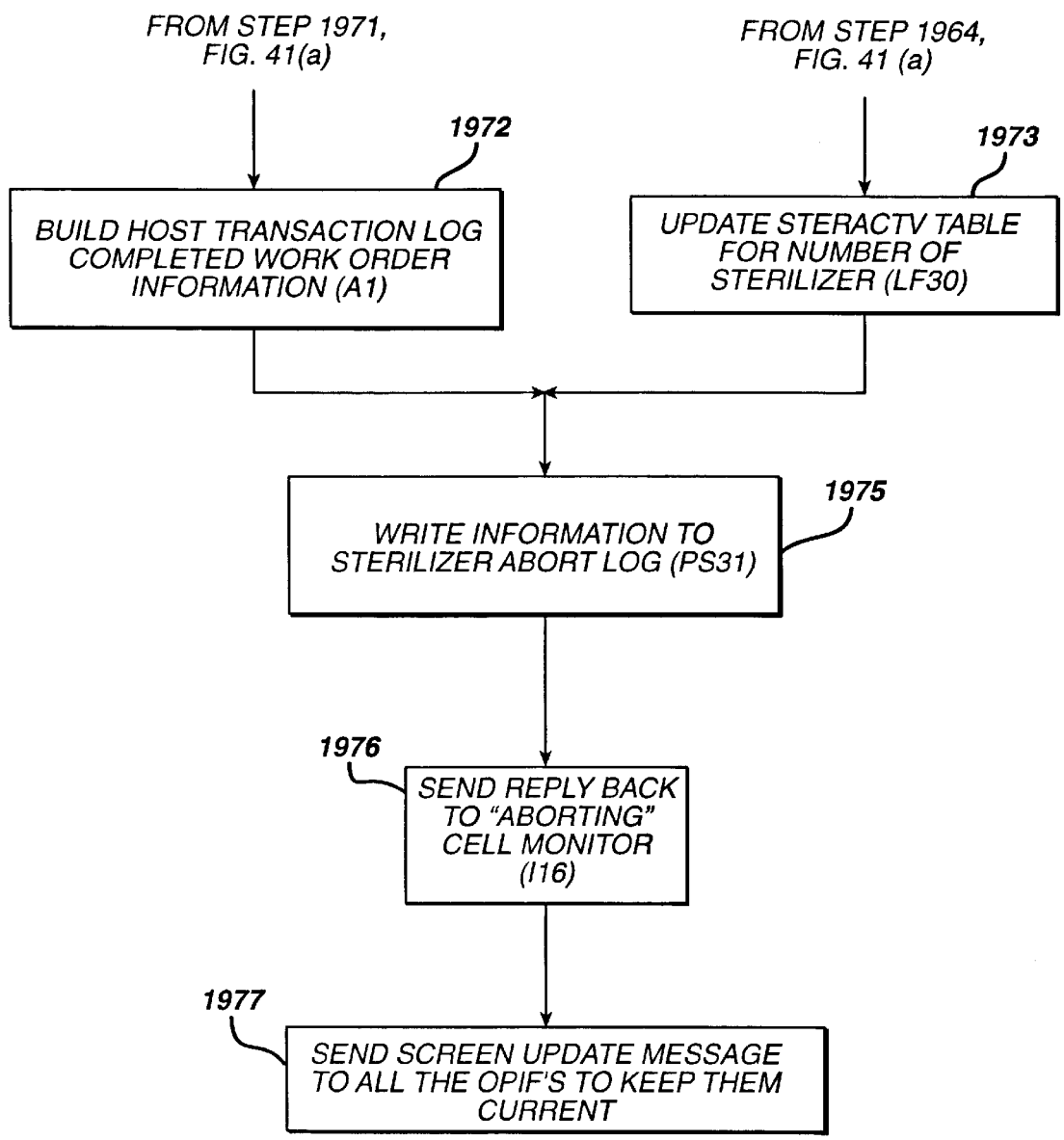

FIG. 41 illustrates the line manager abort order for the Sterilizer cell.

Figure 42:
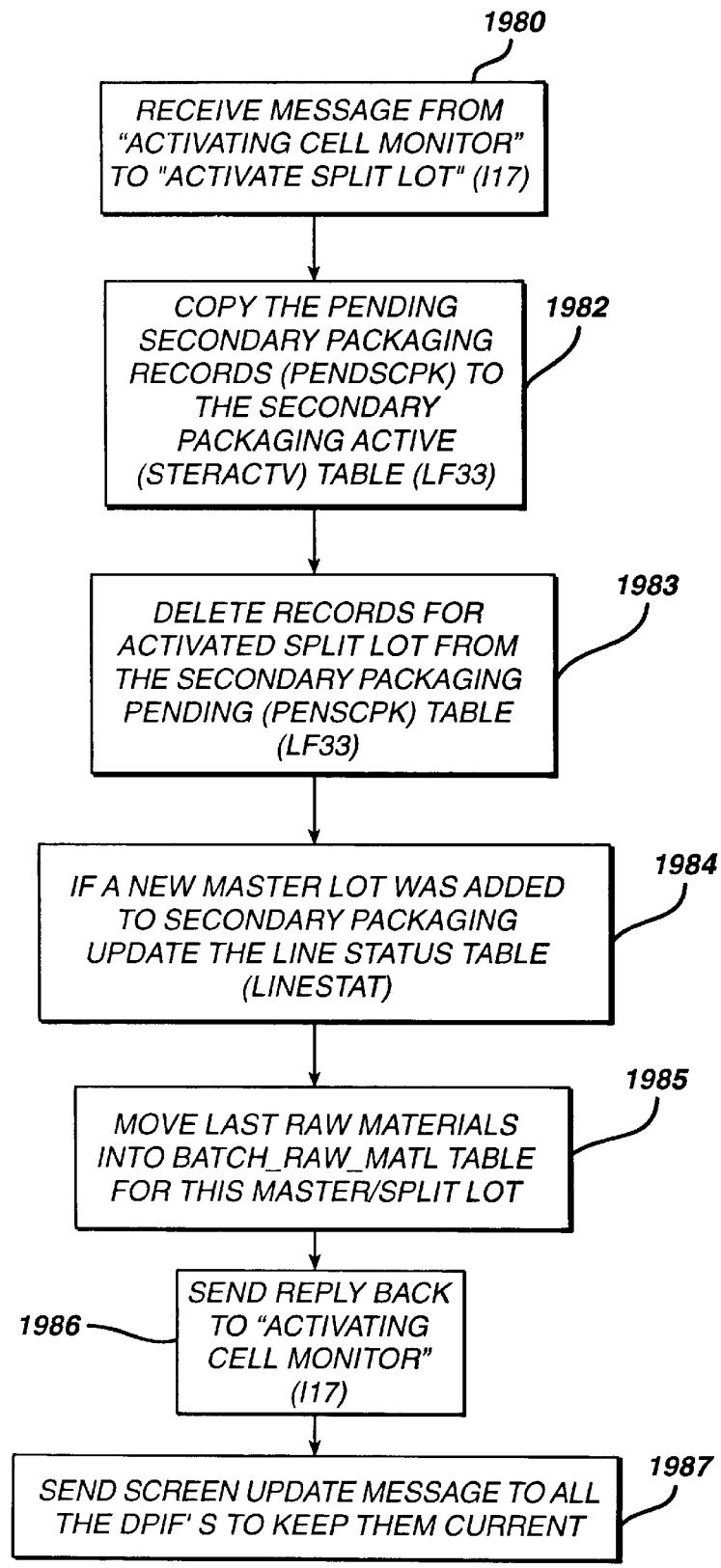

FIG. 42 illustrates the line manager activate split lot order for the Secondary Packaging cell.

Figure 43:
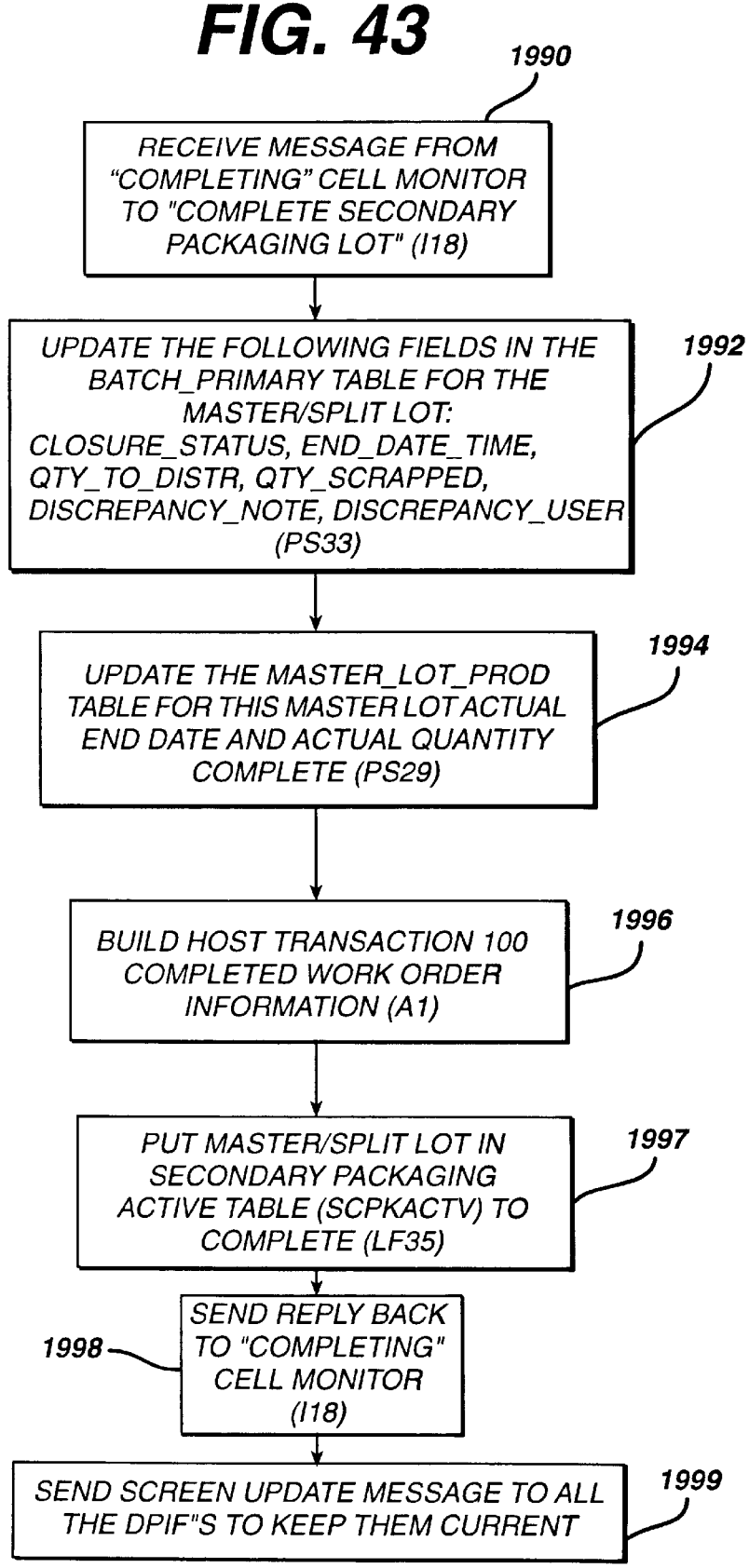

FIG. 43 illustrates the line manager complete split lot order for the Secondary Packaging cell.

Figure 44:
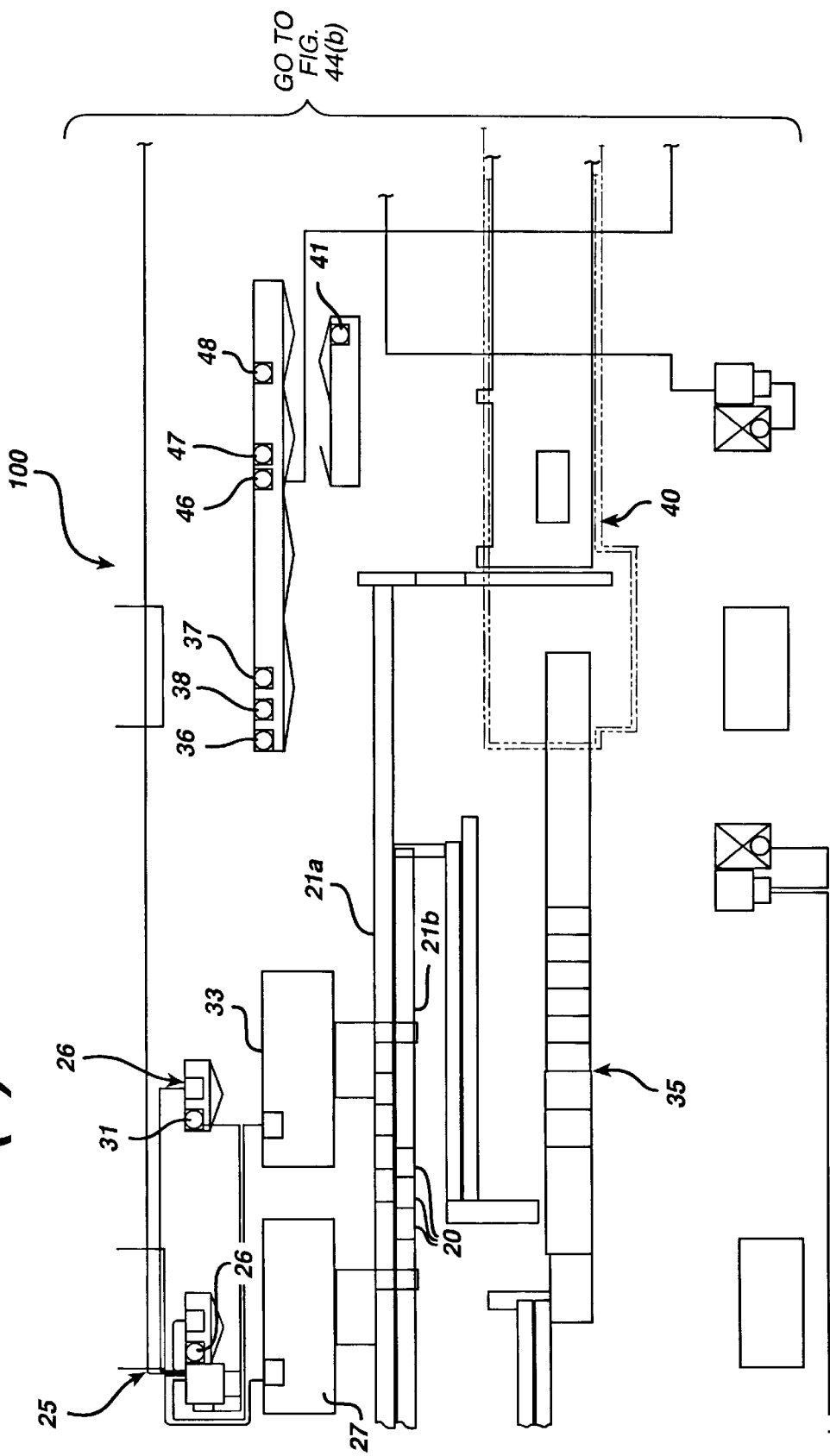
Figure 44:
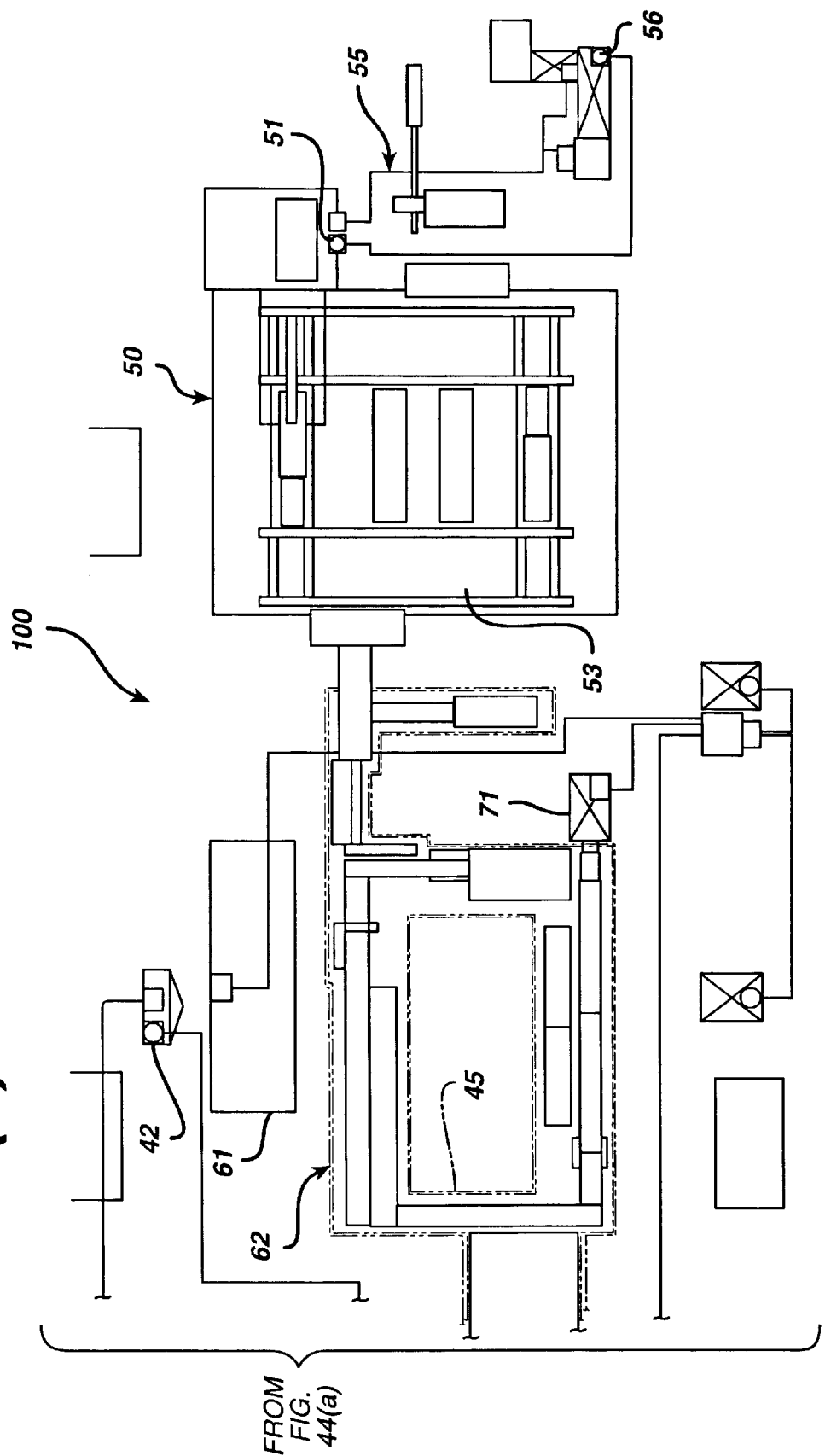

FIG. 44 is a block diagram presented in two sheets, FIGS. 44(a) and 44(b), which together illustrate the physical layout of the automated contact lens production line 100 monitored by the production computer program of the instant invention.

FIG. 45 illustrates the types of lens/mold carrying pallets for transporting lenses through the production line.

DESCRIPTION OF THE PREFERRED EMBODIMENT

The production computer system ("PCS") of the instant invention is a supervisory system for performing an active monitoring function for a continuous flow contact lens production line wherein raw materials (monomer, polypropylene, polystyrene, etc.) are automatically input to the line and packaged finished contact lens product is output with minimal manual support under normal operating conditions. Generally, the contact lens production line is composed of manufacturing or process cells which perform lens fabrication, hydration, post-hydration, primary packaging, and, sterilization and secondary packaging of contact lenses. Additionally, it is supported by process cells for injection molding of front curve (molds), base curve (molds), primary packaging (blister packages), and, automatic lens inspection. All of the equipment within a cell has one or more device controllers, such as individual device controllers or programmable logic controllers (PLC's), that are responsible for controlling the equipment, maintain process parameters within control (high and low) and specification (high high and low low) limits, and generate alarms when the limits have been exceeded.

As will be explained in greater detail below, the PCS monitors the execution of the contact lens production line, collects and stores data for current and future use by operations (production), engineering, maintenance, as well as for the creation of a batch record (device history), displays/graphs selected data (such as GMP ("Good Manufacturing Practice") critical parameters) for process technicians, and records alarms along with recovery actions to correct any problems.

Figure 1:
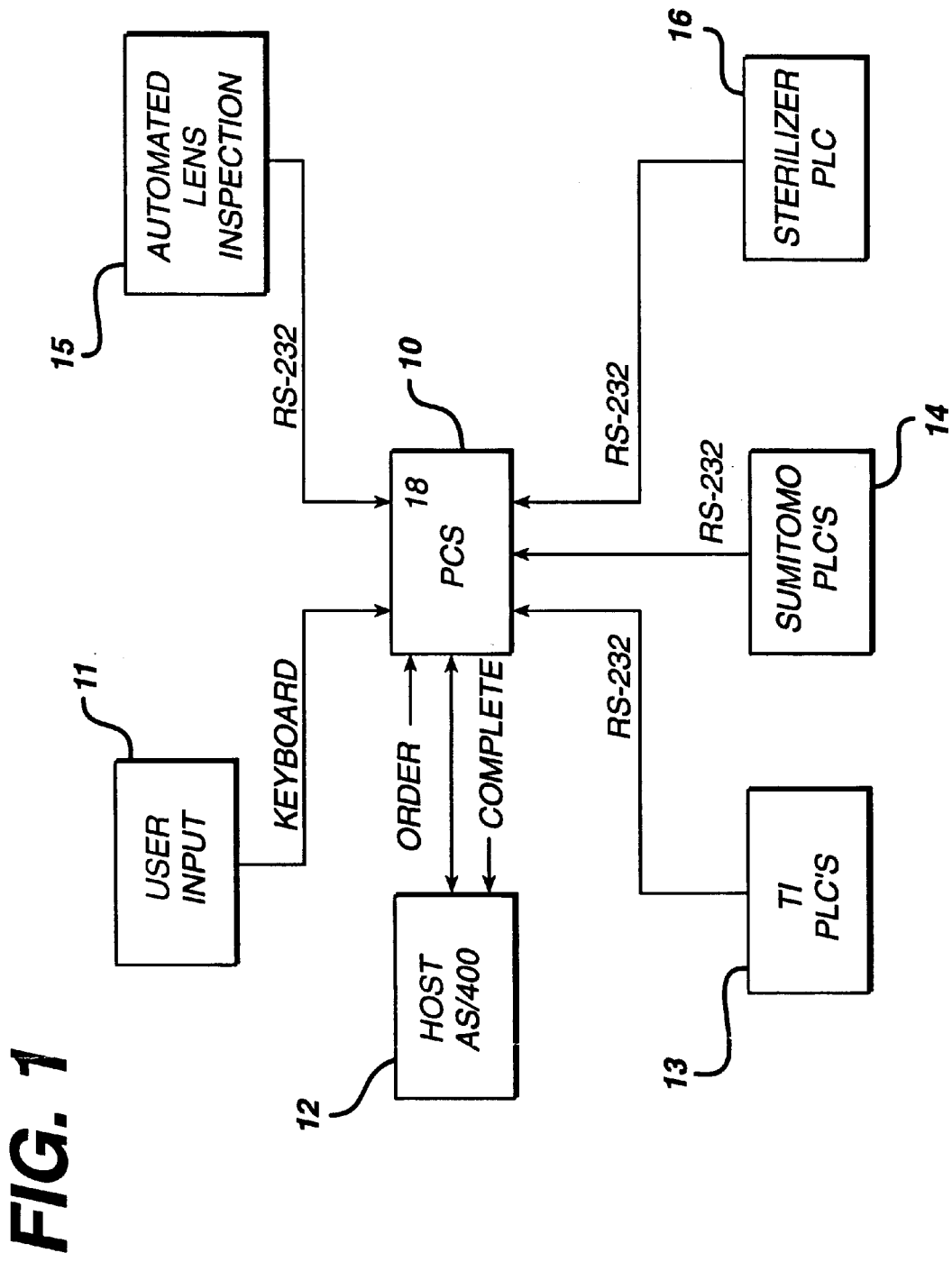
FIG. 1 is a diagram depicting the general interconnection for the PCS system and its implementation in the contact lens production environment.
Figure 2A:
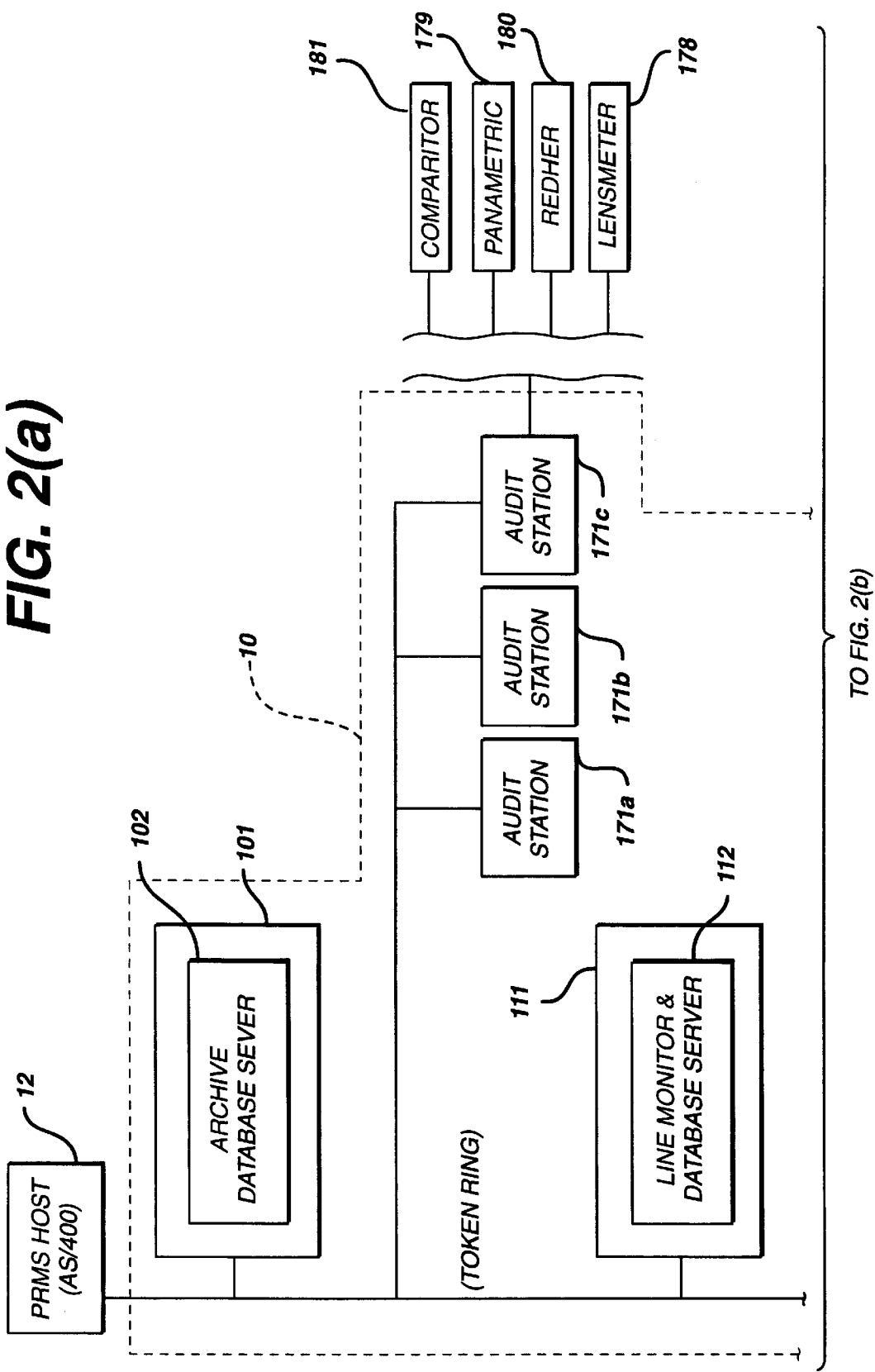
FIG. 2 is a block diagram in 3 sheets, FIG. 2(a), FIG. 2(b) and FIG. 2(c), which together illustrate a hardware block diagram of the production computer system ("PCS") of the invention showing the communication connections between the PCS and the various contact lens production line manufacturing cells.

FIG. 1 shows the general interconnection for the PCS system and its implementation in the contact lens production environment. At the core of this structure, the Production Computer System 10 of the invention has real-time access to user inputs 11, in addition to critical process data emanating from the various manufacturing process control systems embodied as: a plurality of Texas Instruments programmable logic controllers 13 that control the lens fabrication, hydration, post-hydration, primary packaging, and, secondary packaging process cells, a plurality of Sumitomo PLC's 14 that control the front curve, base curve, and, primary packaging injection molders, a sterilizer PLC 15, and, an automatic lens inspection PLC 16. Specifically, as shown in FIG. 1, the process control systems receive schedule and product order information from a host Production Resource Management System ("PRMS") 12 which, in the preferred embodiment, is embodied as an AS/400 computer system. The downloaded order information may include the contact lens product type, lot number, priority, quantity (lot sizes are flexible), schedule time, production line assignment, raw material information, and expiration date.

While the capability exists for the manual override of the transmitted schedule in certain controlled cases, the schedule will be executed as directed. The scheduling system has the best overall insight into material and resource availability, production capacity, inventory levels, and product demand and can therefore suggest the optimal schedule.

Once an order for contact lenses has been selected for execution, verification of manufacturing equipment set-up, e.g., the injection molding machines, labeling, and packaging, and, raw material is performed. Set-up time is recorded and reported for historical purposes.

As will be explained in greater detail below, the PCS of the invention will download the proper order receipt information to the control equipment including, the injection molding machines, lens fabrication machines, etc., for the product scheduled to be produced. In addition, the PCS will verify that the proper version of control logic is loaded in the control equipment before allowing execution of the order.

After preparation has been completed and verified, the production run begins. During production, all critical process information is collected by various monitoring cells of the PCS and stored as: Batch Record data for information required in the device history record, including in-process product quality audits and sample test results as performed by audit stations described below; Engineering Analysis Date Base for process information which may be analyzed for continuous process improvement; Operations Production Reporting for machine, cell, line, and plant yield reporting, raw material consumption, etc.; and, Predictive/Preventative Maintenance information to help in diagnosing and preventing equipment failures.

At the conclusion of a production run, a message is sent to the host PRMS reporting the completion of an order and will contain information such as master lot number, product type, quantity distributed, date, etc.

Figure 3:
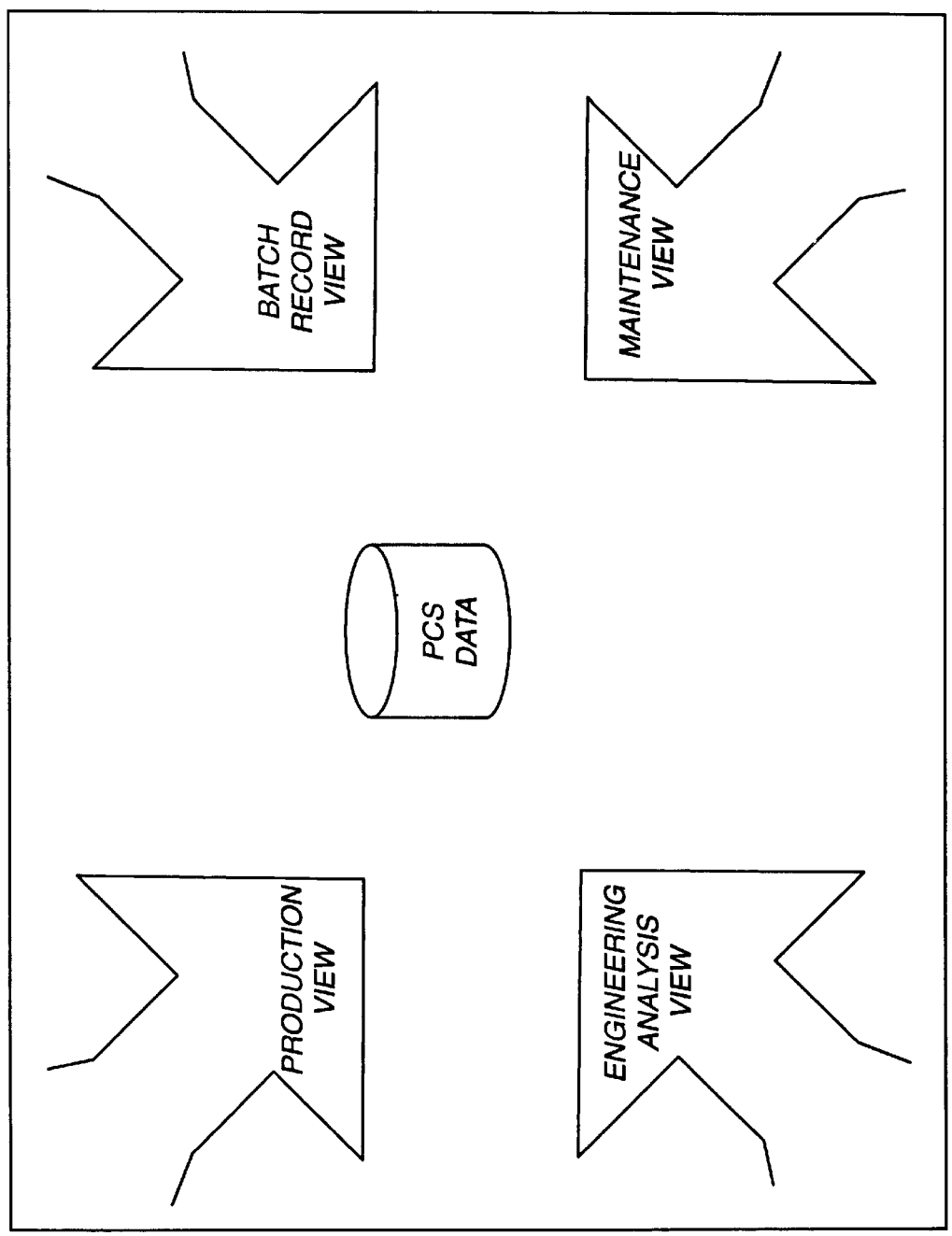
FIG. 3 is a conceptual diagram illustrating the uses for PCS data acquisition information.

As shown in FIG. 3 and mentioned briefly above, all the data collected by the PCS is intended to be viewed from four distinct perspectives: Batch Record, Production, Engineering Analysis, and, Maintenance. For each of the four perspectives, the type of data that the PCS is responsible for collecting/monitoring includes: process and product parameter data, alarm data, product tracking (lens) data, event, and, order data.

Process parameters reflect the current operating conditions of the manufacturing line (e.g., temperature, pressure, time, etc.) and can be further categorized in accordance with their impact on product quality. Production line equipment and their respective controllers are responsible for maintaining (controlling) process parameters within established ranges (specification limits) which have been determined to produce good product. Those process parameters are logged to respective Circular Parameter log or GMP Critical Parameter logs (not shown) at configured intervals for displaying/trending the values of parameters for process technicians, and for reading/recording the actual values of the parameter setpoints after changeover. Additionally, the PCS will monitor parameter readings and check their values against predefined "run-rules", i.e., dynamic tests that are applied to the data to indicate whether a process is in control (statistical quality control).

Product parameters reflect the quality of each individual lens (e.g., center defects, edge defects, etc.) As explained above, these parameters are measured via automatic lens inspection (ALI) and the results (e.g., good/bad) are provided to the PCS. Additionally, audits of product quality occur at various points throughout the system. Such audits may include: Package Seal Quality; Package Seal Strength; Front Curve/Base Curve Mold audits (i.e., peak to valley, air gauge, radius); Process Parameter Inspection (e.g., power, center thickness, base curve, lens diameter); and product audits such as primary packaging and secondary packaging blister package and label defects, carton audits, and lens visual audits. The PCS is responsible for logging the results of each audit in measurement audit and defect audit raw data logs (not shown), computing statistics on the results, storing these results as part of the batch record, and, monitoring the results for SQC run rule violations.

The manufacturing line PLC's and device controllers are responsible for maintaining process parameters within established ranges (specification limits). When the controller recognizes that a parameter has gone above or below either the specification or control limits, the controller will alarm the process technician and will provide information on the alarm to the PCS. All alarms, alarm recovery actions, and, run-rule violations will be logged by the PCS into alarm text logs (not shown).

As will be explained below, information for the Batch record is gathered from a variety of sources including a host PRMS (e.g., product SKU, lot number), the PCS database memory (e.g., process start/end dates, times, list of GMP critical parameters, set point readings etc.) the PLC interfaces and logs at each cell, and each of the audit stations (e.g. audit test results). A batch record information summary includes: Lot number, start and end dates, quantity started, quantity sterilized, quantity release to distribution, verification of process changeover, usage of raw materials, GMP configured setpoints and actual setpoints, product audit results, device monitor data, product tracking data, operation/product yield data is reported back to the PRMS via file transfer. The batch record is completed and logged for historical purposes to provide for legal traceability in compliance with FDA regulations. Preferably, batch records are kept on-line for the previous two months activity, after which time they may be retrieved from batch record archives (not shown). Additionally, all significant alarms and events that occur are recorded in the batch record, and all split lots, whether planned, i.e., occurring at the labeler for each master lot, or, event driven, i.e., that may be initiated by a line operator, will result in an additional batch record.

Further in view of FIG. 3, the Production (Operations) viewpoint requires detailed information about how a lot was manufactured, particularly, to enable traceability. Primarily, this is used to facilitate the finding of all products which contain a particular raw materials/lot number, or, to facilitate the finding of all products which were manufactured under a specific set of conditions.

In the same way that PCS provides traceability information for Production, it also provides information which Engineering can find useful to improve the production process over time through analysis, prior production, or, experimental designs on new production. For example, an analysis may be done which compares product quality (as measured by the lens inspection (ALI)), with raw materials, process parameters, and/or dies used to make the lens. As will be explained in further detail below, a lens is uniquely identified at ALI by the position it holds within a given serialized post hydration pallet. Therefore, when a lens quality analysis is done against parameters, the date and time that a particular pallet was processed at a bar code pallet scan location, can be used to cross-reference to the process parameter log for that pallet scan location. Due to the fact that a lens has been transported by a post-hydration pallet, a hydration tray, and a front curve/base curve lens fab pallet, it will be necessary to cross-reference from the post hydration pallet to these pallet records in the product log first.

PCS Hardware Overview

Figure 6C:
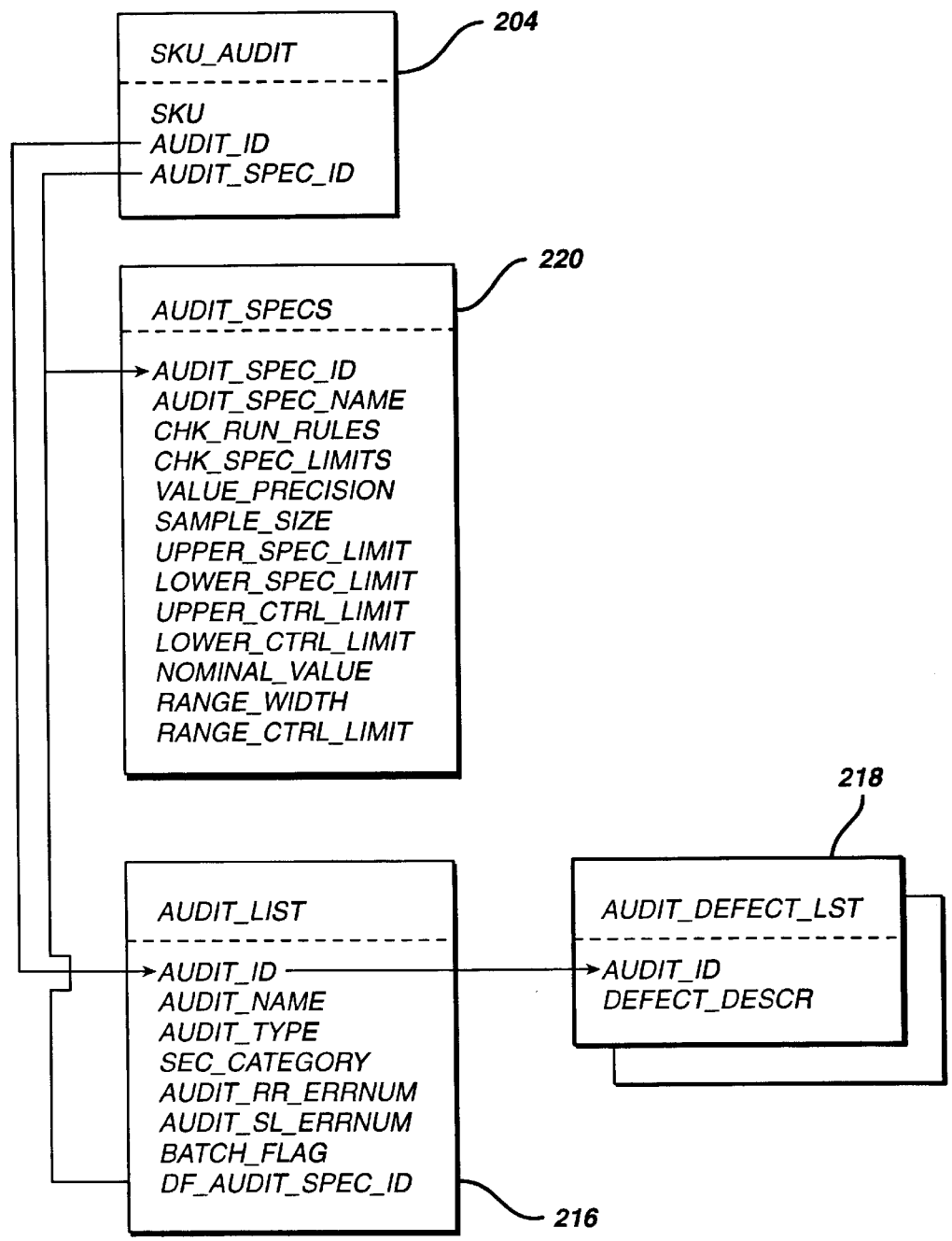
FIGS. 6(*a*)–6(*h*) illustrate the data contents of static memory tables stored in the primary database.
Figure 6F:
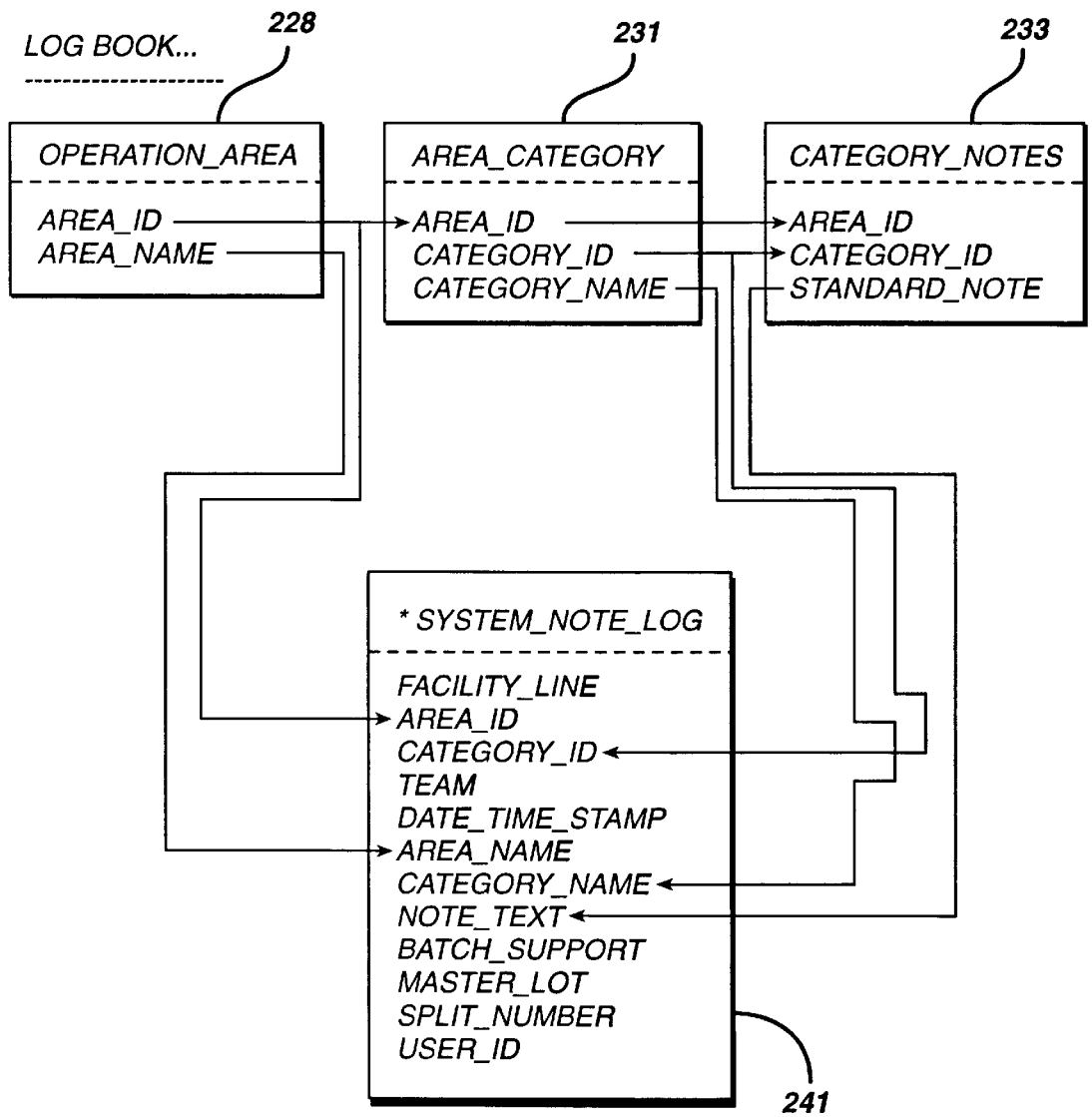
Figure 6:
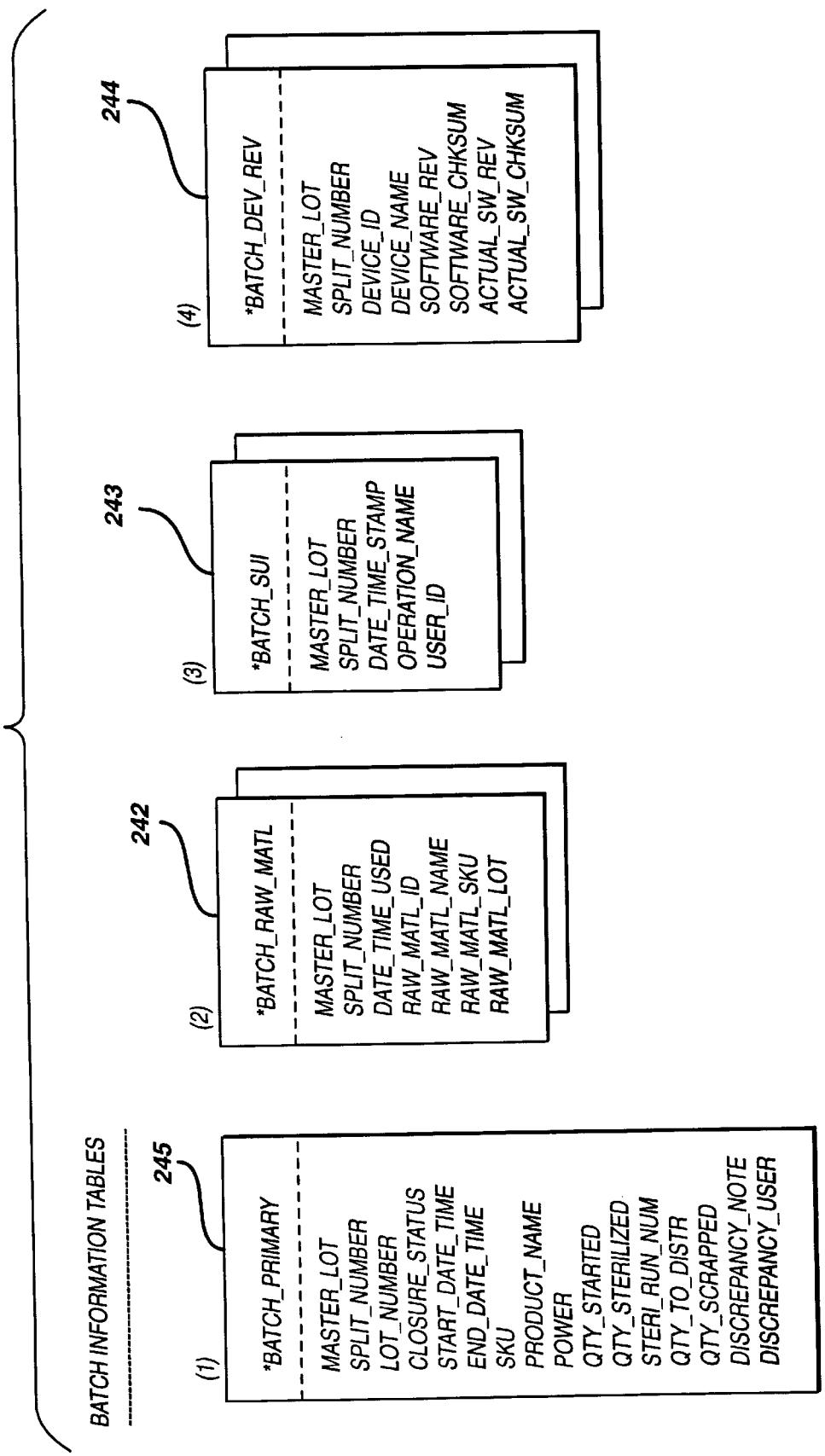
Figures 2, 6I:
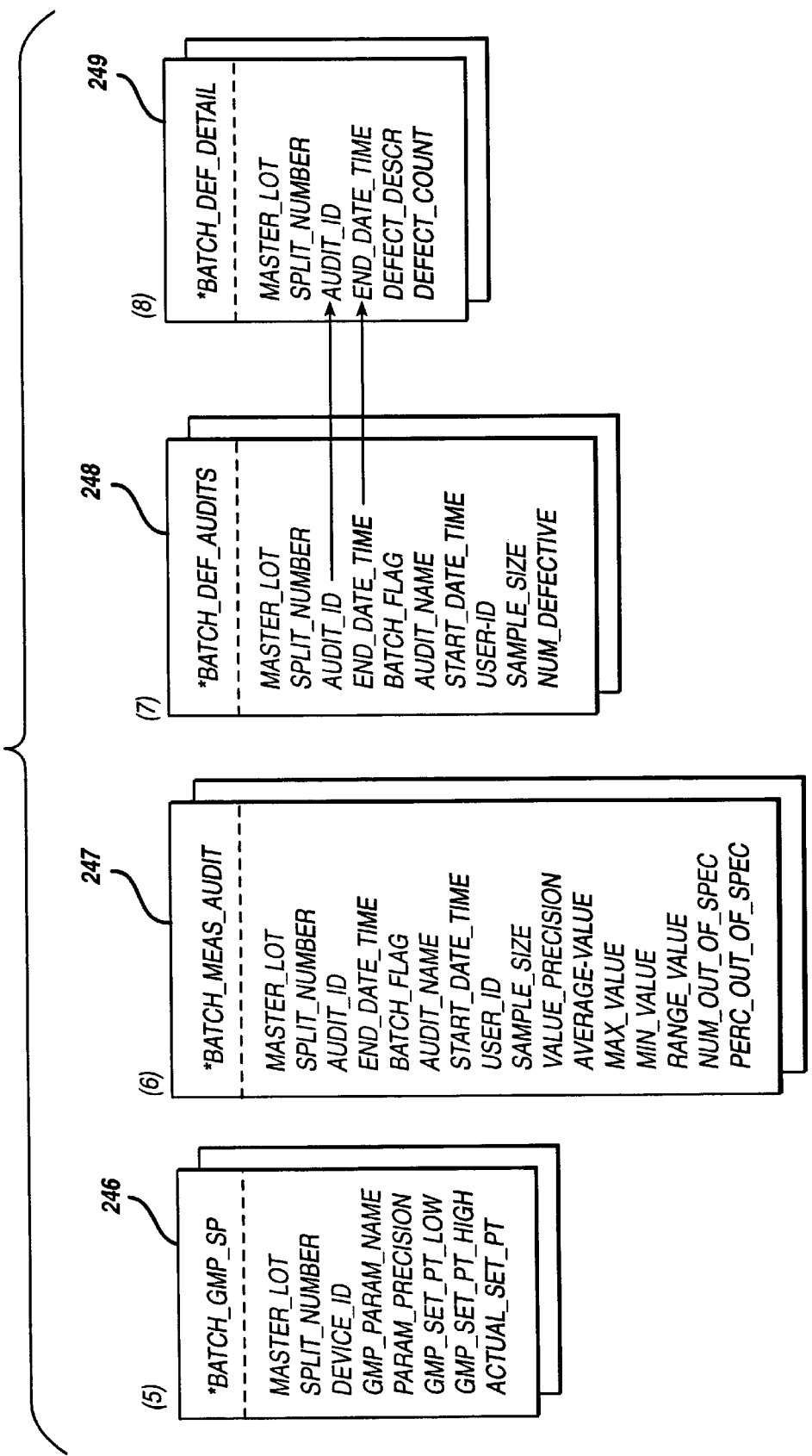
Figure 6J:
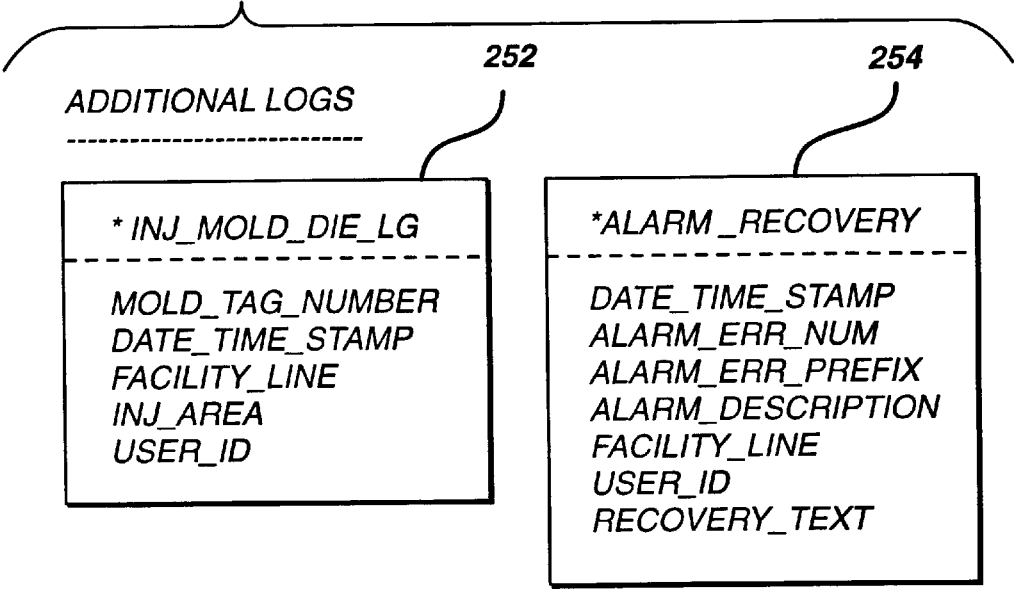
Figure 6K:
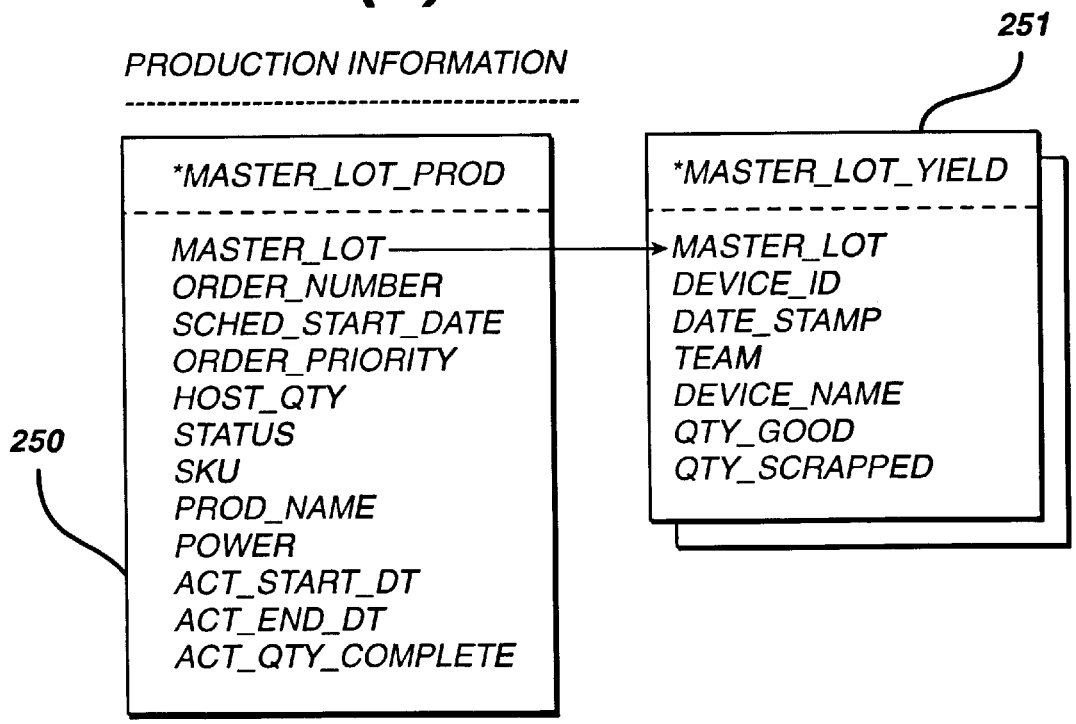

As shown in FIG. 2, the PCS 10 of the instant invention monitors and analyzes performance for the contact lens production line. The hardware elements of the PCS 10, as well as the communication interfaces with the various contact lens production line processes software include: an archive station 101 that is configurable, and, in the minimum preferred embodiment, is an IBM PS/2 Model 9598 having 32 Mbytes of memory, at least a 1.0 Gigabyte hard disk, and, is configured with Database and LAN servers 102; a Line Monitor station 111 that, in the minimum preferred embodiment, is an industrial IBM PS/2 Model 7546-411 having 32 Mbytes of memory, at least a 1.0 Gigabyte hard disk, and, is configured with Database and LAN servers 112; five Cell monitors 121, 131, 141, 151, and 161 corresponding to respective five main processing cells: injection molding, lens fabrication, hydration, post hydration, and, sterilization and secondary packaging, each cell monitor preferably consisting of, at minimum, an industrial IBM PS/2 Model 7546-411 ('486DX2) having 32 Mbytes of RAM, at least a 400 Mbyte hard disk configured as Database Requestor and LAN Requestor servers; and, audit stations 171a, 171b, and 171c, each preferably consisting of an IBM PS/2 Model 9585 having 16 Mbytes of memory, at least a 200 Mbyte hard disk, and, that is configured with Database Requestor and LAN Requestor servers. As shown in FIG. 2, the measurement audit instruments available at the audit stations include: a Lensometer 178, for measuring lens power; a Panametric 179, for measuring base curve depth; a Redher Gauge 180, for measuring lens center thickness; and, a Comparitor 181, for measuring lens diameter. As will be explained in greater detail below, readings from these instruments will be received by PCS on a per measurement basis.

Each of the IBM PS/2 components described above share a common token-ring network. Data is shared among the computers using the IBM LAN Server/Requestor software and IBM DB2/2 database Server/Requestor software. As will be explained in detail below, the line monitor 111 is connected to the PRMS and transfers files using IBM PC Support software for the AS/400. Each of the operation Cell monitors 121, 131, 141, 151, and, 161 read data from and write data to the connected PLC's preferably via Unilink Host Adapters (Texas Instruments) 122, 132, 142, 152, and, 162, respectively, and are additionally supported by individual Network Interface Module "NIM" capability (Texas Instruments). It should be understood that, with the exception of intense diagnostic logging of data, all views of acquired data are available to all operation cells via customized programming in conjunction with the token-ring support LAN. Additionally, the distributed configuration of the cell monitors enables greater volume of data acquisitions at greater speeds than compared to a single cell monitor for the whole line.

Additionally, shown in FIG. 2 are the eight major processes, indicated as process cells, to be monitored by the PCS in the manufacture of contact lenses. As will be explained in greater detail below, the major process cells of the contact lens production line include: a Front Curve Injection Molding cell 25 that includes PLC 26 for controlling the front curve lens mold transfer process; Base Curve Injection Molding cell 30 that includes PLC 31 for controlling a base curve lens mold transfer process; Lens Fabrication cell 35 that includes: a PLC 36 for controlling polymer filling and mold assembly operations, a PLC 37 for controlling lens UV cure and demold operations, and, a PLC 38 for controlling bar code reading and pallet tracking operations throughout lens fabrication; a Hydration cell 40 that includes a PLC 41 for controlling the transfer of lenses to the hydration bath for hydration thereof and sequencing of all subsequent hydration steps, and, a PLC 42 for controlling transfer of empty blister packages from the primary packaging injection molder to post-hydration pallets; a Post Hydration cell 45, that includes: a PLC 46 for controlling the buffering of blister filled post-hydration pallets and lens transfer from hydration to posthydration, a PLC 47 for performing lens filled posthydration pallet tracking throughout post-hydration, inspection, and lens sorting, and, a PLC 48 for controlling lens consolidation, lens package heat sealing, sterilizer cart loading (sealed package consolidation), and, product conveying through to secondary packaging; a Sterilization Cell 50 that includes a PLC 51 for controlling lens sterilization process operations; and, a Secondary Packaging cell 55 that includes a secondary packaging PLC 56 for sterilizer cart unloading, cartoning, and carton transfer.

In addition to the above-mentioned PLC's, the PCS is configured to communicate with the following device controllers: front curve and base curve injection mold controllers 27 and 33, respectively, which control the operation of the front and base curve mold machines (not shown) that work in conjunction to form the front and base curve molds used to produce each lens; the primary packaging controller 61 which controls the operation of the primary packaging injection molding machine (not shown) to produce blister pack bottoms; and, the ALI automatic lens inspection controller 71 which controls the operation of the vision inspection machine (not shown) for performing lens inspection. Each of the three mold machines and the vision inspection machine are connected with monitoring cells of the PCS by dedicated asynchronous serial lines, such as RS-232 lines 23$a,b,c,d$, as shown in FIG. 1.

In the preferred embodiment, each process cell PLC mentioned above is a TI system 545 (Texas Instruments) and may include a TI 386/ATM coprocessor module for communicating with the respective PLC across the backplane or by serial link (not shown). It is understood that each PLC has its own memory and addressing capabilities for storing and updating blocks of data to be discussed in further detail below.

As mentioned above, the programmable device controllers 27, 33, and 61 provided in the contact lens production line for controlling respective, front and base curve mold machines, and, the primary packaging machine are preferably manufactured by Sumitomo Corp. The device controller 71 that controls the automatic lens inspection system is preferably manufactured by Perceptics based in Knoxville, Tenn.

A brief description of each of the contact lens production line process cells follows hereinbelow:

Front/Base Curve Injection Molding

FIG. 44 is a physical layout diagram for the contact lens manufacturing line 100 monitored by the PCS 10 of the invention. As shown in FIG. 44, front curve and base curve injection molding cells 25 and 30 operate the same for respective front and base curve molds using different processing conditions. The stock keeping unit or "SKU" of the lens, as communicated by the host PRMS to the line monitor, determines which steel-mold components needs to be installed in the front curve injection molding equipment. Base curve steel-mold components are the same regardless of the power factor of the lens to be manufactured.

The front curve and base curve injection molders 27 and 33, form individual polystyrene front and base curve molds, respectively, for each lens. Preferably, both front and back curve injection molders cycle every six (6) seconds to produce eight (8) molds each cycle which are assembled into 4800 lenses/hour. As mentioned above, the front curve injection molding controller 27 and base curve injection molding controller 33 are connected to the PCS data collection system via a serial interface and report information each time they cycle.

The front and base curve molds are placed onto respective front and back curve lens fabrication pallets, indicated as pallets 20 in FIG. 44, and each having a unique bar code ID associated therewith. As shown in FIG. 45, each pallet 20 holds eight molds in two rows of four. Specifically, the two PLCs, indicated as 26 and 31 in FIG. 44, control the transfer of eight front curve (FC) and eight base curve (BC) injection mold halves from respective FC and BC injection mold machines (not shown), to respective front curve and base curve carrier pallets positioned adjacent first and second pallet conveyors 21$a$,21$b$ respectively. A front curve mold pallet and base curve mold pallet are subsequently transferred as a pair to the lens fabrication cell 35 for Filling/Assembly, UV curing, and de-mold operations. The PLC reports Injection Molding process measurements to the PCS by pallet ID. In the preferred embodiment, and not in any way limiting, batch set point values and set point running values for the FC and BC injection mold controllers include mold temperature, hold pressures, filling time, velocity, etc., and are monitored by the PCS. Both of the FC and BC injection mold controllers 27,33 additionally communicate status information such as device uptime (percent operating time), good mold product count to lens fab, product count transfer rejects, and scrap rejects, and, product count to audit stations.

Lens Fabrication

As shown in FIG. 44, PLC 36 controls monomer filling and contact lens mold assembly operations in the Lens Fabrication cell 35 as discussed above. This PLC controls process conditions for monomer filling which consists of depositing, in a vacuum environment, a polymerizable compound (monomer mixture) for forming a contact lens in the concave portion of each FC lens mold portion in each carrier pallet and, also controls the operation of assembling the individual contact lens mold assemblies which consists of picking each BC lens mold from pallet and placing them in an oriented configuration onto a corresponding associated FC lens mold carried by an adjacent carrier pallet.

To prevent process stability from being affected by the presence of oxygen, the front and base curve molds must be transferred to a nitrogen buffer for degassing within twelve (12) seconds after the injection molding operation is complete. Front and base curve molds which fail to meet this criteria are subsequently rejected by the PLC.

Preferably, there are two parallel Filling/Assembly cells that are identical in operation and share the same nitrogen environment that is continuously monitored by the PLC. If one Filling/Assembly cell is opened up to work on a jam, etc., both cells are stopped and product must be rejected from both because of spoilage. In operation, pairs of pallets that contain front curve molds and one with base curve molds are transferred from the injection molders 25,31 molds to the lens fabrication cell 35. After receiving a complete pallet pair, the following sequence of events takes place;

(1) Dosing—the front curve molds are dosed with monomer a pallet at a time. Enough monomer is used to guarantee that when the assembled unit is cured a Hema ring is formed outside the edge of the lens to help ensure a quality lens edge is lo produced.

(2) Assembly—the base curve molds are extracted from their pallet and placed onto the front curve molds still in their front curve pallet.

(3) the base curve mold pallet is returned to the base curve injection molding machine.

(4) the assembled unit is transferred to Pre-Curing.

Both Filling/Assembly cells cycle every twelve (12) seconds to keep pace with the injection molding cycles and one can run if the other is not operational. Process status information are tagged to the bar code ID of the pallets by the PLC 38. The status information identifies the integrity of the carrier pallet and its contents (e.g., FC molds, BC molds, etc.) and, is processed by PCS each cycle.

As mentioned above, the nitrogen buffer is shared by both parallel cells, between Injection Molding and Filling/Assembly. If Filling/Assembly halts for any reason, the Injection Molding machines will continue to cycle but the lens molds will be rejected by the pallet tracking PLC 38 when the nitrogen buffer is full. If either one of the Filling/Assembly cells fails, the other will discontinue operation.

The filled and assembled units are then passed onto lens Curing/Demold process step of the Lens Fabrication process cell 35 on the same front curve mold pallet for curing/Demolding operations. These operations are composed of two sets of identical machines which operate in parallel under the control of PLC 37 that controls the precure, UV curing, and de-mold operations for the contact lens production line as follows:

(1) The assembled unit is transferred to PreCuring;

(2) A number of pallets, for e.g., five (5), are accumulated from Filling/Assembly;

(3) Pre-Curing—the front and base curve molds are pressed together, e.g., five (5) pallets at a time, and the monomer solution contained in each mold assembly is partially cured into a viscous gel-like state by subjecting the front and back curve lens molds to a predetermined pressure to further define the contact lens edges, and, to eliminate decentration. This also forces the excess monomer out through the mold edge to form the Hema ring.

(4) Tunnel Curing—The Lens Fabrication pallet is transferred to the UV tunnel conveyor for curing. As a result of curing, the monomer is polymerized to form contact lens blanks. The UV lamps and time in tunnel of each pallet are monitored by the PLC. Tunnel curing lasts approximately 6½ minutes.

(5) Demold—A laser process is used to heat the base curve lens surface to allow the base curve and Hema ring to be removed from the lens assembly. Demold cycles every 12 seconds and one can run while the other is not operational. Generally, the back curve lens mold halves of the mold assemblies are automatically separated from the front curve lens mold halves to expose the polymerized contact lens. The front curve pallet, with the front curve still attached to the lens, is then transferred to the Hydration Cell 45 in FIG. 2.

The PLC reports Lens Fabrication/Filling Assembly process measurements to the PCS by pallet ID. In the preferred embodiment, batch set point values and set point running values include $N_2$ buffer time, oxygen levels in buffer and status information includes product count to demold, front curve transfer reject count, and device uptime. In the cure/de-mold operation, batch set point values and set point running values include UV tunnel temperatures and belt speeds. Status information that is monitored include: the total number of front curves dosed; the number of assemblies rejected from filling and assembly (F/A); the total number of assemblies to pre-cure from F/A; the total number of good lenses at demold and the total number of lenses rejected at demold; and, hydration transfer uptimes.

Hydration

As shown in FIG. 44, the parallel operations of Filling Assembly and Curing/Demold are serialized at a Hydration process cell 40, where the lens/front curve mold assembly leaves the Lens Fabrication pallet and is transferred to a Hydration tray. A Hydration tray is composed of a bottom and a top chamber.

As shown in FIG. 44, Hydration PLC 41 controls the transfer of the front curve mold halves containing molded contact lenses to the hydration chamber where contact lenses are hydrated.

There are four basic steps in Hydration controlled by this hydration PLC:

(1) hydration transfer—the lens and front curve mold assembly is transferred from front curve Lens Fabrication pallets to a Hydration top chamber tray.

(2) bath soak—each Hydration top chamber is suspended in DI water to release the lens from the front curve.

(3) front curve removal—the front curve mold is removed from the top chamber. The top chamber is then mated with the bottom chamber.

(4) pressure removal—each tray is sequenced through a series of stations.

In the preferred embodiment, four front curve Lens Fabrication pallets, each holding eight lens units each with the front curve molds still attached, are transferred to a Hydration top chamber comprising convex lens holders for holding 32 (4×8) lenses. Each lens unit is flipped over when transferred to the Hydration top chamber to result in an orientation wherein each lens is resting on top of a convex Hydration top chamber lens holder with the still attached front curve mold on top of the lens.

The Hydration operation begins by placing each Hydration top chamber into one of fifteen (15) slots in a bath of DI water. Hydration cycles once every twenty-four (24) seconds. Each tray remains in its slot for 15 cycles for a total of six (6) minutes.

The tray is then removed from the bath, turned over, and the front curve mold is removed by pushing the tab of the front curve mold. The surface tension between the lens and the Hydration top chamber holds the lens in place on the top chamber.

The Hydration top chamber is then married with a Hydration bottom chamber. The Hydration tray is then sequenced on a conveyor through a series of stations whereby de-ionized ("DI") water is injected into the Hydration tray and the Hydration tray rests while lenses absorb DI water. This process continues for a total of twenty (20) Hydration cycles (8 minutes). The PCS shall track the cycles of Hydration and records the process measurements. Since their are no bar code IDs on the Hydration trays, the PCS will count Hydration cycles to track where each Hydration tray is in the process.

After Hydration, the lenses are removed from the Hydration tray and transferred to a Post Hydration pallet where they are each placed in a blister pack pre-filled with DI water. Two (2) rows of eight (8) blister packs, produced by the primary packaging injection mold machine 62 are placed in each Post Hydration Pallet for a total of sixteen (16). Post Hydration Pallets do have bar code IDs.

The hydration PLC device 41 records batch set point values and set point running values for process parameters such as minimum soak time, extraction dose, and release temperature. Status information for monitoring include total number of lenses transferred to Hydration and process uptime.

Primary Packaging Injection Molding

As mentioned above, and, in view of FIG. 44, the primary packaging Injection molding machine 62 produces a blister pack for the primary package bottom. This process is nearly identical to the injection molding process described above for forming the front and base curve molds, the difference being that polypropylene resin is used as the molding material. In the preferred embodiment, a Gaylord® system is used to feed the resin to the injection molding machine.

The primary packaging Injection Molding machine operates under the control of device controller 61 and cycles every twelve (12) seconds to produces 16 blister pack bottoms per cycle. The injection molding controller is connected to the PCS data collection system via a serial interface and report information each time they cycle. Primary Packaging transfer PLC 42 controls the transfer of blister packages to the Post-Hydration cell (pallets) to receive the hydrated lenses. It should be understood that the Hydration cell monitor 141 collects data from the PLC 42 which is largely a device for a post_hydration operation. This is because PCS allows for distributing processing demands from relatively heavy data collection areas (e.g. at post_hydration) to areas where processing demand is more available.

In the preferred embodiment, the PCS monitors the following batch set point values and set point running values including for the Primary Packaging injection mold controller including: mold temperature, hold pressures, filling time, velocity, etc., The Primary Packaging injection mold controller additionally communicates status information such as device uptime, number of good product count to post hydration, product count scrap rejects, and, product count to audit stations.

Post Hydration

PLC's 46–47, as shown in FIG. 44, control the post hydration operations. After the blister pack bottoms are transferred via PLC 46 control into the Post Hydration pallets of 16 cavities (2×8), contact lens inspection data consisting of pass/fail results as determined by an automatic vision system of an automatic lens inspection station is generated. More specifically, Post Hydration performed in the post-hydration process cell 45 consists of 4 steps:

(1) Pre-Dosing of the blister pack bottom with DI solution;
(2) Transfer of the lens from the Hydration cell into the blister pack bottom;
(3) Inspection of the lenses via the vision inspection system;
(4) Removal of the DI water and transfer to the pre-Heat Sealer accumulation conveyor.

A conveyor, under PLC 46 control, is used to transport the Post Hydration pallets containing the blister pack bottoms through the post hydration and ALI inspection process. Each Post Hydration pallet has a unique bar code ID which the PLC uses to associate with the results from the vision inspection machine 71.

Pre-Dose: Prior to placing lenses in the blister pack bottoms, a pre-dose of DI solution is placed in the blister pack bottoms by pumps, for e.g., Oyster Bay pumps. The amount of DI is determined by calibration of the pumps.

Transfer: Lenses are transferred from the Hydration thirty-two (32) lens pallets into two 16-lens Post Hydration pallets by robot manipulators, thirty-two (32) lenses at a time. DI is again added from preferably two (2) Oyster Bay pumps.

Inspection: The pallets then travel into the vision inspection machine, where each lens is individually examined for defects. There are two tests performed on each lens;

(1) Outer edge lens defect—detects tears, chips, and excess; and,
(2) Center lens defect—detects holes and puddles.

Preferably there are four (4) inspection cameras (not shown) that are organized in a pairs of Outer and a pair of Center cameras on each side of the pallet. Each camera pair inspects eight lenses on the Post Hydration pallet, and the results are returned to PCS once every twelve (12) seconds by the two inspection controllers for each Post Hydration pallet.

The inspection system calculates a "score" for each of the types of defects and reports the total scores to the PCS for database storage. Additionally, the inspection system will mark individuals lenses to be rejected at the transfer point if they receive a failed "score". Status information includes the number of good lenses inspected into heat seal and the number of bad lenses rejected. After automatic lens inspection, all lenses continue through the post hydration cell for DI water removal and package transfer operations.

DI Removal: Immediately after the vision inspection machine, a DI removal station removes the DI solution from the packages.

Transfer: Based on the results of the vision inspection, a PLC-controlled robot transfer mechanism lifts the 16 inspected lenses (in the blister pack bottoms) from the pallet and transfers them either onto the accumulation conveyor just prior to the sealing machine, or onto a reject conveyor.

The post hydration PLC that controls the transfer of blister packages containing contact lenses to post-hydration pallets (PLC 46) will provide status information such as total number of lenses transferred to hydration and device uptime.

Heat Seal

PLC 48 controls the primary packaging and lens package consolidation aspect of the lens packaging system and also controls processes such as solution exchange, saline fill, package foil heat seal, etc.

Specifically, PLC 48 controls the Heat Seal process that, in addition, includes the following primary packaging steps:

(1) Adding a measured saline solution dose to the blister pack bottom;
(2) Checking the saline dose;
(3) Labeling, cutting, and perforating the foil that comprises the top of the primary package;
(4) Inspection of label by the PPT system;
(5) Application of the foil and applying heat to seal the package.

The individual blister pack bottoms and lenses contained therein are transferred via PLC control from the pre-Heat Sealer accumulation conveyor into pallets of 10 (2 strips of 5) at the entry to the Sealing machine.

As the pallets of 10 enter the sealing machine, a sensor verifies that all packages are present in the pallet. Any packages missing will cause the PLC to stop the machine and require that the operator take action. Pallets are not removable in the Heat Seal operation.

A saline dosing station adds saline solution to the bottoms, and this is verified at a saline level check station. Any saline dose problems (over or under) will cause the PLC 48 to stop the machine and require that the operator take action.

A Foil Print/Cut machine feeds the foil tops into the Sealing machine. The foil stock begins in roll form. The first step is to print and verify (by the PPT system) the Power, Expiration Date, and Lot No. onto the foil. Following this, the foil is perforated, cut, and slit into strips that will cover 5 package bottoms. A proprietary controller controls the print/cut operation. Any date collected from this operation is via the PLC controlling the Heat Seal cell.

After the saline dose and verification, two 5-unit strips of foil are placed on the pallet, and the foil is heat sealed onto the blister pack bottom. Time, temperature, and pressure are monitored by the heat seal PLC 48, as shown in FIG. 44. Any abnormalities will cause the PLC to reject the packages and transmit information to PCS.

The post hydration PLC that controls lens package heat sealing (PLC 48), will record batch set point values and set point running values for process parameters such as DI removal blow time, DI inlet pressure, heat seal temperature, heat seal force, etc. Status information includes product count scrapped (number of rejected foil sheets), quantity transferred, number of sealed products count to sterilization (quantity in tray loader), and device uptime.

Sterilization

The PLC 48 additionally controls the loading and unloading movement of the sterilizer carts, and, PLC 51 controls the sterilization operations occurring in the sterilization cell 50.

Generally, as the lenses (now sealed in a blister pack in a strip of 5 lenses per pack) exit the heat sealer, they are transferred from the Sealer pallets to Sterilizer trays preferably carrying two-hundred and ten (210) lenses (42 strips of 5 each) that are loaded at the tray loading stations 53. At this station, a rack of empty trays feeds the tray fill station.

When a tray is filled, it is automatically placed on the rack at the rack fill station. Trays and racks are always filled and emptied using a FIFO approach to maintain the order of lenses for tracking purposes. Up to sixty-four (64) trays (8 trays per rack and 8 racks per cart) can be loaded into a sterilizer cart. As each tray, rack, and cart is filled, the PLC generates an event indicating this to the PCS.

When a cart is full the PLC 48 sends a "Request Load" signal to the sterilizer controller PLC 51 to let the sterilizer cart enter the sterilizer. If the sterilizer is in a ready state, the sterilizer controller opens the door and the cart is loaded into the sterilizer. The sterilizer controller closes the door and the sterilizer PLC 51 and automatically starts the heat, pressure, and fan speed regulation of the sterilization process. The PLC 51 reports to PCS on all measurements in the form of a sterilizer run record.

When the sterilizer controller PLC 51 determines that a sterilization cycle is complete, it sends a "Cycle Complete" signal to the material handling PLC 48 which then removes the cart from the sterilizer, conveys the cart of sterilized lenses to the cartoning area, and controls the unloading station. The PLC 51 informs the PCS of successful sterilizer runs.

If the sterilizer controller detects that an invalid cycle has occurred, it will initiate an alarm and will open either the front or back door at cycle complete. The operator is required to look at the product on the cart and verify that the invalid cycle has not caused damage to the product or packaging to make sure that it is still intact. The operator can then direct the sterilizer whether to restart the cycle or reject the loan. If the sterilizer run fails three times, the product must then be scrapped. Thus, sterilizer operation confirmation is made by the line operator. Additionally, it should be mentioned that the operator will inform PCS when a sterilizer cycle is aborted.

A sterilizer cycle takes approximately 90 minutes, but it takes almost 180 minutes to fill a sterilizer cart. If multiple sterilizer cycles are required for a given cart, subsequent carts are queued by the material handling PLC in a strict FIFO queue until the sterilizer catches up.

As the sterilizer steps through the sterilization cycle, the PCS collects event data indicating each cycle step, and, batch set point and set point running values such as expose temperature and fan speed from the PLC. The PCS will generate a sterilizer run number for each Steri-run and will record the status information such as the number of good sealed products from sterilization and the number of good sealed products from sterilization, and, device uptime.

Secondary Packaging

As shown in FIG. 44, the last process cell, the Secondary Packaging cell 55, performs the operation of taking blister pack containing a contact lens product to labeled secondary packaging cartons and sealing them therein.

Secondary Packaging consists of the following steps:
(1) Printing/applying the bar-coded lot number on carton;
(2) Printing the power and expiration date on the carton;
(3) Inserting the blister packs into the carton and gluing the carton flaps closed;
(4) Verifying the lot number;
(5) Verifying the power and expiration date;
(6) Weighing the carton;
(7) Loading and closing the case and applying the case label;
(8) Loading and completing the pallet and applying the pallet label; and,
(9) Releasing the pallet to quality assurance.

The Secondary Packaging operations are controlled by PLC 56 as indicated in FIG. 44. A number of additional programmable devices are used to print and verify information during the packaging process, but these controllers are not interfaced directly to the PCS. Unsuccessful verifications are indicated to the PCS as summary information from the PLC 56.

When a steri-cart is ready to be unloaded and the product run through the secondary packaging cell, an operator must first manually perform an appropriate setup. This is addressed in detail in the cell-specific requirements explained below.

The secondary packaging operation begins with the carton stock. The carton stock is a pre-formed box in flat form whose product code is applied to the carton during labeling.

The first step in the process is to open up the flattened box to form the carton and allow insertion of the product into the carton. The lot number and UPC product code is then printed and applied to the carton. This is done using a thermal transfer label printer, indicated as label printer 165 in FIG. 2. After the lot number product code are applied, the Power and Expiration Date are printed on the box flap using a ink-jet printer.

Six nested strips of blister packs with 5 lenses to a strip are inserted into the carton, and the carton is sealed.

An automatic in-line bar code reader reads the lot number to both verify readability and to verify that the correct lot number is being printed on the carton. An automatic in-line vision system reads the Power and Expiration Date and also verifies readability and the correct information. The PCS does not interface to these verification devices.

If either of the printer verification checks indicates there is a problem with either label, the secondary packaging PLC 56 will reject the carton and generate summary information for the PCS.

The final verification step is an in-line weigh scale. The scale verifies that the weight of the carton is within tolerances. If the weight is either too high or low, the carton will be rejected by the PLC 56 (and the PLC will generate and event to the PCS).

At the end of the cartoning process, an operator manually loads the 30-pack cartons into cases of 100 cartons per case. At the end of each case, the operator seals up the case and requests and applies a Case ID label. The PCS shall generate the Case Id number.

Each case as it is completed is stacked on a pallet. When the appropriate number of cases is loaded onto the pallet, the operator requests a pallet label. Three copies of the same label are printed (front, back, and spare). The PCS shall generate the Pallet ID.

At the end of each Steri-Run/Lot No. combination, a reconciliation process is done to ensure that all product that entered the packaging machine is accounted for. This will be done automatically by the PCS but initiated by operator entry. Any discrepancies will be alerted to the operator and will manually resolve and a note manually entered into the PCS for inclusion in the batch record.

PLC status information for the secondary packaging process includes product count from steri tray unloader, number of packaged products from the secondary package machine (for distribution), number of rejected packages from the secondary package machine, and, device uptime.

It should be mentioned that all of the abovedescribed PLC devices include a batch set point that comprises the device revision level, which may be verified from time to time during production.

Product Tracking

The contact lens product manufactured by the production line 100 of FIG. 44, are identifiable by their order number, master lot number, pallet/tray identification number, and, position from Lens Fabrication through Post Hydration. After leaving the post hydration cell, the products are tracked by their lot number.

The purpose of product tracking is to enable an informed engineering analysis of defective lenses and correlation to potential causes of the defects. Since lenses are transported in different types of pallet/tray/containers throughout the production line, PCS provides the ability to trace the history of a particular lens by tracking their transporting devices as follows:

As shown in FIG. 45 and explained briefly above, after demolding, the FC mold assembly carrying front curve lens molds are transported in the FC pallet 20 each carry eight (8) molds/lenses in a 2×4 matrix. Then, four front curve lens carrying pallets are accumulated and transferred to hydration trays which holds thirty-two (32) lenses in a 4×8 matrix as shown in the FIG. 45. Specifically, the order in which the lenses are transferred to the hydration tray matrix are indicated as 20-1, 20-2, 20-3, and 20-4. After hydration, the lenses are transferred in post hydration pallets each of which hold sixteen (16) lenses in a 2×8 matrix as shown in FIG. 45.

As mentioned above, the PCS 10 provides the ability to map a given lens which failed Automatic Lens Inspection to the GMP critical parameters, raw materials, and equipment used to produce the lens.

PCS Software Overview

Figure 4:
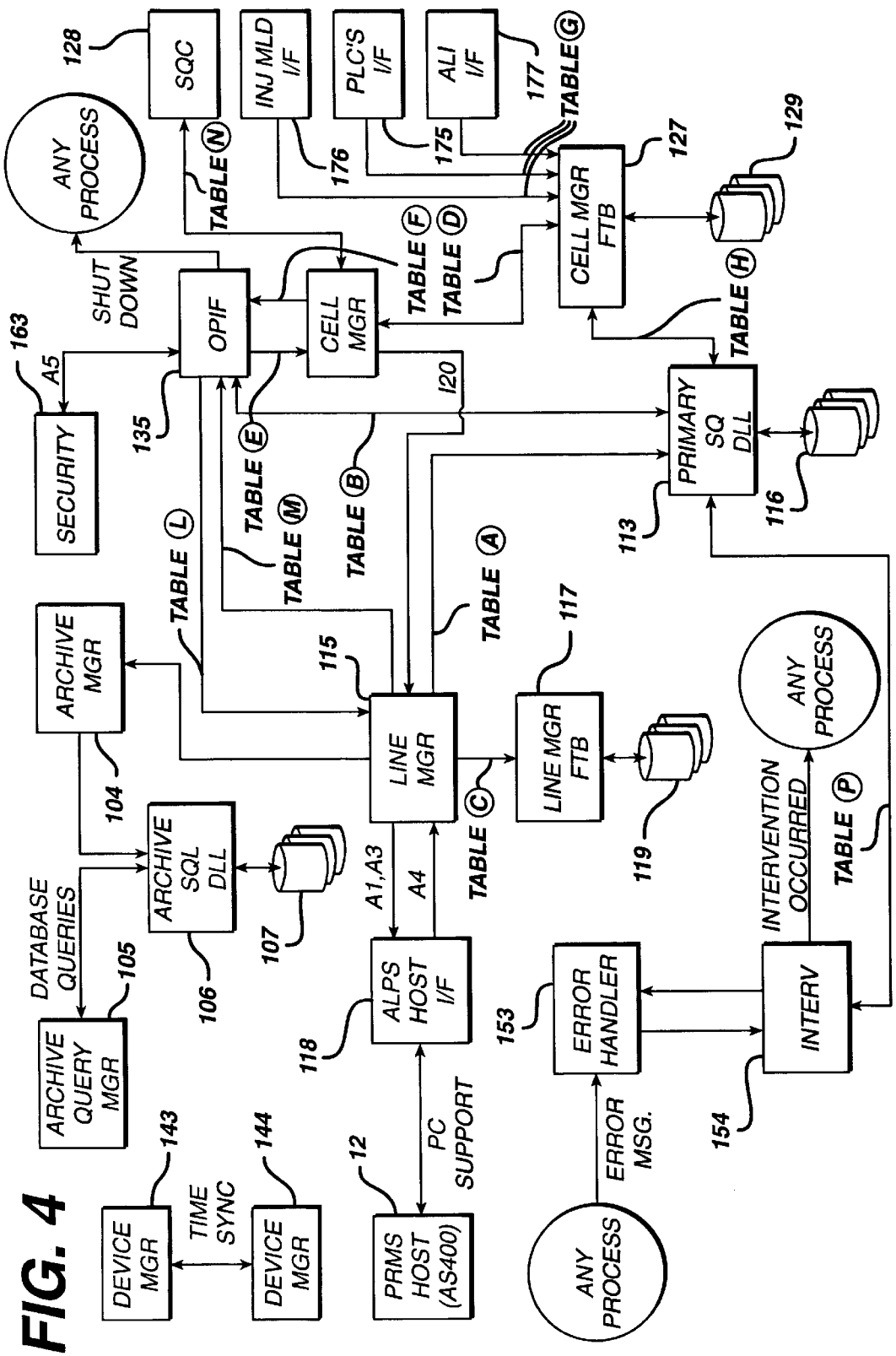
FIG. 4 is a conceptual diagram illustrating the PCS system components at a process and functional level.

FIG. 4 is a conceptual diagram illustrating the PCS components at a process and functional level. FIGS. 4 and 5 additionally indicate Tables A–P that comprise various interprocess communication messages calls for communicating messages and transferring data to and from the various software processes. How the types of data and other information are routed throughout the PCS will be explained below.

Further to the hardware view of FIG. 2, FIG. 4 shows the Line monitor station 111 as comprising: a Line manager 115 whose primary function is to coordinate order activation and completion between the system operations and the cells, and, to back up any data which is no longer in-process and older than three weeks to the Archive database 107 via the archive manager 104; the Line manager fast table 117, hereinafter "LM FTB", which provides an application independent interface to in-process order and line status information that is kept in memory/disk "Fast Tables" 119; a Primary SQL Interface 113 that functions to provide an application independent interface to system data stored in the PRIMARY Database 116 located in the Line Monitor PC 111; and, the Host I/F interface 118 provides file transfer capability to the PRMS AS/400 host computer (via PC Support). FIG. 4 also shows the components of the Archive database station 101 comprising: an Archive manager 104 whose primary responsibility includes archiving data sent by the line manager to the Archive database 107; an Archive query manager which provides the ability to run system reports on data stored in the archive database 107; and, an Archive SQL interface 106 which function provides an application independent interface to system data stored in the archive database 107. As mentioned above in view of FIG. 2, there are approximately five (5) Cell monitors 121, 131, 141, 151, and 161 generally corresponding to respective five main process cells: injection molding, lens fabrication, hydration, post hydration, and, sterilization and secondary packaging. As shown in FIG. 4, each of these cell monitors include: a Cell manager 125 whose primary responsibilities include: sending product good and bad counts collected from the system devices (e.g., PLCs) to the line manager 115; monitoring GMP set points for the active orders at the cell; write a periodic log for GMP critical parameters; monitor and send SQC (statistical quality control) information (from system devices) to an SQC process 128 that provides run-rule checking and X-bar data collection for "GMP Critical", "Process Critical", and "Other" device parameter information; monitor device events and initiate device related interventions; and, to perform pallet tracking. Additionally, each cell monitor includes a Cell manager fast table 127, hereinafter "CM FTB", which provides an application independent interface to actual device parameter readings. As will be explained in further detail below, information is taken from each of the devices and stored into cell monitor fast tables 129 (via Device I/F processes). Each cell monitor's data acquisition capabilities are configurable, and, with the additional support of Unilink/NIM's, singular values stored in PLC memory may be collected on a polled time interval or based on machine cycles. Similarly, multiple values stored in PLC memory may be collected based on a polled time interval or based on machine cycles. It is understood that PLC data may include, words, floating point numbers, bit words and alarms.

Each of the Cell monitors include one or more PLC Interface processes, collectively indicated as element 175 in FIG. 4, whose primary responsibilities include: interfacing directly to a respective process PLC; polling at regular intervals, the device data which is then stored in the CM FTBs; verifying data from the device (via Handshake register in the PLC); and, updating the PCS device health counter register, as will be explained in further detail below. Additionally, the cell manager includes an injection molding controller interface process, indicated as element 176 in FIG. 4, whose responsibilities include: interfacing directly to the injection molding controller; and, polling at regular intervals, the device data which is then stored in the CM FTBs. An ALI interface process, indicated as element 177 in FIG. 4, interfaces directly with the Automatic lens inspection controller 71 (FIG. 2).

Across all of the production cells, a common operator interface 135 is utilized in order to promote a consistent user interface to the PCS. Additionally, as shown in FIG. 4, device manager processes 143 and 144 are provided for keeping the system time clocks on each of the stations synchronized, and, for every process in the PCS, an error handling function 153 is available to process system errors, for e.g., which may involve logging to a printer, beeping the PC speaker and/or initiating interventions. Operator intervention process 154 is the means for which the PCS applications notify operators that an error requiring intervention has occurred. The intervention is responsible for logging alarm recovery actions taken by system operators.

As further shown in FIG. 4, the Security Process 163 is provided to control access to system resources (e.g., user menu options, audits, . . . , etc.). Each of the audit stations, Line monitor, Cell monitor and operator interface processes will be discussed in further detail hereinbelow.

Database Tables

To fully understand the detailed description of the archive, line monitor, cell monitor, and operator interface functions, it is necessary to define the various types of data that are obtained and stored in the primary and archive databases, and the cell and line monitor fast table memories, and, the types of data that are stored and communicated throughout the PCS. FIGS. 6(*a*) through 6(*k*) illustrate the memory tables stored in the primary database 116 for the Line Monitor station 111. These tables include PCS static tables having data that are not modified by system. Static tables are located in FIGS. 6(*a*)–6(*k*). As will be described in detail below, the PCS Operator Interface provides a seamless interface for access to the Query Manager panels. FIGS. 6(*d*)',6(*e*)', 6(*f*) and 6(*g*) illustrate dynamic tables and their data contents that are continually modified by system processes during normal system operation.

As mentioned briefly above, FIG. 5 illustrates the various Tables A–P each comprising the various interprocess communication message calls that are implemented by PCS to transfer data into and out of the various tables of FIGS. 6(*a*)–6(*k*) for supporting PCS archive manager, line manager, cell manager, and operator interface activities.

As shown in FIGS. 6(*a*)–6(*h*), static tables include:

PRODUCT SKU table 202 is the table used to tie SKU's to work instruction sets and includes the follwing data: sku the number of the product; product_name, the product name; power, the lens power; and, instr_set_id, which is the link to the instruction set table 212;

INSTRUC SET table 212, is used to group setup instructions for each operation in the process and include the following data: instr_set_id, which is the identifier for the set; instr_set_desc, the description for the set; inj_mold_sui, injection mold-front curve set up filename; lens_fab_sui, lens fab set up filename; hydration_sui, hydration set up filename; post_hydration_sui, post hydration set up filename; lab_mast_sui, the labeler set up filename for "start new master lot"; lab_slot_sui, labeler set up filename for "start new split lot"; steril_sui, sterilization set up filename; and, sec_pkg_sui, sec packaging set up filename.

DEFAULT PARMS table 210 contains the default parameter settings for each parameter in the system devices and includes the following data: device_id, which is the device identifier (link to device_config);, parameter_type (long or floating point); parameter_index which is the index offset in the device where the parameter is located; parameter_group which defines whether the data is GMP Critical value, Process Critical Value, or other type of value; parameter_name, the parameter descriptive name; parameter_precision, the precision string used for display parameter; scale_flag, the flag to indicate whether or not the read parameter value requires scaling; scale_min_input, minimum input value from the device; scale_max_input, maximum input value from the device; scale_min_output, minimum after scaling output; scale_max_output, maximum after scaling output; dead_band, the dead band setting for the parameter. The value is logged only if value changes plus or minus the dead band. Note that the band filtering is done before scaling and will not affect X-Bar,R plotting. read_count sample subgroup size; freq_interval the polling interval (interval * poll rate); log_flag the flag indicating whether or not parameter is written to a circular parameter log. It should be noted that parameters which are GMP Critical are written to a GMP Critical Parameter Log whether this flag is set or not. log_filename, the filename for the circular log; log_max_size maximum number of entries in circular file; SQC_flag the flag to indicate whether or not SQC analysis is performed on the parameter value; chk_run_rules, flag indicating if run rules are checked or not checked; max_subgroups, the number of subgroup points stored in system memory for X-Bar,R plots; upper_spec_limit, which is the upper spec limit for X-Bar,R; lower_spec_limit, which is the lower spec limit for X-Bar,R; upper_ctrl_limit, which is the upper control limit for X-Bar,R; lower_ctrl_limit, which is the lower control limit for X-Bar,R; nominal_value, which is the nominal value for X-Bar,R; range_width, the maximum range for X-Bar,R; and, range_ctrl_limit, which is the range upper control limit for X-Bar,R.

SKU PARM EXCEPTIONS table 208, is a table used to override certain parameter default settings based on the SKU and includes the following data: sku; device_id; parameter_type; parameter_index; upper_spec_limit; lower_spec_limit; upper_ctrl_limit; lower_ctrl_limit; nominal_value; range_width; range_ctrl_limit.

SKU GMP EXCEPTIONS table 206, is a table used to override GMP parameter default settings based on the SKU and includes the following data: sku; device_id; parameter_type; parameter_index; GMP_high, the set point maximum range; GMP_low, the set point minimum range. It should be understood that a DEFAULT_GMP_SP record 209 that is used to identify GMP set points settings for each of the system devices, must exist. If an exception record is not found for a given SKU/GMP parameter, then the system will use the GMP default setting found in the DEFAULT_GMP_SP table 209.

DEFAULT GMP SP table 209 is a table used to identify default GMP set points settings for each of the system devices and includes the following data: device_id; parameter_type; parameter_index; parameter_name; parameter_precision; GMP_high, the set point maximum range; GMP_low, the set point minimum range.

SKU AUDIT table 204, is a table used to tie measurement and defect audit specifications to a SKU and includes the following data: sku; audit_id, which is the audit id record identifier and the link to the AUDIT_LIST table; and, audit_spec_id, which is the audit specification record identifier.

AUDIT LIST table 216 is used to identify all the system audits and their default specifications and includes the following data: audit_id; audit_name, which is the audit name/description; audit_type (measurement or defect); sec_category, security resource category number; audit_rr_errnum, the error number to use for run rule violation; audit_sl_errnum, the error number to use for audit spec limit violation; batch_flag, an indicator whether the audit is to be stored with the batch record or not; and, df_audit_spec_id, the default audit specifications (link to AUDIT_SPECS).

AUDIT SPECS table 220, is used to identify audit specifications used for both defect and measurement type audits and includes the following data: audit_spec_id, which is the specification identifier; audit_spec_name, which is the unique name identifier for the specification and used by the dataset filename by the SQC process; chk_run_rules, flag indicating if run rules are checked or not checked; chk_spec_limits, flag indicating whether upper and lower limits are checked or not checked; value_precision, the precision string used for display value; sample_size, the sample size to use for this audit; and, these other predefined values upper_spec_limit; lower_spec_limit; upper_ctrl_limit; lower_ctrl_limit; nominal_value; range_width; range_ctrl_limit.

AUDIT DEFECT LST table 218, is used to identify all the possible defect descriptions for defect audits and includes the following data: audit_id; and, defect_descr, which is the defect description.

The DEVICE CONFIG table 222, is used to identify system devices (PLC, inj. mold., and ALI) along with their current software revisions and checksum numbers and includes the following data: device_id; device_type (i.e., PLC, IM mold machine, ALI); valid_scrap_flag, a flag indicating whether an operator can identify scrap for this device or not; valid_stat_flag, a flag indicating whether an operator can view device status for this device or not; device_name which is the device name/description; cellmgr_name which is the cell manager responsible for reading data from the device; software_rev the device software revision level; param_sr_index which is the index offset in the device where software revision number parameter is located; software_chksum, the device software checksum; and, param_sc_index, the index offset in the device where software checksum parameter is located.

SCRAP REASONS table 229 is a table used to store scrap reason codes and descriptions for each device in the process and includes the following data: device_id; scrap_code the scrap code identifier; and scrap_descr, the scrap description.

Other static tables stored in the primary database for data acquisition include:

SUPPLEMENTAL SUI table 214 which is used to identify supplemental setup instructions which are not necessarily required for a batch/lot changeover and includes the sui_descr set up instruction description and sui_filename the set up instruction file name.

The RAW MATERIAL table 224 which is used to identify raw materials which are used throughout the process and includes the following data: raw_material_id, the raw material identifier; operation_id, which is the operation identifier where the raw material is used (e.g., IM cell, LF cell, HY, etc.); raw_material_name, the material name/description; raw_material_sku, the product-sku number for the raw material; and, sui_filename.

The STERI ABORT CODES table 226 identifies the list of abort reasons which can occur at the sterilizer and includes the following data: abort_code abort reason code identifier; and, abort_desc abort reason description.

The OPERATION AREA table 228 is used to identify the operational areas which make up the process and is no primarily used for log book functions and includes data such as: area_id the area identifier; and, area_name the descriptive name of the operational area.

The AREA CATEGORY table 231 is a table used to identify logging categories for the various operational areas and includes data such as: area_id; category_id, the category identifier; and, category_name, the category descriptive name.

CATEGORY NOTES table 233 is used to identify standard notes for each identified categories in the AREA_CATEGORY table 231 and includes area_id; category_id; and, standard_note, the standard note text.

As illustrated in FIGS. 6(*d*)',6(*e*)',6(*f*),6(*g*), and FIG. 6(*i*), the dynamic tables include:

The SCRAP LOG table 236 that is used to store the system's scrap log and includes the following data: master_lot, the master lot number including facility/line identifier and a master lot identifier; split_number, the split lot number; device_id; device_name, the device name/description; scrap_code, scrap_descr; scrap_other_note which is the users other description note; scrap_qty, the quantity which was scrapped; date_time_stamp, the date/time stamp when the scrap occurred; team, the team identifier; and, user_id, the user id of the technician who entered the scrap.

The BATCH SUI table 243 records the setup instruction user sign-offs for the master/split lots and includes the following data: the master_lot; split_number; date_time_stamp, the date/time stamp when the setup instruction was signed off by the user; operation_name, the operation to which the setup instruction pertained; and, user_id, the user id of the technician who signed off the setup instruction.

The BATCH DEV REV table 244 is used to record the system's device software revision levels and actuals and includes data such as: master_lot; split_number; device_id; device_name, software_chksum the PCS stored software checksum; software_rev, the PCS stored revision level; actual_sw_rev the actual device read software revision level; and, actual_sw_chksum the actual device read software checksum.

The BATCH GMP SP table 246 is used to record each device's GMP set points and actuals and includes the following data: master_lot; split_number; device_id; GMP_param_name, the parameter descriptive name; parameter_precision; GMP_set_pt_low, PCS stored GMP minimum value; GMP_set_pt_high, PCS stored GMP maximum value; Actual_set_pt, actual set point read from the device.

The BATCH MEAS AUDITS table 247 is used to record the measurement audit results against the master/split lot and contains the following data: master_lot; split_number; audit_id; end_date_time; the date/time stamp when the audit ended; batch_flag; the flag indicating whether an audit is to be stored with the batch record or not; audit_name; start_date_time, the date/time stamp when the audit started; user_id; sample_size; value_precision; max_value, the sample max value; min_value, the sample min value; range_value, the sample range value; num_out_of_spec, the number in sample which were out of spec; and, perc_out_of_spec, the percentage of sample out of spec.

The BATCH DEF AUDITS table 248 is used to record the defect audit results against the master/split lot and includes the following data: master_lot; split_number; audit_id; end_date_time; batch_flag; audit_name; start_date_time; user_id; sample_size; and, num_defective which is number defective in the sample. The percent defective is equal to the num_defective/sample_size and this value is used in Pareto chart plotting described below.

The BATCH DEF DETAIL table 249 is used to record the detailed results for the defect audits stored in the BATCH_DEF_AUDITS table 248 for a master/split lot and includes the following information: master_lot; split_number; audit_id; end_date_time; defect_descr; and, defect_count, which is the quantity of this type of defect in the sample.

The BATCH PRIMARY table 245 stores the primary batch header information used in printing and displaying the batch record and includes the following data: master_lot; split_number; lot_number, which is the entire split lot number with checksum (includes split number in addition to facility line number, year, master lot identifier, and check digit); closure_status, which is a flag indicating the status of the split lot (e.g., still in-process, ready for closure, or, closed); start_date_time, the time the date lot started (assigned at the labeler); end_date_time, the date the lot was completed; sku; product_name; power; qty_started, which is the quantity put into the tray loader; qty_sterilized, which is the quantity that sterilized successfully; steri_run_number, the sterilization run number; qty_to_distr, the quantity released to distribution by secondary packaging; qty_scrapped, the quantity scrapped after sterilization; discrepancy_note, which is the user note if quantity to distribution does not equal quantity sterilized minus the quantity scrapped; and, discrepancy_user, the user id of the operator logging the discrepancy.

The BATCH RAW MATL table 242 stores the raw materials used in a lot. For a split lot, all materials recorded against the master lot are included in the split lot raw material usage report. The BATCH_RAW_MATL table 242 includes the following data: master_lot; split_number; date_time_used, which is the date/time stamp when raw material was added to the line; raw_material_id; raw_material_name; raw_material_sku; and, raw_matl_lot, the lot number of raw material.

Other dynamic tables stored in the primary database of the line monitor station include:

The LAST USED RAW MATL table 238 which is used to store the last used raw material lot for each of the raw materials and includes the following data: operation_id; raw_material_id; raw_material_name; raw_material_sku; and, raw_matl_lot; date_time_used, which is the date/time stamp when raw material was last used. When a new master lot is started at injection mold-FC the materials data contents of this table are moved to the BATCH_RAW_MATL table 242 using the master lot number.

The STERI ABORT LOG table 240 which is used to log sterilizer aborts for split lots and includes the following data: master_lot; split_number; date_time_used, which is the date/time stamp when abort was logged by the line technician; cycle_count, sterilizer cycle count when count occurred; steri_run_number; user_id; team; abort_code, abort reason code identifier; and, abort_desc, abort reason description.

The SYSTEM NOTE LOG table 241 which is used to store user notes which have been logged against the process and include the following data: facility_line, which is the facility and ine identifier; area_id; category_id; team; date_time_stamp, which is the date/time stamp when the note was logged; area_name; category_name; note_text, which is the actual note entered by the operator; batch_support, which is a flag indicating whether or not the log information should be kept as batch support data; master_lot; split_number; and, user_id.

The INJ MOLD DIE LOG table 252 is logged when an injection molding die is changed out and includes the following data: mold_tag_number, the identifier for the injection mold die; date_time_stamp, which is the date/time stamp when the mold was changed out; facility_line; inj_area, the identifier for the injection area where the mold was changed (e.g. injection molding front curve); and, user_id, of the tech who changed the mold.

The ALARM RECOVERY table 254 is used to log alarm recovery action text which is entered by the line technician during intervention actions and includes the following data: date_time_stamp, which is the date/time stamp when the alarm occurred and should match the time stamp in the alarm text log; alarm_err_num, which is the alarm error number (set in error description file); alarm_err_prefix, the alarm error prefix identifier; alarm_description, the alarm description text; facility_line; user_id, the id of the technician making the log entry; and, recovery_text, the recovery action text entered by the technician.

The MASTER LOT PROD table 250 is used to store production information against the master lot and includes the following information: master_lot; order_number, the host order number; sched_start_date, the host's schedule start date; order_priority, the order's priority assigned by the host; host_qty, the quantity of lens to build; status (active, complete); sku; product_name; power; act_start_dt, the date/time the order was activated by injection mold; act_end_dt, the last recorded time and date when a split lot belonging to the master completed secondary packaging or aborted at the sterilizer; and, act_qty_complete, the quantity verified to distribution.

The MASTER LOT YIELD table 251 which is used to store production yield information against a master lot, device, date and team includes the following data: master_lot; device_id; date_stamp, the date information is collected; team; device_name; qty_good, the quantity of lenses completed good indicated by the device; qty_scrapped, the quantity of lenses scrapped indicated by the device and the user scrap log; yield_percent which is a value calculated within the report queries.

The following static and dynamic tables (not shown) located in the archive database 107 for the Archive Line Monitor station 101 (FIG. 4) are identical to the tables defined above but contain data that is dated by a predetermined amount of time (e.g., two weeks). These tables are preferably stored in the database for a period of up to one year and include: the SCRAP_LOG table, the INJ_MOLD_DIE_LOG table; the ALARM_RECOVERY table; the BATCH_PRIMARY table; the BATCH_RAW_MATL table; the BATCH_SUI table; the BATCH_DEV_REV table; the BATCH_GMP_SP table; the BATCH_MEAS_AUDITS table; the BATCH_DEF_AUDITS table; the BATCH_DEF_DETAIL table; the STERI_ABORT_LOG table; the SYSTEM_NOTE_LOG table; the MASTER_LOT_PROD table; and, the MASTER_LOT_YIELD table.

The following table definitions are used by the line monitoring station 111 for accessing in-process production data stored in the Line Monitor Fast Tables ("LM_FT") 119 (FIG. 4): the GENINFO.FTB is a record for storing general information required by the line manager application and includes data such as: index_key (a value equal to one (1)); next_host_number, the next host file number to download; next_pcs_number, the next PCS file number to upload; prim_maint_time, the time when system maintenance is performed by the line manager; next_maint_date, the next maintenance date. Additionally included are the inj_mold_team, lens_fab_team, hydration_team, pst_hyd_lab_team, and, ster_secpkg_team variables which identify the team currently signed on at a cell.

The PRMSPEND.FTB is used to store pending PRMS orders which are ready for activation by injection molding front curve (FC) and includes the following data: sched_start_date; order_priority; master_lot; host_qty; sku; product_name; power; and, order_number.

The FCLFHPHL.FTB is a table used to store current active orders for the injection mold (FC), lens fab, hydration, post hydration, and, labeller operations and includes the following data: operation_id, the identifier for the operation (IM, LF, HY, etc.); sched_start_date; order_priority; master_lot; host_qty; sku; product_name; power; and, order_number.

The LABELSL.FTB is a table used to store the current active split lot at the labeller operation and includes the following data: index_key; master_lot; split_num; year, the year number used in the split lot number string; check_digit, the check digit used in the split lot number string; split_lot, the entire split lot number in ASCII form; label_qty, the quantity of labels entered by the user at the labeler operation; activate_stamp, which is a value in seconds and is assigned each time a new split lot is created.

The PENDSTER.FTB is a table used to store the pending lots for the sterilizer operation. As will be explained in greater detail below, split lots from the labeler are not moved into this table until the labeler technician has entered the quantity placed into the tray loader. The PENDSTER.FTB includes data such as: check_num, chechsum number used in split lot number string; activate_stamp; master_lot; split_num; year; split_lot; label_qty; qty_tray_loader, the quantity placed into the tray loader prior to the sterilizer operation that is entered by the technician at the labeler operation after completing a split lot; sched_start_date; order_priority; host_qty; sku; product_name; power; and, order_number.

The STERACTV.FTB is a table used to store the active lots currently at the sterilizer operation; activate_stamp; master_lot; split_num; year; check_num; split_lot; label_qty; qty_tray_loader; num_of_cycles, the number of sterilizer runs for this lot; sched_start_date; order_priority; host_qty; sku; product_name; power; and, order_number.

The PENDSCPK.FTB is a table used to store the pending lots for the secondary packaging operation. It should be understood that split lots from the sterilizer are not moved into this table until the sterilizer technician has selected to complete the sterilizer lots (good). The PENDSCPK.FTB table includes the following data: activate_stamp; master_lot; split_num; year; check_num; split_lot; label_qty; qty_tray_loader; num_of_cycles; sched_start_date; order_priority; host_qty; sku; product_name; power; and, order_number.

The SPKACTV.FTB table is used to store the active lot at the secondary packaging operation and includes the following data: index_key; activate_stamp; master_lot; split_num; year; check_num; split_lot; label_qty; qty_tray_loader; num_of_cycles; qty_scrapped, which is the quantity of lenses scrapped at secondary packaging while this split lot is active and accounts for the bad quantity from the device and the user's scrap log; sched_start_date; order_priority; host_qty; sku; product_name; power; and, order_number.

The LINESTAT.FTB table is used to store local device information on each device shown on the line status display and includes the following information: device_id; device_name; master_lot; host_qty; sku; product_name; power; qty_good, the quantity released good from the device; and, qty_bad, the quantity released bad from the device.

The following table definitions are used by the Cell monitoring stations for accessing device data for storage in the Cell Manager Fast Tables ("CM_FT") 129 (FIG. 4): The DEVINFO.FTB is a table used to store local device information on the PC where the Cell Manager and Device I/F's are located. This table includes data such as: device_id; device_name; device_type; gmp_sp_errnum, which is the error number to use for GMP set point violation errors; rr_errnum, the error number to use for run rule violations; poll_rate_if, the device I/F poll rate in milliseconds; poll_rate_mgr, cell manager poll rate in milliseconds; long_address, which is the starting address block in the device where the long values are stored (PLC's only); long_block_size, which is the number of long stored in the block; dbl_address, the starting address block in the device where the double values are stored; dbl_block_size, which is the number of doubles stored in the block (4 bytes); prod_good_ct, the index into the param long table for product good count; prod_bad_ct, the index into the param long table for product bad count; prod_good_ct_a, the index into the param long table for product good count "A" side; prod_good_ct_b, the index into the param long table for product good count "B" side; prod_bad_ct_a, the index into the param long table for product bad count "A" side; prod_bad_ct_b, the index into the param long table for product bad count "B" side; ftb_long_name which is the fast table filename for long values; and, ftb_dbl_name which is the fast table filename for double values.

The DEVGEN.FTB table is used to store the general information for each device and is initially created by the application programmer and maintained by the Cell manager. The DEVGEN.FTB contains the following information: device_id; operation_id; master_lot; sku; last_good_ct, a value used to store the last count values from the device; last_good_ct_a; last_good_ct_b; last_bad_ct; last_bad_ct_a; and, last_bad_ct_b.

The DEVEVENT.FTB table is used to store event indexes and error numbers to use for each event BIT setting and includes data for each device such as: device_id; event_index, which is the index into the parameter long table where the event code is located; err_no_bit1–err_no_bit16, the error numbers when either of bits 1–16 are on; and, err_bit1_flag–err_bit16_flag, the flags indicating whether the outstanding error is true/false. The DEVZONE.FTB is a table used to store zone information indexes for the PLC type devices and includes data such as: device_id; zone_number, the zone number reference by the device engineers; zone_descr, the zone description; zn_wip_index, the index into the parameter long table where wip (works in progress) for the zone is stored; zn_status_index, the index into the parameter long table where status for the zone is stored; and, zn_uptime_index, the index into the parameter double table where uptime percentage is stored.

The XXXXXXX.FTB table, whose name XXXXXXX is configurable in the DEVINFO.FTB table and corresponds to a particular monitored device, is a fast table used to store long data_value information which are the long values read from the particular device. This table is created and maintained by the cell manager and device I/F applications and is keyed by the index identifier number.

Likewise, the YYYYYYY.FTB is a fast table used to store double data_value information which are the double values read from the particular device. This table is created and maintained by the cell manager and device I/F applications and is keyed by the index identifier number.

The following description of the operator interface, line manager and cell manager processes, makes reference to each of these tables and the data contents therein.

Cell Manager

Figure 7:
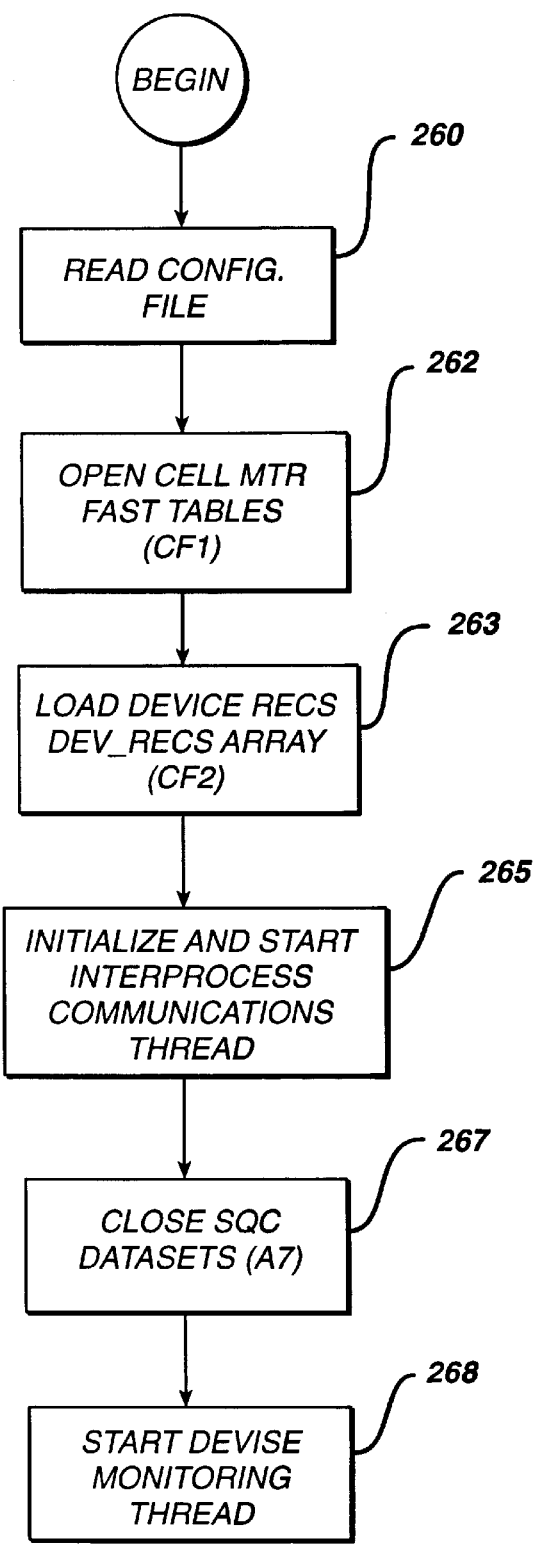
FIG. 7 illustrates the Cell manager software process overview.

As mentioned above, the Cell manager's primary responsibilities include: sending product good and bad counts collected from the system devices (e.g., PLCs) to the line manager; monitoring GMP set points for the active orders at the cell; write a periodic log for GMP critical parameters; monitor and send SQC (statistical quality control) information to the SQC process that provides run-rule checking and X-bar data collection for "GMP Critical", "Process Critical", and "Other" device parameter information; monitor device events and initiate device related interventions; and, perform pallet tracking. FIG. 7, FIGS. 11(a),(b) and FIGS. 12(a),(b) provides a detailed illustration of these Cell Manager processes.

As shown in FIG. 7, the first step 260 of the cell manager process is to read its configuration file, i.e., read all the "CFG.*" data variables, flags, files, drive paths, and indexes used for each of the devices in communication with the Cell manager. Next, at step 262, all of the device Cell Monitor Fast tables (element 129, FIG. 4) i.e., the DEVINFO.FTB, DEVGEN.FTB, DEVEVENT.FTB, and, DEVZONE.FTB tables that receive process parameter information from the production line devices (PLC I/F 175, FIG. 4) are opened by the message call (CF1) shown in Table D (FIG. 5). Then, at step 263, the previously declared memory array of structures, DEV_RECS, that point to fast table memory is initialized by the CM FTB call (CF2) shown in Table D (FIG. 5). The message call (CF2) functions to: initialize each device record array, open the parameter index tables for the device; open the device index table which hold the word values from the device by implementing CM FTB message call (CF3); open the device index table which hold the floating point values from the device by implementing CM FTB message call (CF4); allocate memory for the GMP SP records; assign the GMP set point (GMP_SP) information of the DEV_REC for the current SKU the device is working on by implementing CM FTB message call (CF5) which includes the steps of: obtaining the count of default GMP_SP records which are in the database for the given device (SQL message call (PS55)); opening a cursor in the default GMP SP table (table 209, FIG. 6(b)) by implementing message call (PS15), fetching default GMP SP records from the table by implementing message call (PS16), obtaining a record from the SKU GMP exception table (table 206, FIG. 4) to see if there is an exception record based on the given SKU, device, and parameter type by implementing message call (PS18), and finally closing the cursor (PS17); and, obtain the DEV Monitor information of the DEV_REC for the current SKU the device is working on by implementing CM FTB message call (CF6) which includes the steps of: obtaining the count of default parameter records which are in the database for the given device (SQL message call (PS83)); opening a cursor in the DEFAULT_PARMS table (table 210, FIG. 6(b)) by implementing message call (PS84), fetching default parameter data from the table by implementing message call (PS85), obtaining a record from the SKU parameter exception table (table 208, FIG. 4) to see if there is an exception record based on the given SKU, device, and parameter type by implementing message call (PS87), and finally closing the cursor (PS86). Additionally, production counters are additionally assigned (e.g. Good_Ct, Bad_Ct) into the monitor array, and, event indexes are assigned into the array by implementing message call CM FTB (CF7) which functions to get all device event records from the DEVEVENT.FTB table FTB for the given device.

For each operation on the line there is a good counter and bad counter (not shown). The bad counter represents the total number of rejects for the operation. For e.g., if the injection molder is rejecting shots because no lens fab pallet is available for audits, the total reject amount is reported to the bad counter. Also, any product that is manually scrapped can be added to the bad counter total via manual entry to the operator interface scrap log screen as is often the case at secondary packaging. Good and bad counters, preferably, are either shift counters or lot counters and are manually resettable or resettable by a write operation to the PCS upon a close lot operation.

In the preferred embodiment, production counters are used by PCS for displaying line status information over the master and split lot, for calculating the additional manufactures needed at injection molding to produce the number of finished product needed for the master lot, and, for displaying and calculating the yield for each device and line. Preferably, these counters are incremented by the number of lenses from 0 to 30,000 and roll back over to one. If counts exceed 30,000, a rollover counter is associated with the production counter. Alternatively, the rollover counter may be omitted and PCS configured to track rollover independently whenever the production counter is returned to zero.

Referring back to FIG. 7, an Inter-process Communications thread (described below) is initialized and the inter-process message receive thread is started at step 265 to enable the cell manager to receive and send messages to and from the operator interface and line manager.

At step 267, a message to close any SQC dataset that might have been previously opened is sent by the Cell Manager to the SQC process by the message call (A7) as shown in Table N (FIG. 5). Finally, a Device_Monitor thread of the Cell Manager is started for each configured device at step 268. As will be explained in detail below, each Device_Monitor thread is responsible for: monitoring GMP set points at a predetermined interval that is a function of the data acquisition poll rate; check counters and send count updates to the Line Manager at a predetermined interval that is a function of the data acquisition poll rate; continuously monitoring SQC/Log parameters (GMP Critical, Process Critical, and other); periodically log GMP Critical data at a predetermined interval that is a function of the data acquisition poll rate; and, to continuously check for events.

Device Monitor Thread

Figure 11B:
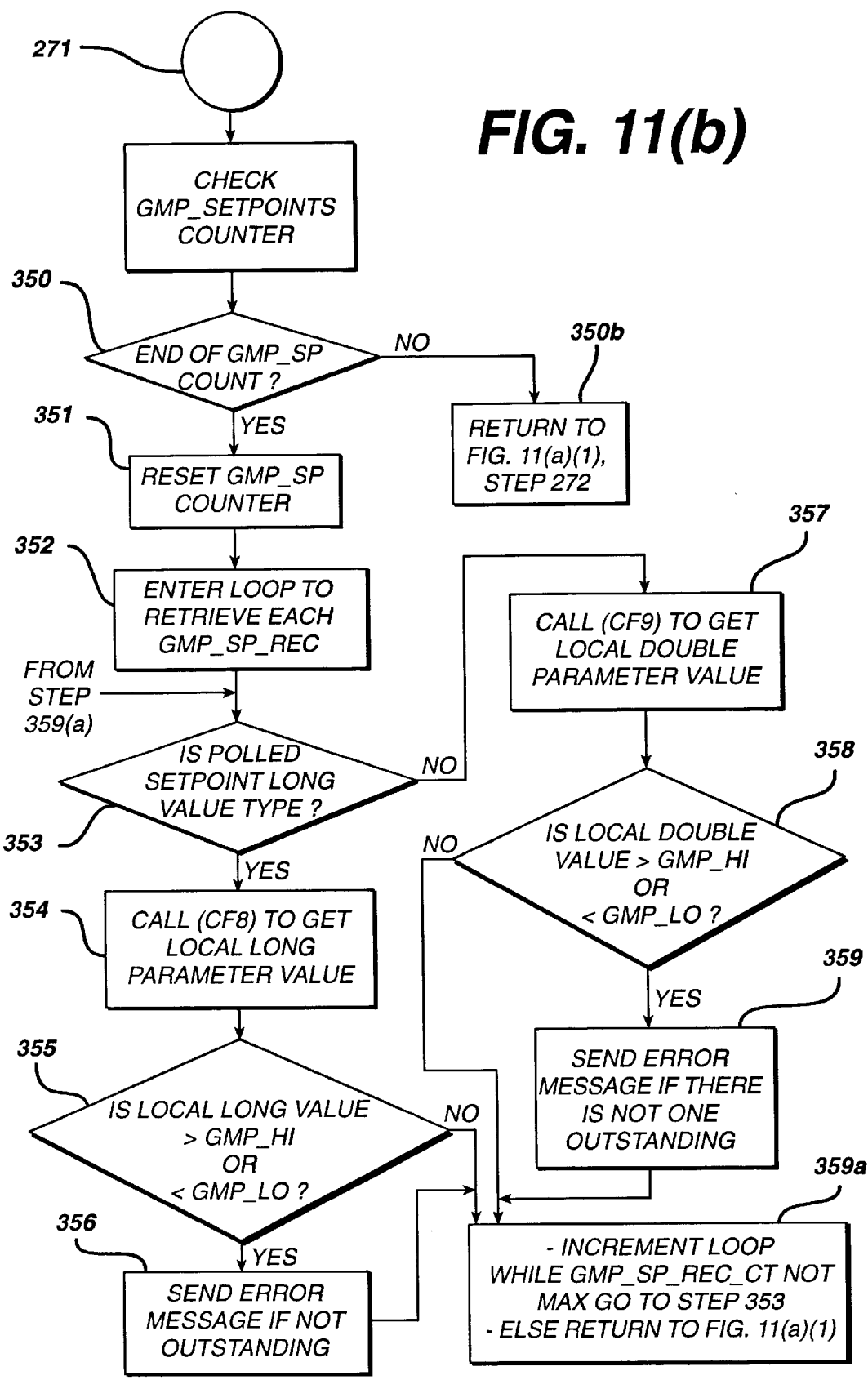
FIGS. 11(*a*)(1), 11(*a*)(2) and 11(*b*) together illustrate the Device Monitor thread of the Cell Manager.

FIG. 11(a) illustrates the process flow for the Device Monitor thread of the Cell Manager. The first step 269 is to open all the SQC datasets by implementing message call (A8) to the SQC process for opening an SQC dataset, i.e., data structure for the specified parameters. Next, at step 270, all of the interval counters (GMP_SP, GMP_CRIT, and, Count interval) for determining the current device parameter information to be retrieved for PCS logging and SQC purposes are incremented. Then, at step 271, the GMP set points that are located in individual setpoint arrays (GMP_SP_RECS) for each device, are monitored. This function is illustrated in further detail with respect to FIG. 11(b).

As shown in FIG. 11(b), the first step 350 is to check the GMP set point counter (not shown) to determine if the end of the configured CFG_SP interval has been reached. If the end of the interval has not been reached, the system will return to step 272 of FIG. 11(a) to update the logs. If the GMP set point count has reached the predetermined configured interval count, then the counter is reset at step 351. Then, each GMP_SP parameter in the GMP_SP_REC array for the device is evaluated as indicated at step 352 by entering into a loop that performs the following steps while the current parameter index is less than the maximum count (GMP_SP_REC_CT): First, the parameter type is checked at step 353. If the evaluated data point is a long value, as determined at step 353, then the message call (CF8), as shown in Table D of FIGS. 4 and 5, is implemented at step 354 to retrieve the long parameter value from the GMP_SP_RECS.FTB for the particular monitored device. A determination is then made at step 355 to determine whether the retrieved long value is greater in value than the GMP_HI set point or less in value than the GMP_LO setpoint for the device parameter. If the retrieved long value is greater in value than the GMP_HI set point or less in value than the GMP_LO setpoint, then an error message will be sent as indicated at step 356 and the process will return to the loop to retrieve the next parameter value in the GMP_SP_REC array for monitoring as indicated at step 359a. At step 353, if the evaluated data point is not a long value, then the message call (CF9), as shown in Table D of FIGS. 4 and 5, is implemented at step 357 to retrieve the double (floating point) parameter value from the GMP_SP_RECS.FTB storing current GMP setpoint for the particular monitored device. A determination is then made at step 358 to determine whether the retrieved double (floating point) value is greater in value than the GMP_HI set point or less in value than the GMP_LO setpoint for the device parameter. If the retrieved double value is greater in value than the GMP_HI set point or less in value than the GMP_LO setpoint, then an error message will be sent as indicated at step 359 and the process will return to the loop to retrieve the next parameter value in the GMP_SP_REC array for monitoring as indicated at step 359a. After monitoring each of the GMP_SP in the RECS array, the process exits the loop to return to step 272, FIG. 11(a).

The next device monitor operation is a check if it is time to log GMP critical parameter data. A check is made at step 272 to determine if the end of the GMP critical data log time interval (not shown) has been reached. If the GMP critical data log time count has reached the predetermined configured interval count, then the current GMP critical counter is reset at step 273. Next, a check is made at step 274 to determine if it is time to send count (status) updates to the Line manager. Specifically, a check is made at step 274 to determine if the end of the current count time interval (not shown) has been reached. If the current count time interval has reached the predetermined configured count interval, then the count update counter is reset at step 276, and a flag (log_counts) is set.

The next series of steps is to evaluate and process each GMP_CRIT, Process Crit, and event parameter output of the particular production line PLC's. After initializing the device index i="0" at step 277, a loop having the index "i" whose maximum value is equal to the number of parameters being measured for a given production line process (i.e., i=dev_monitor_ct) is entered. At step 278, a determination is made if the index has reached its final value, i=dev_monitor_ct. If not, the parameter obtained is evaluated as follows: First, as generally indicated at step 279, the stored parameter is obtained from its corresponding XXXXXXX.FTB or YYYYYYY.FTB, described above, and a determination is made as to whether the data value type is long or double (floating point). For this determination, respective Cell monitor fast table calls (CF8) and (CF9), as indicated in Table D of FIGS. 4 and 5, are implemented to retrieve either the long value type or double value type parameter data from respective fast tables, XXXXXXX.FTB or YYYYYYY.FTB for the particular monitored device. For double parameter values, it may be necessary to scale the parameter value.

Figure 12:
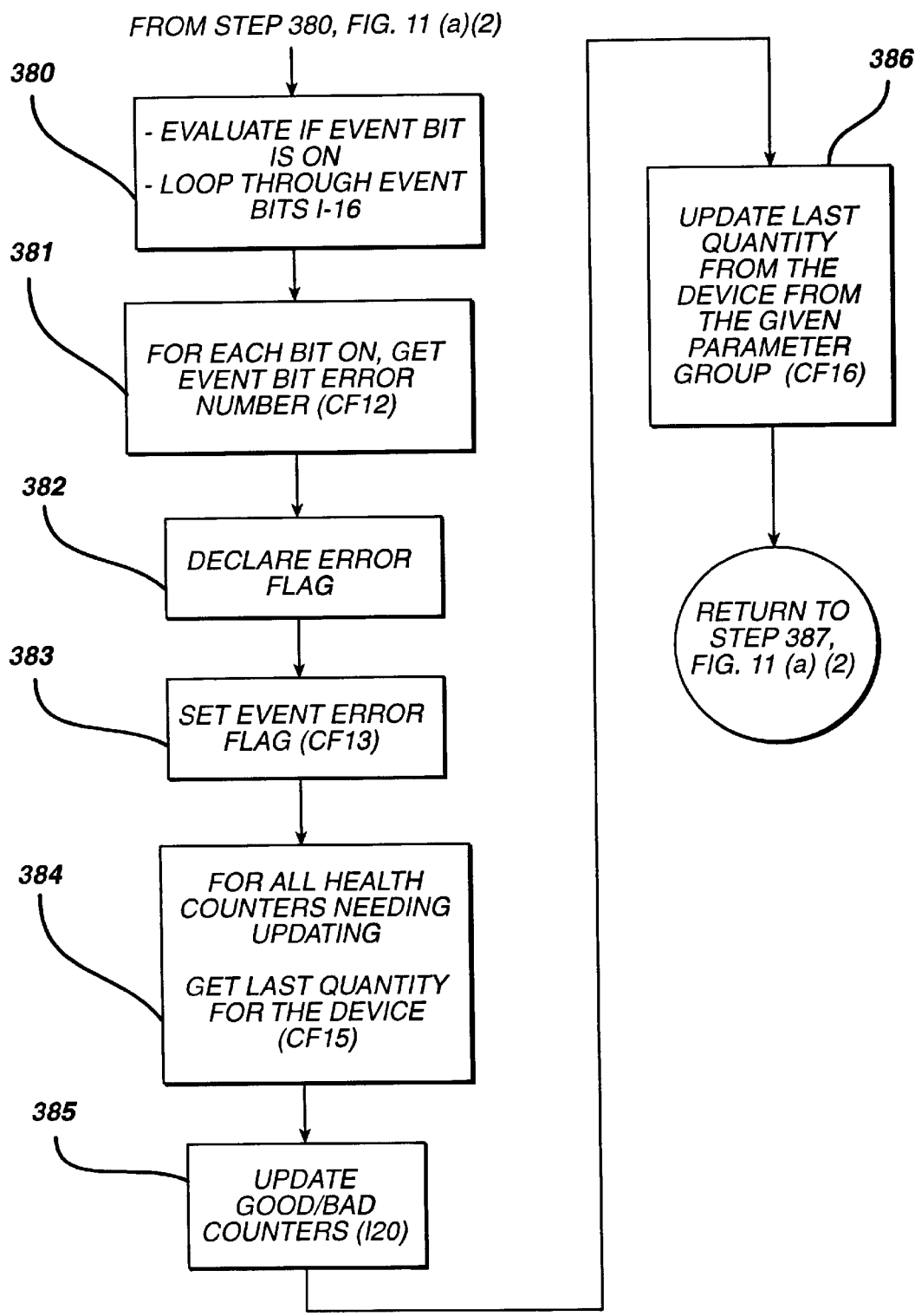
FIGS. 12(*a*)(1) and 12(*a*)(2) together illustrate the process for evaluating parameter data and FIG. 12(*b*) illustrates the process for evaluating event type data.

After evaluating the type of each parameter, a determination is made as to the parameter grouping (GMP Critical, Process Critical, or other). As shown as step 280 in FIG. 11(a), a determination is made as to if the parameter is a GMP Critical parameter or Process critical parameter. If the parameter is a GMP or Process Critical parameter, then a routine for processing the parameter data is performed at step 360 as shown in FIG. 12(a). If the parameter is not a GMP or Process Critical parameter, then it is an event type data and the routine for processing the event type data is performed as shown at step 380 in FIG. 12(b).

Process Parameters

The routine for processing the parameter data is illustrated in FIG. 12(a). Specifically, this routine processes the parameter data for SQC, Dead Band checking and Circular log entry purposes.

For GMP_Crit type data, a determination is made as to whether the GMP_CRIT flag has been set as indicated at step 360. If the GMP_CRIT flag has been set, then, as indicated at step 362, a file is opened and the GMP critical parameter information (i.e., parameter name, type, index, date, etc.) is logged to the GMP Critical file. It should be understood that for each parameter, three (3) counters exist that are updated by the PCS. These counters are the read, frequency, and skip counters and are registers that are configured by operators at the operator interface for determining when data for SQC is to be retrieved for trending and SQC purposes.

Thus, at step 365, the frequency interval counter for the parameter is incremented. Then, at step 366, a determination is made if the current frequency count is greater or equal to the count at monitoring frequency (interval). If the current frequency count is not greater or equal to the count at monitoring frequency (interval), then the parameter processing will return to retrieve the next parameter for evaluation (FIG. 11(a)). If the current frequency count is greater or equal to the count at monitoring frequency, then the current frequency count is reset to zero (0) at step 367, and the current skip count is incremented at step 368. Then, at step 369, a determination is made if the current skip count is greater than the skip count at the monitoring frequency for the device. If the current skip count is not greater than the skip count at the monitoring frequency, then the parameter processing will return to retrieve the next parameter for evaluation FIG. 11(a)). If the current skip count is greater than the skip count at the monitoring frequency, then the value is put into the read array at step 370. Then, at step 371, the read counter is incremented. A final determination is made at step 372 as to whether the current read count is greater than the read count at the monitoring frequency for the device. If the current read count is not greater than the read count at the monitoring frequency, then the parameter processing will return to FIG. 11(a) to read the next parameter. If the current read count is greater than the read count at the monitoring frequency, then SQC and Dead band checks are made as follows: First, at step 373, a subgroup calculation is made, and, a subgroup data point is added to the dataset of the SQC process by implementing interprocess message call (A10) if a data subgroup is completed. Then, at step 374, the actual value is checked to determine whether it is within dead band limits, i.e., if the absolute value of the difference between the current actual parameter value and the previous value is greater than a predefined limit. If the current value exceeds the dead band limit, the value is entered in the FIFO circular log by calling a predetermined message that writes the value to the Circular log at step 375. Next at step 376 the current skip counter and current read counter is reset to zero are reset to zero (0).

From the determination at step 281, if the data to be processed is determined to be event type data, then, as shown as step 380, FIG. 12(b), a loop is entered to evaluate the status of each bit, particularly, as to whether any event bit (of preferably, a 16-bit word) is set, and, for each bit that is set, obtaining the error number associated with the given event bit by implementing message call (CF12) at step 381. Implementing message (CF12) returns a flag indicating whether or not an error is already outstanding for the particular event bit. If, an error is found corresponding to the particular bit set, then, at step 382, an error argument is assigned, and, at step 383, for the given device, event index, and bit number, the outstanding error flag is set accordingly by implementing message call (CF13).

Next, a determination is made as to whether the linemanager count updates is to be updated. As determined at step 276 (FIG. 11(a)), if linemanager count update is to be made, then for the given parameter group (Good_Ct_A, Good_Ct_B, Good_Ct, Bad_Ct_A, Bad_Ct_B, Bad_Ct), the last quantity from the device is retrieved by CM FTB call (CF15) at step 384, and a message (I20) is then sent to the line manager to update the good and bad counter records in the LINESTAT and MASTER_LOT_YIELD tables at step 385. Then, for the given parameter group, the last quantity from the device is updated by CM FTB call (CF16) at step 386 for line monitoring views.

After processing the current event, GMP and Process critical parameter for the particular device, the process returns to step 387, FIG. 11(a), where the index "i" is incremented and the next parameter value is evaluated in the same manner as described above, at step 387, FIG. 11(a), after processing the GMP critical, Process critical and event data, PLC Interface As mentioned above, each of the Cell monitors include one or more PLC Interface processes whose primary responsibilities include: interfacing directly to a respective process PLC; polling at regular intervals, the device data which is then stored in the CM FTBs; verifying data from the device (via Handshake register in the PLC); and, updating the PCS device health counter register. Specifically, in view of FIG. 2 above, PLC polling includes the sending of a message via the RS-232 to the Unilink Host Adapter to request the collection of a block of word or floating point addresses from the PLC memory locations. The Unilink Host Adapters, in turn, request the information from the NIM via the Ti-way.

Figure 8:
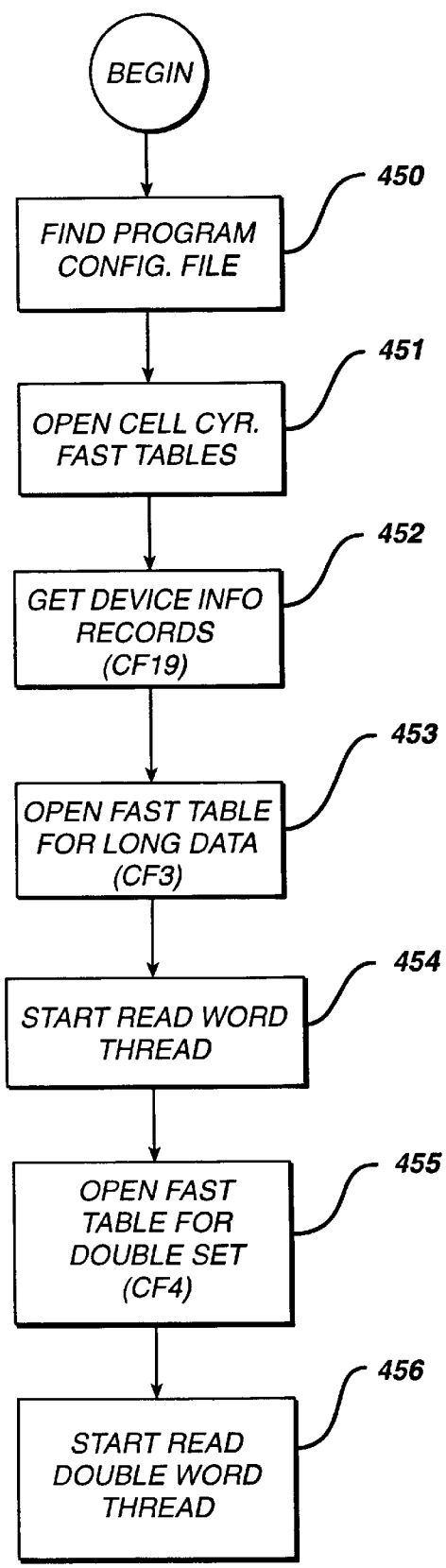
FIG. 8 illustrates the PLC interface software process overview.

As shown in FIG. 8, the first step 450 of the PLC interface process is to read its configuration file, i.e., read all the "CFG.*" including the device ID the interface is responsible for, the PLC data handshake address and health counter word address, etc. Next, at step 452, all of the Cell Monitor Fast tables (element 129, FIG. 4) that receive process parameter information from the PLC devices (PLC I/F 175, FIG. 4) are opened by the message call (CF1). Then, for the given device, the device information record is obtained from the DEVINFO Table (CF19). Next, at step 453, the device index table which hold the word values from the device is opened by implementing CM FTB message call (CF3). Then, at step 454, the read word thread is activated to read the word data block from the device. Next, at step 455, the device index table which hold the double word values from the device is opened by implementing CM FTB message call (CF4). Then, at step 456, the read double word thread is activated to read the double word data block from the device.

As shown in steps 454 through 458, in FIG. 14(s), the data acquisition thread is started to read word data blocks from the device. The first step, is to begin PLC polling of word block which is subject to start address, block size, and polling rate variables. Then, for the size of the word block, data is written to the long fast tables by implementing CM FTB message (CF11). Likewise, as shown in steps 456 through 460, in FIG. 14(t), the data acquisition thread is started to read double word data blocks from the device. The first step, is to begin PLC polling of floating point blocks which are subject to start address, block size, and polling rate variables. Then, for the size of the word block, data is written to the double fast tables by implementing CM FTB message (CF10).

Operator Interface

In the preferred embodiment, as shown in FIG. 4, each of the Audit stations, Line monitor, and Cell monitor stations include an operator interface 135 which is the process by which operators and other personnel interact with PCS. The Cell management functions provided by the operator interface 135 include: activation and completion of orders for the various operations throughout the system; display and request sign-off verification of operating setup instructions; view/monitor capability of system devices (e.g., PLCs), and, log book entry for allowing technicians to log activities and problems with quick recall features. The operator interface 135 additionally provides the following Line management activities: view line status (device, in-process orders, PRMS pending orders); view production reports; and, view/print batch records. Additionally, data entry for both defect and measurement audits are provided via operator interface.

Figure 9:
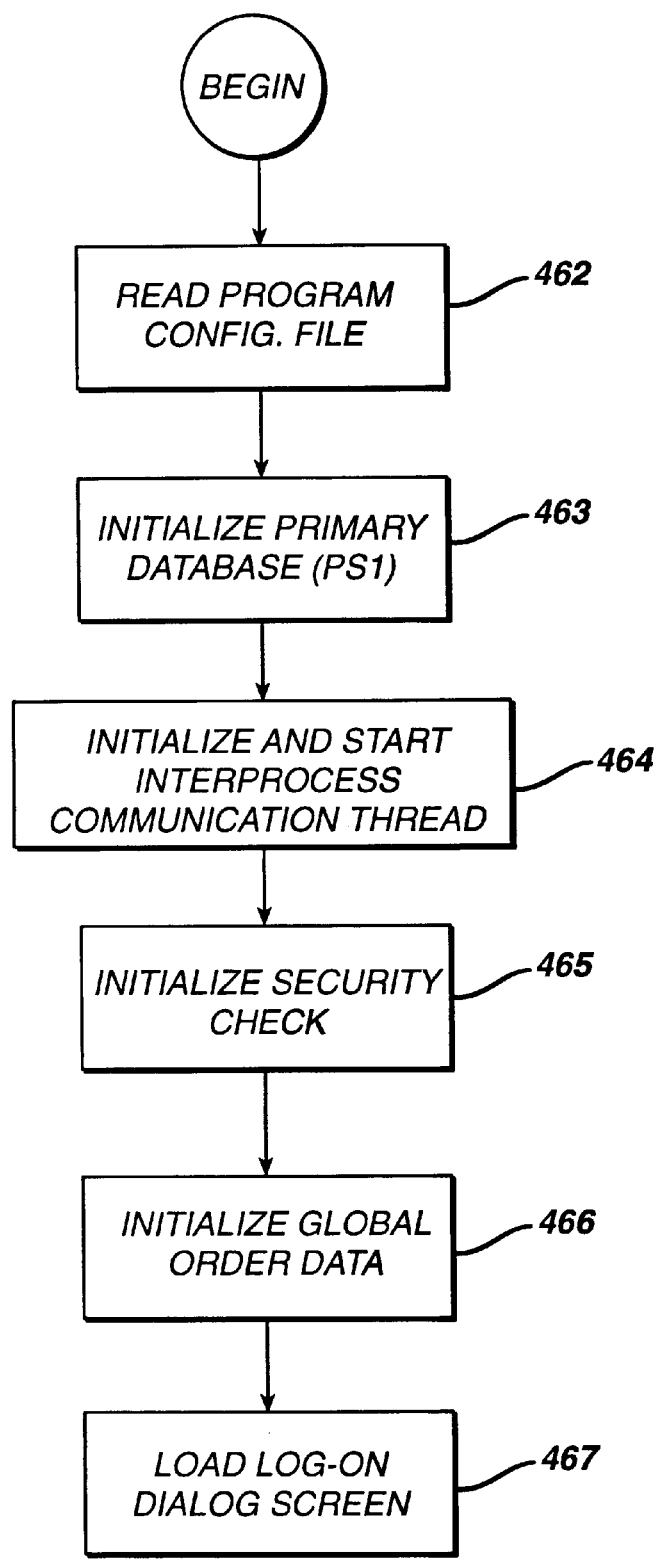
FIG. 9 illustrates the Operator Interface software process overview.

FIG. 9 illustrates the general operator interface process 135. As shown in FIG. 9, the first step 462 of the Operator Interface ("OPIF") process is to read its configuration file, i.e., read all the "CFG.*" global data variables, files, flags, drive paths, and indexes and screens utilized during the OPIF process. Next, at step 463, the database message call (PS1) is made so that the primary database is initialized. Then, at step 464, the Inter-process Communications thread is initialized and the inter-process message receive thread is started as will be explained below. Another OPIF thread, the Security check is initialized at step 465, for verifying the user and storing the user password. In the preferred embodiment, all operator technicians will be prompted for their user id and passwords before they initiate any processes (e.g. entering batch record information, performing lot changeover, etc.). Finally, all global order data are initialized and accessed from the line manager at step 466. This global data is retrieved by IPCOM receive send messages when order management processes are viewed for activation or completion.

After all global data is initialized, then, as indicated in FIG. 9 at step 467, the Log-on dialog box, as shown in FIG. 13, is displayed on an operator interface screen. As shown in FIG. 13, the log-on screen prompts the operator to enter, by mouse, keyboard, or touch-screen control, his or her User ID and password for security validation, and, the team that the operator belongs to.

Interprocess Communication Receive Message Thread

FIGS. 14(a)–14(c) generally illustrate the IPCOM Receive Send Message process. The first step 1100 is to perform a security check on the user and store the user ID. As shown in FIG. 14(a), step 1100, the interprocess message (A5) is used to communicate user validation with the security process 163. Once the user is validated, the team that the user belongs to is communicated to the line manager by the interprocess message (I6) at step 1102, and, the main menu dialog screen as shown in FIG. 15 is displayed at step 1104.

As shown in FIG. 15, the main menu 275 is displayed which enables the user to access the following PCS functions that correspond to decisions branches in FIG. 14(a): the Order Management menu 300 if selected at step 1105a in FIG. 14(a) allows the user to activate/complete/view orders at different parts of the production line; the Raw Material Changeout menu 400 if selected at step 1105b, allows the user the ability to record raw material usage by lot number; the Audit menu 500 if selected at step 1105c, allows the user to select the type of audit (defect or measurement) that is to be performed, and then loads the associated audit screen; the Add Log entry menu 600 if selected at step 1105d, allows the user to manually note events that are not automatically collected by the system; the Batch Record/Lot Closure menu 700 if selected at step 1105e, is where the user views, prints, or closes the batch record for split lots or master lots; the Line Status menu 800 if selected at step 1105f, shows the current status, quantity, or yield of all orders being built on the line; the Device Menu 850 displays the device menu if selected at step 1105g; the Utility menu 900 if selected at step 1105h allows access to various system utility functions. The Injection Mold Tag Entry menu 950, if selected at step 1105i in FIG. 14(b), is where the user updates the mold die changeout information. Each of these menu screens and corresponding processes will be explained in further detail hereinbelow.

Order Management

As shown in FIG. 14(a), if the order management screen is selected, then the Order management Menu screen 300 is displayed as indicated at step 1106a. The Order Management menu 300 screen, as shown in FIG. 16, enables the user to access order management information for the Injection mold, Lens Fabrication, Hydration (IM, LF, HY) processes, as indicated at step 1107a, the Post Hydration and the Labeler (PH, Labeler) processes, as indicated at step 1107b, or, the Sterilization/Secondary Packaging (Steri, SecPkg) processes, as indicated at step 1107c in FIG. 14(e).

If the operator selects the IM LF HY selection 301 from the Order management menu 300, then, at step 1108a in FIG. 14(d), the order management screen 301 for the injection mold, lens fab, and hydration cells, is loaded and displayed with the current active order information. As shown in FIG. 17(a), this screen includes a listbox 315 having updated information for the number of pending orders 310 from the Host PRMS, and, a listbox 316 for the current active orders 311 in the Injection Mold, Lens Fabrication and Hydration cells. As shown at step 1109 in FIG. 14(d), this information is obtained by the interprocess message call (I1) to the line manager fast tables which functions to update order management screen to include global data such as: number of current pending orders from PRMS, array of records for the pending PRMS orders; and, the current active orders from Injection Mold, Lens Fabrication and Hydration cells. The update IM LF HY order screen process as shown at step 1110 functions to update all the fields and list boxes on the order management IM LF HY screen, and, additionally, enables or disables the "Activate Next Order" and "Complete Order" push buttons as respectively shown as boxes 313 and 314 in FIG. 17(a). Similarly, if the operator selects the PH/Labeler selection 302 from the Order management menu 300, then, at steps 1115 through 1117 in FIG. 14(d), the order management screen at the post hydration and labeler cells is loaded and displayed with the current active order information. As shown in FIG. 17(b), this screen will include a listbox 324 having updated information for the current active orders in hydration, a listbox 325 having updated information for the current active orders in post hydration, and, a listbox 326 having updated information for the current active orders at the labeler. As shown as step 1116 in FIG. 14(d), this information is obtained by the interprocess message call (I12) to update the order management screen to include global data such as: the current active orders in post hydration and the labeler; and, the current split/lot order at the labeler. The update PH/Labeller order screen process as shown at step 1117 functions to update all the fields and list boxes on the order management PH Labeller screen, and additionally enables and disables all "Activate Next Order" push buttons 318, 319, "Complete Order" push buttons 321,322 and, "Split Lot" and "Complete Split Lot" push buttons as shown as boxes 327 and 328 in FIG. 17(b).

Activate Order at IM, LF, HY, PH and Labeler

As shown in FIG. 14(d) at step 1111, if an operator selects the current pending order from the PRMS schedule (at injection mold cell), to be activated at the injection mold, then a determination is made at step 1112 to determine if the selected order is expected based on date and priority. If the selected order is not expected, then the operator is prompted if he/she wishes to continue or return to the order management menu screen at step 1113. The process then proceeds to step 1114 to obtain operator setup instructions and sign off data, as explained below. If the user selects any of the "activate next order" push buttons to activate an order for the LF, HY, PH, or Labeller, as indicated at step 1118 then the process directly proceeds to step 1114 to obtain operator setup instructions and sign off data.

At step 1114, for any selected process activated, primary database SQL calls (PS3) and (PS4) are made to obtain product SKU records and Instruction setup records, respectively. Then data from these records are stored in global variables and passed to the setup/changeover instruction dialog for display on the screen (not shown). This instruction dialog box enables the user to ensure proper setup for the order to be processed and must signoff after all instruction procedures are performed or verified.

After signing off from the setup instruction dialog at step 1114, a determination is made as to whether the system is in automatic or manual mode. In manual mode, there is no device connection as indicated at step 1120 in FIG. 14(*d*) and the process continues to step 1129. If in automatic mode, then devices are connected as indicated at step 1121, and the software revision and checksum values in the database tables for each controlled device is compared to the actual software revision and checksum values of the device, as indicated at step 1122. For instance, if a new order for injection molding is activated, then information from the front curve PLC, base curve PLC and the Primary Packaging PLC is verified. Additionally, the FC IM controller, BC IM controller and Primary Packaging controller information is verified. If an order for lens fabrication is activated, information from the FILL ASSY PLC, and Cure_Demold PLC is verified. If an order for Hydration lens fabrication is activated, information from the Hydration PLC is verified. If an order for Post Hydration is activated, information from the Post_Hy_1 PLC and Post_Hyd_2 PLC is verified and if an order for the Labeler is activated, information from the sealing PLC is verified. When any of the software revision and checksum values in the database tables for each controlled device matches the actual software revision and checksum for the device, then the values are updated to the BATCH_DEV_REV table as indicated at step 1125 in FIG. 14(*d*).

After all the device software revisions and checksums have been verified, then, as shown at steps 1127 through 1128 in FIG. 14(*d*), messages are called for comparing the GMP set point ranges from the database with the actual ranges for each device and verifying that the setpoints are within the correct ranges. Furthermore, updated setpoint data are written to the BATCH_GMP_SP table. Specifically, at step 1126, a primary database SQL call (PS11) is made to retrieve the device configuration records and SQL calls (PS15 and PS16) are made to retrieve all the default GMP records for the particular devices used to process the selected order. For instance, if a new order for injection molding is activated, then GMP SP record information for the front curve PLC, base curve PLC, Primary Packaging PLC, the FC IM controller, BC IM controller, and, the Primary Packaging controller information is retrieved. If an order for lens fabrication is activated, GMP SP information for the FILL ASSY PLC, and Cure_Demold PLC is retrieved and if an order for Hydration lens is activated, GMP SP information from the Hydration PLC is retrieved, as above. Then, as indicated at step 1127 in FIG. 14(*d*), a primary database SQL call (PS18) is made to retrieve SKU_GMP_exception data for a determination if there is an exception record based on the SKU. Next, as indicated at step 1128, a comparison is made if the actual GMP setpoints are in the configured ranges. Specifically, an interprocess message (I3) is first sent to the Cell Manager to get device parameter data for the particular device and the comparison is made with the configured ranges. If the device parameter data that is returned is not within the GMP set point range, then an error message is displayed that the GMP setpoint is out of range for the SKU. The operator will then be prompted to retry and repeat the verification, to override and use the setpoint value, or, abort the order activation. If the operator chooses to cancel, then a primary database SQL call (PS17) is made to close the table for the default GMP SP. If the operator chooses to retry then the records are closed, reopened and compared in the manner described above. If the setpoint value is verified or the operator chooses override, then, as indicated at step 1128, a record for the given parameter is written to the BATCH_GMP_SP table 246 by the primary database SQL call (PS19).

In the next step 1129 of FIG. 14(*d*), an interprocess message (I2) is sent to the Line Manager to activate the order (from PRMSPEND.FTB) if the injection molding order is activated, or, a message (I5) is sent to the Line Manager to activate the order (from table FCLFHPHL.FTB) if an LF, HY, PH, Labeller order is activated. The (I2) and (I5) line manager activation of respective injection mold or cell monitor orders messages are explained in further detail below. For each process activated, a reply is received from the Line Manager indicating whether the order activation was successful. If the order activation was successful as determined at step 1130, then, the sign off information is written to the BATCH_SUI table by the SQL message call (PS10) as shown at step 1131. Finally, at step 1132, an interprocess message (I4) is sent to the Cell Manager to initialize and start a new master lot. If the order activation was not successful, then an error message is displayed at step 1135.

Activate Split Lot from Labeler

As indicated in FIG. 17(*b*), if the Split Lot push button 327 from the PH Labeler order management screen is selected, then the process steps 1140 through 1153 of FIG. 14(*d*) are performed. Specifically, step 1141 includes the steps of performing primary database SQL calls (PS3) and (PS4) to obtain product SKU records and instruction setup records, respectively. From these records, the current split lot number is checked to see if the limit is reached at step 1142. The data from these records are stored in global variables and passed to the setup/changeover instruction dialog for display on the screen. As discussed above, this instruction dialog box enables the user to ensure proper setup for the split lot order to be processed, as shown in step 1142. Further, as shown at step 1145 in FIG. 14(*d*), and illustrated in FIG. 17(*c*), a dialog box is displayed for the user to verify the master lot number and to enter information such as the lot expiration date, the quantity of lenses at the labeler, and, the split lot number, etc., which are saved in variables. Particularly, from the current date, an expiration date is calculated for the new lot to be split from the master. Additionally, the next split lot number may be changed by the operator as follows: if the "+" key 331 in FIG. 17(*c*) is selected, the next split lot number is incremented by one; if the "−" key 332 is selected, the next split lot number is decremented by one; and, if the "OK" key is selected, an SQL call (PS20) to the primary database is made to verify that the split lot number has not been used.

After entering the split lot expiration date and label quantity, a determination is made as to whether the system is in automatic or manual mode. In manual mode, there is no device connection as indicated at step 1146 in FIG. 14(*d*) and the process continues to step 1150. If in automatic mode, the steri/secpkg devices are connected as indicated at step 1147, and an interprocess message (I8) is sent to the Cell Manager to retrieve the lot number, expiration date, and quantity from the sealing PLC at step 1148. The values obtained from the PLC's are compared with the expected values calculated above. If there is an error, i.e., the values do not match, then an error will be displayed at step 1149 and the split lot activation will be cancelled.

In the next step 1150 of FIG. 14(*d*), an interprocess message (I9) is sent to the Line Manager to activate the split lot order (from LABELSL.FTB) for the labeler, a process described in further detail below, which will return an indication of whether the split lot order was successfully activated. As determined at step 1151, if the split lot order was successfully activated, then, the sign off information is written to the BATCH_SUI table by the SQL message call (PS10) as shown at step 1153, and if not, an error message is displayed.

Complete Order at IM, LF, HY, PH, Labeler

Referring back to FIGS. 17(*a*) and 17(*b*), if the operator selects either of the complete active order buttons for injection molding (button 314), or, for LF HY PH or Labeler (buttons 321 or 322), then, the following steps (beginning at step 1200) are performed as illustrated in FIG. 14(*f*): First, at step 1201, a security check is made to validate the security level of the user. Then, at step 1202, an interprocess message (I7) is sent to the Line Manager to complete the order, as will be explained in further detail below. After a reply is received from the Line Manager, a determination is made at step 1203 if the order was successfully activated. If an order was not successfully activated, then, the process terminates at step 1204. If an order was successfully activated, then the interprocess message (I7) is sent to the Cell Manager at step 1205 to complete the master lot which entails the invoking of cell manager fast table call (CF17) to update the connected device's generation record with a new master lot number and SKU. Additionally, a message is invoked to close all SQC datasets in the SQC process for the given device (A11).

Completing Split Lot Order at Labeler

As shown at step 1200 in FIG. 14(*f*), if the operator selects the "complete split lot" button (FIG. 17(*b*)) at the labeler (button 328), then a determination is made as to whether the system is in automatic or manual mode. In manual mode, there is no device connection, as indicated at step 1207 in FIG. 14(*f*), and the default quantity for the sterilizer tray loader is retrieved at step 1208. If in automatic mode, as indicated as step 1209, an interprocess message (I14) is sent to the Cell Manager to get the quantity in the tray loader for the split lot being completed by the labeler as retrieved by invoking interprocess message call (CF8) at step 1210. Next, at step 1211, the operator is prompted to verify the quantity of lenses placed into the tray loader for the split lot, and, the operator's security level is checked at step 1212. If the operator is an invalid user, then the process will return to the order screen. If the operator is authorized, then, at step 1213 an interprocess message (I11) is sent to the Line Manager to complete the split at the labeler as will be explained in further detail below.

Activate Order at STERI, SECPKG

Referring back to FIG. 14(*e*) and FIG. 16, if the operator selects the sterilizer secondary packaging selection 303 from the Order management menu 300 the order management screen for the sterilizer secondary packaging cells is loaded and displayed (step 1107*c*) with the current active order information. As shown in FIG. 17(*d*), this screen will include a listbox 335 having updated information for the number of pending split lot orders from the labeler, a listbox 336 for the current active orders 311 in the sterilizer cell, a listbox 337 for the number of pending lots for secondary packaging from the sterilizer, and, a listbox 338 for the current active orders in the secondary packaging.

As shown at step 1155 in FIG. 14(*e*), this information is obtained by the interprocess message call (I13) to update the order management screen with the global data including: pending lots for the sterilizer; active split lots for the sterilizer; pending split lots for the secondary packaging; and, active split lots at the secondary packaging. Next, the update Steri/secpkg screen process is invoked at step 1156 which functions to update all the fields and list boxes on the order management Steri/secpkg screen, and additionally enables and disables all "Activate Next Order" push buttons 341, 342, "Complete lot" push buttons 343,344 and, "Abort Run" and "Scrap/Removal" push buttons respectively shown as boxes 345 and 346 in FIG. 17(*d*).

As shown at step 1158*a* in FIG. 14(*e*), if the user selects and activates split lots for the sterilizer, then an interprocess message call (I15) is invoked to access current pending lot records for the sterilizer from the PENDSTER.FTB table. Then, a determination is made at step 1159 if the selected pending lots have the same setup instructions. Specifically, for the selected process activated, primary database SQL calls (PS3) and (PS4) are made to obtain product SKU records and Instruction setup records, respectively. The SUI data from these records are stored in global variables and compared with setup information from the instruction set table. If the setup instruction information is the same, then the process proceeds to pass the global variables to the setup/changeover instruction dialog for display on the screen (not shown). As shown at step 1160, this instruction dialog box enables the user to ensure proper setup for the order to be processed and must signoff after all instruction procedures are performed or verified. If the setup instruction information is not the same, then the activation order information will be cancelled at step 1161.

If the user selects and activates split lot order for secondary packaging 1158*b*, then an interprocess message call (I17) is invoked to access current pending lot records for the sterilizer from the PENDSCPK.FTB table. Then, at step 1160, the process proceeds to pass the global variables to the setup/changeover instruction dialog for display on the screen as described above.

Whether the lot is being activated from the secondary packaging cell or sterilizer cell, after signing off from the setup instruction dialog, a determination is made as to whether the system is in automatic or manual mode. In manual mode, there is no device connection as indicated at step 1162 in FIG. 14(*e*) and the process continues to step 1170. If in automatic mode, then devices are connected as indicated at step 1163, and the software revision and checksum values in the database tables for the sterilizer PLC device, or, the secondary packaging PLC device, is compared to the actual software revision and checksum values of the device, as indicated at step 1164. When the software revision and checksum values in the database tables for the PLC device matches the actual software revision and checksum for the device, then the values are updated to the BATCH_DEV_REV table 244 as indicated at step 1165 in FIG. 14(*e*).

After the device software revisions and checksums have been verified for the particular device, then, as shown as steps 1166 through 1169 in FIG. 14(*e*), messages are called for comparing the GMP set point ranges from the database with the actual ranges for the steri PLC device (or secondary packaging PLC) and verifying that the setpoints are within the correct ranges. Furthermore, updated setpoint data are written to the BATCH_GMP_SP table. Specifically, at step 1166, a primary database SQL call (PS11) is made to retrieve the device configuration records and SQL calls (PS15 and PS16) are made to retrieve all the default GMP records for the particular device used to process the selected order. For instance, the GMP SP record information for the sterilizer PLC or secondary packaging PLC is retrieved. If an order for sterilization is activated, GMP SP information for the steri PLC is retrieved and if an order for secondary packaging is activated, GMP SP information from the secondary packaging PLC is retrieved, as above. Then, as indicated at step 1167 in FIG. 14(*e*), a primary database SQL call (PS18) is made to retrieve SKU_GMP_exception data for a determination if there is an exception record based on the SKU. Next, as indicated at step 1168, a comparison is made if the actual GMP setpoints are in the configured ranges. Specifically, an interprocess message (I3) is first sent to the Cell Manager to get device parameter data for the particular device and the comparison is made with the configured ranges. If the device parameter data that is returned is not within the GMP set point range, then an error message is displayed that the GMP setpoint is out of range for the SKU. The operator will then be prompted to retry and repeat the verification, to override and use the setpoint value, or, abort the order activation as explained above with respect to steps 1176 through 1179 of FIG. 14(*e*).

In the next step 1170 of FIG. 14(*e*), either the interprocess message (I15) is sent to the Line Manager to activate the sterilizer lots order (from PENDSTER.FTB) if the secondary packaging order is activated, or, a message (I17) is sent to the Line Manager if the secondary packaging order (from table PENDSCPK.FTB) is activated.

After a reply is received from the Line Manager, a determination is made at step 1172 if the order was successfully activated. If an order was successfully activated, then, the sign off information is written to the BATCH_SUI table by the SQL message call (PS10) as shown at step 1173. Finally, an interprocess message (I4) is sent to the Cell Manager to initialize and start a new master lot at step 1175.

Abort Steri Run

Referring back to FIG. 17(*d*), if the user selects the "abort run" push button 345, then the following steps are performed as shown in FIG. 14(*e*): At step 1177, a security check is made to validate the security level of the user. Then, at step 1178, the user is prompted to enter the aborted steri run number and the reason code for the termination by accessing the STERI_ABORT_CODES table 226 of primary database by SQL message call (PS24) to retrieve the list of abort reasons which can occur at the sterilizer. Once chosen, a sterilizer abort code(s) is associated with a particular sterilization run number. Finally, at step 1179, an interprocess message (I16) is sent to the Line Manager to request termination of the sterilization run lots as will be explained in further detail below.

Complete Steri/SecPkg Order

From the STERI order management screen 303 (FIG. 17(*d*), if the operator selects the "complete lot steri" push button 343 then the following steps beginning at step 1180 are performed as shown in FIG. 14(*g*): At step 1181, a security check is made to validate the security level of the user. If an invalid user requests lot completion, the process will return to the screen. Then, at step 1182, the user is prompted to enter the steri run number. Finally, at step 1183, an interprocess message (I10) is sent to the Line Manager to request completion of the active lots at the sterilizer as will be explained in further detail below. If the operator selects the "complete lot secpkg" push button 344 (FIG. 17(*d*)), then the following steps are performed as shown in FIG. 14(*g*): At step 1184, a security check is made to validate the security level of the user. Then, at step 1185, a screen is displayed and the user is prompted to enter the quantity of lens packages going to distribution, i.e., the quantity of lens packs started minus the quantity scrapped at secondary packaging. Next, at step 1186, an interprocess message (I21) is sent to the Line Manager to return the quantity scrapped (i.e., quantity released from the sterilizer) for the current split lot which is stored in the SCPKACTV.FTB table. This value is obtained from the SCPKACTV table by invoking LM FTB call (LF22). The values from the table are compared to the value entered by the operator, their discrepancy is evaluated, and if there is a difference, the operator is prompted to enter a discrepancy note at step 1187. Finally, at step 1188, an interprocess message (I18) is sent to the Line Manager to complete the lot at secondary packaging as described in further detail below.

Referring back to the STERI order management screen 303 of FIG. 17(*d*), if the operator selects the "scrap/removal" push button 346 then the scrap log screen will be displayed to allow for scrapping of product and for recording of data associated with scrapped product at any device, as will be explained in further detail below.

Raw Material Changeout

As shown in the operator interface communication thread of FIG. 14(*a*), if the Raw Material Changeout menu option is selected at step 1105*b*, the Raw Material Changeout screen 400 is loaded and displayed at step 1401. As shown in FIG. 18, this screen includes a select material listbox 401 that includes a list of all raw material records used in a lot, a "view setup" push button 402 to enable an operator to view raw material changeout instructions, entry fields 404, 405, and, a "save" button 403 to save the raw material changeout information. Specifically, as shown at step 1405 in FIG. 14(*h*), the list of all raw material records is obtained from the BATCH_RAW_MATL database table 242 by the SQL call (PS34) and is displayed in the listbox for operator selection. Then, after highlighting the raw material desired, for e.g. the de-ionized water 406 in FIG. 18, the operator has the option to view the setup instruction for the raw material changeout, as indicated at step 1406. If the operator performs raw material changeout, then the raw material record data in the form of setup instructions is passed as global variables to the setup/changeover instruction dialog for operator display at step 1407. Finally, at step 1408, the operator performs each instruction to ensure proper changeover while checking boxes after finishing each instruction step, and further signing off after an operator authorization (security) check is performed at step 1409.

If the "save" push button 403 (FIG. 18) is selected, the lot number of the particular raw material selected is entered in an entry filed 404 at step 1411 and compared with the current raw material for the lot in entry filed 405. If the lot numbers match, then, based on the operation (IM LF HY PH L SECPKG), the master lot number and split number are properly assigned, as indicated at step 1412 in FIG. 14(*h*). Further, at step 1414 the updated data are written to the LAST_USED_RAW_MATL database table 238 and the BATCH_RAW_MATL database table 242 by the SQL call (PS39). Finally, at step 1415, an interprocess message (I19) is sent to the Line Manager to report the raw material usage data.

Audits

As shown in the operator interface communication thread of FIG. 14(*a*), if the Audit menu option is selected at step 1105*c*, the Audit Menu screen 500 is loaded and displayed at step 1425. The Audit Menu screen 500, as shown in FIG. 19, enables the user to select the audit type that is to be performed, e.g., the defect audit 501, indicated as step 1426*a* in FIG. 14(*a*), or, the measurement audit 502 indicated as step 1426*b*.

Defect Audits

If defect audit is selected, the defect audit screen 501 is displayed at step 1426*a*, FIG. 14(*i*), to provide for the entry of defect audit data. As illustrated in FIG. 20(*a*), this screen includes a select audit listbox 504 that includes a list of the audit types 524 to be performed, for e.g., customer audit; a select defects listbox 506 to display a list of the correct defect types 526 for the audit selected; a start audit push button 507 to start the audit selected; a complete audit button 508 to be selected when the audit is complete; and, a previous item push button 509 and next item push button 511 for allowing the user to display/update audit data for the previous item or next item, respectively. The master lot/split lot entry fields 510 are available for operator to enter master/split lot entry data, and, the "product name", "power", and audit "sample size" will be automatically displayed for the item being audited. Additionally, the "view pareto" button 513 is provided to allow the user to view a Pareto chart of all previously entered defect data for the given master lot and audit.

As indicated at step 1427 in FIG. 14(*i*), the defect audit process begins by filling the select audit box 504 with the list of audit records. For the defect audit, the list of audit records is obtained by SQL call (PS42) to the AUDIT_LIST table 216. Then, at step 1428, the audit is selected by highlighting the desired audit type in the select audit box. Note, that if the previous item push button 509 is selected at step 1430, then the user will be able to display/update audit data for the previous item (step 1431) and if the next item push button 511 is selected at step 1432, the user will be able to display/update audit data for the next item from the select audit list 504 at step 1433. For a given selected audit item, at step 1435, the list of the defect types is retrieved for display into the select defects listbox 506. These records are obtained by SQL call (PS43) to the AUDIT_DEFECT_LST table 218. The operator will then be able to select the defect(s) for a given item from the listbox 506 at step 1436. The start audit button 507 is then selected at step 1437. Before the audit is started, the user authorization is checked at step 1438. Then, the SKU for the master lot/split number is retrieved from the line monitor fast table by interprocess message call (122) at step 1439. Next, a product SKU record is obtained at step 1440 by a primary database SQL call (PS3) into the PRODUCT_SKU table 202, and at that point, the product name and power is displayed in the defect audit view screen 501. At step 1441, an SKU audit spec ID record is retrieved from the AUDIT SPECS table 220 for a given SKU and Audit ID by a primary database SQL call (PS45). If an audit spec ID is not found, a default audit spec ID is retrieved from the AUDIT_LIST table 216. For the given audit spec ID, an audit specs record is retrieved from the AUDIT_SPECS table 220 by a primary database SQL call (PS46) at step 1443.

Next, in order to later perform run rule checking, the previous stored data for this master lot/audit is obtained at step 1444. For example, this data will include the number of required points for run rule checking. Then, at step 1445, the SQL message (PS47) is called to retrieve all of the percent defective values from the BATCH_DEF_AUDITS table 248 for the given master lot and audit ID in order to check run rules for defect audits.

When the audit is complete at step 1446, the complete audit push button 508 is enabled, and, when selected, the following steps are performed: As shown at step 1447 in FIG. 14(*j*), the number in the sample that were defective is first calculated. Then, based on the sample size, the percent defective is calculated, as indicated at step 1448. Then, at step 1449, the audit completion date/time is assigned the current date/time. Then, at step 1450, a predetermined message call performed by the SQC process 128 (FIG. 4) is made to determine if the percent defective is within the specified limits. If the percent defective is not within the specified limits, then an error message is sent to the error handler at step 1451. If the percent defective is within the specified limits, then the run rules are checked at step 1455 by the predetermined host SQC message that performs a run rule check algorithm to return either a run rule good if the results are within run rule limits, or, a run rule violation message if the results are not within the run rule limits, as indicated at step 1456. If a run rule violation is determined, then an error message is sent to the error handler as implemented by interprocess message (A9). It should be mentioned that for each of the spec limit and run rule violations described above, an error number corresponding to predefined errors in the AUDIT_LIST table 216 is set, and the error will require an operator intervention.

Finally, as indicated at step 1457 in FIG. 14(*j*), a record is inserted into the BATCH_DEF_AUDITS table 248 by the SQL message (PS51). Then, as indicated at step 1458 in FIG. 14(*j*), a record is inserted into the BATCH_DEF_DETAIL table 249 by the SQL message call (PS52).

It should be noted that at any time, the audit may be cancelled by invoking the cancel audit command which is a push button 512 as illustrated in FIG. 20(*a*). When invoked, the memory locations for the local calculations are cleared and the rest of the select push buttons on the screen are disabled except for the start audit button. Additionally, a Pareto chart view screen for the defect data is available for display by invoking the view pareto button 513 in FIG. 20(*a*). As shown in FIG. 14(*k*), at step 1460, when selected, the SQL message call (PS53) is invoked to retrieve the Pareto data for the given master lot at step 1461, and, at step 1462, a predefined message residing in the host SQC process 128 (FIG. 4) is called to process the Pareto data (Pareto count, Pareto records) to generate the Pareto chart.

Furthermore, at any time during the audit, a free form comment window is available for writing comments that will be stored with raw audit data that is written to the disk. This feature is available by invoking the comment push button 514 as shown in FIG. 20(*a*).

Measurement Audits

As mentioned briefly above with respect to FIG. 2, means are provided for collecting measurement information manually for purposes of auditing product or raw materials so that a determination can be made that they are within specification. Raw material pieces or injection molded back or front curve mold pieces may be randomly taken for audit measuring. Measurements audits performed utilize the following instruments: Rheder Gauge for measuring Lens Center thickness; Comparator Gauge for measuring Base Curve thickness; ZYGO (Panametric) gauge for measuring peak/valley thickness; and, Lensometer for measuring lens Power.

As shown as step 1426b in FIG. 14(a), if a measurement audit is selected, the measurement audit screen 502 is displayed to provide for the entry of measurement values data. As shown in FIG. 20(b), this screen includes a select audit listbox 534 that includes a list of the audit types 536 to be performed, for e.g., center thickness audit; a MEASUREMENT entry field 549 used to enter in the actual measurement values; and, an Item Number measurement window 537 for displaying the measurement already taken. A "*" identifies when values are out of the specified upper or lower control limits. A start audit push button 538 is provided to start the audit selected; a complete audit button 539 is selected when the audit is complete; and, an Add Measurement push button 541 is selected to add the value in the Measurement field to the ITEM # MEAS. window. The Measurement field will be set to blank after the value is accepted. An edit item push button 542 is provided to allow the user to edit any value in the ITEM # MEAS window. The user selects/highlights the value they wish to edit then selects the edit button. An ITEM # EDIT window is displayed when the user select the Edit button, afterwards which the user enters the item number to be edited in the audit into the ITEM # field and enters the value to change in the MEASUREMENT. Then the OK button or the CANCEL is selected to return to the Measurement Audit window. The master lot/split lot entry fields 545 are available for operator to enter master/split lot entry data, and, the "product name", "power", and audit "sample size" will be automatically displayed for the item being audited. The Gage ID field 544 is displayed for the operator to enter the ID of the particular gauge being used for the audit. Additionally, the "view X-Bar R" button 546 is provided to allow the user to view an X-Bar R chart of measurement data for a given audit.

As indicated at step 1467 in FIG. 14(l), the measurement audit process begins by filling the select audit box 534 with the list of audit records. For the measurement audit, the list of audit records is obtained by SQL call (PS42) to the AUDIT_LIST table 216 at step 1468. Then, at step 1469, the audit is selected by highlighting the desired audit type in the select audit listbox. The start audit button 538 is then selected at step 1470. Before the audit is started, the user authorization is checked at step 1471. Then, the SKU for the master lot/split number is retrieved from the line monitor fast table by interprocess message call (I22) at step 1472. Next, a product SKU record is obtained at step 1473 by a primary database SQL call (PS3) into the PRODUCT_SKU table 202, and at that point, the product name and power is displayed in the defect audit view screen 501. At step 1474, an SKU audit spec ID record is retrieved from the AUDIT_SPECS table 220 for a given SKU and Audit ID by a primary database SQL call (PS45). If an audit spec ID is not found, a default audit spec ID is retrieved from the AUDIT_LIST table 216. For the given audit spec ID, an audit specs record is retrieved from the AUDIT_SPECS table 220 by a primary database SQL call (PS46) at step 1475. At the next step 1477, memory is allocated to hold all of the entered measurements. Then, in order to later perform run rule checking, the previous stored data for this master lot/audit is obtained at step 1479. For example, this data will include the number of required points for run rule checking. Then, at step 1480, the SQL message (PS50) is performed to retrieve all of the measurement value averages from the BATCH_MEAS_AUDITS table 247 for a given master lot and audit ID in order to check run rules for measurement audits.

When the audit is complete at step 1481, the complete audit push button 539 is enabled, and, when selected, the following steps are performed. First, at step 1482, the audit completion date/time is assigned the current date/time. Then, at step 1483, a spec limit check is made by a predetermined host SQC process 128 (FIG. 4) to determine if the average measurement value for the audit sample is compared to the average upper and lower limits from the audit specs table. If the average value is not within the specified limits, then an error message is sent to the error handler at step 1484. If the average value is within the specified limits, then the run rules are checked at step 1485 by a predetermined SQC message call that performs a run rule check algorithm that returns either a run rule good if the results are within run rule limits, or, a run rule violation message if the results are not within the run rule limits, as indicated at step 1486. If a run rule violation is determined, then an error is sent to the error handler as implemented by interprocess message (A9). Finally, as indicated at step 1487 in FIG. 14(l), a record is inserted into the BATCH_MEAS_AUDITS table 247 by the SQL message (PS54).

It should be noted that at any time, the audit may be cancelled by invoking the cancel audit command which is a push button 547 as illustrated in FIG. 20(b). When invoked, the memory locations for the local calculations are cleared and the rest of the select push buttons on the screen are disabled except for the start audit button. Additionally, the following items displayed in screen 502 of FIG. 20(b) including: "sample size", "item count", "maximum", "minimum", "average", "range", "number out of spec", "percent out of spec", are initialized to nullity.

An X-Bar,R chart view screen for the measurement data is available for display by invoking the View X-Bar,R button 546 in FIG. 20(b) and shown as step 1489 in FIG. 14(m). As shown in FIG. 14(m) the SKU for the master lot/split number is first retrieved from the line monitor fast table by interprocess message call (I22) at step 1490. Next, a product SKU record is obtained at step 1492 by a primary database SQL call (PS3) into the PRODUCT_SKU table 202, and at that point, the product name and power is displayed in the defect audit view screen 501. At step 1493, an SKU audit spec ID record is retrieved from the AUDIT_SPECS table 220 for a given SKU and Audit ID by a primary database SQL call (PS45). If an audit spec ID is not found, a default audit spec ID is retrieved from the AUDIT_LIST table 216. For the given audit spec ID, an audit specs record is retrieved from the AUDIT_SPECS table 220 by a primary database SQL call (PS46) at step 1495. At the next step 1496, an X-Bar Count variable is set, and the SQL message call (PS50) is performed to retrieve all of the measurement value averages from the BATCH_MEAS_AUDITS table 247 for a given master lot and audit ID. Finally, at step 1497, a predefined function residing in the host SQC process is called to process the X,Bar R data (X,Bar count, X,Bar Avg, X,Bar range) to generate the X,Bar R plot for display.

Furthermore, at any time during the audit, a free form comment window is available for writing comments that will be stored with raw audit data that is written to the disk. This feature is available by invoking the comment push button 548 as shown in FIG. 20(b).

As shown as step 1426c in FIG. 14(a), if the measurement audit sampling results is selected, the calculate audit results screen 550 is displayed to allow the operator to calculate the acceptability of audit samples taken based on the type of audit. As shown in FIG. 20(c), the calculation parameters entry box 551 contains the parameters upon which data is retrieved for the calculations. There are three methods for selecting the data: Master lot only, Master/Split lot combination, and Master/Split/Date combination, and the desired method is chosen by selecting one of the three radio buttons at the bottom of the Calculation Parameters group box 552 as illustrated in FIG. 20(*c*). Data may further be limited by selecting to limit the sample size. Selecting the desired audit is then accomplished by highlighting it in the manner described above with respect to the select area listbox defect audit screen. The Get Database Info button 555, retrieves the database information for the master lot that is currently in the user entered Master Lot entry field, and, data is displayed in the Database Information area 557 of the screen.

The user then has the option of selecting the Calculate Results button 558 to retrieve the database information for the master lot that is currently in the Master Lot entry field and then retrieves the data based on the Calculation Parameters. The results are then calculated and displayed in the Results area 559 of the screen. Furthermore, selecting the Print Results button 553, will allow the printing of the currently calculated results to the currently defined system printer or to a file and is enabled only if results have been 'calculated.

Add Log Entry

As shown in the operator interface communication thread of FIG. 14(*a*), if the Add Log menu option is selected at step 1105*d*, the Add Log Entry menu screen 600 is loaded and displayed at step 1501. The Add Log Entry Menu screen 600, as shown in FIG. 21 enables the user to manually note events that are not automatically collected by the system. Notes are based on a selected area from the selected area list box 602, for e.g., steri/sec Pkg., and, a selected category from the select category listbox 604, for e.g., tray load, and, the user has the option of selecting from a list of standard notes from listbox 606, or, choosing where the data is to be stored by invoking push button 608, for adding note to batch record, or, invoking push button 610, for adding the note to log book.

As indicated at step 1502 in FIG. 14(*n*), the add log entry process begins by filling the select area box 602 with the list of operational areas. The list of operational areas is obtained by SQL call (PS35) to the OPERATION_AREA table 228. Additionally, at this step, a default master lot number is assigned based on the cell ID. Then, at step 1503, the operational area is selected by highlighting the select area listbox. After selecting the area ID from which the user wishes to leave a note, the list of operational area category records is obtained by SQL call (PS36) to the AREA_CATEGORY table 231 at step 1504 and displayed in the select category listbox 604 (FIG. 21). Then, at step 1505, the category is selected by highlighting the select category listbox. After selecting the category, the list of category notes is obtained by SQL call (PS37) to the CATEGORY_NOTES table 233 at step 1507 and displayed at step 1508 in the select standard note listbox 606 for an operator to choose a standard note for display (FIG. 21). The multi-line edit area 611 (FIG. 21) may be highlighted to receive the operator note entry or note edit at step 1509.

After a note is entered, the user has the option of adding the note to batch record support, or, the log book. If the note is to be added to the batch record, as determined at step 1510, the operator is prompted to enter the current master/split lot number at step 1511. Then, at step 1513, the note is inserted into the SYSTEM_NOTE_LOG table 241 by SQL call (PS38). If the note is to be added to the log book, as determined at step 1510, a security check is first performed at step 1512 to validate the user and then the note is inserted into the SYSTEM_NOTE_LOG table.

Batch Closure

As shown in the operator interface communication thread of FIG. 14(*a*), if the Batch Closure menu option is selected at step 1105*e*, the Batch Closure menu screen is loaded and displayed at step 1550. The BatchRecord/Lot Closure screen 701, as shown in FIG. 22, enables the user to view the batch record for master/split lots. A split lot may be selected from the list of those requiring closure and both Master lots and split lots may be selected manually. Additionally, the operator may print out a copy of the master or split lot batch record to a printer (configurable). If a split lot that requires closure is selected to be closed via the CLOSE OUT LOT button 723, the option exists to print out a product release certificate.

Specifically, as shown in FIG. 14(*o*), the Lots requiring closure dialog window 705 displays a list of all the split lots awaiting closure. As shown in FIG. 14(*o*), the Lots requiring closure window is filled by first invoking message call (PS56) at step 1551 to open a cursor to retrieve the split lots ready for closure from the BATCH_PRIMARY table 245. Then, at step 1553, the split lot closure data is fetched from the table for display by invoking SQL message call (PS57), and the lot closure cursor is closed by call (PS58). At step 1554 in FIG. 14(*o*), the operator may select a split lot to close by highlighting the split lot requiring closure from dialog window, and, at step 1555, activating the Select Lot From List button 707 (FIG. 22). After selection, the Batch Record information window 709 (FIG. 22) will then display Batch Record information for the split lot selected.

As shown in FIG. 14(*o*), filling the batch record is accomplished by first obtaining the master lot and split lot numbers at step 1557, and then, invoking the call (PS59) to get the batch primary record from the BATCH_PRIMARY table 245 at step 1558. After inserting the header information into the Batch Record information window 709 (FIG. 22) at step 1559, the following additional information is inserted: raw materials used in the master/split lot by invoking SQL calls (PS60) (open cursor), (PS61) (fetch data), and (PS62) (close cursor) from the BATCH_RAW_MATL database table 242 as shown as step 1562; and, lot changeover information by invoking SQL calls (PS63), (PS64), and (PS65) from the BATCH_SUI database table 243 at step 1563; device software revision information by invoking SQL calls (PS66), (PS67), and (PS68) from the BATCH_DEV_REV table 244 as shown as step 1565; device GMP setpoint data by invoking SQL calls (PS69), (PS70), and (PS71) from the BATCH_GMP_SP table 246 at step 1567; measurement audit information by invoking SQL calls (PS72), (PS73), and (PS74) from the BATCH_MEAS_AUDITS table 247 at step 1569; defect audit information by invoking SQL calls (PS75), (PS76), and (PS77) from the BATCH_DEF_AUDITS table 248 at step 1571, and, defect audit detail information by invoking SQL calls (PS78), (PS79), and (PS80) from the BATCH_DEF_DETAIL table 249 at step 1573.

Referring back to FIG. 22, activating the ENTER LOT MANUALLY button 708 displays the MANUAL LOT ENTRY dialog which requires the user to enter the master lot number and activating a OK button (not shown) to display the Batch Record information for the entire master lot, including all split lot information, in the manner as described above. Entering the master lot with the split lot number and activating the OK button displays only the Batch Record information for that split lot. Additionally provided is a REPORTS button 718 for enabling operator display of Query Manager BATCH RECORD information for the selected batch/lot, a support data button 721 for displaying the SUPPORT DATA information for the selected batch/lot, the print button 725 for sending all the information to be displayed to the printer defined in the system configuration file or disk to a file, and, a close lot button 723 for closing out a lot. The system will request the user to enter his/her user ID and password and the security message will verify the user is authorized to close out the lot. Upon user validation, the system will display a message box asking if the user wishes to print PRODUCT RELEASE CERTIFICATE (not shown). If the user enters yes, a PRODUCT RELEASE CERTIFICATE will be printed.

Line Status

As shown in the main menu process of FIG. 14(*a*), if the Line Status option is selected at step 1105*f*, the Line Status screen 801 is loaded and displayed at step 1601. To fill the order screen, the interprocess message (I25) is invoked to obtain the line status information 802 (FIG. 23) from the line manager. The Line Status screen 801, as shown in FIG. 23, shows the current status of what the line is producing. Based upon current yields and the original order quantity, estimates 804 (FIG. 23) are calculated of how many additional items need to be built at the front curve molding cell.

Device Monitoring

As shown in FIG. 14(*a*), if the device status screen is selected at step 1105*g*, then the Device Menu screen is displayed as indicated at step 1650. As shown in FIG. 24(*a*), the Device Menu screen 850 enables an operator to select from the following choices: displaying the Device monitor screen 852; displaying the Automated Lens Inspection screen 853; displaying the Device Alarm Information screen 854; displaying the Device Yield Information screen 855; displaying the Device Word Information screen 856; displaying the Device Scrap Log screen 857; and, displaying a listbox 858 containing the devices for which GMP parameter logs may exist.

As shown in FIGS. 14(*a*) and 14(*p*) if the Monitor Device option is selected at step 1653, a listbox (not shown) containing all the devices that are available to be monitored on the screen is displayed. To display the listbox of all system devices the primary database message call (PS82) is enabled at step 1655 to get all of the device configuration records which are viewable from the device monitor screen. The operator is prompted to highlight the particular device which is to be monitored at step 1657, and, when the device is selected the device monitor screen of FIG. 24(*b*), is displayed. To fill the screen with the desired device status information, the interprocess message call (I23) is made to the cell manager at step 1609 to retrieve the device status information. This particular process involves looking at each parameter type (GMP, process, and other) to ascertain if it is a long or double word, scaling the value if necessary, assigning the return information, retrieving all of the zone information for a given device from the DEVZONE table by CM FTB message call (CF18) and finally, displaying the information in parameter data listbox 868 and data history listbox 869 such as shown in FIG. 24(*b*).

In FIG. 24(*b*), after loading the Device Monitor screen display 852 is loaded with the device status information, the operator is enabled to perform the following functions: by selecting the CREATE GRAPHIC button 861, the operator may create an individualized device monitor screen by selecting from an Instrument Panel listbox (not shown) that is used to select the instrument panel upon which the new graphic tool will be placed (the list box contains the names of the instrument panels). A graphic tool definition dialog will be displayed for the operator to configure the control fields for the graphic tool. By selecting the VIEW X-BAR button 862 of FIG. 24(*b*) with a parameter selected that is available for SQC X-Bar, an X-Bar, R graphic using the parameter selected will be by selecting the START/STOP SQC RECORDING button 863 with a parameter selected makes it available for SQC X-Bar viewing or makes it unavailable for SQC X-Bar recording. Depending on the state of the parameter selected the button will display STOP SQC X-Bar Recording or Start SQC X-Bar Recording. If the parameter is presently recording SQC X-Bar information, the button will display STOP SQC X-Bar Recording. If the parameter is presently not recording the SQC X-bar information, the button will display the START SQC X-Bar Recording. By selecting the START/STOP LOG TO FILE button 864, the operator is enabled to log parameter data to a file that may be later viewed and printed at a later date. Due to the amount of information being recorded the Log files will be limited in size and depending on the state of the parameter selected the button will display STOP LOG TO FILE or START LOG TO FILE. By selecting the VIEW LOCAL LOGS button 865, the operator may view the log recorded on the particular system PC. The user will be able to view and/or print the logs. By selecting the DATA HISTORY ON button 866, the operator may view the parameter information in the DATA HISTORY window. Parameters that are available for viewing data history are identified with the available to view history symbol. By selecting the DATA HISTORY OFF button 867 the user may stop viewing the parameter information in the DATA HISTORY window, and, by selecting the SYNCH buttons 868*a,b,c*, the user is enabled to synchronize the data history windows for synchronized data scrolling.

View X,Bar R

If the operator desires to select the view XBar,R graphic 861 (FIG. 24(*b*)), then the interprocess message call (I24) is made to the cell manager to retrieve parameter specification data (upper and lower limits, etc.) for the given device, and a message to display the X,Bar R chart with the retrieved data is called. The mechanism for starting and stopping the SQC recording process for a particular device parameter will now be explained hereinbelow:

First, as shown as step 1660 in FIG. 14(*q*), the operator is prompted to highlight the selected item from the parameter data listbox 868 (FIG. 24(*b*)). If the operator desires to start recording the SQC process of the parameter chosen at step 1660, then a determination is made at step 1663 if the process the parameter desired to be monitored for SQC is currently being monitored or not. If the process parameter desired to be SQC monitored is currently not being monitored, then the operator is prompted to enter the subgroup size (number of readings taken), the frequency interval (time interval between each sample), and, the skip interval, (intervals to wait between subgroups) at step 1165, and, the interprocess message (I42) is sent to the Cell Manager to start the SQC recording process for X-Bar,R data at step 1667. Then, at step 1669, if it is determined that an SQC dataset has not already been opened for the specified device parameter, then the message call (A8) is made to the SQC process to open a dataset for the specified device parameter if one has not already been opened. Additionally, at step 1670, the desired frequency, subgroup size, and skip interval is assigned by the operator to the particular device parameter. As described previously, these values are configurable, and the values entered determine the amount and frequency of process parameter data that is to be collected by the cell manager's device monitor thread for each PLC device.

If the operator desires to stop recording the SQC process as determined, then, a determination is made if the process the parameter desired to be monitored for SQC is being monitored or not. If the process parameter desired to be monitored is currently being monitored, then the system returns and the message (A11) is sent to the SQC process to close the device parameter dataset. It should be mentioned that logic has been built into the (I42) message to ensure that the operator does not stop a required parameter which is setup in the database for automatic SQC monitoring.

Automatic Lens Inspection

Enabling of the Automatic lens inspection ("ALI") option 1675 as shown in FIG. 14(*a*), enables the input of information from ALI and the develops reports to characterize ALI by cavity. In the preferred embodiment as shown in FIG. 2, an RS-232 interface driver receives ALI results at a transmission rate of 19.2 baud and collected by the PCS at the post-hydration cell. Additionally, communication is bi-directional and all data is interpreted as ASCII characters.

As shown in FIG. 24(*a*), when the ALI option 853 is selected, a menu is loaded and displayed to reveal a list of all ALI results that may be displayed. For instance, in the ALI graphics menu screen 870 shown in FIG. 24(*c*), a select graphic listbox 875 is generated for operator selection of the type of data results collected for the ALI and to be displayed in graphic form that includes: ALI pass/fail reports; center of lens condition codes; ALI inner score, outer score, combination score, and total score summaries; lens position abort summary; pallet defects summaries; pass/fail codes; pallet code summaries and ALI total lens abort summary. As shown in FIG. 24(*c*), for a given master lot indicated in the master lot entry field 872 selecting the configure button 876 will display the frequency window 877 so that the operator may configure the frequency for collecting ALI data in this window. The view data 878 and view graph 879 selections enable the operator to view and display Pareto and X-Bar, R graphic displays. Illustrative examples of a view data and view graph for a lens condition check are respectively shown in FIGS. 25(*a*) and 25(*b*).

Device Alarm Information

As shown in FIG. 14(*a*), when the Device Alarm option is selected at step 1680, a screen is displayed at step 1681 to enable the operator to view graphs or reports of alarm data collected at the devices defined in the system. Data can be limited to a given timeframe by setting the start and end date/time.

In the Device Alarm screen 880 shown in FIG. 26(*a*), a select device listbox 881 is generated for operator selection of which data is to be viewed. Additionally, a select graph listbox 882 is generated for operator selection of a graph type that is desired to be viewed.

The date and time entry fields 883 are used as criteria for gathering data to be viewed from the database or data logs. Only data with a timestamp equal to or greater than this will be used. If the current time checkbox 884 is checked, then the end date and time will keep synchronized with the current time. Selection of the view report button 885 will cause an OS/2 Query Manager menu of reports to be displayed, and selection of the view graph button 886 will create a graph of data corresponding to the selected device, graph type, and date/time criteria.

For instance, FIG. 26(*b*) shows an example of an alarm graph showing alarm durations for a particular time period.

Device Yield Information

As shown in FIG. 14(*c*), when the Device Yield option is selected at step 1690, a screen is displayed at step 1691 to enable the operator to view graphs or reports of yield data collected at the devices defined in the system. Data can be limited to a given timeframe by setting the start and end date/time.

In the Device Yield screen 890 shown in FIG. 27(*a*), a select device listbox 891 is generated for operator selection of which data is to be viewed. Additionally, a select graph listbox 892 is generated for operator selection of a graph type that is desired to be viewed.

The date and time entry fields 893 are used as criteria for gathering data to be viewed from the database or data logs. Only data with a timestamp equal to or greater than this will be used. If the current time checkbox 894 is checked, then the end date and time will keep synchronized with the current time. Selection of the view report button 895 will cause an OS/2 Query Manager menu of reports to be displayed, and selection of the view graph button 896 will create a graph of data corresponding to the selected device, graph type, and date/time criteria.

For instance, FIG. 27(*b*) shows an example of a graph in pie chart form showing the total yield for selected system devices.

Although not shown in the Figures, the device yield display will further enable time trending charts for particular devices.

Device Word Information

As shown in FIG. 14(*c*), when the Device Word Information option is selected at step 1700, a screen is displayed at step 1701 to enable the operator to view graphs or reports of device word data collected at the devices defined in the system. Data can be limited to a given timeframe by setting the start and end date/time.

In the Device Word information screen 990 shown in FIG. 28(*a*), a select device listbox 991 is generated for operator selection of which data is to be viewed. Additionally, a select word description listbox 992 retrieves the description of the word data that is desired to be viewed. This description is tied to the actual location of the data in the device by the cell manager process responsible for that device. The state descriptions listbox 993 is generated for descriptions of the various word bit states being monitored by the cell manager process. In the preferred embodiment, there are up to 33 possible states for each 16 bit word being monitored. The 16 states correspond to the 16 bits of the word. Another 16 states can be defined as combinations (using AND, OR, and NOT operators) of the bits in the word and these are defined at the cell manager. The other state is for communications down time, that is, time during which the cell manager could not communicate with the device. Additionally, a select graph listbox 994 is generated for operator selection of a graph type that is desired to be viewed. The date and time entry fields 996 are used as criteria for gathering data to be viewed from the database or data logs. Only data with a timestamp equal to or greater than this will be used. If the current time checkbox 997 is checked, then the end date and time will keep synchronized with the current time. Selection of the view report button 998 will cause an OS/2 Query Manager menu of reports to be displayed, and selection of the view graph button 999 will create a graph of data corresponding to the selected device, graph type, and date/time criteria.

For instance, FIG. 28(*b*) shows an example of a pie graph showing the word information for the selected post hydration PLC device.

Scrap Log Screen

As discussed briefly below, and, as shown in FIG. 14(*c*), when the Scrap Log option is selected at step 1725, the Scrap Log screen is loaded and displayed at step 1726 to enable the operator to allow for scrapping of product and for recording of data associated with scrapped product at any device.

Specifically, the Scrap log information screen 1050 of FIG. 29 includes a select device listbox 1051 and a select reason window 1052. When the notes dialog box 1053 is selected, the scrap reason may be entered in the free form area provided therein. The appropriate master lot/split lot numbers are displayed in the display fields 1054 and the amount of product to be scrapped is entered in entry field 1055.

As shown in FIG. 14(*c*), step 1730, to fill the select device listbox, the interprocess message (PS40) is first implemented to get all of the device configuration records which are used for scrap identification. Once an operator selects a particular device to enter into the scrap log, as indicated at step 1731, the select reasons window is then filled by calling the interprocess message (PS41) to retrieve all of the scrap reasons for a device from the SCRAP_REASONS table as shown at step 1735.

Based upon the given device, the appropriate MASTER LOT and SPLIT LOT numbers are assigned and displayed based upon the device selection at step 1737. After the screen items are displayed and the quantity and scrap reasons are chosen or entered at step 1739, the save button 1057 of FIG. 29 is selected to save the scrap log information. The scrap log information record is thus written to the scrap log by primary database SQL call (PS28) at step 1740, FIG. 14(*e*). Finally, the production good and bad counters are updated in the LINESTAT and MASTER_LOT_YIELD tables by interprocess message (I20) at step 1745.

The other device monitor process for operator choice is the GMP parameter log view as shown as step 1747 in FIG. 14(*c*).

Utility Menu

As shown in FIG. 14(*b*), if the utility menu screen is selected at step 1105*h,* then the Utility Menu screen is displayed as indicated at step 1750. As shown in FIG. 30, the Utility menu screen, enables an operator to access the various system utility functions such as: The report menu 901, for displaying different predefined reports that can be displayed/printed for PCS; the View edit database menu 902 for activating the Query Manager view/edit database menu to enable the operator to view/edit the database; the View logs screen 903 to display the various PCS logs; the Supplemental Setup instruction menu 904 for viewing any of the supplemental setup instructions that may exist outside of the context of line changeover (e.g., an operator just wants to view instructions); the query manager 905 for displaying the query manager interface to the database; and, the security administration 906 for displaying the security administration dialog that authorizes users to specific system resources.

Specifically, in accordance with the view of FIG. 3, the Report Menu will enable selection of the following different types of reports that can be displayed/printed for PCS: Static table reports, batch support data, log report data, and production report data. In the preferred embodiment, an operator may add/delete or change the report menu based on the PCS data requirements.

The Database View/Edit Menu activates the Query Manager callable interface of the primary database. The present set of menu items for PCS database editing or viewing include: the product data, audit information, device data, and miscellaneous data. The PCS support personnel can add/delete or change the menu based on the PCS data requirements. For example, from the product data menu of the database View/edit option 902, an operator may view/edit PRODUCT_SKU, SKU_AUDIT, SKU_GMP_EXCEPTIONS, SKU_PARM_EXCEPTIONS, INSTRUC_SET, SUPPLEMENTAL_SUI, and, RAW_MATERIAL information. Logic is built in to the system to avoid any unauthorized changes to the database.

Selecting View Log option 903 from the Utility Menu will display the View Log window from which the operator may select the log that they are interested in or change the directory to view other logs.

Injection Mold Die Entry

As shown in FIG. 14(*b*), if the Injection Mold Die Entry screen is selected at step 1105*i,* the Injection Mold Die Entry screen is displayed which enables an operator to log a mold tag number whenever a new mold is installed in one of the injection mold machines. First, as shown at step 1760 in FIG. 14(*r*), the Injection Mold Die Entry screen is loaded and displayed. As shown in FIG. 31, the injection mold die entry screen enables the operator to select the front curve, back curve, or, primary packaging injection molder (whose die is to be changed), and, at step 1763 in FIG. 14(*r*), enter the mold tag number in the entry field 953 (FIG. 31). After performing a security check, the interprocess message (PS89) is called at step 1765 to insert the updated injection mold tag information as a log in the INJ_MOLD_DIE_LOG table.

Line Manager

As mentioned above, the primary responsibility of the line manager is to coordinate order activation and completion between the system operations and the cells, and, to back up any data which is no longer in-process and older than three weeks to the Archive database.

Figure 10:
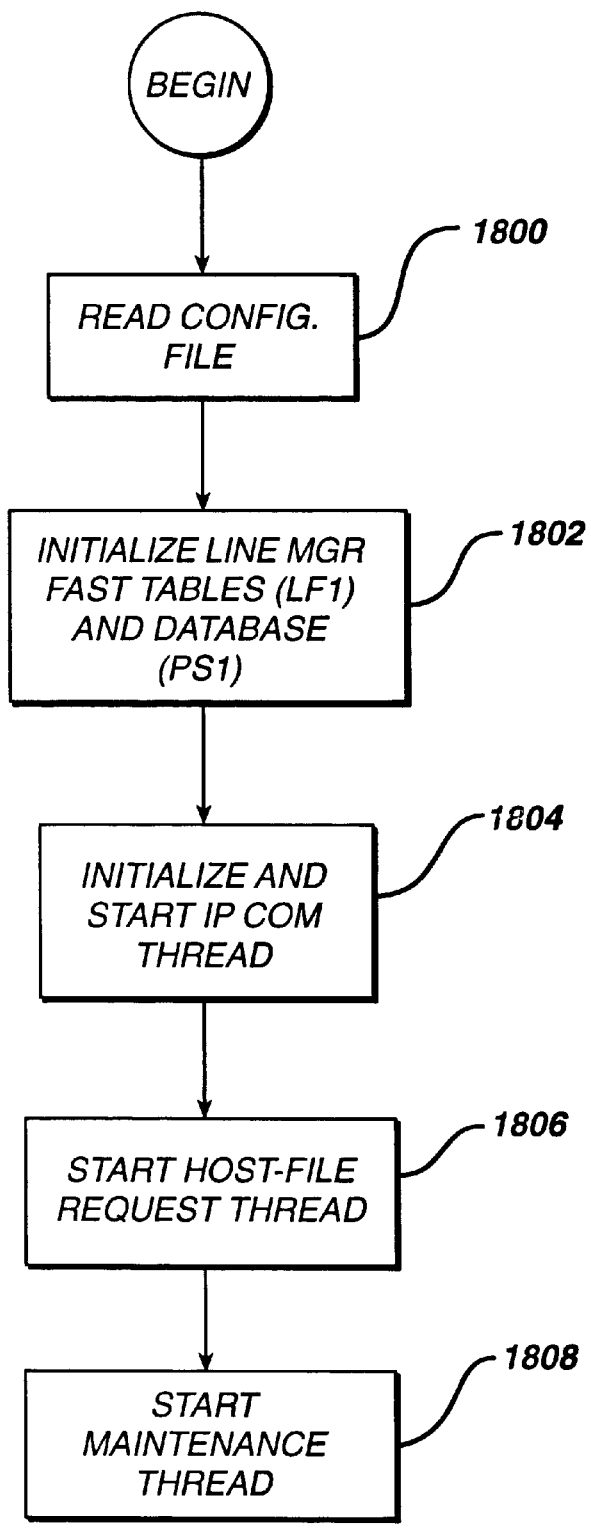
FIG. 10 illustrates the Line manager software process overview.

As shown in FIG. 10, the first step 1800 of the line manager process is to read its configuration file, i.e., read all the "CFG.*" data variables, flags, files, drive paths, and indexes used for each of the devices in communication with the Line manager. Next, at step 1802, all of the Line Manager Fast tables (element 119, FIG. 4) that receive in-process production data information are opened and initialized by the message call (LF1) shown in Table C (FIG. 5). Additionally, at step 1802, the database message call (PS1) is made so that the primary database is initialized. Next, at step 1804, the Inter-process Communications thread is initialized and the inter-process message receive thread is initiated. Two other Line manager threads, the Host File Request thread, and, the Maintenance thread are additionally started, respectively, at steps 1806 and 1808.

The host file request thread 1806 is the process for downloading contact lens production line order information from the host PRMS. In the preferred embodiment, the host PRMS generates production order information for contact lens production and sequentially tags each file for storage in a host file directory. The line manager polls the host file directory at a predetermined time intervals, preferably in milliseconds, and sequentially downloads new files from the host. As show in FIG. 32, the first step 1810 for downloading host information includes retrieving the next host file number of the sequence and to request the host I/F to download it. Utilizing the line manager message call (LF2), the next host file number is obtained from the LM_FT. Then, at step 1812, a host file name is created using a predetermined AS/400 header format and the file is configured for use by the PCS. Finally, at step 1814, a request is made to download the host file from the PRMS using the interprocess message (A3). In the preferred embodiment, the PRMS host transaction files to be downloaded will contain multiple records. In the preferred embodiment, two types of records are used: schedule (work orders) and raw material status. A finer level of granularity may be provided so that records detailing specific transactions may be processed. These finer detailed records include: new work orders—to identify work order information for new orders to PCS; update order transaction—to identify work order information to be updated by PCS; delete order transaction—to identify work order information to be deleted by PCS; and, raw material status information—to identify raw material status information to PCS.

It should be mentioned that after the PCS has successfully downloaded and the production line has successfully processed an order, the PCS will upload an order complete file. The uploading process is largely similar. The PCS writes a file to disk and then uploads it to a pre-determined AS/400 directory. These files are sequentially tagged so that the PRMS may poll the AS/400 directory for each consecutive file to be processed. The PCS transaction files to be uploaded will contain multiple records. In the preferred embodiment, two types of records are used: schedule (work orders) and raw material usage. The PCS work order record will be used to identify work order completion information to PRMS, and, the raw material usage record will be used to identify raw material usage information to PRMS.

As mentioned briefly above, the maintenance thread 1808 is used to back up any data to the Archive database which is no longer in-process and older than three weeks. As shown in FIG. 33(*a*), the maintenance thread of the Line Manager process is invoked that involves the steps of: obtaining the maintenance time and date from the LM_FT, as performed by the line manager fast table message call (LF39) at step 1820; then, obtaining the current system time and date at step 1822; then, comparing the current time and date to the next local maintenance time and date, as indicated at step 1824. If the current time and date is beyond the maintenance time and date, then, as indicated at step 1826, for all of the master lots that are older than a predetermined number of days prior to the current time and date, which is a value obtained by a message call (PS90) to the MASTER_LOT_PROD table in the primary database table, the following maintenance items are performed by the line manager that include: at step 1828, archiving the scrap log records from the SCRAP_LOG table by accessing the table from the primary database by SQL message calls (PS91, PS92), deleting the table by message calls (PS93, PS94), and sending the table data to the archive database by interprocess message (I26) to the archive manager; at step 1830, archiving the batch primary records from the BATCH_PRIMARY table by accessing the table from the primary database by SQL message calls PS95, PS96, closing and deleting the table by message calls PS97, PS98, and sending the data to the archive database by interprocess message I27 to the archive manager; at step 1832, archiving the batch raw material records from the BATCH_RAW_MATL table, as performed by primary database SQL message calls PS99, PS100, PS101, PS102 and interprocess message I28 to the archive manager; at step 1834, archiving the batch set-up instruction records from the BATCH_SUI table, as performed by primary database SQL message calls PS103, PS104, PS105, PS106 and interprocess message I29 to the archive manager; at step 1836, archiving the batch device software revision level records from the BATCH_DEV_REV table, as performed by primary database SQL message calls PS107, PS108, PS109, PS110 and interprocess message I30 to the archive manager; at step 1838, archiving the GMP set points values from the BATCH_GMP_SP table, as performed by primary database SQL message calls PS111, PS112, PS113, PS114 to the primary database and interprocess message I31 to the archive manager; at step 1840, archiving the measurement audit records from the BATCH_MEAS_AUDITS table, as performed by primary database SQL message calls PS115, PS116, PS117, PS118 and interprocess message I32 to the archive manager; at step 1842, archiving the defect audit records from the BATCH_DEF_AUDITS table, as performed by primary database SQL message calls PS119, PS120, PS121, PS122 and interprocess message I33 to the archive manager; at step 1844, archiving the detailed results of the defect audits against master/split lots stored in the BATCH_DEF_DETAIL table, as performed by primary database SQL message calls PS123, PS124, PS125, PS126 and interprocess message I34 to the archive manager; at step 1846, archiving the logs for (split lot) sterilizer aborts from the STERI_ABORT_LOG table, as performed by primary database SQL message calls PS127, PS128, PS129, PS130 and interprocess message I35 to the archive manager; at step 1848, archiving the production yield information against a master lot, device, etc., stored in the MASTER_LOT_YIELD table, as performed by primary database SQL message calls PS131, PS132, PS133, PS134 and interprocess message I36 to the archive manager; at step 1850, archiving the production information against the master lot from the MASTER_LOT_PROD table by accessing the table from the primary database by SQL message calls PS135, PS136, closing and deleting the table by message calls PS137, PS138, and sending the data to the archive database by interprocess message I37 to the archive manager; at step 1852, archiving the injection mold die changeout records from the INJ_MOLD_DIE_LOG table, as performed by primary database SQL message calls PS139, PS140, PS141, PS142 and interprocess message I38 to the archive manager; at step 1854, archiving the logged alarm recovery intervention actions from the ALARM_RECOVERY table, as performed by primary database SQL message calls PS143, PS144, PS145, PS146 and interprocess message I39 to the archive manager; and, as shown in FIG. 33(*b*) at step 1860, archiving the user notes which have been logged against a process from the SYSTEM_NOTE_LOG table, as performed by primary database SQL message calls PS147, PS148, PS149, PS150 and interprocess message I40 to the archive manager. Additionally, at step 1862, the line manager sends a list of the master lots archived by interprocess message I41. Finally, at step 1864, the maintenance time and date is updated by incrementing the current date and that date is written to the LM_FT, as performed by the line manager fast table message call (LF40).

The Line Manager Interprocess Communication thread actually involves two message types: the IPCOM Receive Send Message thread and the IPCOM Receive Send Wait Message thread for processing messages and commands from the production cells and the operator interfaces.

As described above with respect to the operator interface communication thread, master lot and split lot production orders may be activated and completed orders at each of the production cells. Interprocess messages that are sent to the Line manager for activating and completing orders are now described hereinbelow.

Activate Order at IM

As described above with respect to step 1129, FIG. 14(*d*), an interprocess message (I2) is sent from the injection mold cell to the Line Manager to activate the order (from PRMSPEND.FTB) when the injection molding order is activated. As shown as step 1875 in FIG. 34, when a message to activate an order for injection molding at the line manager is received, the following steps are performed: First, at step 1876, records are moved from the PRMSPEND.FTB table to the FCLFHPHL.FTB (injection mold active order table) by invoking the line monitor fast table message (LF9). Then, at step 1877, the line status records are updated for the FC PLC and BC PLC devices by invoking LM FTB message calls (LF10) and (LF12). Next, at step 1879, a record is created and inserted in to the MASTER_LOT_PROD table 250 by SQL database message call (PS5). At step 1880, FIG. 34, the last used raw materials are moved into the BATCH_RAW_MATL table in the manner as follows: a cursor for the LAST_USED_RAW_MATL table is opened by SQL message (PS6); all the records are then fetched by SQL message (PS7) configured in a loop; for the specified master lot number, the last used raw material record is inserted into the BATCH_RAW_MATL table by SQL message call (PS9); and, the cursor for the LAST_USED_RAW_MATL table is closed by SQL message (PS8).

Finally, at step 1882, the (I2) reply is sent back to the injection mold cell indicating that the order has been successfully activated, and, at step 1884, the information for the order management interface screen is updated with PRMSPEND (host) records, by invoking LM FTB message call (LF4), and, FCLFPHL (IM,LF,HY) records by invoking LM FTB message calls (LF5) and then sending the message (I1) to update the screen.

Activate Order at LF HY PH L

As described above with respect to step 1129, FIG. 14(*d*), an interprocess message (I5) is sent from the activating cell monitor (LF HY PH Labeller) to the Line Manager to activate an order (from FCLFHPHL.FTB). As shown as step 1900 in FIG. 35, when a message to activate an order for lens fab, hydration, post hydration, and the labeller at the line manager is received, the following steps are performed: First, at step 1902, records from the FCLFHPHL.FTB table are moved from the previous cell to the activating cell by invoking the line monitor fast table message (LF11). Then, at step 1904, the line status records are updated for the LF HY PH Labeler PLC devices by invoking LM FTB message calls (LF12). At step 1906, a reply is then sent back to the activating LF HY PH or Labeler cell indicating that the order has been successfully activated. Finally, at step 1908, the information for the order management interface screen is updated with FCLFPHL (PH,Labeller) records by invoking LM FTB message calls (LF5) and then sending the message (I12) to update the screen.

Completing Order at IM, LF, HY, PH, Labeler

As described above with respect to step 1202, FIG. 14(*f*), an interprocess message (I7) is sent from the injection mold, lens fab, hydration, post hydration, and labeler cells to the Line Manager to complete the order when the order is completed at that particular cell. As shown as step 1910 in FIG. 36, when a message to complete an order for injection mold, lens fab, hydration, post hydration, and the labeller at the line manager is received, the following steps are performed: First, at step 1912, the FCLFHPHL record structure is set to nulls and the record is updated to by invoking the line monitor fast table message (LF11). Then, at step 1914, the line status records for the attached PLC devices (FC, BC, Fill Assy, Cure/Demold, Hydration, Post hydration, primary packaging, and sealing PLC) of the completing cell are updated and cleared by invoking LM FTB message calls (LF14). At step 1916, a reply message (I7) is then sent back to the completing IM, LF, HY, PH, or Labeler cell indicating that the order has been successfully activated. Finally, at step 1918, depending upon which cell has issued the completing order, the order management interface screen is updated with PRMSPEND (host) records, by invoking LM FTB message call (LF4) and FCLFPHL (IM,LF,HY) records by invoking LM FTB message calls (LF5) and then sending the message (I1), or, is updated with FCLFPHL (PH, Labeller) records by invoking LM FTB message call (LF5), and sending the message (I12) to update the screen.

Activate Split Lot Order at Labeler

As described above with respect to step 1150, FIG. 14(*d*), an interprocess message (I9) is sent from the labeler cell monitor to the Line Manager to activate a split lot order (from FCLFHPHL.FTB). As shown as step 1920 in FIG. 37, when the message to activate a split lot order is received by the line manager, the following steps are performed: First, at step 1922, a batch primary record for the split lot is created and inserted into the BATCH_PRIMARY table by invoking the primary database SQL message (PS21). Then, at step 1924, the labeler's current split lot information record is updated by invoking LM FTB message call (LF17). Next, at step 1926, the last used raw material information is moved into the BATCH_RAW_MATL table in the manner described above, and, at step 1928, a reply is sent back to the labeler indicating that the order has been successfully activated. Finally, at step 1929, the information for the order management interface screen is updated with PRMSPEND (host) records, by invoking LM FTB message call (LF4), and, FCLFPHL (IM,LF,HY) records by invoking LM FTB message call (LF5) and then sending the message (I1) to update all operator interface screens.

Completing Split Lot at Labeler

As described above with respect to step 1213, FIG. 14(*f*), an interprocess message (I11) is sent from the labeler cell to the Line Manager to complete the split lot order. As shown as step 1930 in FIG. 38, when a message to complete the split lot order for the labeler is received at the line manager, the following steps are performed: First, at step 1932, the current split lot information for the labeler (LABELSL_REC) record is retrieved by invoking the message call LM FTB message call (LF15). Then, at step 1932, the message call LM FTB message call (LF18) is invoked to move the active split lot at the labeler to the pending split lot table for the sterilizer, and, to activate the stamp for the labeler active split lot to indicate that the split lot is complete. Next, at step 1934, the primary database SQL call (PS22) is invoked to update the quantity started field in the BATCH_PRIMARY table for the given master, split number. At step 1935, a reply message (I11) is then sent back to the completing Labeler cell indicating that the split lot order has been successfully completed. Finally, at step 1936, the order management interface screens are updated with: the current active orders in post hydration and the labeler and the current split/lot order at the labeler (I12) and the current pending lots for the sterilizer, active split lots for the sterilizer, pending split lots for the secondary packaging, and, active split lots at the secondary packaging (I13).

Activate Split Lot Order at Steri

As described above with respect to step 1170, FIG. 14(*e*), an interprocess message (I15) is sent from the sterilizer cell monitor to the Line Manager to activate a new split lot order from the sterilizer. As shown as step 1940 in FIG. 39, when the message to activate a split lot order is received by the line manager, the following steps are performed: First, at step 1942, the LM FTB message (LF23) is invoked to activate the specified lots for the sterilizer by copying the pending sterilizer records to the STERACTV.FTB table, and then, at step 1943, deleting the PENDSTER records which were copied. Then, at step 1945, the line status table is updated if a new master lot is being activated. At step 1946, a reply (I15) is sent back to the sterilizer indicating that the order has been successfully activated. Finally, at step 1947, the information for the order management interface screen is updated with: pending records for the sterilizer (PENDSTER) records, by invoking LM FTB message call (LF19); active lots for the sterilizer from STERACTV table by invoking LM FTB message call (LF24); pending records for secondary packaging (PENDSCPK) records, by invoking LM FTB message call (LF21); and, active split lots for secondary packaging from SCPKACTV table by invoking LM FTB message call (LF22). Then, the message (I13) is sent to update all cell screens, the line monitor screen, and the audit station screens.

Completing Split Lot at Steri

As described above with respect to step 1183, FIG. 14(*g*), an interprocess message (I10) is sent from the sterilizer cell to the Line Manager to complete the order when the order is completed at that cell. As shown as step 1950 in FIG. 40, when a message to complete a split lot order for the steri is received at the line manager, the following steps are performed: First, at step 1952, the LM FTB message (LF24) is invoked to retrieve all active lots for the sterilizer from the STERACTV table. Then, at step 1952, the primary database SQL message (PS23) is invoked to update the quantity sterilized and the sterilizer run number fields in the BATCH_PRIMARY table for the given master/split lot number. Next, at step 1954, the LM FTB message (LF26) is invoked to update the line status record quantity good field in the line status table for the Steri PLC device, and, at step 1956, the primary database SQL message (PS25) is invoked to update the quantity good and yield per cent fields in the MASTER_LOT_YIELD table. At step 1958, the LM FTB message (LF25) is invoked to complete the specified lots for the sterilizer by copying the active sterilizer records from the STERACTV table to the PENDSCPK table and then deleting the STERACTV records which were copied. At step 1959, a reply (I10) is sent back to the sterilizer indicating that the split lot has been successfully completed. Finally, at step 1960, the information for the order management interface screen is updated with: pending records for the sterilizer records (LF19); active lots for the sterilizer (LF24); pending records for secondary packaging records (LF21); and, active split lots for secondary packaging (LF22). Then, the message (I13) is sent to update all cell screens, the line monitor screen, and the audit station screens.

Aborting Lot Order at Steri

As described above with respect to step 1179, FIG. 14(*e*), an interprocess message (I16) is sent from the sterilizer cell monitor to the Line Manager to abort a lot order from the sterilizer. As shown as step 1962 in FIG. 41, when the message to abort a steri lot order is received by the line manager, the following steps are performed: First, at step 1964, a determination is made as to whether the current abort is the third abort for the lots in the sterilizer. If it is not the third abort, then, at step 1973, the LM FTB message (LF30) is invoked to update the STERACTV record in the STERACTV table. If it is the third abort for master/split lot at the sterilizer, at step 1966, the BATCH_PRIMARY table is updated by first invoking the LM FTB message (LF24) to retrieve all of the STERACTV records. Then, the LM FTB message (LF31) is invoked to get the next PCS file number which will be used in building the host upload file, Then, at step 1966, the SQL database message (PS26) is invoked to close out the batch primary record for the given master/split lot. Next, the SQL database messages (PS27 and PS28) are invoked to insert a record into the scrap log at step 1967. Then, at step 1968, the SQL database message (PS29) is invoked to update the ACT_END_DT and ACT_QTY_COMPLETE (quantity complete) fields in the MASTER_LOT_PRODUCT table. Next, at step 1969, the SQL database message (PS30) is invoked to update the quantity scrapped field in the MASTER_LOT_YIELD table. Then, at step 1970, the LM FTB message (LF28) is invoked to update the quantity bad line status record field for the sterilizer, and, at step 1971, the LM FTB message (LF29) is invoked to delete all of the aborted lots from the STERACTV table. Then, at step 1972, a host transaction file is appended with the completed work order information and the completed work order file is uploaded to the host PRMS by invoking interprocess message (A1).

Regardless of whether the sterilizer abort was the third abort or not, at step 1975, FIG. 41, a record is inserted into the sterilizer abort log by invoking the SQL database message call (PS31). Furthermore, the LM FTB message (LF32) is invoked to increment the next PCS file number in the GENINFO table for later system use. At step 1976, a reply (I16) is finally sent back to the sterilizer indicating that the split lot has been aborted, and, at step 1977, the information for the order management interface screen is updated with: pending records for the sterilizer records (LF19); active lots for the sterilizer (LF24); pending records for secondary packaging records (LF21); and, active split lots for secondary packaging (LF22). Then, the message (I13) is sent to update all cell screens, the line monitor screen, and the audit station screens.

Activate New Split Lot at Secondary Packaging

As described above with respect to step 1170, FIG. 14(*e*), an interprocess message (I17) is sent from the SECPKG cell monitor to the Line Manager to activate a new split lot order at the secondary packaging cell. As shown as step 1980 in FIG. 42, when the message to activate a split lot order is received by the line manager, the following steps are performed: First, at step 1982, the LM FTB message (LF33) is invoked to activate the specified lots for the sterilizer by copying the pending secondary packaging record to the SCPKACTV.FTB table, and, at step 1983, deleting the PENDSCPK record which was copied. Then, at step 1984, the line status table is updated if a new master lot is being activated. At step 1985, the last used raw material information is moved into the BATCH_RAW_MATL table in the manner described above, and, at step 1986, an (I17) reply is sent back to the secondary packaging cell indicating that the split lot order has been successfully activated. Finally, at step 1987, the information for the order management interface screen is updated with: pending records for the sterilizer (PENDSTER) records, by invoking LM FTB message call (LF19); active lots for the sterilizer from STERACTV table by invoking LM FTB message call (LF24); pending records for secondary packaging (PENDSCPK) records, by invoking LM FTB message call (LF21); and, active split lots for secondary packaging from SCPKACTV table by invoking LM FTB message call (LF22). Then, the message (I13) is sent to update all cell screens, the line monitor screen, and the audit station screens.

Completing Split Lot at SecPkg

As described above with respect to step 1188, FIG. 14(g), an interprocess message (I18) is sent from the SECPKG cell monitor to the Line Manager to complete the split lot order at the secondary packaging cell. As shown as step 1990 in FIG. 43, when the message to complete the split lot order is received by the line manager, the following steps are performed: First, at step 1992, the BATCH_PRIMARY table is updated by first invoking the LM FTB message (LF22) to retrieve all of the SCPKACTV records and the LM FTB message (LF31) is invoked to get the next PCS file number which will be used in building the host upload file. Then, the SQL database message (PS33) is invoked to update the batch primary fields in the BATCH_PRIMARY table. Then, at step 1994, the SQL database message (PS29) is invoked to update the ACT_END_DT and ACT_QTY_COMPLETE (quantity complete) fields in the MASTER_LOT_PRODUCT table. Then, at step 1996, a host transaction file is appended with the completed work order information and the completed work order file is uploaded to the host PRMS by invoking interprocess message (A1). Furthermore, the LM FTB message (LF32) is invoked to increment the next PCS file number in the GENINFO table for later system use, and, at step 1997, the SCPKACTV table is updated as complete by invoking LM FTB call (LF35). At step 1998, a reply (I18) is finally sent back to the secondary packaging monitor cell indicating that the split lot has been completed, and, at step 1999, the information for the order management interface screen is updated with: pending records for the sterilizer records (LF19); active lots for the sterilizer (LF24); pending records for secondary packaging records (LF21); and, active split lots for secondary packaging (LF22). Then the message (I13) is sent to update all cell screens, the line monitor screen, and the audit station screens.

While the invention has been particularly shown and described with respect to the preferred embodiments thereof, it will be understood by those skilled in the art that the foregoing and other changes in form and details may be made therein without departing from the spirit and scope of the invention, which should be limited only by the scope of the appended claims.

We claim:

1. A production control system for monitoring process parameters in an automated production line for manufacturing contact lenses, said production line having a plurality of process stations including a beginning and an end, each process station having one or more process control devices that control production operations at a respective process station and generates production parameter data therefrom, said system comprising:

(a) a line monitor device for receiving an externally generated production order including a lot number, product type, and quantity, said line monitor:
  i) coordinating manufacturing processes at each said plurality of process stations, and,
  ii) tracking order production from said beginning to said end of said production line;

(b) a plurality of cell monitor devices for retrieving said production data from said one or more process control devices and processing said data to ensure that production data are within predefined setpoints; and, (c) an interface device for enabling operator activation and completion of orders at each process station and for accessing line status information from said line monitor device and production data from said cell monitor device for real-time viewing of respective line status and control device status information.

2. The production control system for monitoring process parameters in an automated production line as claimed in claim 1 further including a fist database storage means for storing said predefined setpoints for each of the system process control devices.

3. The production control system for monitoring process parameters in an automated production line as claimed in claim 2 further including one or more audit stations for performing quality control audit tests upon one or more said manufactured products associated with a particular lot or process station devices wherein results of said audit tests are entered through said operator interface for storage in said database storage means.

4. The production control system for monitoring process parameters in an automated production line as claimed in claim 3 wherein said cell monitor device compares said audit results against predefined setpoints and generates an alarm when said results are out of range.

5. The production control system for monitoring process parameters in an automated production line as claimed in claim 2 wherein said cell monitor devices compares said production data against said predefined setpoints and generates an alarm when said production data is out of range.

6. The production control system for monitoring process parameters in an automated production line as claimed in claim 5 wherein predefined setpoints for selected production parameters conform to good manufacturing practice (GMP).

7. The production control system for monitoring process parameters in an automated production line as claimed in claim 2 further including a second memory storage database for storing in-process order and line status information, said line monitor accessing said in-process order information for coordinating said manufacturing processes.

8. The production control system for monitoring process parameters in an automated production line as claimed in claim 7 wherein said line status information further includes the device status information including the amount of good lens product and the amount of bad lens product at said devices.

9. The production control system for monitoring process parameters in an automated production line as claimed in claim 8 wherein said line status information further includes means for calculating the per cent yield for each device from said good and bad lens product counts, said line monitor calculating an estimate of said quantity remaining to be produced at said beginning station based on said per cent yield values.

10. The production control system for monitoring process parameters in an automated production line as claimed in claim 7 wherein said line status information includes current active orders at each of said process stations.

11. The production control system for monitoring process parameters in an automated production line as claimed in claim 10 wherein said line status information further includes externally generated orders that are ready for activation at said beginning process station.

12. The production control system for monitoring process parameters in an automated production line as claimed in claim 11, wherein said cell monitor includes an update counter for each parameter to be monitored, said update counter defining a time interval for polling a specific device parameter to be monitored.

13. The production control system for monitoring process parameters in an automated production line as claimed in claim 11 wherein said time interval is user configurable.

14. The production control system for monitoring process parameters in an automated production line as claimed in claim 2 wherein each of said plurality of cell monitor devices includes a polling device for polling each of said process control devices at a periodic basis to acquire said production parameter data.

15. The production control system for monitoring process parameters in an automated production line as claimed in claim 2 further including an automated lens inspection means for automatically evaluating each contact lens produced and generating inspection data for each contact lens for storage in said database.

16. The production control system for monitoring process parameters in an automated production line as claimed in claim 2 further including means for producing a batch record report comprising production parameters and alarm activity relating to a particular lot number.

17. The production control system for monitoring process parameters in an automated production line as claimed in claim 2 further including a third memory storage database for storing said production parameter data, said production control system including means for storing word and floating point data.

18. The production control system for monitoring process parameters in an automated production line as claimed in claim 2 wherein said line monitor device further tracks production raw material usage throughout the process stations.

19. The production control system for monitoring process parameters in an automated production line as claimed in claim 2 wherein said operator interface device accesses instructional information from said database storage when tooling at a particular process station is changed when manufacturing different production orders.

20. The production control system for monitoring process parameters in an automated production line as claimed in claim 2 wherein said line monitor device further retrieves production parameter data that has been stored in said database for a predetermined amount of time for archival storage in a fourth memory storage database.

21. The production control system for monitoring process parameters in an automated production line as claimed in claims 1 or 3 further including means for providing statistical quality control analysis (SQC) for one or more predetermined production parameters, said cell monitor means providing said production data and audit test results to said statistical quality control means at user-configured intervals.

22. The production control system for monitoring process parameters in an automated production line as claimed in claim 21 wherein said statistical quality control means includes means for generating run-rule checking for one or more predetermined production parameters or audit test results.

23. The production control system for monitoring process parameters in an automated production line as claimed in claim 22 wherein said statistical quality control means further includes means for automatically processing said production parameter or audit test data for graphic display thereof.

24. The production control system for monitoring process parameters in an automated production line as claimed in claim 23 wherein said graphic display includes an X-Bar,R chart.

25. The production control system for monitoring process parameters in an automated production line as claimed in claim 23 wherein said graphic display includes Pareto chart.

26. The production control system for monitoring process parameters in an automated production line as claimed in claim 1 further including means for automatically generating a batch record comprising line monitor and device monitor information.

27. The production control system for monitoring process parameters in an automated production line as claimed in claim 26 wherein said batch record information complies with FDA requirements.

* * * * *